United States Patent
Nakayama et al.

(10) Patent No.: US 6,339,774 B1
(45) Date of Patent: Jan. 15, 2002

(54) INFORMATION SHARING SYSTEM AND COMPUTER PROGRAM PRODUCT FOR CAUSING COMPUTER TO SUPPORT THE INFORMATION SHARING SYSTEM

(75) Inventors: Yasuko Nakayama, Yokohama; Kouichi Sasaki, Kawasaki; Yoichi Takebayashi, Kamakura; Mika Fukui, Tokyo; Yoshihisa Ohtake, Yokohama; Kazuyuki Gotoh, Kawasaki; Toshihiko Manabe, Kamakura; Toru Imai; Toshinari Takahashi, both of Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/015,074

(22) Filed: Jan. 28, 1998

(30) Foreign Application Priority Data

Jan. 29, 1997 (JP) .............................. 9-014937
Jan. 31, 1997 (JP) .............................. 9-019400

(51) Int. Cl.⁷ .............................................. G06F 17/30
(52) U.S. Cl. ........................... 707/10; 707/1; 707/100; 707/104
(58) Field of Search ................. 707/8, 1, 3, 5, 707/201, 200, 10, 104, 102, 2, 100

(56) References Cited

U.S. PATENT DOCUMENTS

| | | | |
|---|---|---|---|
| 5,123,103 A | * 6/1992 | Ohtaki et al. | 707/5 |
| 5,317,727 A | * 5/1994 | Tsuchida et al. | 707/2 |
| 5,761,666 A | * 6/1998 | Sakai et al. | 707/100 |
| 5,857,187 A | * 1/1999 | Uenoyama et al. | 707/8 |
| 5,873,085 A | * 2/1999 | Enoki et al. | 707/10 |
| 5,893,909 A | * 4/1999 | Normura et al. | 707/5 |
| 5,918,222 A | * 6/1999 | Fukui et al. | 707/1 |
| 5,983,220 A | * 11/1999 | Schmitt | 707/5 |

OTHER PUBLICATIONS

Toptsis et al. Relevance Feedback in the Retrieval of Results of Reusuable Software, Jan. 1996.*
Lelescu et al., Approximate Retrieval from Multimedia Databases Using Relevance Feedback, IEEE electronic library online, p. 215–223, Jan. 1999.*
Robert S. Fish, et al., "Quilt: A Collaborative Tool For Cooperative Writing," Association for Computing Machinery, (1988), pp. 30–37.
Timothy Catlin, et al., "Internote: Extending a Hypermedia Framework to Support Annotative Collaboration," Hypertext '89 Proceedings, (Nov. 1989), pp. 365–378.
Yoshiaki Seki, et al., "Flexible Information Sharing and Handling System–Towards Knowledge Propagation," IEICE Trans. Commun., vol. E77–B, No. 3, (Mar. 1994), pp. 404–410.
The Transactions of the Institute of Electronics Information and Communication Engineers, pp. 1223–1231 vol. J76–D–II NO. 6, Jun. 1993, w/partial English Translation.
"GoldFISH: Group Oriented Long–term Distribution with FISH," 93–GW–3, vol. 93, No. 75, Aug. 27, 1993, pp. 17–24 w/partial English Translation.

* cited by examiner

Primary Examiner—Jean R. Homere
Assistant Examiner—Greta Robinson
(74) Attorney, Agent, or Firm—Oblon, Spivak, McClelland, Maier & Neustadt, P.C.

(57) ABSTRACT

An information sharing system using a computer so as to allow a plurality of users to share disclosed information, the system comprising, input section for receiving responses to the disclosed information from references of the disclosed information, evaluation information generation section for totalizing and processing the responses to generate evaluation information and storing the evaluation information after correlating it with the disclosed information, and evaluation information notifying section for presenting the evaluation information generated by the evaluation information generation section.

59 Claims, 169 Drawing Sheets

| #1024 | TITLE | :LECTURE MEETING HOLDING PROCEDURE |
|---|---|---|
| | DISCLOSER | :TARO YAMADA |
| | DATE OF DISCLOSURE | :OCTOBER 1, 1995 |
| | CATEGORY | :KNOWHOW |
| | CLASSIFICATION | :VISITOR SERVICES |
| | RELATED INFO. | :#200 (HOW TO WRITE A LETTER OF REQUEST);#350 (LIST OF SCHOLARS) |
| | KEYWORDS | :LECTURE;VISIT;PROFESSORS;AGENDA |
| | CONTENTS | :(1)RESERVATION OF THE MEETING ARENA |
| | | (2)DISPATCH OF A LETTER OF REQUEST TO THE LECTURE |
| | | (3)CONSULTATION WITH THE SUPERIOR ON REMUNERATION |
| | | (4)FILING OF A REQUEST FOR THE VISIT |
| | | (5)ORAL AND VISUAL NOTIFICATIONS TO RELATED SECTIONS |
| | | (6)ARRANGEMENT OF AN AFTER-THE-MEETING PARTY |
| | | (7)RESERVATION OF AN PARTY ARENA INCLUDING DRINKS AND TAXIS |
| | REFERENCE HISTORY | :/log/#24;/log/#38;/log/#105 |

FIG. 2A

| #1320 | TITLE | :BUDGET CONTROL PROGRAM |
|---|---|---|
| | DISCLOSER | :MOMOKO YONEYAMA |
| | DATE OF DISCLOSURE | :OCTOBER 1, 1995 |
| | CATEGORY | :PROGRAM |
| | CLASSIFICATION | :BUDGET CONTROL SERVICE |
| | RELATED INFO. | :#300 (LIST OF ISSUED REQUESTS) |
| | KEYWORDS | :BUDGET;SCHEDULED PROCUREMENTS;OVERTIME |
| | CONTENTS | :/etc/yosan_kanri |
| | REFERENCE HISTORY | :/log/#60;/log/#62;/log/#120 |

FIG. 2B

LIST OF EVALUATIONS DISPLAY WINDOW

TITLE: LECTURE MEETING HOLDING PROCEDURE

| ORDER | REFERENCER (101) | TOTAL POINT (102) |
|---|---|---|
| 1 | tanaka | 85 |
| 2 | aoki | 80 |
| 3 | suzu | 77 |
| 4 | hiroko | 61 |

DISPLAY COMMENT | PER INDIVIDUALS (103) | END
DISPLAY GRAPH

PER INDIVIDUALS EVALUATIONS DISPLAY WINDOW

TITLE: LECTURE MEETING HOLDING PROCEDURE

USER/EVALUATOR: aoki ☐ ~111

EFFECTIVENESS : 9.0
REUSABILITY : 8.5 ~112
RECOMMENDABILITY TO OTHERS : 7.0

INFORMATION ON REFERENCERS ~114

END

COMMENT:
- THE PROCEDURE IS EASY TO UNDERSTAND BUT IT'S BETTER IF "HOW TO WRITE DOCUMENTS" OF (2) IS INCLUDED ~113

INFORMATION RETRIEVAL WINDOW

| SPECIFY CLASSIFICATION | SPECIFY KEYWORD | EXECUTE RETRIEVAL | INPUT EVALUATION | NEXT RETRIEVAL | END |

TITLE: PROCEDURE FOR APPLYING FOR NURSERY LEAVE
DISCLOSER: KANAKO SUZUKI
CONTENTS: (1) PERSONS HAVING A BABY 1 YEAR OLD OR YOUNGER ARE ENTITLED TO TAKE A NURSERY LEAVE
(2) A NURSERY LEAVE APPLICATION FORM HAS TO BE FILED IN AND SUBMITTED TO THE ADMINISTRATION
...

— 141

142
- CORRECTION
- ADDITION
- REQUEST FOR CORRECTION
- REQUEST FOR ADDITION
- DELETION
- REFERENCE

FIG. 14B

INFORMATION RETRIEVAL WINDOW

| SPECIFY CLASSIFICATION | SPECIFY KEYWORD | EXECUTE RETRIEVAL | INPUT EVALUATION | NEXT RETRIEVAL | END |

TITLE: PROCEDURE FOR APPLYING FOR NURSERY LEAVE
DISCLOSER: KANAKO SUZUKI
CONTENTS: (1) PERSONS HAV YOUNGER ARE
(2) A NURSERY L FIL ED IN A

143 — ADDITIONAL INFORMATION INPUT WINDOW

REGISTERED PERSON: NATSUKI HASEGAWA — 144
CONTENTS: (1) PERSONS HAVING A BABY 1 YEAR OLD OR YOUNGER ARE ENTITLED TO TAKE A NURSERY LEAVE UNTIL THE FIRST MARCH 31 AFTER THE FIRST BIRTHDAY

146 — REGISTER    CANCEL — 146

FIG. 15A

INFORMATION RETRIEVAL WINDOW

| SPECIFY CLASSIFICATION | SPECIFY KEYWORD | EXECUTE RETRIEVAL | INPUT EVALUATION | NEXT RETRIEVAL | END |

TITLE: PROCEDURE FOR APPLYING FOR NURSERY LEAVE
DISCLOSER: KANAKO SUZUKI
CONTENTS: (1) PERSONS HAVING A BABY 1 YEAR OLD OR YOUNGER ARE ENTITLED TO TAKE A NURSERY LEAVE — 151
(2) A NURSERY LEAVE APPLICATION FORM HAS TO BE FILLED IN AND SUBMITTED TO THE ADMINISTRATION
...

FIG. 15B

INFORMATION RETRIEVAL WINDOW

| SPECIFY CLASSIFICATION | SPECIFY KEYWORD | EXECUTE RETRIEVAL | INPUT EVALUATION | NEXT RETRIEVAL | END |

TITLE: LECTURE MEETING HOLDING PROCEDURE
DISCLOSER: TARO YAMADA
CONTENTS: (1) RESERVATION OF THE MEETING ARENA — 152

ADDITION — 153
REQUEST FOR ADDITION (2) DISPATCH OF A LETTER OF REQUEST TO THE LECTURE
...

162~TITLE : PROCEDURE FOR APPLYING FOR NURSERY LEAVE ~83
REGISTERED PERSON : NATSUKI HASEGAWA
DATE OF REGISTRATION : DECEMBER 6, 1996
CONTENTS : (1) PERSONS HAVING A BABY 1 YEAR OLD OR YOUNGER ARE ENTITLED
TO TAKE A NURSERY LEAVE UNTIL THE FIRST MARCH 31 AFTER
THE FIRST BIRTHDAY

FIG. 17

| log# | DISCLOSED INFORMATION IDENTIFICATION # | ADDITIONAL INFORMATION IDENTIFICATION # | SUBJECTIVE/ OBJECTIVE | SEMANTIC RELATIONSHIP |
|---|---|---|---|---|
| 24# | #1024-1 | #24 | OBJECTIVE | ADDITION |
| 25# | #1024-1 | #25 | OBJECTIVE | ADDITION |
| 26# | #1429-1 | #26 | OBJECTIVE | CORRECTION |
| 27# | #1500-2 | #27 | SUBJECTIVE | REQUEST FOR ADDITION |
| ... | ... | ... | ... | ... |

FIG. 19A

```
▽              INFORMATION RETRIEVAL WINDOW
┌─────────────┬────────┬────────┬──────────┬─────────┐
│  SPECIFY    │SPECIFY │EXECUTE │  INPUT   │  NEXT   │ END
│CLASSIFICATION│KEYWORD│RETRIEVAL│EVALUATION│RETRIEVAL│
└─────────────┴────────┴────────┴──────────┴─────────┘
```

TITLE: ACCOUNT SETTLEMENT FOR SHORT DISTANCE OFFICIAL TRIP
DISCLOSER: MINAMI WATANABE
CONTENTS: (1) AN ACCOUNT SETTLEMENT SLIP SHOULD SUBMITTED
FOR EACH SHORT DISTANCE OFFICIAL TRIP
(2) PERSONS MAKING A SHORT DISTANCE OFFICIAL
TRIP ARE ENTITLED RECEIVE TO A DAILY TRAVEL
ALLOWANCE OF ¥1,000 IF NO CANTEEN IS
AVAILABLE IN THE TRAVELING AREA
(3) A RECEIPT HAS TO BE SUBMITTED FOR EACH TAXI
RIDE TAKEN FOR THE MISSION

Menu 191:
- CORRECTION
- ADDITION
- REQUEST FOR CORRECTION
- REQUEST FOR ADDITION
- DELETION
- REFERENCE

FIG. 19B

```
▽              INFORMATION RETRIEVAL WINDOW
┌─────────────┬────────┬────────┬──────────┬─────────┐
│  SPECIFY    │SPECIFY │EXECUTE │  INPUT   │  NEXT   │ END
│CLASSIFICATION│KEYWORD│RETRIEVAL│EVALUATION│RETRIEVAL│
└─────────────┴────────┴────────┴──────────┴─────────┘
```

TITLE: ACCOUNT SETTLEMENT FOR SHORT DISTANCE OFFICIAL TRIP
DISCLOSER: MINAMI WATANABE
CONTENTS: (1) AN ACCOUNT SETTLEMENT SLIP SHOULD SUBMITTED
FOR EACH SHORT DISTANCE OFFICIAL TRIP
(2) PERSONS MAKING A SHORT DISTANCE OFFICIAL
TRIP ARE ENTITLED RECEIVE TO A DAILY TRAVEL
ALLOWANCE OF ¥1,000 IF NO CANTEEN IS
AVAILABLE IN THE TRAVELING AREA
(3) A RECEIPT HAS TO BE SUBMITTED FOR EACH TAXI
RIDE TAKEN FOR THE MISSION

▽ ADDITIONAL INFORMATION INPUT WINDOW

REGISTERED PERSON: YUTA ISHIDA
DAILY ALLOWANCE: INFORM ME OF THE UPDATED DAILY
TRAVEL ALLOWANCE

[REGISTER] [CANCEL]

192

```
┌─────────────────────────────────────────────────────────────┐
│ ▽    │      ADDITIONAL INFORMATION INPUT WINDOW       │    │
├─────────────────────────────────────────────────────────────┤
│ DISCLOSED INFORMATION:ACCOUNT SETTLEMENT FOR SHORT DISTANCE │
│                       OFFICIAL TRIP                          │
├─────────────────────────────────────────────────────────────┤
│ REQUEST FOR CORRECTION:INFORM ME OF THE UPDATED DAILY       │
│                        TRAVEL ALLOWANCE                      │
├─────────────────────────────────────────────────────────────┤
│ REGISTERED PERSON:MINAMI WATANABE  —207                     │
│ CONTENTS:                                                    │
│                                                              │
│                                       ┌────────┐ ┌────────┐ │
│                                       │REGISTER│ │ CANCEL │ │
│                                       └────────┘ └────────┘ │
└─────────────────────────────────────────────────────────────┘
```

FIG. 20A

```
┌─────────────────────────────────────────────────────────────────┐
│ ▽  │         INFORMATION RETRIEVAL WINDOW                  │    │
├─────────────────────────────────────────────────────────────────┤
│ │SPECIFY      │SPECIFY│EXECUTE  │INPUT     │NEXT     │ END │    │
│ │CLASSIFICATION│KEYWORD│RETRIEVAL│EVALUATION│RETRIEVAL│     │    │
├─────────────────────────────────────────────────────────────────┤
│ TITLE:ACCOUNT SETTLEMENT FOR SHORT DISTANCE OFFICIAL TRIP       │
│ DISCLOSER:MINAMI WATANABE                                       │
│ CONTENTS:(1)AN ACCOUNT SETTLEMENT SLIP SHOULD SUBMITTED         │
│             FOR EACH SHORT DISTANCE OFFICIAL TRIP               │
│          (2)PERSONS MAKING A SHORT DISTANCE OFFICIAL            │
│             TRIP ARE ENTITLED RECEIVE TO A DAILY TRAVEL         │
│             ALLOWANCE OF ¥1,000 IF NO CANTEEN IS                │
│             AVAILABLE IN THE TRAVELING AREA                     │
│          (3)A RECEIPT HAS TO BE SUBMITTED FOR EACH TAXI         │
│  ┌──────────────────────────────────────────────────────────┐   │
│  │ ▽ │     ADDITIONAL INFORMATION INPUT WINDOW        │    │   │
│  ├──────────────────────────────────────────────────────────┤   │
│  │ REQUEST FOR CORRECTION:INFORM ME OF THE UPDATED DAILY    │   │
│  │                        TRAVEL ALLOWANCE                   │   │
│  ├──────────────────────────────────────────────────────────┤   │
│  │ REGISTERED PERSON:                                        │   │
│  │ CONTENTS:                                                 │   │
│  │                                                           │   │
│  │                              ┌────────┐ ┌────────┐        │   │
│  │                              │REGISTER│ │ CANCEL │        │   │
│  │                              └────────┘ └────────┘        │   │
│  └──────────────────────────────────────────────────────────┘   │
└─────────────────────────────────────────────────────────────────┘
                                                            202
```

FIG. 20B

```
┌─────────────────────────────────────────────────────┐
│ ▽  │    ADDITIONAL INFORMATION INPUT WINDOW        │
│  ┌───────────────────────────────────────────────┐  │
│  │ DISCLOSED INFORMATION:LECTURE MEETING HOLDING PROCEDURE │
│  └───────────────────────────────────────────────┘  │
│  ┌───────────────────────────────────────────────┐  │
│  │ REQUEST FOR ADDITION:WHAT ARENA TO SELECT FOR THE MEETING? │
│  └───────────────────────────────────────────────┘  │
│  ┌───────────────────────────────────────────────┐  │
│  │ TITLE:SELECTION OF ARENA FOR THE MEETING      │  │
│  │ REGISTERED PERSON:TARO YAMADA                 │  │
│  │ CONTENTS:                                     │  │
│  └───────────────────────────────────────────────┘  │
│                              [REGISTER]  [CANCEL]   │
└─────────────────────────────────────────────────────┘
```

FIG. 21A

```
┌──────────────────────────────────────────────────────┐
│ ▽  │       INFORMATION RETRIEVAL WINDOW             │
│ ┌────────┬────────┬────────┬────────┬────────┬────┐  │
│ │SPECIFY │SPECIFY │EXECUTE │INPUT   │NEXT    │END │  │
│ │CLASSIFI│KEYWORD │RETRIEVAL│EVALUAT│RETRIEV │    │  │
│ │CATION  │        │        │ION    │AL      │    │  │
│ └────────┴────────┴────────┴────────┴────────┴────┘  │
│ TITLE:LECTURE MEETING HOLDING PROCEDURE              │
│ DISCLOSER:TARO YAMADA                                │
│ CONTENTS:(1)RESERVATION OF THE MEETING ARENA         │
│                                                      │
│          (2)DISPATCH OF A LETTER OF                  │
│             REQUEST TO THE LECTURE                   │
│   ┌──────────────────────────────────────────────┐   │
│   │ ▽ │   ADDITIONAL INFORMATION INPUT WINDOW    │   │
│   │ ┌──────────────────────────────────────────┐ │   │
│   │ │REQUEST FOR ADDITION:WHAT ARENA TO SELECT FOR THE MEETING?│ │
│   │ └──────────────────────────────────────────┘ │   │
│   │ ┌──────────────────────────────────────────┐ │   │
│   │ │TITLE:SELECTION OF ARENA FOR THE MEETING  │ │   │
│   │ │REGISTERED PERSON:                        │ │   │
│   │ │CONTENTS:                                 │ │   │
│   │ └──────────────────────────────────────────┘ │   │
│   │                       [REGISTER]  [CANCEL]  │   │
│   └──────────────────────────────────────────────┘   │
│                                               211    │
└──────────────────────────────────────────────────────┘
```

FIG. 21B

```
231 ─┤CLERICAL::
232 ─┤ OFFICIAL TRIP::DAILY ALLOWANCE;ACCOUNT SETTLEMENT;
                    SECTION OF TRANSPORTATION;RECEIPT
233 ─┤ SHORT DISTANCE TRIP::OUTING;IN-OFFICE
       LONG DISTANCE TRIP::OVERNIGHTING;HOME-GOING
       OVERSEAS TRIP::AIRCRAFT;TRAVELER'S CHECK;
                     PASSPORT;MEDICINE;COMMUNICATION

234 ─┤DUTY::ACCIDENT;NON-ACCIDENT ─ 235
       LEAVE::YEARLY;HALF-DAY;MATERNITY
       OUTING::DIRECT;DIRECT HOME-GOING;FULL DAY
       ABSENCE::
       EARLY LEAVING::
       LATE COMING::
       SHORT LEAVE::CARE;NURSING
       TEMPORARY RETIREMENT::NURSING
                    :
      RESEARCH::
       INFORMATION TELECOMMUNICATIONS::
       MEDIA INFORMATION PROCESSING::
        VOICE INFORMATION PROCESSING::VOICE ANALYSIS;
            VOICE RECOGNITION;VOICE SYNTHESIS;DIALOGUE;SPEAKER
        IMAGE SIGNAL PROCESSING::IMAGE IMPROVEMENT;
                                        COMPRESSION;CODING
        IMAGE-GRAPHIC RECOGNITION::IMAGE UNDERSTANDING;
            OBJECT RECOGNITION;CHARACTER RECOGNITION;VISION
                    :
       SOFTWARE::
        PROGRAMMING LANGUAGE::PROCEDURAL;LOGICAL;OBJECT-ORIENTED
        OS::STORAGE MANAGEMENT;JOB MANAGEMENT;
            DISTRIBUTED PROCESSING;PERFORMANCE EVALUATION
                    :
```

FIG. 23A

```
    236              237
SHORT DISTANCE TRIP::SHORT DISTANCE
LONG DISTANCE TRIP::LONG DISTANCE
TRAVELER'S CHECK::TC;CHECK
SECTION OF TRANSPORTATION::TRANSPORTATION
            >>TRAIN;BUS;PRIVATE CAR;AIRCRAFT ─ 238
YEARLY::YEARLY LEAVE;YL
                    :
```

FIG. 23B

TARO YAMADA —241

242 — ASSIGNMENT:DESIGN SECTION,○○DEPARTMENT —243
POST:MANAGER
244 — PROFESSIONAL FIELD:IMAGE-GRAPHIC PROCESSING;
　　　　　　　　　　　IMAGE SIGNAL PROCESSING
　　　　　　　　　　　⋮

KANAKO SUZUKI

ASSIGNMENT:ADMINISTRATION SECTION,○○DEPARTMENT
POST:
PROFESSIONAL FIELD:DATA-GATHERING;
　　　　　　　　　　　VISITOR RECEPTION
　　　　　　　　　　　⋮

NATSUKI HASEGAWA

ASSIGNMENT:ADMINISTRATION SECTION,○○DEPARTMENT
POST:
PROFESSIONAL FIELD:WELFARE;HEALTH CARE;DUTY RECORD
　　　　　　　　　　　⋮

FIG. 24

```
TERMS FOR EXPRESSING OBJECTIVE FACTS

DOES (DO)
IS (ARE)   ~252

```
TERMS FOR EXPRESSING SUBJECTIVE VIEWS

BETTER
I THINK
I HAVE ONCE
SEEM(S)
MAY BE   ~254
GO (GOES) WELL
MAY WELL
         ⋮
```

FIG. 25B

EXPRESSIONS FOR SATISFACTION 280

```
LOW SATISFACTION
  SO-SO
  THAT'S THE WAY
  NO OTHER HELP
  IT MAY DO
  YES
  I SEE
  WELL

MEDIUM SATISFACTION
  IT SEEMS NICE
  THAT WILL DO
  THAT'S IT
  I THANK YOU FOR YOUR EFFORTS
  THAT MAY BE GOOD
  IT'S GOOD
  I AGREE
  OK
  GOOD
  THANK YOU

HIGH SATISFACTION
  THANK YOU VERY MUCH
  GREAT
  I AM VERY PLEASED
  VERY GOOD
  FANTASTIC
  I AM RELIEVED
  IT'S A GREAT HELP
  IT'S VERY INTERESTING
  THAT'S EXACTLY WHAT I WANT
  EXACTLY THAT'S IT
  HERE IT IS
  EXCELLENT
  IT'S CLEAVER, ISN'T IT
  CHARMING
```

FIG. 32A

EXPRESSIONS FOR DISSATISFACTION 280

```
LOW DISSATISFACTION
  AH, WELL?
  THERE IS SOMETHING MISSING
  THERE IS SOMETHING FUNNY
  IS IT REALLY SO?
  IS THIS ALL YOU HAVE?

MEDIUM DISSATISFACTION
  I DON'T UNDERSTAND
  IT'S FUNNY
  WHAT CAN THIS BE?
  WHAT ON EARTH IS IT?
  THERE'S SOMETHING
       WRONG WITH IT
  IT'S ABSURD
  I DON'T WANT IT
  IT'S MEANINGLESS

HIGH DISSATISFACTION
  TERRIBLE
  HORRIBLE
  I HATE IT
  IT'S A MESS
  IT'S A SHAME
  I DON'T UNDERSTAND AT ALL
  IT'S HELPLESS
  IT'S STUPID
  I CAN'T BELIEVE IT
```

FIG. 32B

| log# | USER ID | EVALUATION A | EVALUATION B | EFFEC-TIVENESS | REUSA-BILITY | RECOMMEN-DABILITY | RATING | COMMENT | REFERENCED TIME | COPY YES/NO |
|---|---|---|---|---|---|---|---|---|---|---|
| #24 | TANAKA | 3 | 3 | 9.0 | 8.5 | 7.0 | 8.5 | /text/#24 | 60 | YES |
| #38 | AOKI | 3 | 2 | 8.5 | 8.0 | 7.0 | 8.0 | /text/#38 | 120 | NO |
| #105 | SUZU | 3 | 2 | 8.5 | 8.5 | 6.5 | 7.7 | /text/#105 | 150 | NO |
| ... | ... | ... | ... | ... | ... | ... | ... | ... | ... | |

RETRIEVAL KEYWORD
WRITTEN WORK

UPPER KEYWORD: GENERAL

LOWER KEYWORD: PAPER, PATENT DOCUMENT, REPORT

SYNONYM: WRITTEN WORK, DOCUMENT, PAPER, DATA

FIG. 45B

RETRIEVAL KEYWORD
MEETING

UPPER KEYWORD: COMPANY

LOWER KEYWORD: MEETING SCHEDULE, MINUTES

SYNONYM: MEETING

FIG. 45C

RETRIEVAL KEYWORD
MINUTES

UPPER KEYWORD: REPORT, MEETING

LOWER KEYWORD: –

SYNONYM: MINUTES, JOURNAL

FIG. 47A

PERSON CATEGORY
NEW PERSON

UPPER CATEGORY: GENERAL
LOWER CATEGORY: -

NAME:
ADDRESS:
SEX:
DATE OF BIRTH:
ASSIGNMENT:

FIG. 47B

PERSON CATEGORY
INTRA-COMPANY

UPPER CATEGORY: GENERAL
LOWER CATEGORY: SUPERIOR,
 COLLEAGUE,
 SUBORDINATE,
 INTRA-DEPARTMENT,
 EXTRA-DEPARTMENT

NAME:
ADDRESS:
SEX:
DATE OF BIRTH:
ASSIGNMENT:
POST
INTRA-COMPANY ID NUMBER:
EXTENSION:

FIG. 47C

PERSON CATEGORY
SUPERIOR

UPPER CATEGORY: INTRA-COMPANY
LOWER CATEGORY: -

NAME:
ADDRESS:
SEX:
DATE OF BIRTH:
ASSIGNMENT:
POST
INTRA-COMPANY ID NUMBER:
EXTENSION:

```
        ANNEXED
       INFORMATION
481 ─
     PROVIDER:
     UTILIZATION NOTIFYING CONDITIONS:
     REFERENCE INFORMATION:
     RETRIEVAL KEY:
     FILE NAME:
     INFORMATION NAME:
     CONTENTS:
     SCOPE OF DISCLOSURE:
     REFERENCE LIST:
```

FIG. 48

```
     UTILIZATION NOTIFYING
     CONDITIONS
491 ─
     ANNEXED INFORMATION NAME:
     NOTIFIEE:
     NOTIFYING CONDITIONS:
     METHOD OF NOTIFICATION:
     TIME LIMIT OF NOTIFICATION:
```

FIG. 49

| NOTIFYING CONDITION | CORRECTION MADE | METHOD OF DETERMINATION |
|---|---|---|
| REGISTRATION | DISCLOSED INFORMATION WAS REGISTERED IN SOME OTHER SYSTEM | CALL "REGISTRATION" PROCEDURE OF THE SYSTEM |
| EDITING | DISCLOSED INFORMATION WAS EDITED BY SOME OTHER PERSON | FIND DIFFERENCE BETWEEN THE TWO PIECES OF INFO AT THE END OF EDITING |
| ACCESS | THE INFORMATION BEING USED BY OTHER PERSON WAS ACCESSED BY A THIRD PERSON | FIND IF IT IS PRESENTED SOME OTHER SYSTEM |
| COMMENT | SOME OTHER PERSON ADDED INFORMATION TO THE PRESENTED INFORMATION | FIND ANY ADDITION TO THE INFORMATION AT THE END OF EDITING |

| ANNEXED INFORMATION |
| :--- |
| DOCUMENT INFORMATION 1 |

PROVIDER: ICHIRO TAKAGI
UTILIZATION NOTIFYING CONDITIONS: NOTIFYING CONDITIONS 1
REFERENCE INFORMATION: NONE
RETRIEVAL KEY: DOCUMENT, RETRIEVAL, DATA BASE, RESEARCH, REPORT
FILE NAME: ~takagi/refs/papers/data1.doc
INFORMATION NAME: "INTRA-COMPANY REPORT RETRIEVAL RESULT"
CONTENTS: "REPORT ON DOCUMENT DB RETRIEVAL SYSTEMS"
SCOPE OF DISCLOSURE: INTRA-SECTION
REFERENCE LIST: (FUMIO OHTA, SUSUMU INADA)

| UTILIZATION NOTIFYING CONDITION |
| :--- |
| NOTIFYING CONDITIONS 1 |

ANNEXED INFORMATION NAME: DOCUMENT INFORMATION 1
NOTIFIEE: ICHIRO TAKAGI
NOTIFYING CONDITIONS: REGISTRATION
METHOD OF NOTIFICATION: WINDOW
LIMITS OF NOTIFICATION: NONE

~takagi/refs/papers/data1.doc

DATA ID: 0001
AUTHOR: YOSHIHIRO NAKAGAWA
TITLE: "CONSTRUCTION AND EVALUATION OF A DOCUMENT RETRIEVAL SYSTEM"
RESUME: A SYSTEM FOR CONSTRUCTING DOCUMENT DATA BY RETRIEVING ENTIRE DOCUMENTS ON AN OBJECT-ORIENTED DATA BASE WAS CONSTRUCTED AND EVALUATED
COMMENT: IT MAY NOT GET HIGH MARKS FUNCTIONALLY BUT DB SCHEMERS MAY FIND IT USEFUL
DATA ID: 0002
AUTHOR: TADASHI YOSHIOKA, SATOSHI OKAMURA, ET AL
TITLE: "SELECTION OF KEYWORDS FOR A DOCUMENT RETRIEVAL SYSTEM"
RESUME:

USER INFORMATION

PERSON CATEGORY: PERSON HIMSELF

NAME: ICHIRO TAKAGI
ADDRESS: ·  ·  · , XX-CHO, OO-KU, △△-CITY
SEX: MALE
DATE OF BIRTH: OCTOBER 25, 1967

ASSIGNMENT: XX SECTION, △△DEPARTMENT,
　　　　　　　OOO COMPANY
POSITION: SUPERINTENDENT 3RD CLASS
INTRA-COMPANY ID NUMBER: 9201XX95
EXTENSION: 45X6

FIG. 52B

USER INFORMATION

PERSON CATEGORY: FRIEND, SUBORDINATE,
　　　　　　　　　YOUNGER, DIFFERENT SEX

NAME: KYOKO YAMADA
ADDRESS: ·  ·  · , OO-CHO, □□-KU, △△-CITY
SEX: FEMALE
DATE OF BIRTH: AUGUST 6, 1969

ASSIGNMENT: XX SECTION, △△DEPARTMENT,
　　　　　　　OOO COMPANY
POSITION: ASSISTANT SUPERINTENDENT
INTRA-COMPANY ID NUMBER: 9401XX22
EXTENSION: 45X6

FIG. 52C

USER INFORMATION

PERSON CATEGORY: FRIEND, SUPERIOR, ELDER,
　　　　　　　　　SAME SEX, EXTRA-SECTION

NAME: NOBORU TAKENAKA
ADDRESS: ·  ·  · , □□-CHO, OO-KU, XX-CITY
SEX: MALE
DATE OF BIRTH: AUGUST 6, 1957

ASSIGNMENT: △△SECTION, □□DEPARTMENT,
　　　　　　　OOO COMPANY
POSITION: MANAGER
INTRA-COMPANY ID NUMBER: 7201XX34
EXTENSION: 45X8

FIG. 52D

USER INFORMATION

PERSON CATEGORY: FRIEND, EXTRA-COMPANY,
　　　　　　　　　ELDER, SAME SEX

NAME: ? GOTO
ADDRESS: ?
SEX: MALE
DATE OF BIRTH: ?

ASSIGNMENT: OO DEPARTMENT,
　　　　　　　XX MANUFACTURING COMPANY

```
USER INFORMATION
PERSON CATEGORY:ACQUAINTANCE,COLLEAGUE,
              SAME SEX,SAME AGE,INTRA-SECTION
NAME:HIDEKI OHMORI
ADDRESS:・・・,××-CHO,○×-KU,△△-CITY
SEX:MALE
DATE OF BIRTH:NOVEMBER 11, 1967

ASSIGNMENT:××SECTION,△△DEPARTMENT,
           ○○COMPANY
POSITION:SUPERINTENDENT 3RD CLASS
INTRA-COMPANY ID NUMBER:92511XX95
EXTENSION:43X1
```

FIG. 56

INFORMATION RETRIEVAL WINDOW

INPUT BY THE RETRIEVAL KEY

DOCUMENT

RESEARCH

REPORT

| EXECUTE RETRIEVAL | KEYWORD LIST DISPLAY | CANCEL |

FIG. 57

```
((NOTIFIEE 1, NOTIFICATION CONTENT 1)
 (NOTIFIEE 2, NOTIFICATION CONTENT 2)
 (NOTIFIEE 3, NOTIFICATION CONTENT 3)
        .
        .
        .
 (NOTIFIEE N, NOTIFICATION CONTENT N))
```

FIG. 60

INFORMATION DISPLAY WINDOW — 591

```
DATA ID:0001
AUTHOR:YOSHIHIRO NAKAGAWA
TITLE: "CONSTRUCTION AND EVALUATION OF
              DOCUMENT RETRIEVAL SYSTEM"
RESUME:A SYSTEM FOR CONSTRUCTING DOCUMENT
       DATA BY RETRIEVING ENTIRE DOCUMENTS
       ON AN OBJECT-ORIENTED DATA BASE WAS
       CONSTRUCTED AND EVALUATED
COMMENT:IT MAY NOT GET HIGH MARKS FUNCTIONALLY
        BUT DB SCHEMERS MAY FIND IT USEFUL
DATA ID:0002
AUTHOR:TADASHI YOSHIOKA,SATOSHI OKAMURA,ET AL
TITLE: "SELECTION OF KEYWORDS FOR
              A DOCUMENT RETRIEVAL SYSTEM"
RESUME:
```

| EDIT ANNEXED INFORMATION | EDIT INFORMATION CONTENTS | CANCEL |

REFEREN(
INFORMA

ANNEXED INFORMATION EDITING WINDOW — 611

```
INFORMATION NAME: ___ ☐
CONTENTS:
PROVIDER:ICHIRO TAKAGI
UTILIZATION NOTIFYING CONDITIONS:
              NOTIFYING CONDITION-TAKAGI 1
REFERENCE INFORMATION:NONE
RETRIEVAL KEY:DOCUMENT,RESEARCH,RETRIEVAL
FILE:
```

| EXECUTE | CANCEL |

FIG. 61

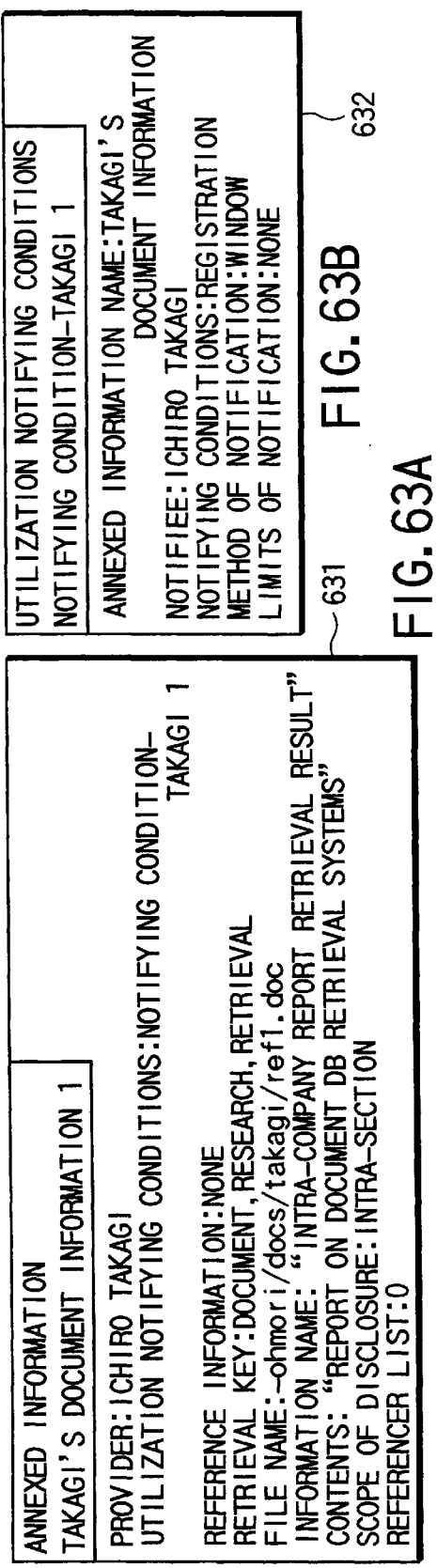
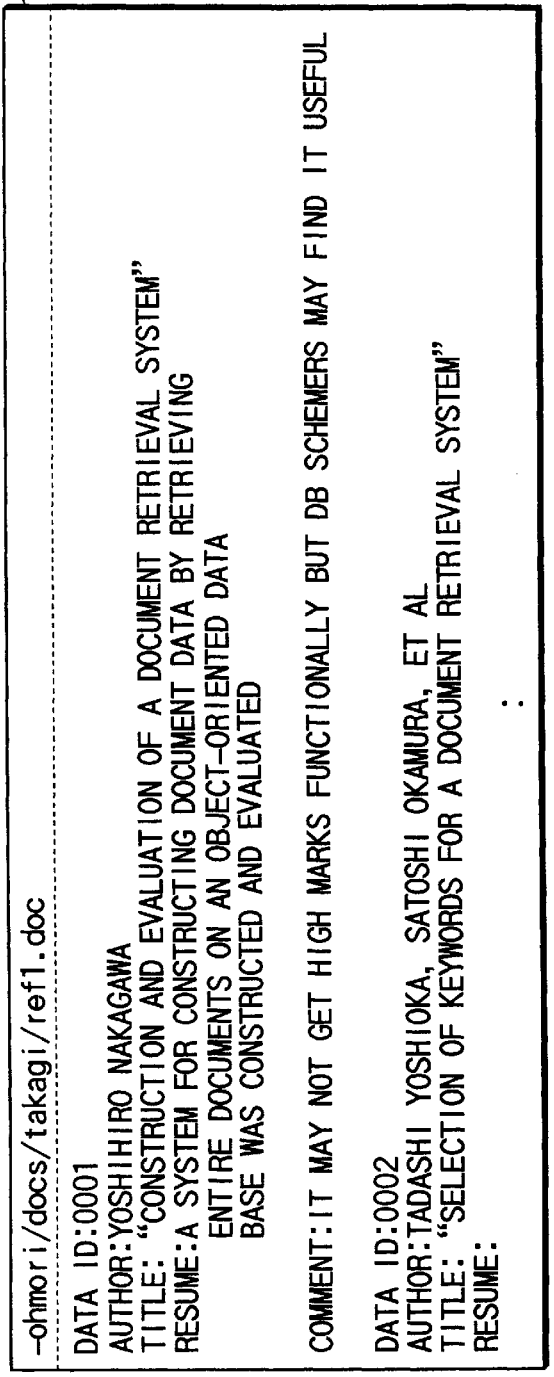
FIG. 63A
FIG. 63B
FIG. 63C

```
ANNEXED INFORMATION
DOCUMENT INFORMATION-WATANABE
```
PROVIDER:DAIGO WATANABE
UTILIZATION NOTIFYING CONDITIONS:NOTIFYING CONDITION-
                       WATANABE A
REFERENCE INFORMATION:NONE
RETRIEVAL KEY:BOOK,RETRIEVING SENTENCE,GENERATION,DB
FILE NAME:-ohmori/docs/daigo/query.doc
INFORMATION NAME: "DOCUMENT RESEARCH RESULT
        (GENERATION OF A RETRIEVING SENTENCE)"
CONTENTS: "A LIST OF BOOKS DESCRIBING ABOUT METHODS OF
     AUTOMATICALLY GENERATING A RETRIEVING SENTENCE
     FOR DB RETRIEVAL"
SCOPE OF DISCLOSURE:INTRA-COMPANY
REFERENCE LIST:0

FIG. 71A

```
UTILIZATION NOTIFYING CONDITION
NOTIFYING CONDITIONS-WATANABE A
```
ANNEXED INFORMATION NAME:DOCUMENT
          INFORMATION-WATANABE
NOTIFIEE:DAIGO WATANABE
NOTIFYING CONDITIONS:COMMENT
METHOD OF NOTIFICATION:DISPLAY OF CONTENTS
TIME LIMITS OF NOTIFICATION:JANUARY 1996

FIG. 71B

-ohmori/docs/daigo/query.doc

DATA NUMBER:01
AUTHOR:STEVE SMITH
TRANSLATED BY:TAKESHI ANDO
TITLE: "METHOD OF CONSTRUCTING A RELATIONAL DATABASE"
PUBLISHER:○○COMPANY
1ST EDITION:NOVEMBER 9, 1992

DATA NUMBER:02
AUTHOR:OSAMU MATSUSHIMA
TITLE: "METHOD OF DATA BASE RETRIEVAL"
PUBLISHER:××PUBLISHING
1ST EDITION:APRIL 2, 1993
        :

FIG. 71C

~ohmori/docs/report/db-data.doc

INTRA-COMPANY RESEARCH REPORTS AND PAPERS WERE
SEARCHED FOR CONSTRUCTING A DATA BASE FOR
MULTI-MEDIA DATA. THE RESULTS ARE LISTED BELOW

A LIST OF BOOKS DESCRIBING ABOUT METHODS OF
AUTOMATICALLY GENERATING A RETRIEVING SENTENCE
FOR DB RETRIEVAL IS SHOWN BELOW

\begin{reference} {DOCUMENT INFORMATION-WATANABE}

AUTHOR:STEVE SMITH
TRANSLATED BY:TAKESHI ANDO
TITLE: "METHOD OF CONSTRUCTING A RELATIONAL DATABASE"
PUBLISHER:○○COMPANY
1ST EDITION:NOVEMBER 9, 1992

\end{reference} {DOCUMENT INFORMATION-WATANABE}

COMMENT: · · · · ·

\begin{reference} {DOCUMENT INFORMATION-WATANABE}

AUTHOR:OSAMU MATSUSHIMA
TITLE: "METHOD OF DATA BASE RETRIEVAL"
PUBLISHER:××PUBLISHING
1ST EDITION:APRIL 2, 1993

\end{reference} {DOCUMENT INFORMATION-WATANABE}

COMMENT: · · · · ·

⋮

A LIST OF REPORTS ON ELATED RESEARCHED IS SHOWN BELOW
(THE LIST WAS PREPARED BY MR.TAKAGI)

\begin{reference} {TAKAGI'S DOCUMENT INFORMATION}

DATA ID:0001
AUTHOR:YOSHIHIRO NAKAGAWA
TITLE: "CONSTRUCTION AND EVALUATION OF
          A DOCUMENT RETRIEVAL SYSTEM"
RESUME:A SYSTEM FOR CONSTRUCTING DOCUMENT DATA BY
       RETRIEVING ENTIRE DOCUMENTS ON AN OBJECT-
       ORIENTED DATA BASE WAS CONSTRUCTED AND
       EVALUATED

```
ANNEXED INFORMATION
RELATED RESEARCH INFORMATION 1

INFORMATION PROVIDER:MICHIO OHMORI
UTILIZATION NOTIFYING CONDITIONS:NOTIFYING CONDITION 1
REFERENCE INFORMATION:TAKAGI'S DOCUMENT INFORMATION
                                DOCUMENT INFORMATION-TAKAGI
RETRIEVAL KEY:RETRIEVAL,RETRIEVING SENTENCE,GENERATION,
                                                 DOCUMENT DB
FILE NAME:-ohmori/docs/report/db-data.doc
INFORMATION NAME: "RESULTS OF A SEARCH FOR DB-RELATED
                                              RESEARCHES"
CONTENTS: "RESULTS OF A SEARCH FOR INTRA-COMPANY
          RESEARCH REPORTS AND PAPERS FOR CONSTRUCTING
          A DATA BASE FOR MULTI-MEDIA DATA"
SCOPE OF DISCLOSURE:INTRA-DEPARTMENT
REFERENCER LIST:(CHIYOKO MUKAI)
```

FIG. 74A

```
UTILIZATION NOTIFYING CONDITION
NOTIFYING CONDITIONS 1

ANNEXED INFORMATION NAME:RELATED
                    RESEARCH INFORMATION 1
NOTIFIEE:AKIO OHMORI
NOTIFYING CONDITIONS:ACCESS
METHOD OF NOTIFICATION:RESUME
TIME LIMIT OF NOTIFICATION:NONE
```

FIG. 74B

| | |
|---|---|
| TITLE | : LECTURE MEETING HOLDING PROCEDURE ~23 |
| DISCLOSER | : TARO YAMADA |
| DATE OF DISCLOSURE | : OCTOBER 1, 1995 |
| CATEGORY | : KNOWHOW |
| CLASSIFICATION | : VISITOR SERVICES |
| RELATED INFO. | : #200 (HOW TO WRITE A LETTER OF REQUEST) ;#350 (LIST OF SCHOLARS) |
| KEYWORDS | : LECTURE;VISIT;PROCESSORS;AGENDA |
| CONTENTS | (1) RESERVATION OF THE MEETING ARENA |
| | (2) DISPATCH OF A LETTER OF REQUEST TO THE LECTURE |
| | (3) CONSULTATION WITH THE SUPERIOR ON REMUNERATION |
| | (4) FILING OF A REQUEST FOR THE VISIT |
| | (5) ORGAL AND VISUAL NOTIFICATIONS TO RELATED SECTIONS |
| | (6) ARRANGEMENT OF AN AFTER-THE-MEETING PARTY |
| | (7) RESERVATION OF AN PARTY ARENA INCLUDING DRINKS AND TAXIS |
| REFERENCE HISTORY | : /log/#24;/log/#38;/log/#105 |

| | |
|---|---|
| TITLE | : BUDGET CONTROL PROGRAM |
| DISCLOSER | : MOMOKO YONEYAMA |
| DATE OF DISCLOSURE | : OCTOBER 1, 1995 |
| CATEGORY | : PROGRAM |
| CLASSIFICATION | : BUDGET CONTROL SERVICE |
| RELATED INFO. | : #300 (LIST OF ISSUED REQUESTS) |
| KEYWORDS | : BUDGET;SCHEDULED PROCUREMENTS;OVERTIME |
| CONTENTS | : /etc/yosan_kanri |
| REFERENCE HISTORY | : /log/#60;/log/#62;/log/#120 |

CASE REFERENCE WINDOW

REGISTERER:TARO YAMADA

REGISTRATION DATE:1996. 2. 29

TITLE:LECTURE MEETING HOLDING PROCEDURE
　　　　FOR PROFESSOR SO AND SO, ○△UNIVERSITY

CONTENTS:

```
. . . . .
. . . . . . . . . . . . .
. . . . . . . . . .
```

REMARKS:

```
┌─────────────────────────────────────────────────┐
│    ▽  INFORMATION REGISTRATION WINDOW           │
│                                                 │
│  TITLE  SHORT-CUT WAY TO GET TO A TRADING COMPANY│
│                                                 │
│  ☑ FILE NAME  /home/yama/data1    READ          │
│                                                 │
│  ☐ TEXT                                         │
│    ┌───────────────────────────────┐            │
│    │                               │            │
│    │                               │            │
│    │                               │            │
│    │                               │  EXECUTE   │
│    └───────────────────────────────┘            │
└─────────────────────────────────────────────────┘
```

FIG. 94

```
┌─────────────────────────────────────────────────┐
│    ▽  INFORMATION REGISTRATION WINDOW           │
│                                                 │
│   TITLE  WHEN THE FILLED-IN FORM FOR TRAVEL     │
│          EXPENSES IS NOT SUBMITTED IN TIME      │
│                                                 │
│  ☐ FILE NAME                                    │
│                                                 │
│  ☑ TEXT                                         │
│    ┌───────────────────────────────────┐        │
│    │ IF TEMPORARY PAYMENT IS TO BE MADE, SUBMIT│
│    │ THE FORM TO THE ADMINISTRATION BY 3 p.m.  │
│    │ OF THE DAY THREE DAYS BEFORE THE          │
│    │ DEPARTURE. OTHERWISE, PERSONALLY BRING THE│
│    │ FORM TO THE ACCOUNTANT BY 0 a.m. OF THE   │
│    │ DAY TWO DAYS BEFORE THE DEPARTURE │ EXECUTE│
│    └───────────────────────────────────┘        │
└─────────────────────────────────────────────────┘
```

FIG. 95

```
┌─────────────────────────────────────────────────────┐
│  ▽  │ INFORMATION REGISTRATION WINDOW │              │
│                                                     │
│ TITLE  WHEN THE FILLED-IN FORM FOR TRAVEL EXPENSES  │
│        IS NOT SUBMITTED IN TIME                     │
│ TEXT                                                │
│   IF TEMPORARY PAYMENT IS TO BE MADE, SUBMIT THE FORM│
│   TO THE ADMINISTRATION BY 3 p.m. OF THE DAY THREE  │
│   DAYS BEFORE THE DEPARTURE. OTHERWISE, PERSONALLY  │
│   BRING THE FORM TO THE ACCOUNTANT BY 0 a.m. OF THE │
│   DAY TWO DAYS BEFORE THE DEPARTURE                 │
│                                                     │
│ CANDIDATE KEYWORDS                                  │
│     ☑ TRAVEL EXPENSES    ☑ TEMPORARY PAYMENT        │
│     ☑ SUBMISSION         ☑ DELAY                    │
│     ☐ ADMINISTRATION     ☐ PERSONALLY               │
│     ☑ ACCOUNTANT         ☑ BRING                    │
│     ☐ OTHERS [_____]               │ CONFIRM │   │
└─────────────────────────────────────────────────────┘
```

FIG. 96

```
┌─────────────────────────────────────────────────────────┐
│ ▽  │ SIMILAR INFORMATION SUBMISSION WINDOW │           │
│                                                         │
│ THERE ARE 3 PIECES OF INFORMATION SIMILAR TO            │
│ YOUR INPUT TITLED "WHEN THE FILLED-IN FORM FOR TRAVEL   │
│ EXPENSES IS NOT SUBMITTED IN TIME"                      │
│                                                         │
│ TITLE: THE DEAD LINE FOR THE SUBMISSION OF    ☑ RELATED │
│        THE FILLED-IN FORM FOR TRAVEL EXPENSES           │
│        DISCLOSER:matsu  ID=8835                         │
│ TITLE: SETTLEMENT OF THE TRAVEL EXPENSES FOR  ☑ RELATED │
│        OFFICIAL TRIPS                                   │
│        DISCLOSER:minoda  ID=10051                       │
│ TITLE: WHEN THE TEMPORARY PAYMENT             ☑ RELATED │
│        WILL BE DONE?                                    │
│        DISCLOSER:taro  ID=208    │REFERENCE│ │REGISTER│ │
└─────────────────────────────────────────────────────────┘
```

FIG. 97

```
┌─────────────────────────────────────────────────────────┐
│ ▽  │ INFORMATION NOTIFICATION WINDOW │                  │
│ ┌─────────────────────────────────────────────────┐ △  │
│ │ THE FOLLOWING INFORMATION HAS BEEN REGISTERED   │    │
│ │                                                 │    │
│ │ TITLE: WHEN THE FILLED-IN FORM FOR TRAVEL EXPENSES│  │
│ │        IS NOT SUBMITTED IN TIME                 │    │
│ │ DISCLOSER:sato                                  │    │
│ │ KEYWORDS:TRAVEL EXPENSE, SUBMISSION, ACCOUNTANT,│    │
│ │         TEMPORARY PAYMENT, DELAY, BRING         │    │
│ │ RELATED INFORMATION:#8835, #11051, #208         │    │
│ │ TEXT:                                           │ ▽  │
│ └─────────────────────────────────────────────────┘    │
│ │CONFIRM│  │AMEND│                                     │
└─────────────────────────────────────────────────────────┘
```

FIG. 98

```
┌─────────────────────────────────────────────────┐
│ ▽  RETRIEVAL RESULT DISPLAY WINDOW              │
│ RETRIEVING SENTENCE: WHAT IS THE PROCEDURE      │
│                   FOR ATTENDING THE SOCIETY MEETING? │
│ SELECT INFORMATION FROM THE RELATED KEYWORDS BELOW │
│ ┌─────────────────────────────────────────────┐ │
│ │ SOCIETY         ATTENDANCE      PROCEDURE   │ │
│ │  ├ ELECTRONICS    ├ ATTENDANCE    ├ APPLICATION │
│ │  │  SOCIETY                                 │ │
│ │  ├ INFORMATION    ├ RESEARCH      └ TRANSFER│ │
│ │  │  SOCIETY                                 │ │
│ │  ├ NATIONAL       ├ SPEECH                  │ │
│ │  │  CONVENTION ↖                            │ │
│ │  ├ RESEARCH       └ CONTRIBUTION            │ │
│ │  │  MEETING         OF AN ARTICLE           │ │
│ │  └ INTERNATIONAL                            │ │
│ │     CONVENTION                              │ │
│ └─────────────────────────────────────────────┘ │
└─────────────────────────────────────────────────┘
```

FIG. 101

```
┌─────────────────────────────────────────────────┐
│ ▽  RETRIEVAL RESULT DISPLAY WINDOW              │
│ SELECT OTHER KEYWORDS         │DISPLAY OF CANDIDATES│
│ ┌─────────────────────────────────────────────┐ │
│ │  NATIONAL  ──── ATTENDANCE(20)              │ │
│ │  CONVENTION      ·SPEECH(10) ↖              │ │
│ │       │          ·RESEARCH(2)               │ │
│ │       │          ·ATTENDANCE(2)             │ │
│ │       └──────── PROCEDURE(15)               │ │
│ │                  ·APPLICATION(10)           │ │
│ │                  ·TRANSFER(5)               │ │
│ └─────────────────────────────────────────────┘ │
└─────────────────────────────────────────────────┘
```

FIG. 102

| RETRIEVAL RESULT DISPLAY WINDOW |

KEYWORDS  NATIONAL CONVENTION, SPEECH

· PREPARATION FOR A SPEECH AT THE
NATIONAL CONVENTION                                    USEFUL

· THE OHP FORMAT TO BE USED FOR A SPEECH AT
THE NATIONAL CONVENTION

· WHO ARE TO ATTEND THE PRACTICE FOR A SPEECH    USEFUL TO
AT THE NATIONAL CONVENTION?                      SOME EXTENT

FIG. 103

  EVALUATION RESULT DISPLAY WINDOW

TITLE: FORMS TO BE SUBMITTED AT THE TIME OF TRANSFER
REGISTERER: tanaka     

NUMBER OF EVALUATIONS   30
   AVERAGE POINT   7.5
   MAXIMUM POINT   10
   MINIMUM POINT   2

FIG. 106

  EVALUATION RESULT DISPLAY WINDOW

TITLE: FORMS TO BE SUBMITTED AT THE TIME OF TRANSFER
REGISTERER: tanaka

| NUMBER OF EVALUATIONS | 30 | LIST OF EVALUATORS |
| AVERAGE POINT | 7.5 | LIST OF COMMENTS |
| MAXIMUM POINT | 10 | EVALUATOR yama |
| MINIMUM POINT | 2 | EVALUATOR taro |

FIG. 107

```
┌─────────────────────────────────────────────┐
│ ▽      RESULT DISPLAY WINDOW                │
│ TITLE:WHO IS THE PERSON IN CHARGE FOR PURCHASING BOOKS? │
│        [USEFUL TO ] [NOT VERY]              │
│ [USEFUL][SOME EXTENT][HELPFUL ] [OBSOLETE]  │
│    4         2          0          0    ↖   │
│   ┌─────────────────────────────────────┐   │
│   │ A FILLED-IN FORMAT IS TO BE         │   │
│   │ SUBMITTED TO THE ADMINISTRATION.    │   │
│   │ ANY ENQUIRY TO MS.YAMAMOTO, LIBRARY │   │
│   └─────────────────────────────────────┘   │
└─────────────────────────────────────────────┘
```

FIG. 108

```
┌─────────────────────────────────────────────┐
│ ▽       RESULT DISPLAY WINDOW               │
│ TITLE┌──────────────────────────────────────┴──┐
│      │ ▽                                       │
│      │                                         │
│      │ YOUR EVALUATION WAS "OBSOLETE"          │
│      │ PLEASE SPECIFICALLY POINT OUT WHAT IS OBSOLETE │
│      │                                         │
│      │  ┌───────────────────────────────┐      │
│      │  │ CURRENTLY, ANY REQUEST FOR    │      │
│      │  │ PURCHASING A BOOK IS TO BE MADE│     │
│      │  │ DIRECTLY TO THE LIBRARY       │ [OK] │
│      │  └───────────────────────────────┘      │
│      └─────────────────────────────────────────┘
```

FIG. 109

```
┌─────────────────────────────────┐
│ ▽                               │
│   PLEASE WRITE THE REASON WHY YOU│
│   EVALUATED AS "USEFUL"    [OK] │
│   ┌──────────────────────┐  △   │
│   │                      │  □   │
│   └──────────────────────┘  ▽   │
└─────────────────────────────────┘
```

FIG. 110

```
┌─────────────────────────────────────────────────────────┐
│  ▽   │ EVALUATION RESULT DISPLAY WINDOW │                │
│                                                         │
│ THE INFORMATION                                         │
│ "WHO IS THE PERSON IN CHARGE FOR PURCHASING BOOKS?"     │
│ DISCLOSED BY YOU WAS EVALUATED AS FOLLOWS               │
│   NUMBER OF EVALUATIONS : takeshi                       │
│   SUMMARY               : "OBSOLETE"                    │
│   COMMENT               : CURRENTLY, ANY REQUEST FOR    │
│                           PURCHASING A BOOK IS TO BE MADE│
│                           DIRECTLY TO THE LIBRARY       │
│   ┌────────────┐ ┌────────────┐ ┌─────────┐             │
│   │EDIT THE    │ │MAIL TO THE │ │NEGLECT  │             │
│   │INFORMATION │ │EVALUATOR   │ │         │             │
│   └────────────┘ └────────────┘ └─────────┘             │
└─────────────────────────────────────────────────────────┘
```

CONFIRMATION OF KNOWHOW REGISTRATION
THE FOLLOWING WILL BE SENT TO THE KNOWHOW SERVER
PLEASE MAKE SURE FOR CORRECTNESS

〈NECESSARY INFORMATION〉
PLEASE EDIT APPROPRIATELY
REGISTERER  sasa
TITLE  WHEN THE FILLED-IN FORM FOR TRAVEL EXPENSES IS NOT SUBMITTED IN TIME 〈KEYWORDS〉
PLEASE EDIT APPROPRIATELY AND SELECT NECESSARY ONES
(ALL WILL BE SELECTED IN DEFAULT)

☑ OBJECT  TRAVEL EXPENSES
☑ OBJECT  TRAVEL EXPENSES FOR AN OFFICIAL TRIP
☑ ACTION  PAYMENT
☑ TOPIC   QS FOR ACCOUNT SETTLEMENT FOR TRAVEL EXPENSES
☑ TOPIC   OTHER ADMINISTRATION RELATED QS
☐ KEYWORD DEPARTURE 3
☐ KEYWORD 3 p.m.

| TYPE OF OPERATION | MERIT TO THE OPERATOR | MERIT TO THE PROVIDER |
|---|---|---|
| RETRIEVAL | +1 | - |
| REFERENCE | +1 | +1 |
| REGISTRATION | +5 | - |
| EVALUATION | +2 | ADD EVALUATION POINT |
| ADDITION·CORRECTION | +2 | +1 |
| QUESTION | +3 | - |
| REPLY TO QUESTION | +5 | +1 |

| USER NAME | NUMBER OF ACCESSES | REFERENCE | REGISTRATION | EVALUATION | QUESTION | TOTAL |
|---|---|---|---|---|---|---|
| aoki | 150 | 500 | 0 | 20 | 30 | 550 |
| yamada | 25 | 30 | 5 | -10 | 0 | 25 |
| minami | 10 | 100 | 50 | 50 | 0 | 200 |
| hayashi | 30 | 50 | 100 | 250 | 5 | 405 |
| miho | 50 | 60 | 0 | 10 | 40 | 110 |
| tanaka | 100 | 200 | 25 | 0 | 10 | 235 |

FIG. 124

RANKING OF TOTAL MERITS 1. aoki 550 pt.
2. hayashi 405 pt.
3. tanaka 235 pt.
4. minami 200 pt.

| TOTAL | REFERENCE | REGISTRATION | EVALUATION | QUESTION |

SUZUKI: YOU CAN ALTER THE PERIOD OF THE NURSERY LEAVE ONLY ONCE. SO, BE CAREFUL.
THE FOLLOWING FORM HAVE TO BE FILLED IN AND SUBMITTED

NURSERY LEAVE PERIOD ALTERNATION FORM

APPLIED PERIOD

ALTERED PERIOD

REASON

NURSERY LEAVE PERIOD ALTERNATION FORM

APPLIED PERIOD

ALTERED PERIOD

REASON

| TOPIC | POINT |
|---|---|
| RESEARCH-RELATED (KNOWLEDGE PROCESSING) | 5 |
| RESEARCH-RELATED (IMAGE PROCESSING) | 3 |
| ⋮ | ⋮ |
| HOW TO USE WINDOWS 95 | 4 |
| PROCEDURE FOR PURCHASING EQUIPMENT | 4 |
| ⋮ | ⋮ |

1331 — (TOPIC column); 1332 — (POINT column)

FIG. 133A

| KEYWORD | POINT |
|---|---|
| KNOWLEDGE DATA BASE | 5 |
| DATA BASE | 5 |
| PROBLEM SOLVING | 5 |
| INFORMATION SHARING | 4 |
| ⋮ | ⋮ |
| WORD | 4 |
| EXCEL | 3 |
| ⋮ | ⋮ |
| REQUEST FOR AN ARRANGEMENT | 4 |
| REAL ESTATE | 3 |
| ⋮ | ⋮ |

1333 — (KEYWORD column); 1334 — (POINT column)

FIG. 133B

| CORRESPONDING USER | POINT |
|---|---|
| RELATED TO PC BUSINESS DEPARTMENT | 5 |
| CHIEF OF DEPARTMENT AND HIGHER-RANKED | 5 |
| MR. YAMAZAKI, MANAGER | 4 |
| ⋮ | ⋮ |
| MIS HANAKO OKAMURA | 1 |
| ⋮ | ⋮ |

1335 — (CORRESPONDING USER column); 1336 — (POINT column)

| #1024 | |
|---|---|
| TITLE | :LECTURE MEETING HOLDING PROCEDURE |
| AUTHOR | :TARO YAMADA |
| REGISTERER | :JIRO TOSHIBA |
| CONTROLLER | :JIRO TOSHIBA |
| DATE OF DISCLOSURE | :OCTOBER 1, 1995 |
| CATEGORY | :KNOWHOW |
| CLASSIFICATION | :VISITOR SERVICES |
| RELATED INFO. | :#200 (HOW TO WRITE A LETTER OF REQUEST); |
| | #350 (LIST OF SCHOLARS) |
| KEYWORDS | :LECTURE;VISIT;PROFESSORS;AGENDA |
| CONTENTS | :(1)RESERVATION OF THE MEETING ARENA |
| | :(2)DISPATCH OF A LETTER OF REQUEST TO THE LECTURE |
| | :(3)CONSULTATION WITH THE SUPERIOR ON REMUNERATION |
| | :(4)FILING OF A REQUEST FOR THE VISIT |
| | :(5)ORAL AND VISUAL NOTIFICATIONS TO RELATED SECTIONS |
| | :(6)ARRANGEMENT OF AN AFTER-THE-MEETING PARTY |
| | :(7)RESERVATION OF AN PARTY ARENA INCLUDING |
| | DRINKS AND TAXIS |
| ADDITIONAL HISTORY | :/log/#24;/log/#38;/log/#105 |

FIG. 135B

| #1320 | |
|---|---|
| TITLE | :BUDGET CONTROL PROGRAM |
| AUTHOR | :MOMOKO YONEYAMA |
| REGISTERER | :MOMOKO YONEYAMA |
| CONTROLLER | :HANAKO TOSHIBA |
| DATE OF DISCLOSURE | :OCTOBER 1, 1995 |
| CATEGORY | :PROGRAM |
| CLASSIFICATION | :BUDGET CONTROL SERVICE |
| RELATED INFO. | :#300 (LIST OF ISSUED REQUESTS) |
| KEYWORDS | :BUDGET;SCHEDULED PROCUREMENTS;OVERTIME |
| CONTENTS | :/etc/yosan_kanri |
| ADDITIONAL HISTORY | :/log/#60;/log/#62;/log/#120 |

```
┌─────────────────────────────────────────────┐
│  ▽  │     INFORMATION REGISTRATION WINDOW   │
│  ┌──────────┬──────────┬──────────┬──────┐  │
│  │ SPECIFY  │ INPUT    │ NEXT     │ END  │  │
│  │CLASSIFI- │INFORMA-  │INFORMA-  │      │  │
│  │CATION    │TION      │TION      │      │  │
│  └──────────┴──────────┴──────────┴──────┘  │
│                                             │
│  TITLE     REPORT ON ATTENDANCE TO          │
│            INTERNATIONAL VENTURE FORUM      │
│  CATEGORY  REPORT                           │
│  FORMAT    TEXT                             │
│  FILE NAME ___   [OVERVIEW]                 │
│  CONTENTS                                   │
│     ┌─────────────────────────────────┐     │
│     │ DATA     DECEMBER 13, 1995      │     │
│     │ LECTURE  BILL GATES, MICROSOFT  │     │
│     │ CONTENTS WHY DID MICROSOFT      │     │
│     │          SUCCEED?               │     │
│     │          AN OUTLOOK OF ITS      │     │
│     │          BUSINESS               │     │
│     └─────────────────────────────────┘     │
└─────────────────────────────────────────────┘
```

1361 points to SPECIFY CLASSIFICATION

FIG. 136

```
┌─────────────────────────────────────────────┐
│  ▽  │      CONDITIONS SPECIFYING WINDOW     │
│  ┌──────────┬──────────┬──────────┬──────┐  │
│  │ SPECIFY  │ INPUT    │ NEXT     │ END  │  │
│  │CLASSIFI- │INFORMA-  │INFORMA-  │      │  │
│  │CATION    │TION      │TION      │      │  │
│  └──────────┴──────────┴──────────┴──────┘  │
│           CHECK THE CHECK BUTTONS           │
│                                             │
│    ☑  NOTIFY THE AUTHOR AND GET HIS/HER    │
│       AUTHORIZATION                         │
│                                             │
│    ☑  NOTIFY THE REGISTERER AND GET HIS/HER│
│       AUTHORIZATION                         │
│                                             │
│    ☐  ONLY THE PROFESSIONALS OF THE        │
│       FIELD WILL BE PERMITTED               │
│                                             │
│    ☑  ADDITIONS WILL BE ACCEPTED           │
│                     ⋮                       │
└─────────────────────────────────────────────┘
```

INFORMATION RETRIEVAL WINDOW

| SPECIFY CLASSIFICATION | SPECIFY KEYWORD | EXECUTE RETRIEVAL | INPUT ADDITIONAL INFORMATION | NEXT RETRIEVAL | END |

TITLE: PROCEDURE FOR APPLYING FOR NURSERY LEAVE
DISCLOSER: KANAKO SUZUKI
CONTENTS: (1) PERSONS HAVING A BABY 1 YEAR OLD OR YOUNGER ARE ENTITLED TO TAKE
(2) A NURSERY LEAVE APPLICATION FILLED IN AND SUBMITTED TO

1381

- CORRECTION
- ADDITION
- REQUEST FOR CORRECTION
- REQUEST FOR ADDITION
- DELETION
- REFERENCE

INFORMATION RETRIEVAL WINDOW

| SPECIFY CLASSIFICATION | SPECIFY KEYWORD | EXECUTE RETRIEVAL | INPUT ADDITIONAL INFORMATION | NEXT RETRIEVAL | END |

TITLE: PROCEDURE FOR APPLYING FOR NURSERY LEAVE
DISCLOSER: KANAKO SUZUKI
CONTENTS: (1) PERSONS HAVING A BABY 1 YEAR OLD OR

ADDITIONAL INFORMATION INPUT WINDOW

REGISTERED PERSON: NATSUKI HASEGAWA — 1384
CONTENTS: (1) PERSONS HAVING A BABY 1 YEAR OLD OR
YOUNGER ARE ENTITLED TO TAKE A NURSERY LEAVE
UNTIL THE FIRST MARCH 31 AFTER THE FIRST
BIRTHDAY

SELECT DISCLOSURE CONDITIONS             1385
  ☑ DISCLOSE ONLY TO THE REGISTERERS
  ☐ DISCLOSE ONLY TO THE MEMBERS OF THE SECTION
  ☐ DISCLOSE ONLY TO THE MEMBERS OF THE DEPARTMENT
  ☐ ...
  ☐ NO LIMITATIONS

1383

| JUDGMENT | DISCLOSED INFO ID # | ADDITIONAL INFO ID # | CONDITIONS SPECIFIED BY THE DISCLOSER | SEMANTIC RELATIONSHIP | CONDITIONS SPECIFIED BY THE ADDITIONAL INFO |
|---|---|---|---|---|---|
| GOOD | #1024-1 | #24 | ONLY ADDITION PERMITTED | ADDITION | DISCLOSE WITHIN THE SECTION |
| GOOD | #1024-1 | #25 | ONLY ADDITION PERMITTED | ADDITION | DISCLOSE WITHIN THE DEPARTMENT |
| NO GOOD | #1429-1 | #26 | REFER TO THE CONTROLLER | CORRECTION | DON'T DISCLOSE |
| GOOD | #1500-2 | #27 | NO CORRECTION | REQUEST FOR ADDITION | NO LIMITATIONS |
| ... | ... | ... | ... | ... | |

```
1421
┌─────────────────────────────────────────────────┐
│┌──────┐                            1423         │
││#2240 │      1422                   /           │
│└──────┘       /                                 │
│  TITLE             :TELL ME HOW TO FILL IN THE FORM│
│                     FOR PLACEMENT OF AN ORDER FOR EQUIPMENT│
│  DISCLOSER        :YUICHI TANAKA                │
│  DISCLOSURE DATE  :DECEMBER 8, 1996             │
│  CATEGORY         :QUESTION                     │
│  CLASSIFICATION   :REQUEST FOR AN ARRANGEMENT   │
│  RELATED INFORMATION :#300(HOW TO GET A MANUAL ON│
│                     REQUEST FOR AN ARRANGEMENT) │
│  KEYWORDS         :BUDGET, EQUIPMENT, ORDER PLACEMENT│
│  CONTENT          :WHO IS THE "PERSON IN CHARGE"│
│                     IN THE FORM FOR PLACEMENT OF│
│                     AN ORDER FOR EQUIPMENT?     │
│                                                 │
│  ADDITIONAL HISTORY :                           │
└─────────────────────────────────────────────────┘
```

FIG. 142

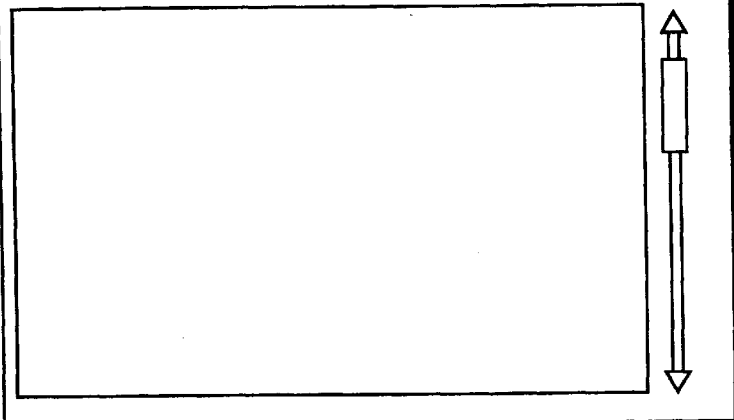

| | |
|---|---|
| TITLE | : DAILY ALLOWANCE FOR A SHORT DISTANCE OFFICIAL TRIP |
| DISCLOSER | : AKEMI ICHIJO |
| DATE OF DISCLOSURE | : SEPTEMBER 10, 1996 |
| CATEGORY | : KNOWHOW |
| CLASSIFICATION | : SALARY PAYMENT |
| KEYWORDS | : OFFICIAL TRIP, TRAVEL EXPENSES, SALARY |
| CONTENTS | : AN OFFICIAL TRIP WILL BE A SHORT DISTANCE TRIP WHEN THE DISTANCE TO THE DESTINATION DOES NOT EXCEED 80 KM THEN, YOU ARE ENTITLED TO GET AN ALLOWANCE OF ¥1,500/DAY |
| ADDITIONAL HISTORY | : /log/#29; /log/#32 |

FIG. 152

| log# | DISCLOSED INFORMATION ID # | ADDITIONAL INFORMATION ID # | SEMANTIC RELATIONSHIP |
|---|---|---|---|
| 29# | #1038 | #29 | AUTHORIZED |
| 30# | #2056 | #30 | AUTHORIZED |
| 31# | #1009 | #31 | AUTHORIZED |
| 32# | #1038 | #32 | DELETE "AUTHORIZED" |
| ⋮ | ⋮ | ⋮ | ⋮ |

TITLE : DAILY ALLOWANCE FOR A SHORT DISTANCE TRIP
REGISTERER : YOKO HORIE
DATE OF REGISTRATION : JANUARY 19, 1997
CONTENT : AUTHORIZED

FIG. 154

```
YUKIO OHKAWA

ASSIGNMENT        :ADMINISTRATION SECTION,○○DEPARTMENT
    POSITION          :MANAGER
    PROFESSIONAL FIELD :PERSONNEL
    AUTHORIZED FIELD  :PERSONNEL
                            ⋮

YOKO HORIE

ASSIGNMENT        :ACCOUNTING SECTION,○○DEPARTMENT
    POSITION          :
    PROFESSIONAL FIELD :PAYMENT;HEALTH INSURANCE
    AUTHORIZED FIELD  :PAYMENT;HEALTH INSURANCE
                            ⋮
```

| TEACH ME HOW TO PREPARE A PATENT MAP | |
|---|---|
| [TEACH] | VERB |
| [ME] | PERSONAL PRONOUN, DATIVE CASE |
| [HOW] | INTERROGATIVE PROVERB |
| [TO] | INDEFINITE PARTICLE |
| [PREPARE] | VERB |
| [A] | INDEFINITE ARTICLE |
| [PATENT] | NOUN |
| [MAP] | NOUN |

FIG. 167

| | SYNTAX RULES |
|---|---|
| 1 | INTERROGATIVE SENTENCE=[NOUN PHRASE]<br>　　　　　　　　　　　+CASE POSTPOSITIONAL<br>　　　　　　　　　+VERB (TEACH / SHOW / CHECK)+POSTPOSITIONAL |
| 2 | INTERROGATIVE SENTENCE=[NOUN PHRASE]<br>　　　　　　　　　　　+CASE POSTPOSITIONAL+NOUN (WHAT) |
| ⋯ | ⋯ |
| 10 | NOUN PHRASE=NOUN+NOUN |
| 11 | NOUN PHRASE=NOUN PHRASE+CASE POSTPOSITIONAL+NOUN |
| 12 | NOUN=COMMON NOUN |
| 13 | NOUN=PROPER NOUN |
| ⋯ | ⋯ |

FIG. 168

```
KEY WORD;ATTRIBUTE NAME=ATTRIBUTE VALUE;
BASIC CONCEPT;INDISPENSABLE ATTRIBUTE;PARTS OF SPEECH

PATENT;OBJECTIVE=PATENT;PRODUCT;;NOUN
PATENT MAP;OBJECTIVE=PATENT MAP;DOCUMENT;;
PATENT LIST;OBJECTIVE=PATENT LIST;DOCUMENT;;
                    ⎰
                    ⎱
PREPARE;ACT=PREPARATION;;OBJECT;VERB
PREPARE;ACT=PREPARATION;;OBJECT;VERB
                    ⎰
                    ⎱
PREPARATION;ACT=PREPARATION;;OBJECT;NOUN(CONJUGATION)
                    ⎰
                    ⎱
WRITE;ACT=PREPARATION;;DOCUMENT;VERB
WRITE;ACT=PREPARATION;;DOCUMENT;VERB
WRITE;ACT=PREPARATION;;DOCUMENT;VERB
                    ⎰
                    ⎱
APPLICATION;ACT=APPLICATION;;PROCEDURE;NOUN
                                    (CONJUGATION)
                    ⎰
                    ⎱
HOW;MODE=PROCEDURE;;ACT;SUFFIX
METHOD;MODE=PROCEDURE;;ACT;NOUN
```

FIG. 169

| INPUT SENTENCE | RETRIEVING SENTENCE |
|---|---|
| TELL ME HOW TO WRITE CLAIMS FOR PATENT | PATENT AND CLAIMS AND PREPARATION AND PROCEDURE |
| HOW TO APPLY FOR THE DEDUCTION FOR MEDICAL EXPENSES? | DEDUCTION FOR MEDICAL EXPENSES AND APPLICATION AND PROCEDURE |
| ⋮ | ⋮ |

FIG. 176

| INPUT SENTENCE | RETRIEVING SENTENCE | RESULT OF RETRIEVAL |
|---|---|---|
| TELL ME HOW TO WRITE CLAIMS FOR PATENT | PATENT AND CLAIMS AND PREPARATION AND PROCEDURE | 0 |
| CLAIMS FOR PATENT | PATENT AND CLAIMS | 7 |
| HOW TO APPLY FOR THE DEDUCTION FOR MEDICAL EXPENSES? | DEDUCTION FOR MEDICAL EXPENSES AND APPLICATION AND PROCEDURE | 0 |
| ⋮ | ⋮ | |

FIG. 177

| TIME AND DATE | INQUIRER | INPUT SENTENCE | RETRIEVING SENTENCE | RESULT OF RETRIEVAL |
|---|---|---|---|---|
| 199X.X.X.10:22 | nao | TELL ME HOW TO WRITE CLAIMS FOR PATENT | PATENT AND CLAIMS AND PREPARATION AND PROCEDURE | 0 |
| | | CLAIMS FOR PATENT | PATENT AND CLAIMS | 7 |
| 199X.X.X.10:35 | aki | HOW TO APPLY FOR THE DEDUCTION FOR MEDICAL EXPENSES? | DEDUCTION FOR MEDICAL EXPENSES AND APPLICATION AND PROCEDURE | 0 |
| ⋮ | ⋮ | ⋮ | ⋮ | |

| TIME AND DATE | INQUIRER | INPUT SENTENCE | RETRIEVING SENTENCE | RESULT OF RETRIEVAL |
|---|---|---|---|---|
| 199X.X.X.10:22 | nao | TELL ME HOW TO WRITE CLAIMS FOR PATENT | PATENT AND CLAIMS AND PREPARATION AND PROCEDURE | 0 |
| 199X.X.X.10:23 | nao | CLAIMS FOR PATENT | PATENT AND CLAIMS | 7 |
| 199X.X.X.10:35 | aki | HOW TO APPLY FOR THE DEDUCTION FOR MEDICAL EXPENSES? | DEDUCTION FOR MEDICAL EXPENSES AND APPLICATION AND PROCEDURE | 0 |
| ... | ... | ... | ... | ... |

FIG. 180

| TIME AND DATE | INQUIRER | INPUT ID | INPUT SENTENCE | RELATED ID | RETRIEVING SENTENCE | RESULT OF RETRIEVAL |
|---|---|---|---|---|---|---|
| 199X.X.X.10:22 | yasu | 132 | ON PATENT | | PATENT | 2020 |
| 199X.X.X.10:23 | yasu | 133 | HOW TO WRITE CLAIM | 132,133 | PATENT AMD CLAIMS AND PREPARATION AND PROCEDURE RESULT OF RETRIEVAL | 0 |
| ... | ... | | ... | | | |

FIG. 181

| TIME AND DATE | INQUIRER | INPUT SENTENCE | RETRIEVING SENTENCE | RESULT OF RETRIEVAL | METHOD OF GATHERING |
|---|---|---|---|---|---|
| 199X.X.X.10:22 | nao | TELL ME HOW TO WRITE CLAIMS FOR PATENT | PATENT AND CLAIMS AND PREPARATION AND PROCEDURE | 0 | 1, 2 |
| 199X.X.X.10:23 | nao | CLAIMS FOR PATENT | PATENT AND CLAIMS | 7 | |
| 199X.X.X.10:35 | aki | HOW TO APPLY FOR THE DEDUCTION FOR MEDICAL EXPENSES? | DEDUCTION FOR MEDICAL EXPENSES AND APPLICATION AND PROCEDURE | 0 | 1, 4 |
| ... | ... | ... | ... | | |

FIG. 185

| INFORMATION REGISTRATION IF | | |
|---|---|---|
| | REGISTER  CANCEL  END | |
| DATE OF REGISTRATION: | 12/25/1996 | |
| AUTHOR: | sato(Takeshi Sato) | |
| TITLE: | FORMAT OF CLAIMS FOR PATENT | |

FIG. 187

| INPUT SENTENCE | RETRIEVING SENTENCE | RESULT OF RETRIEVAL | REAPPEARANCE RATIO | APPLICABILITY RATIO | RANK |
|---|---|---|---|---|---|
| TELL ME HOW TO WRITE CLAIMS FOR PATENT | PATENT AND CLAIMS AND PREPARATION AND PROCEDURE | 0 | 100 | 50 | 1 |
| CLAIMS FOR PATENT | PATENT AND CLAIMS | 0 | 50 | 50 | 2 |
| HOW TO APPLY FOR THE DEDUCTION FOR MEDICAL EXPENSES? | DEDUCTION FOR MEDICAL EXPENSES AND APPLICATION AND PROCEDURE | 0 | 0 | 0 | 1 |
| HOW TO DRAW A PATENT MAP | PATENT AND PATENT MAP AND PREPARATION AND PROCEDURE | 0 | 50 | 25 | 4 |
| PREPARATION OF A PATENT DOCUMENT | PATENT AND PREPARATION | 0 | 50 | 50 | 2 |

FIG. 188

```
┌─────────────────────────────────────────────────────┐
│ INFORMATION REGISTRATION IF                         │
│                    [REGISTER] [CANCEL]    [END]     │
│ DATE OF REGISTRATION: [12/25/1996]                  │
│ AUTHOR:         [sato(Takeshi Sato)]                │
│ TITLE:          [FORMAT OF CLAIMS FOR PATENT]       │
│  ┌───────────────────────────────────────────────┐  │
│  │ ⊥                                             │  │
│  │                                               │  │
│  │                                               │  │
│  └───────────────────────────────────────────────┘  │
│ ┌─────────────────────────────────────────────────┐ │
│ │ CHECK IT APPLICABLE TO THE RELATED QUESTIONS BELOW.│
│ │ YOU MAY REGISTER AS DIFFERENT PIECES OF INFORMATION│
│ │  TELL ME HOW TO WRITE  ////////  DIFFERENT      │ │
│ │  CLAIMS FOR PATENT    /APPLICABLE/ REGISTRATION │ │
│ │                       //////////                │ │
│ │  PREPARATION OF                    DIFFERENT    │ │
│ │  A PATENT DOCUMENT     APPLICABLE  REGISTRATION │ │
│ │                                                 │ │
│ │  CLAIMS FOR PATENT    /APPLICABLE/ DIFFERENT    │ │
│ │                       //////////   REGISTRATION │ │
│ └─────────────────────────────────────────────────┘ │
└─────────────────────────────────────────────────────┘
```

FIG. 189

INFORMATION REGISTRATION IF

[REGISTER] [CANCEL] [END]

DATE OF REGISTRATION: 12/25/1996

AUTHOR: sato(Takeshi Sato)

TITLE: FORMAT OF CLAIMS FOR PATENT

1. "AND" FORMAT
   THE COMPONENTS HAVE TO BE COUPLED BY "AND".
   IT IS SIMPLE AND CLEAR BUT THERE MAY BE CASES
   WHERE IT IS DIFFICULT FOR OTHERS TO UNDERSTAND
   THE CHARACTERISTIC COMPONENTS OF THE INVENTION BY
   SKIMMING THROUGH THE DOCUMENT. YOU HAVE TO CLEARLY
   DESCRIBE THE INTERRELATIONS OF THE COMPONENTS
2. "WHEREIN" FORMAT
   THE PREAMBLE IS FOLLOWED BY ", WHEREIN" AND THE
   DESCRIPTION OF THE CHARACTERISTIC FEATURES OF THE
   INVENTION. WHILE THIS FORMAT PROVIDES AN EASY
   UNDERSTANDING OF THE INVENTION AND COMPARISON
   WITH KNOWN TECHNOLOGIES, THE INVENTIVE STEPS MAY BE
   RATED LOW IF RELATIVELY KNOWN MEANS ARE DESCRIBED
   AFTER "WHEREIN"

CHECK IT APPLICABLE TO THE RELATED QUESTIONS BELOW.
YOU MAY REGISTER AS DIFFERENT PIECES OF INFORMATION

| | | |
|---|---|---|
| TELL ME HOW TO WRITE CLAIMS FOR PATENT | APPLICABLE | DIFFERENT REGISTRATION |
| PREPARATION OF A PATENT DOCUMENT | APPLICABLE | DIFFERENT REGISTRATION |
| CLAIMS FOR PATENT | APPLICABLE | DIFFERENT REGISTRATION |

FIG. 191

INFORMATION SHARING SYSTEM AND COMPUTER PROGRAM PRODUCT FOR CAUSING COMPUTER TO SUPPORT THE INFORMATION SHARING SYSTEM

BACKGROUND OF THE INVENTION

In recent years, information can easily be transmitted to a large number of people as a result of the development of computer networks such as Internet. In such an environment, the intellectual productivity of the society at large may be improved rapidly and remarkably because the information disclosed by a person including his or her achievements, know hows and knowledge can easily be shared by many people. Therefore, disclosure of information has to be encouraged in the modern society.

However, with any of the existing systems, disclosure and utilization of information has not been effectively promoted so far. For example, while the number of times a particular piece of information has been accessed can be referenced in Internet, the evaluations given to it cannot be known to users. Therefore, users are not strongly motivated to access any particular piece of disclosed information to exploit its potential. In other words, there is a demand for means that can encourage users to access disclosed information and evaluate it for utilization.

In the field of communication using personal computers, a piece of information is often associated with a number of pieces of related information so that the user may access any of them. However, if there are too many pieces of information annexed to a specific piece of information, the user is more often than not left at a loss to single out the piece of information exactly he or she want to know. Thus, any existing information systems that can be shared by a number of users do not provide the user with an environment that makes him or her comfortable in retrieving disclosed information and exploit the potential it has.

BRIEF SUMMARY OF THE INVENTION (Objects)

Thus, a first object of the present invention is to provide an information sharing system adapted to receive references' responses to the disclosed and uploaded information and generate evaluations for them by statistically processing the responses in order to encourage disclosure of information and promote the utilization of disclosed information in the information sharing system.

A second object of the invention is to provide an information sharing system adapted to feed back the evaluations given to a specific piece of disclosed information in order to give an incentive to the information discloser to further the disclosure of information.

A third object of the invention is to provide an information sharing system adapted to determining the degree of contribution of a specific user to the system on the basis of the frequency of access and the contents of the retrieved by the user and feeding it back to the user in order to give an incentive to the user to further the utilization of information.

A fourth object of the invention is to provide an information sharing system adapted to present any response to the disclosed information immediately to the information discloser once the notifying conditions provided by the information discloser are met in order to give an incentive to the information discloser to further the disclosure of information.

A fifth object of the invention is to provide an information sharing system adapted to improve the efficiency of utilizing disclosed information by controlling the presentation of additional pieces of information, if any, annexed to a particular piece of information on the basis of the semantic relationships (modification, addition, etc.) of the annexed information.

A sixth object of the invention is to provide an information sharing system adapted to control the presentation of annexed information as a function of information responders and other factors to make the utilization of information more adapted to circumstances.

A seventh object of the invention is to provide an information sharing system adapted to store users' questions and, once a piece of disclosed information matching one or more than one specific questions is registered, notifying the information discloser of the questions in order to improve the efficiency of utilizing disclosed information that matches specific questions.

An eighth object of the invention is to provide a computer program product that can achieve the above first through seventh object of the invention.

(1st aspect of the invention)

An information sharing system using a computer so as to allow a plurality of users to share disclosed information, the system comprising:

input section for receiving responses to the disclosed information from referencers of the disclosed information;

evaluation information generation section for totalizing and processing the responses to generate evaluation information and storing the evaluation information after correlating it with the disclosed information; and evaluation information notifying section for presenting the evaluation information generated by the evaluation information generation section.

With an information sharing system having a configuration as described above, various evaluation data become available on the basis of the responses obtained for disclosed information, which may be fed back to the users of the information sharing system to promote the use of the system.

(2nd aspect of the invention)

According to a second aspect of the invention, in an information sharing system according to the first aspect, the evaluation information generation section has section for generating evaluation information on the disclosed information;

the section for generating evaluation information on the disclosed information being adapted to obtain information on the utility value of the disclosed information from the responses and generate evaluation for the disclosed information on the basis of the obtained information; and the evaluation information notifying section has section for notifying the provider of the disclosed information of the evaluation information.

With the above arrangement, the evaluation information on the utility value of the disclosed information is fed back to the discloser of the disclosed information for further utilization so that the discloser may have an incentive to further the disclosure of information and promote the use of the system.

(3rd aspect of the invention)

According to a third aspect of the invention, in an information sharing system according to the first aspect, the evaluation information generation section has section for generating evaluation information on the record of utilization of the information sharing system for each referencer;

the section for generating evaluation information on the record of utilization of the information sharing system for each referencer being so adapted to detect the utilization of the information sharing system on the basis of the responses and generate evaluation information on the record of utilization by totalizing the detections; and the evaluation information notifying section has section for notifying the referencer of the disclosed information of the evaluation information.

With the above arrangement, the record of utilization of the information sharing system can be evaluated for each user and fed back to the user so that the user may have an incentive to further the utilization of the information sharing system.

(4th aspect of the invention)

According to a fourth aspect of the invention, the information sharing system according to the first aspect further comprises:

utilization conditions storage section for storing notifying conditions for notifying the responses to the information provider of the disclosed information;

the notifying conditions being modifiable only by the information provider; and response notifying section for notifying the information provider of any response meeting the notifying conditions.

With the above arrangement, the information discloser may be directly and selectively notified of the responses of information referencers according to the conditions provided in advance by the information discloser so that the information discloser may have an incentive to update the disclosed information.

(5th aspect of the invention)

According to a fifth aspect of the invention, there is provided a information sharing system using a computer so as to allow a plurality of users to share disclosed information, the system comprising:

input section for receiving additional information to be added to the disclosed information from a reference of the disclosed information;

semantic relationship specifying section for specifying a semantic relationship of the additional relative to the disclosed information;

additional information accumulation section for storing the additional information with the semantic relationship; and additional information presentation section for taking out the semantic relationship from the additional information accumulation section and presenting the additional information on the basis of the semantic relationship when presenting the disclosed to an information referencer.

With an information sharing system having a configuration as described above, whenever there is provided additional information for the disclosed information, the presentation of the additional information can be controlled on the basis of the semantic relationship (modification, addition, etc.) of the additional information relative to the disclosed information so that the disclosed information may be utilized more efficiently along with the additional information.

(6th aspect of the invention)

According to a sixth aspect of the invention, an information sharing system according to the fifth aspect further comprises:

storage section for storing presentation conditions for the additional information; and additional information presentation control section for controlling the presentation of the additional information on the basis of the semantic relationship between the additional information and the disclosed information and the presentation conditions stored in the storage section.

With the above arrangement, the additional information can be presented according to the semantic relationship between the additional disclosed and the disclosed information and controlled according to a different set of presentation conditions, which may be, for example the attributes of the information referencer so that the additional disclosed may be presented according to the circumstances of utilization of information and hence may be utilized more efficiently.

(7th aspect of the invention)

According to a seventh aspect of the invention, there is provided an information sharing system using a computer so as to allow a plurality of users to share disclosed information, the system comprising:

request input section for receiving and storing the requests of information requesters; and request particulars presentation section for analyzing the contents of the disclosed information when the information is registered by an information discloser and taking out requests related to the disclosed information from the request input section to present the requests to the information discloser.

With an information sharing system having a configuration as described above, requests including questions from information requesters can be received and stored so that, when disclosed information that meets the requests is registered subsequently, the requests can be presented to the information discloser. Then, the user may reliably obtain the information he or she want from the information sharing system to promote the utilization of the system.

(8th aspect of the invention)

According to an eighth aspect of the invention, there is provided a computer program product that can be applied to a computer system to realize a information sharing system according to any of the first through seventh aspects of the invention.

Additional object and advantages of the invention will be set forth in the description which follows, and in part will be obvious from the description, or may be learned by practice of the invention. The object and advantages of the invention may be realized and obtained by section of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B show examples of disclosed information stored in the disclosed information storage section.

FIG. 10 is an exemplary image of a list of evaluations on a piece of disclosed information on the display screen.

FIG. 11 is an exemplary image of personal evaluations on the display screen.

FIGS. 14A and 14B are exemplary images on the display screen of the additional information registration section.

FIGS. 15A and 15B are exemplary images of a piece of disclosed information having additional information on the display screen of the information referencing section.

FIG. 16 is an exemplary image of additional information accumulated in the additional information accumulation section.

FIG. 17 is a chart showing exemplary semantic relationships that can be accumulated in the semantic relationship accumulation section.

FIGS. 19A and 19B show exemplary images on the display screen of the additional information notifying section for a modification request, where a user (referencer of disclosed information) is entering a "modification request" for a piece of disclosed information.

FIGS. 20A and 20B show exemplary images on the display screen of the additional information notifying section for a modification request. In FIG. 20A, the information discloser is being notified of the modification request, whereas, in FIG. 20B, the user is requested to modify the additional information.

FIGS. 21A and 21B show exemplary images on the display screen of the additional information notifying section for an addition request. In FIG. 21A, the information discloser is being notified of the addition request, whereas, in FIG. 21B, the user is requested to add something to the additional information.

FIGS. 23A and 23B are examples of terms (classified terms, synonyms) accumulated in the dictionary/terms accumulation section.

FIG. 24 is an example of described profiles accumulated in the profile accumulation section.

FIGS. 25A and 25B are examples of terms (objective expressions, subjective expressions) accumulated in the dictionary/terms accumulation section.

FIGS. 32A and 32B show part of the dictionary of emotional expressions.

FIG. 37 shows an exemplary list of referenced histories accumulation in the reference history accumulation section.

FIGS. 45A, 45B and 45C show examples of retrieving keywords and related information.

FIGS. 47A, 47B and 47C are exemplary personal categories.

FIG. 48 is an exemplary piece of annexed information that can be stored in the information storage section.

FIG. 49 is a list of utilization notifying conditions that can be stored in the utilization notifying condition storage section.

FIG. 50 is a chart illustrating utilization notifying conditions that can be used for the purpose of the invention.

FIGS. 51A, 51B and 51C are exemplary pieces of user information that can be stored for the purpose of the invention.

FIG. 52A, 52B, 52C and 52D are exemplary pieces of stored user information.

FIG. 56 is an exemplary piece of stored user information.

FIG. 57 shows an exemplary image on the information retrieving method window.

FIG. 60 is an exemplary list of evaluations on utilization notifying conditions.

FIG. 61 is an exemplary image on the annexed information registration window and the annexed information editing window.

FIGS. 63A, 63B and 63C are exemplary pieces of information that can be registered in the information sharing support system of FIG. 28.

FIGS. 71A, 71B and 71C are other exemplary pieces of information that can be registered in the information sharing support system of FIG. 28.

FIG. 73 is an exemplary piece of information generated by processing referenced information on the referenced information editing window.

FIGS. 74A and 74B are respective exemplary pieces of annexed information and utilization notifying information generated by processing referenced information on the referenced information editing window.

FIGS. 77A and 77B are still other exemplary pieces of disclosed information that can be accumulated in the disclosed information accumulation section.

FIG. 82 shows an exemplary image on the display screen for referencing a utilization case by way of the utilization case reference section.

FIG. 94 is an exemplary interface for information registration.

FIG. 95 is another exemplary interface for information registration.

FIG. 96 is a still another exemplary interface for information registration that can be used for presenting and selecting candidate keywords.

FIG. 97 is an exemplary interface for presenting and correlating pieces of information that resemble a registered piece of disclosed information.

FIG. 98 is an exemplary interface for notifying a registered piece of disclosed information to the person who registered the information.

FIG. 101 is an exemplary interface for an information retrieving operation.

FIG. 102 is another exemplary interface for an information retrieving operation, prompting the operator to specify a retrieval keyword.

FIG. 103 is a still another exemplary interface for an information retrieving operation.

FIG. 106 shows an exemplary image on the display screen displaying summarized evaluations.

FIG. 107 shows another exemplary image on the display screen displaying summarized evaluations.

FIG. 108 is an exemplary interface for an evaluation input.

FIG. 109 is an exemplary interface for a detailed evaluation input.

FIG. 110 shows an exemplary image on the interface screen, prompting the user to input the reason for the evaluation input by the user.

FIG. 111 shows an exemplary image on the interface screen, notifying an evaluation made on a piece of disclosed information to the registered discloser of the information.

FIG. 114 shows an exemplary image on the interface screen, displaying the result obtained by specifying one of the items displayed by the processing operation of FIG. 100.

FIG. 117 shows an exemplary image on the interface screen of the information registration section, notifying the user of a registered piece of information with annexed keywords.

FIG. 118 shows an exemplary image of a piece of information added to disclosed information on the display screen.

FIG. 119 shows an exemplary image of the retrieval window for hierarchically referencing disclosed information according to predetermined classifications.

FIG. 120 is a schematic block diagram of an eighth embodiment of information sharing support system according to the invention.

FIG. 121 is a flow chart for a processing operation conducted in an information sharing support system of FIG. 107.

FIG. 122 is a table of contribution points that can be referenced when determining by calculation the contribution information of a user operation by the contribution information generation section.

FIG. 123 is a flow chart for a processing operation for determining by calculation the contribution information of a user's operation by the contribution information generation section.

FIG. 124 is an example of contribution information that can be accumulated in the contribution information accumulation section.

FIG. 125 shows an exemplary image on the contribution information display window displaying contribution information.

FIG. 126 is a schematic block diagram of a ninth embodiment of information sharing support system according to the invention.

FIGS. 127A and 127B show exemplary images on the information retrieval/presentation screen of an information referencer terminal in a dialogue between the information referencer and the system.

FIGS. 128A and 128B show exemplary images on the information retrieval/presentation screen of an information referencer terminal in a dialogue between the information referencer and the information discloser.

FIGS. 129 shows an exemplary image for dialogue history on the display screen of the information discloser terminal, while the agent is disclosing information.

FIG. 130 is a flow chart for a processing operation of the ninth embodiment of information sharing support system.

Figure 131:
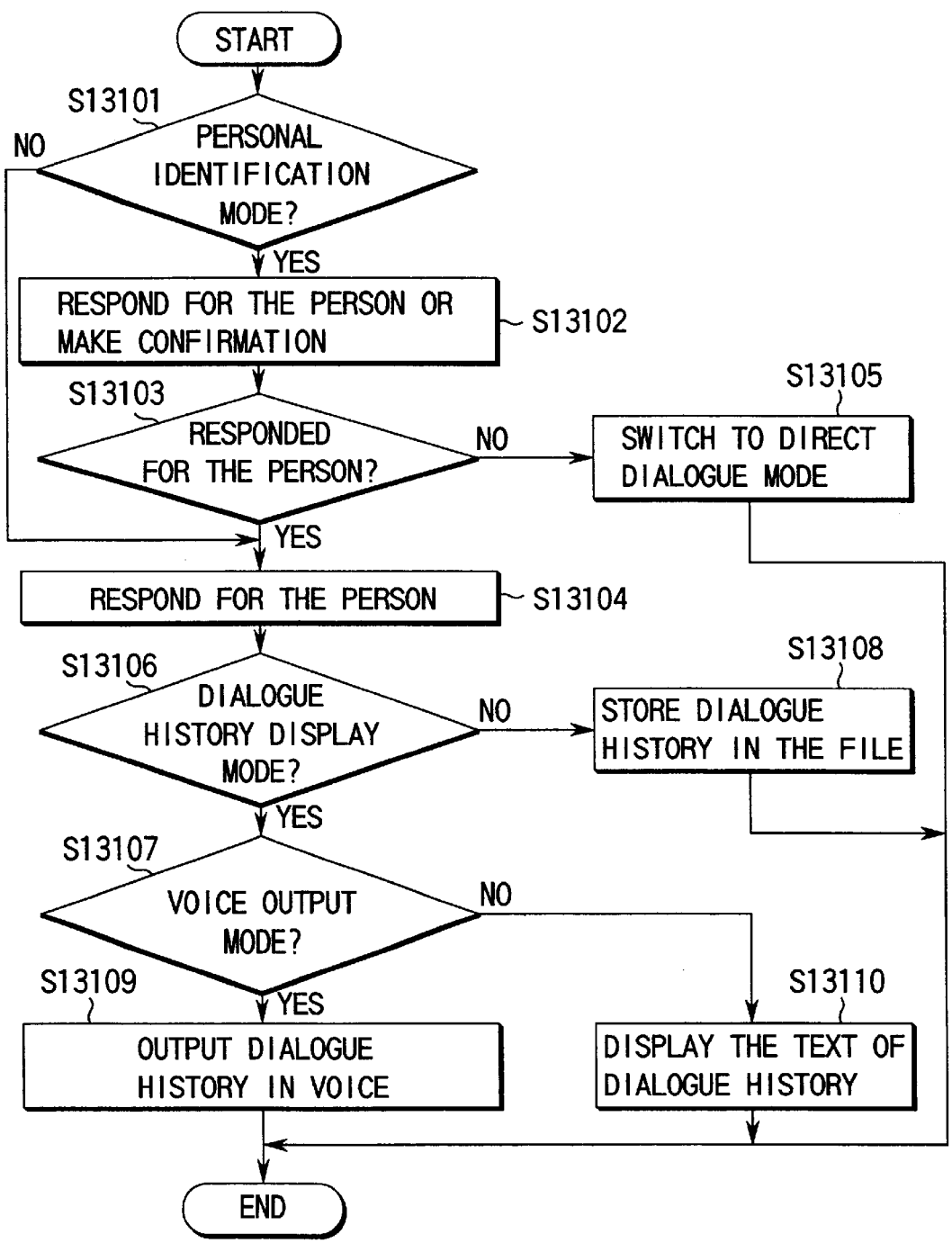

FIG. 131 is a flow chart for a processing operation (information retrieval/presentation/dialogue history display) of the ninth embodiment of information sharing support system.

Figure 132:
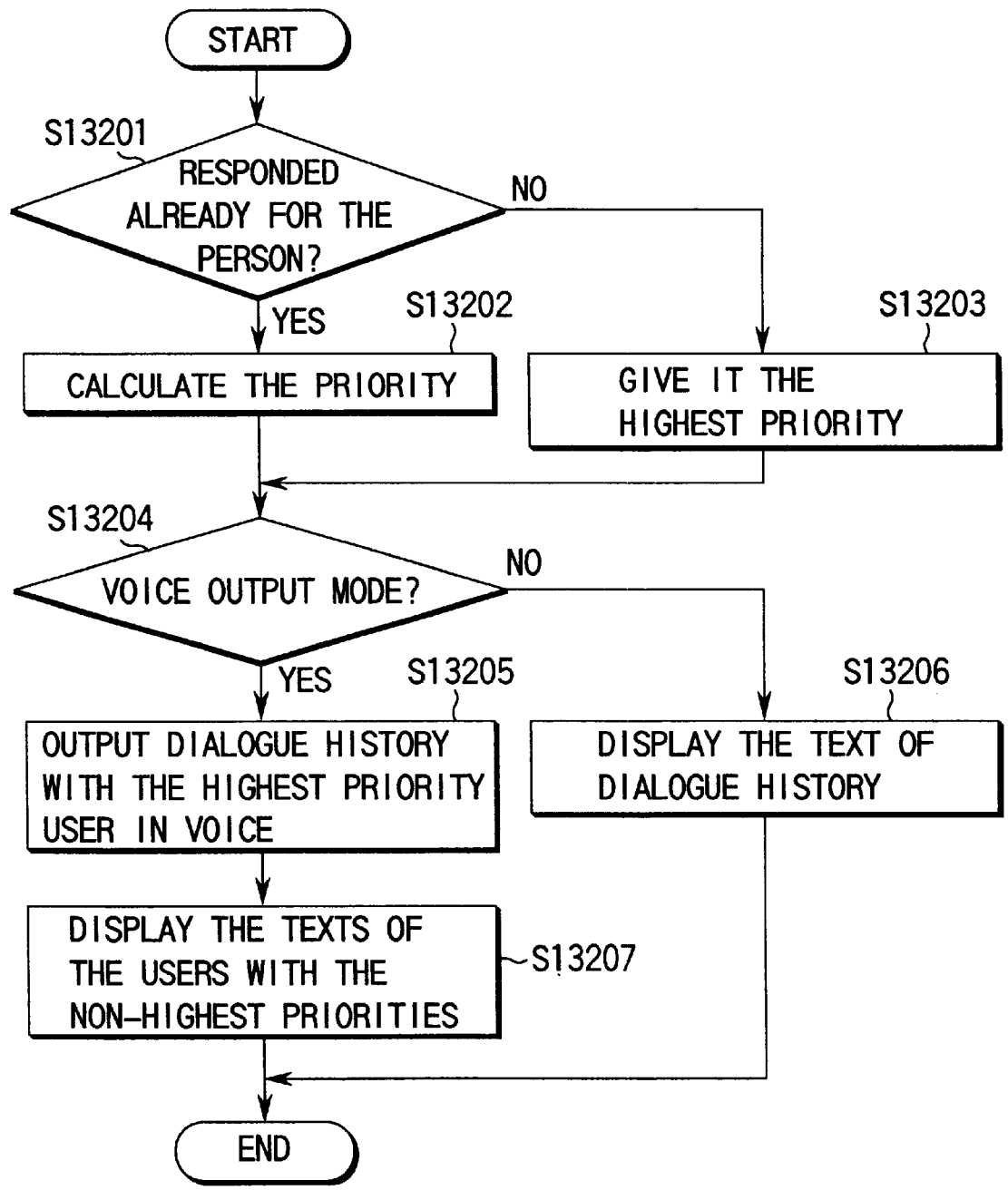

FIG. 132 is a flow chart for a dialogue history display processing operation at the information discloser terminal.

FIGS. 133A, 133B and 133C are examples of profile data that can be accumulated in the profile accumulation section.

Figure 134:
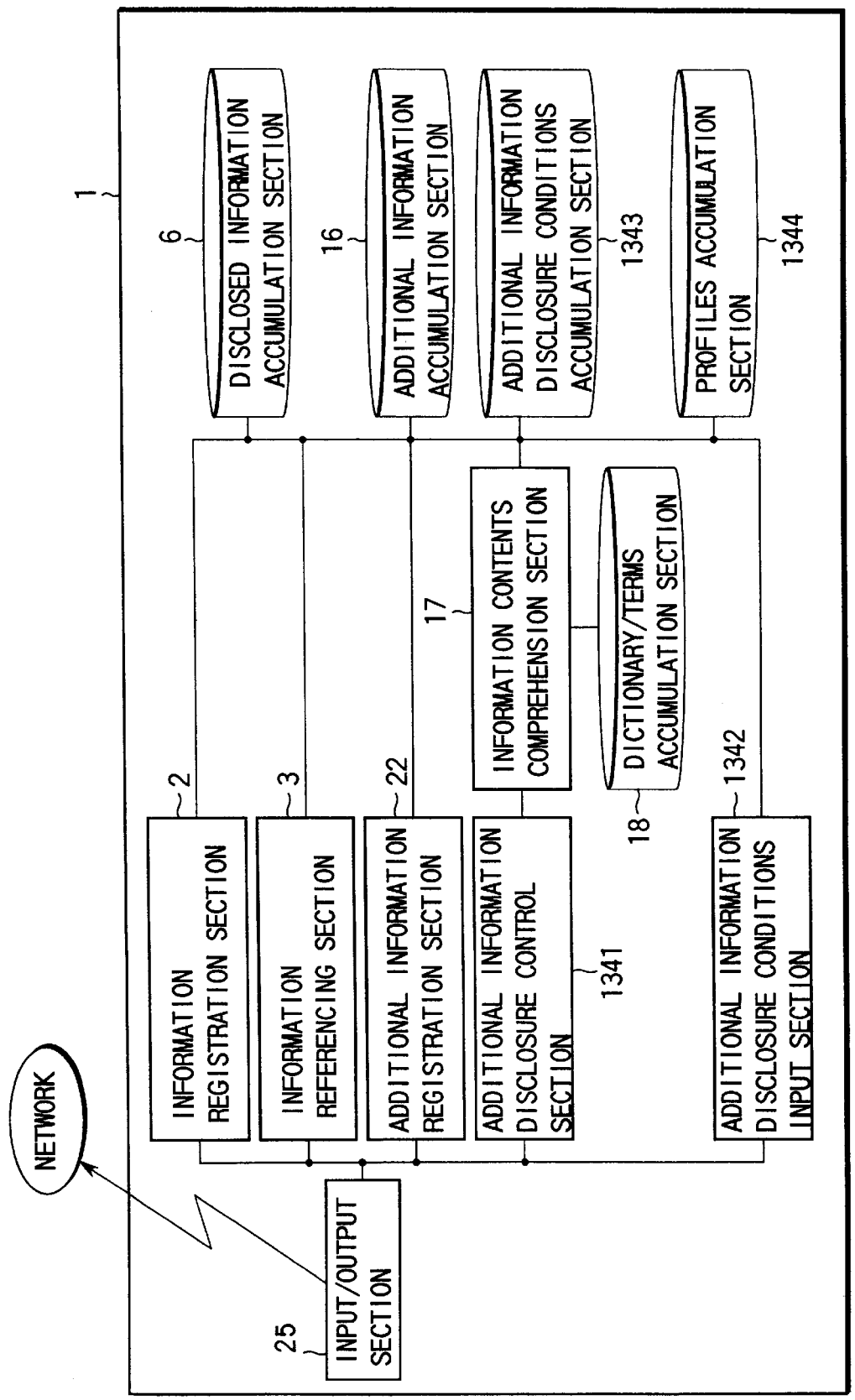

FIG. 134 is a schematic block diagram of a tenth embodiment of information sharing support system according to the invention.

FIGS. 135A and 135B are exemplary pieces of disclosed information accumulated in the disclosed information accumulation section.

FIG. 136 shows an exemplary image on the user interface screen of the information registration section.

FIG. 137 shows an exemplary image on the user interface screen, specifying the disclosure conditions of additional information by the registerer of the disclosed information.

FIGS. 138A and 138B show exemplary images on the user interface screen for registering additional information.

FIG. 139 is a table of data that can be stored in the additional information accumulation section fore correlating the disclosing conditions and the evaluations on the disclosing conditions with the disclosed information and the additional information.

Figure 140:
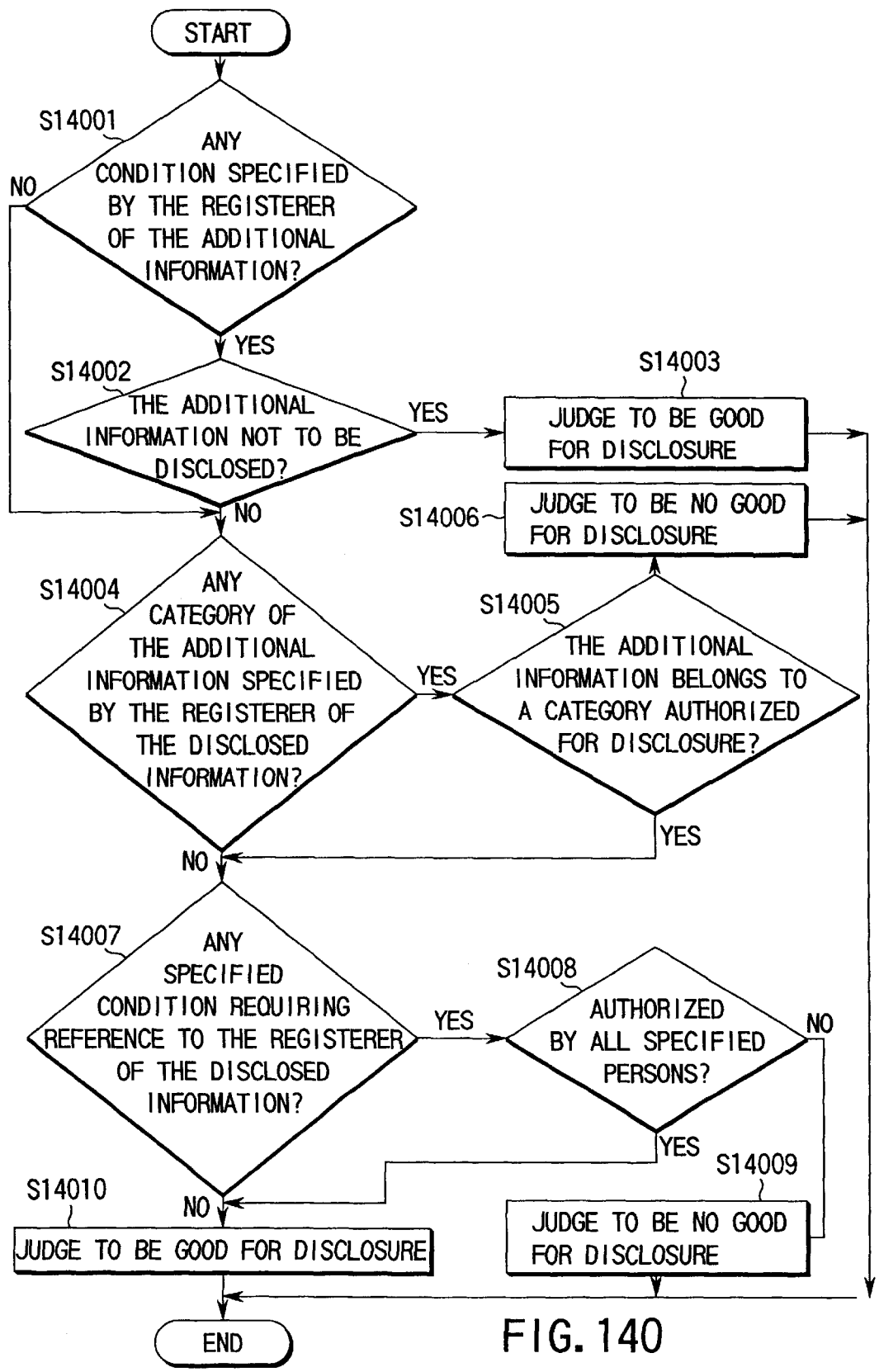

FIG. 140 is a flow chart for a processing operation of judging if a piece of additional information can be disclosed or not.

Figure 141:
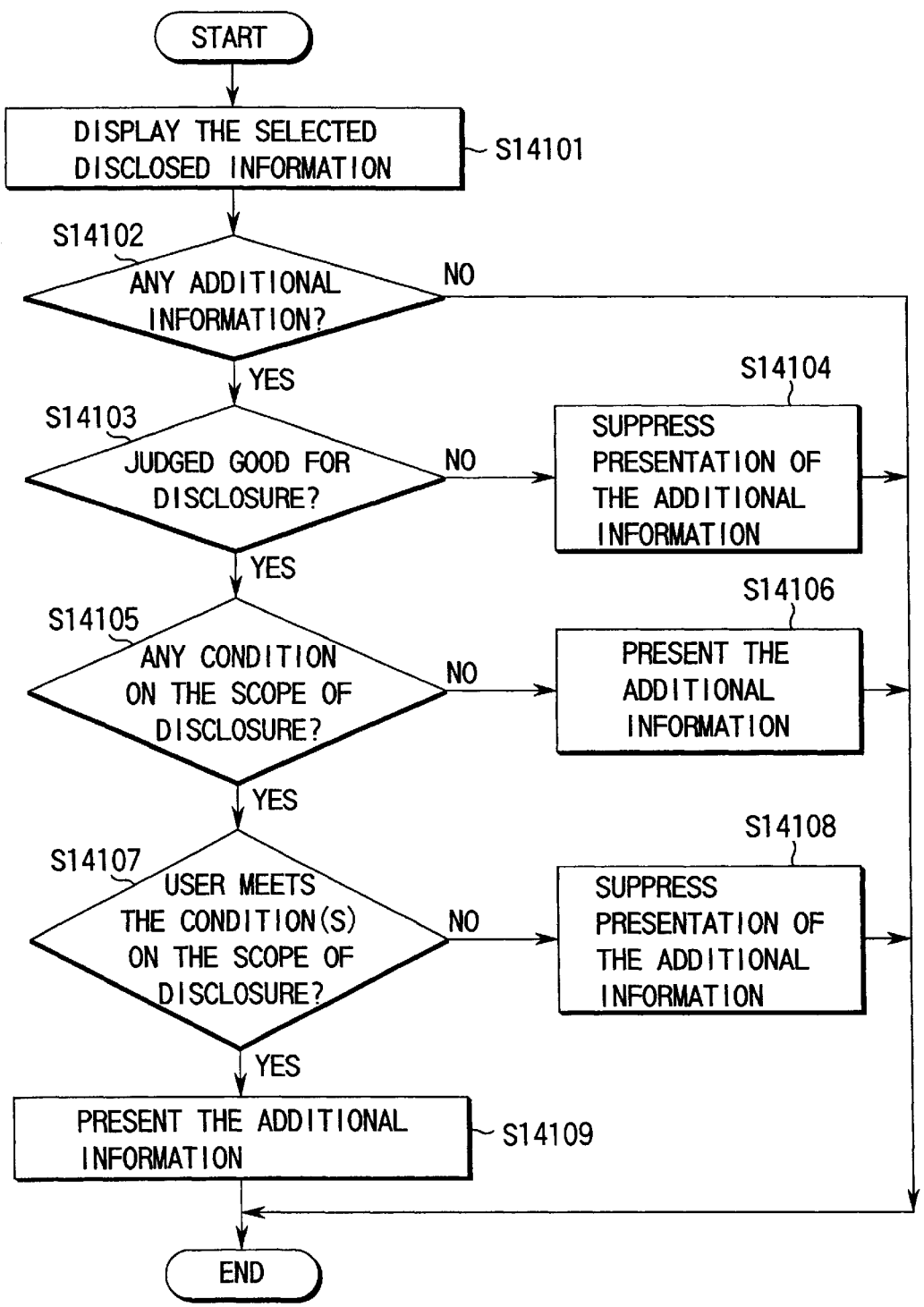

FIG. 141 is a flow chart for a processing operation of controlling the operation of judging if a piece of additional information can be disclosed or not.

FIG. 142 shows exemplary pieces of information accumulated in the disclosed information accumulation section of an eleventh embodiment of information sharing support system according to the invention.

FIG. 143 shows an exemplary image on the user interface screen for retrieving/referencing information by way of the information referencing section.

Figure 144:
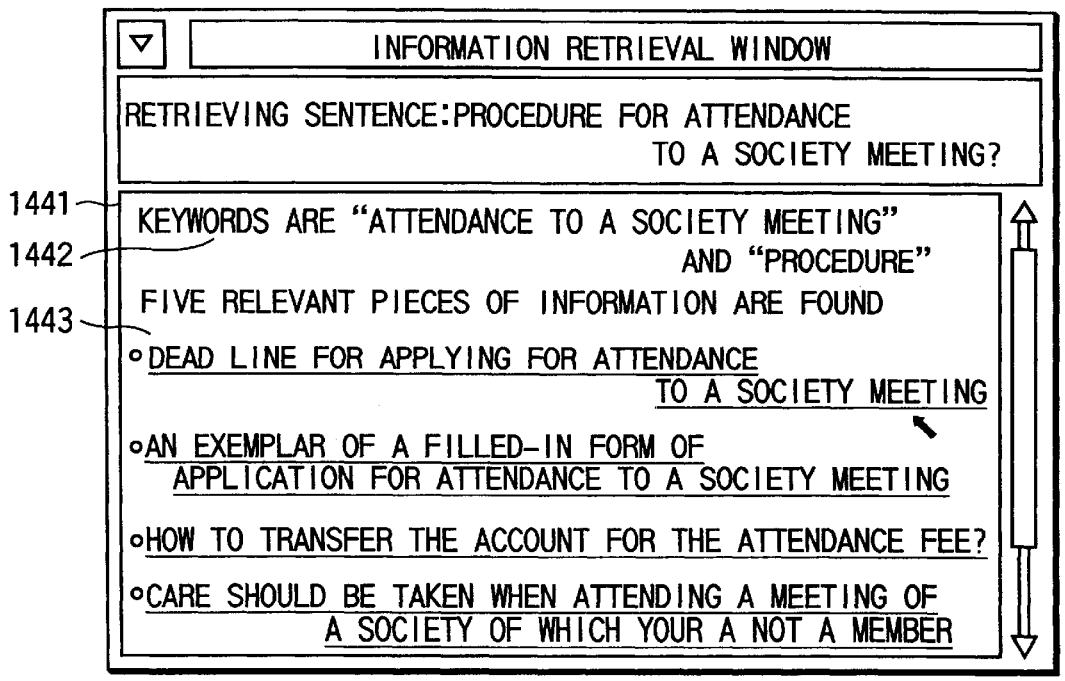

FIG. 144 shows an exemplary image on the display screen telling the result of an information retrieving operation.

Figure 145:
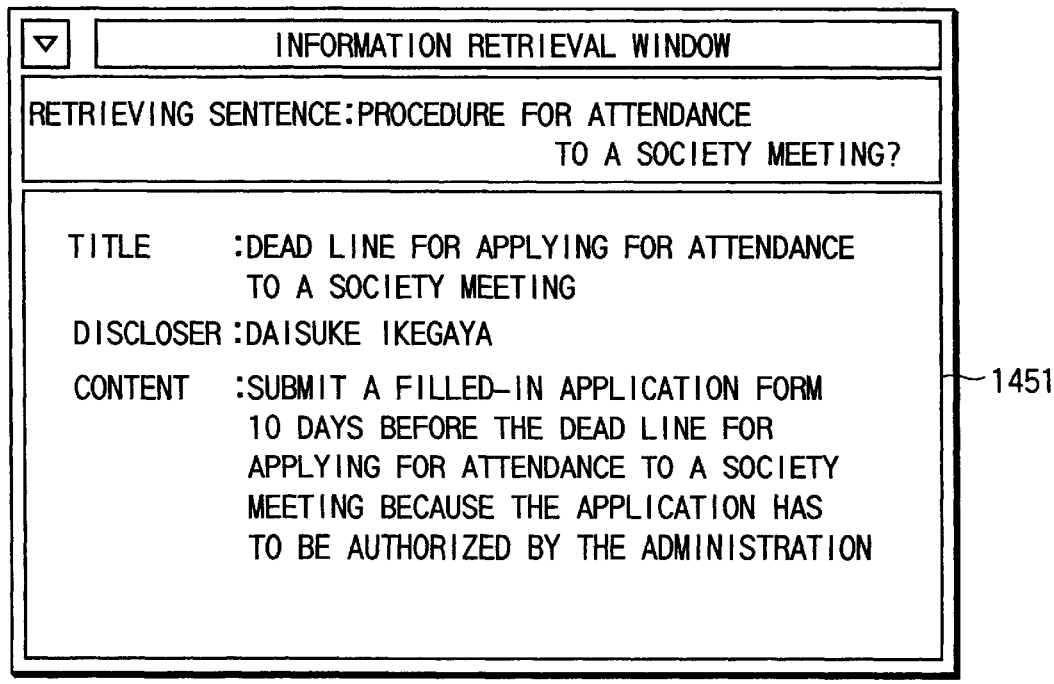

FIG. 145 shows an exemplary image on the display screen illustrating the retrieved disclosed information.

Figure 146:
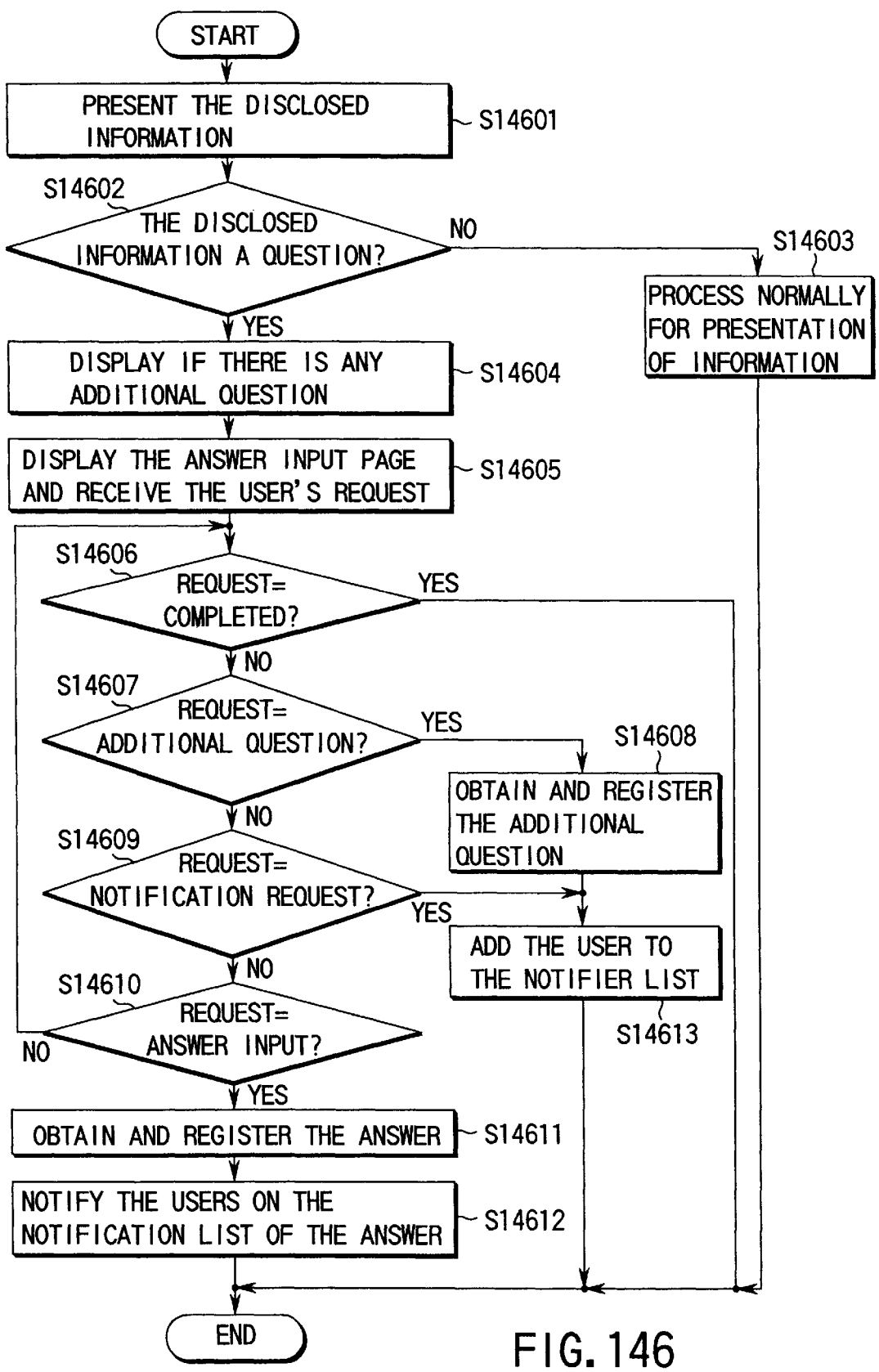

FIG. 146 is a flow chart for a processing operation of the additional information registration section.

Figure 147:
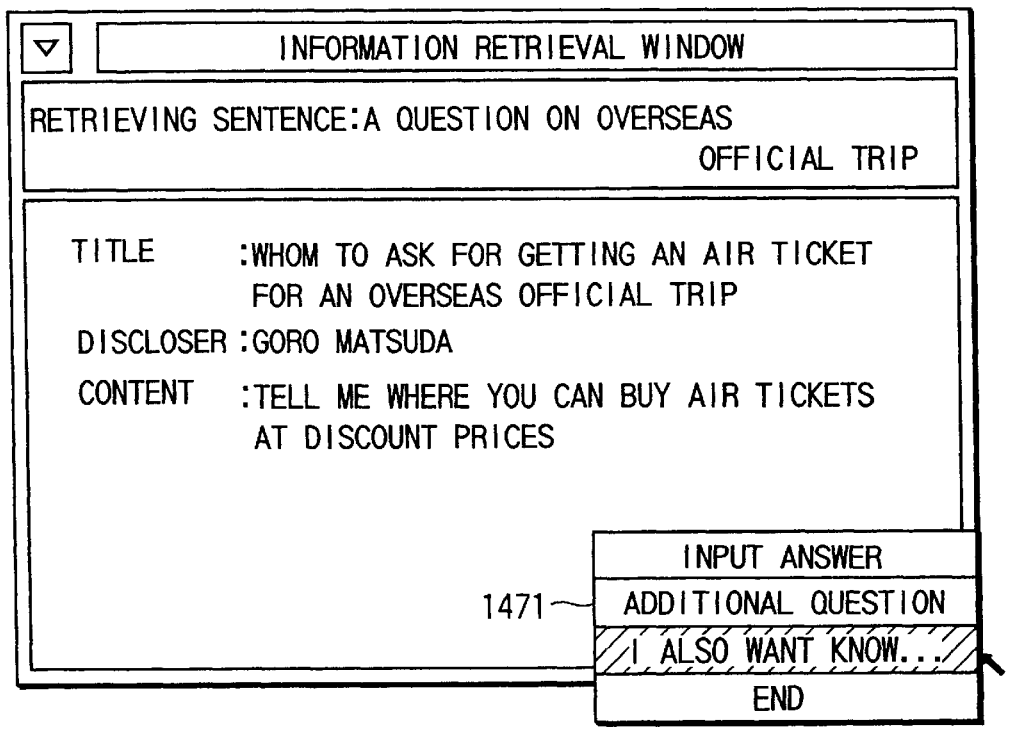

FIG. 147 shows an exemplary image on the display screen of the additional information registration section that can be displayed at the time of information registration.

Figure 148:
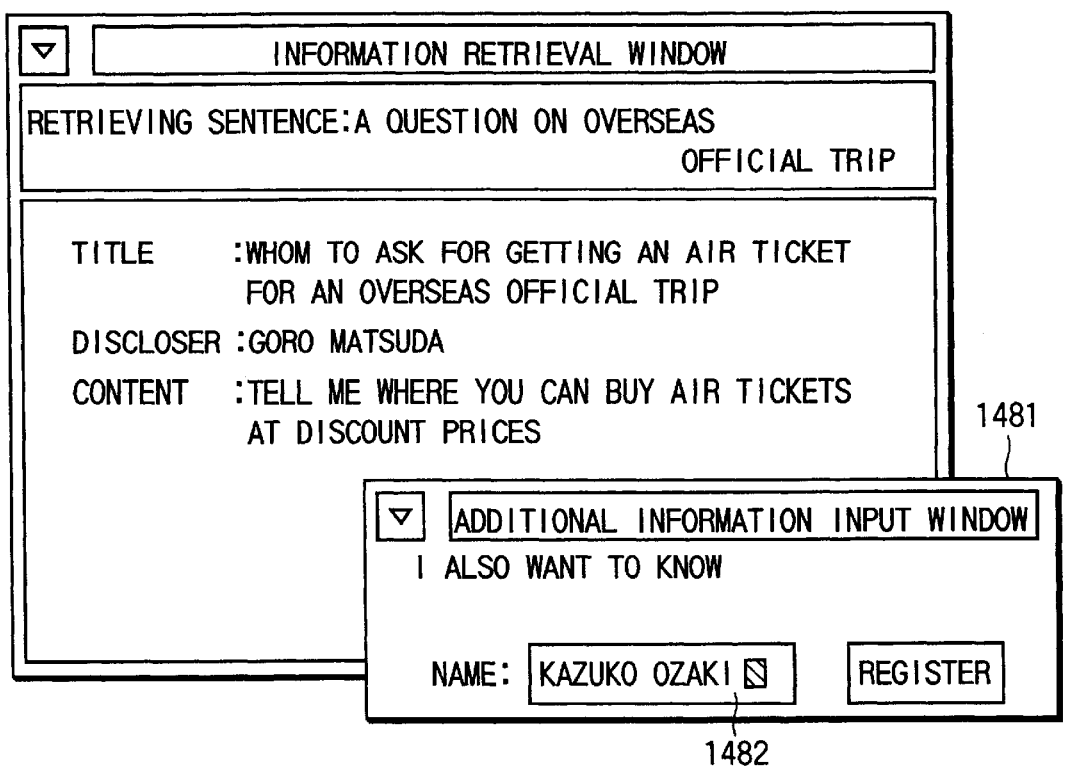

FIG. 148 shows another exemplary image on the display screen of the additional information registration section that can be displayed at the time of information registration.

Figure 149:
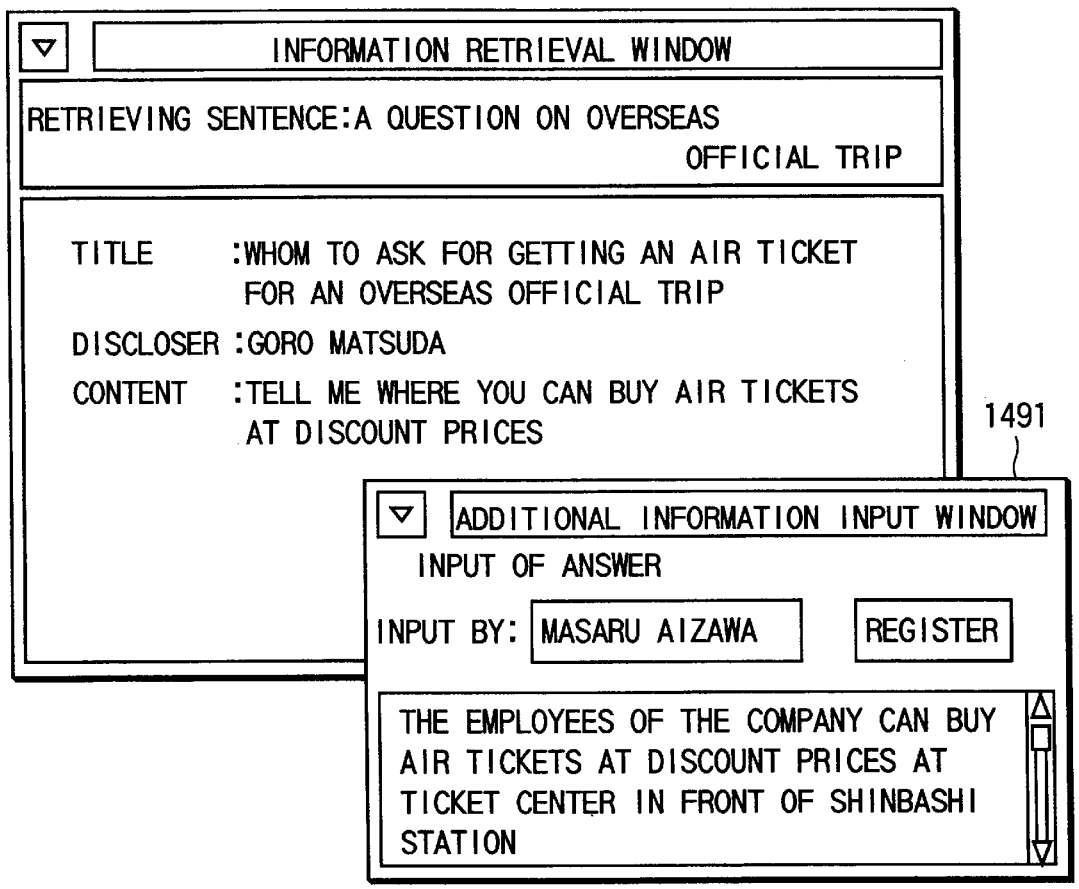

FIG. 149 shows still another exemplary image on the display screen of the additional information registration section that can be displayed at the time of information registration.

Figure 150:
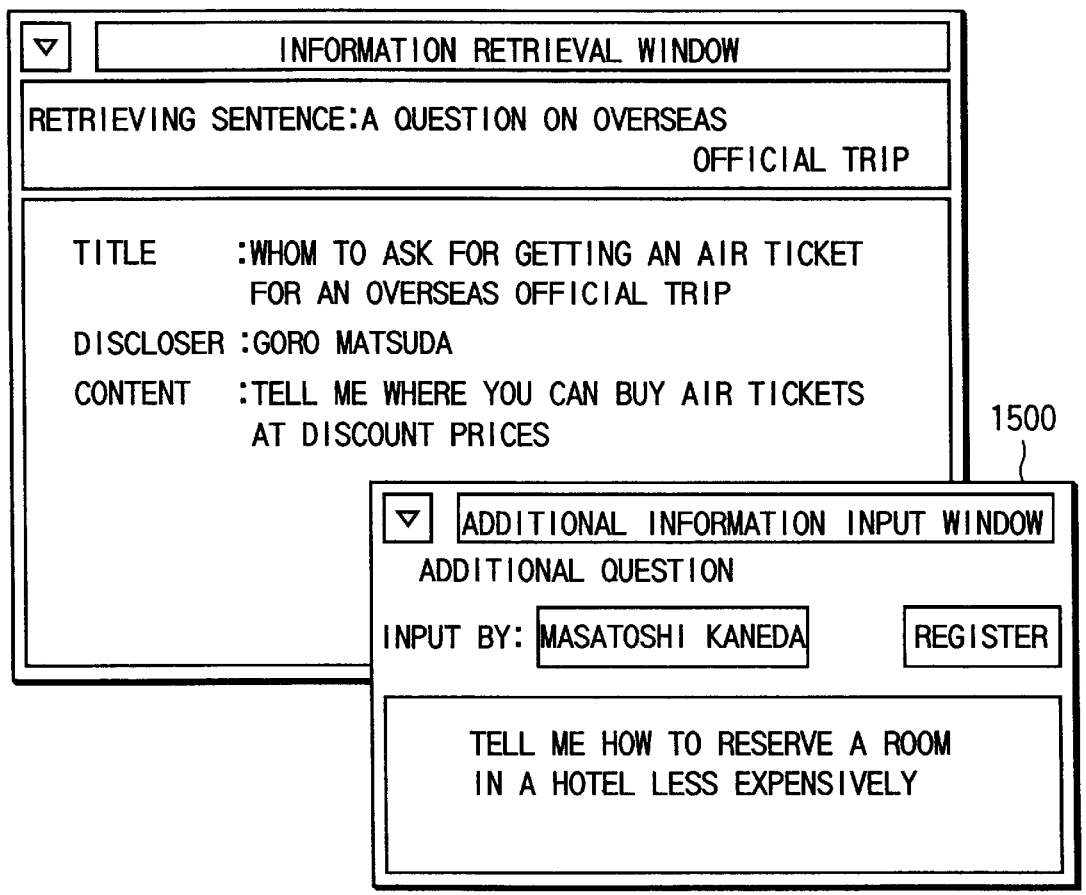

FIG. 150 shows still another exemplary image on the display screen of the additional information registration section that can be displayed at the time of information registration.

Figure 151:
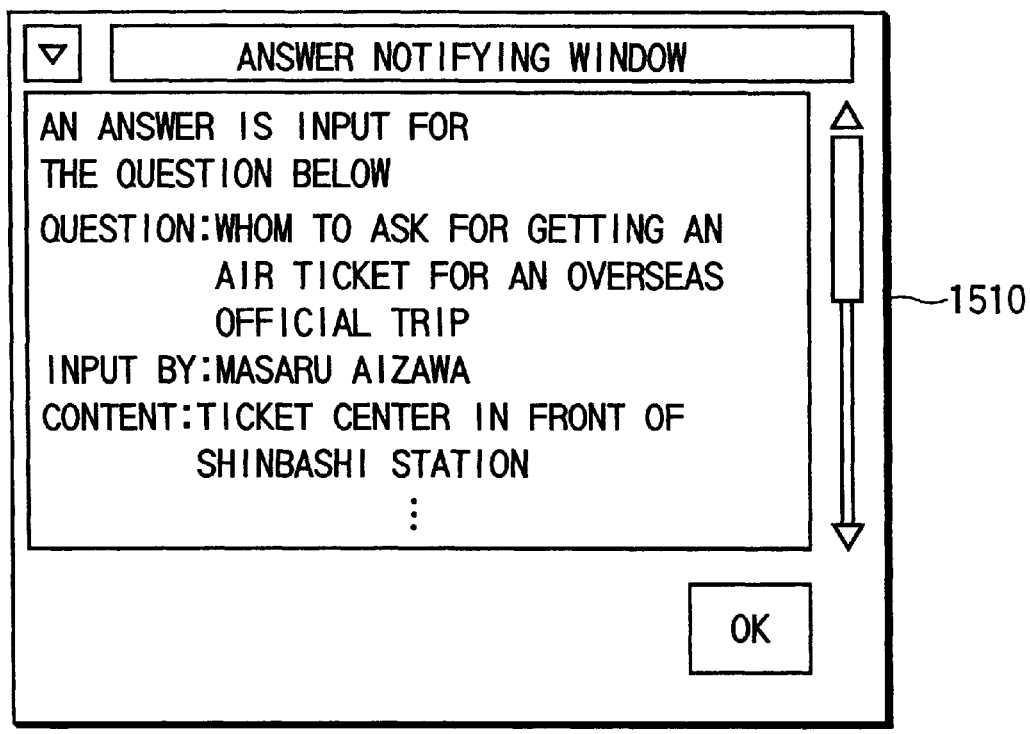

FIG. 151 shows an exemplary image on the display screen that can be displayed when the answer to a question is registered in the additional information registration and the related users are notified of the answer.

FIG. 152 shows exemplary data that can be accumulated in the disclosed information accumulation section.

FIG. 153 shows exemplary data that can be accumulated in the semantic relationship accumulation section.

FIG. 154 shows exemplary additional information that can be accumulated in the additional information accumulation section.

Figure 155:
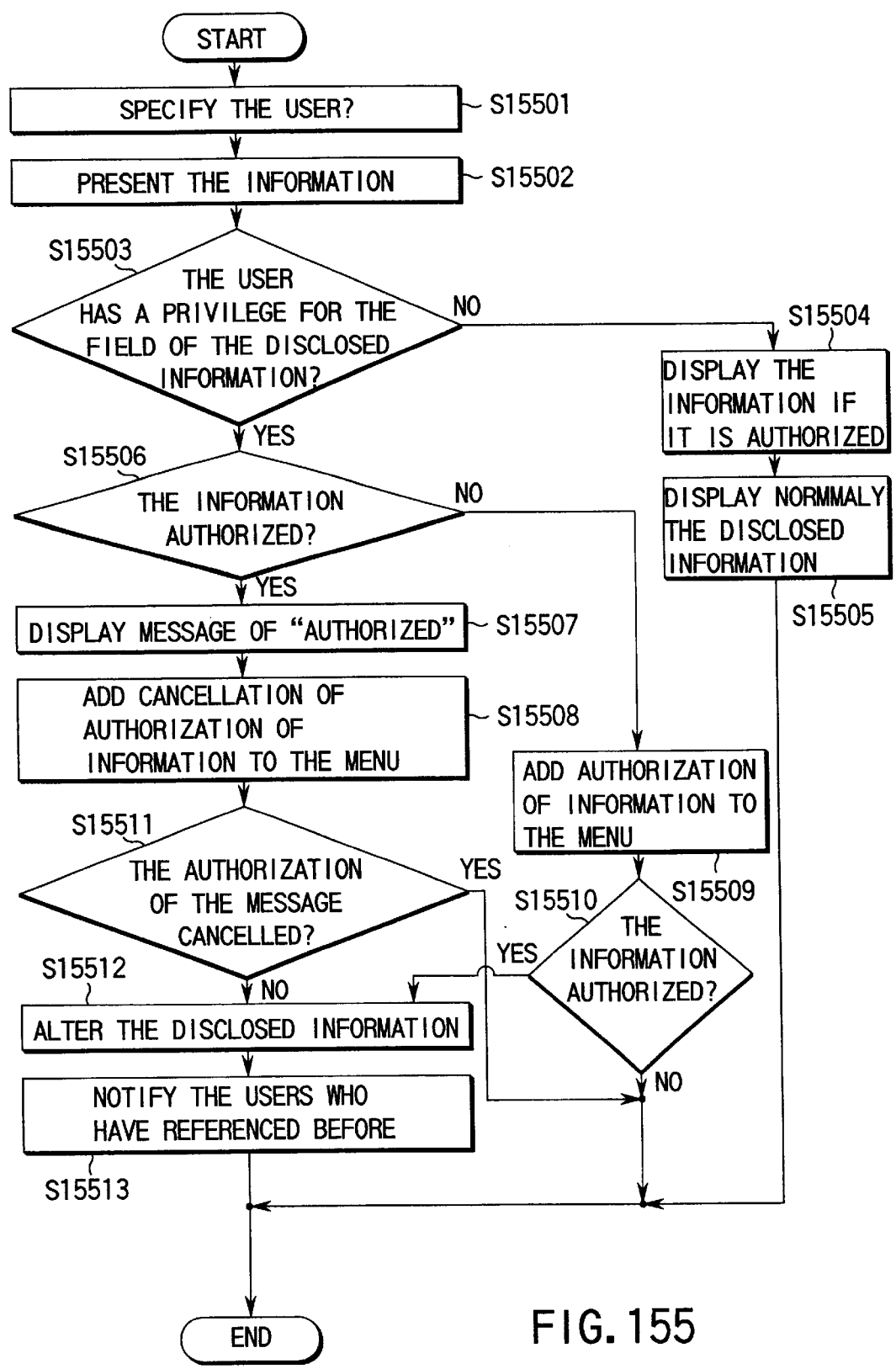

FIG. 155 is a flow chart for a processing operation in the information referencing section.

FIG. 156 shows exemplary data that can be accumulated in the profile accumulation section.

Figure 157:
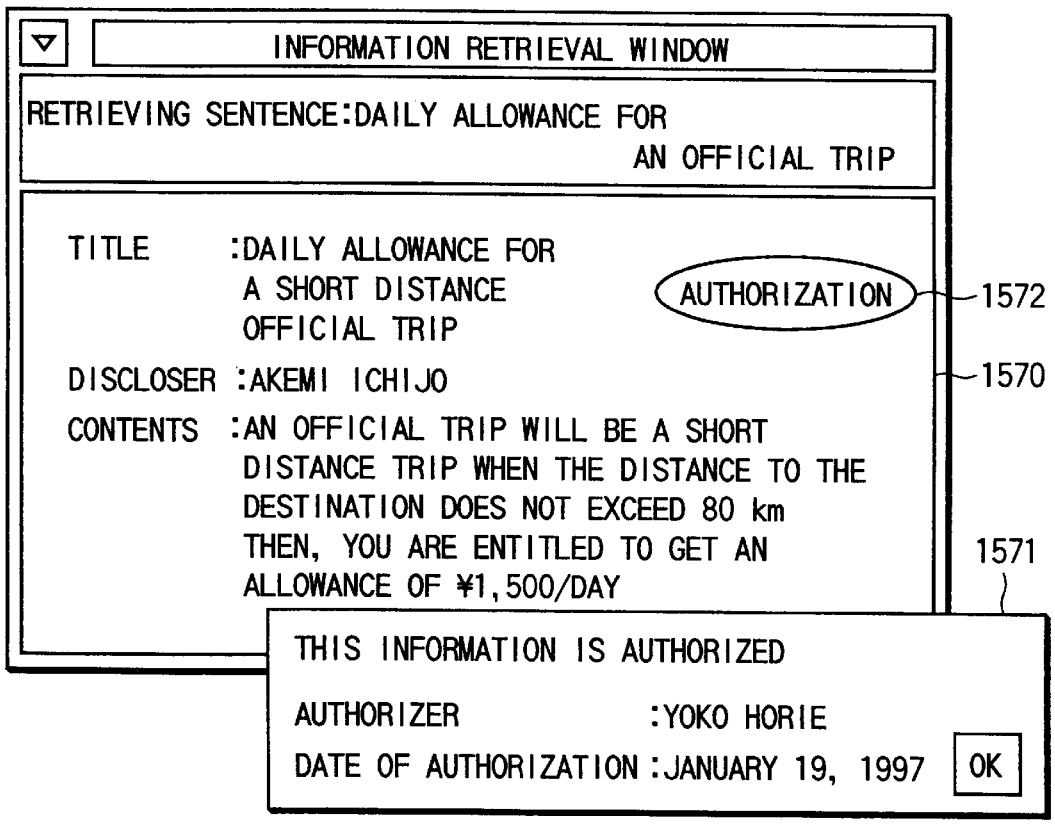

FIG. 157 shows an exemplary image on the display screen of the additional information notifying section, showing additional information.

Figure 158A:
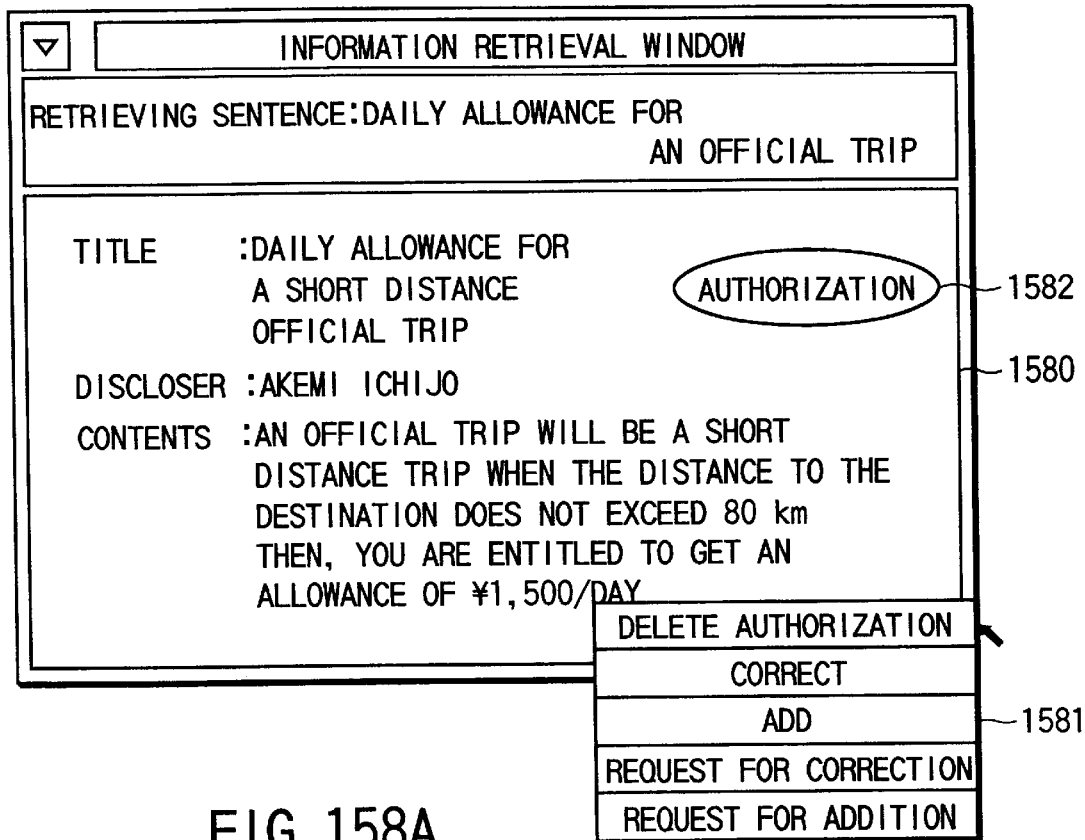
Figure 158B:
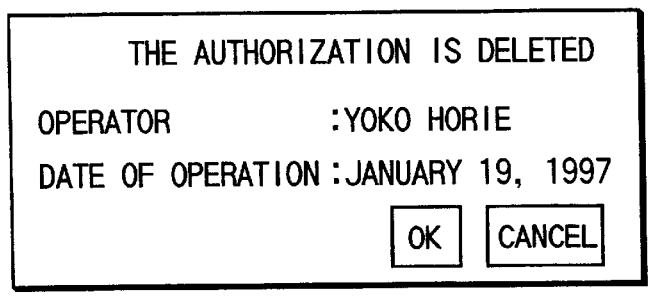

FIGS. 158A and 158B show exemplary images on the display screen, showing additional information being registered in the additional information registration section.

Figure 159:
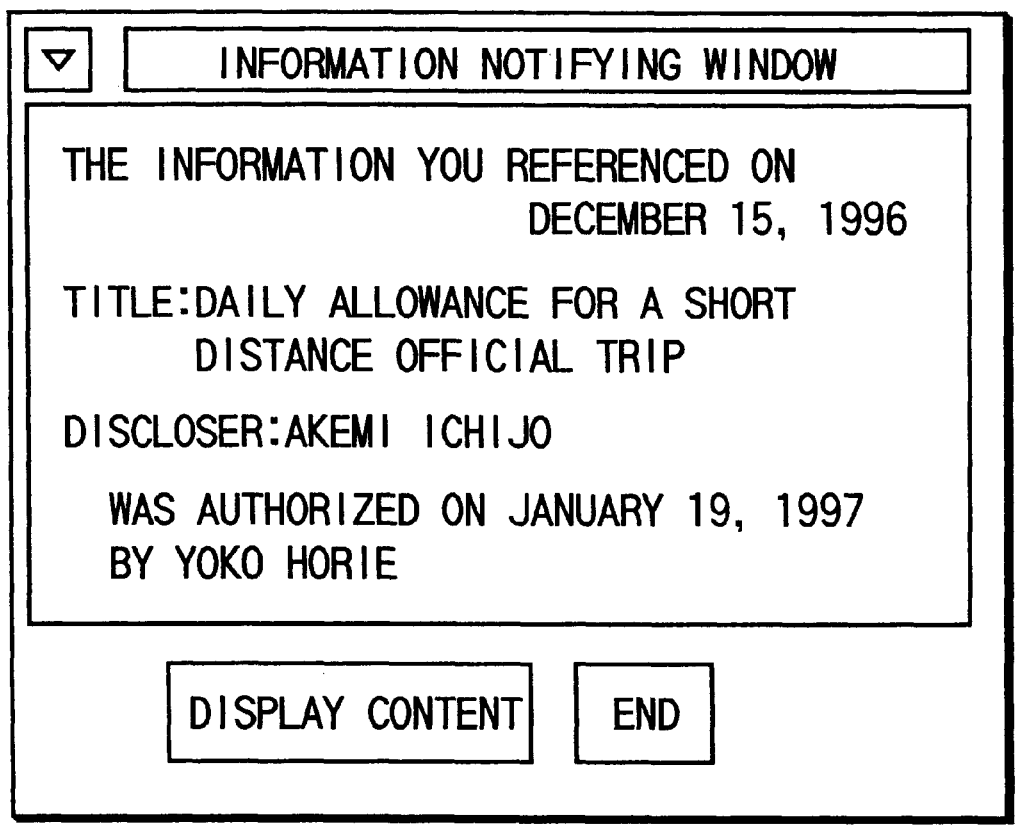

FIG. 159 shows an exemplary image on the display screen, showing additional information being notified by the additional information notifying section.

Figure 160:
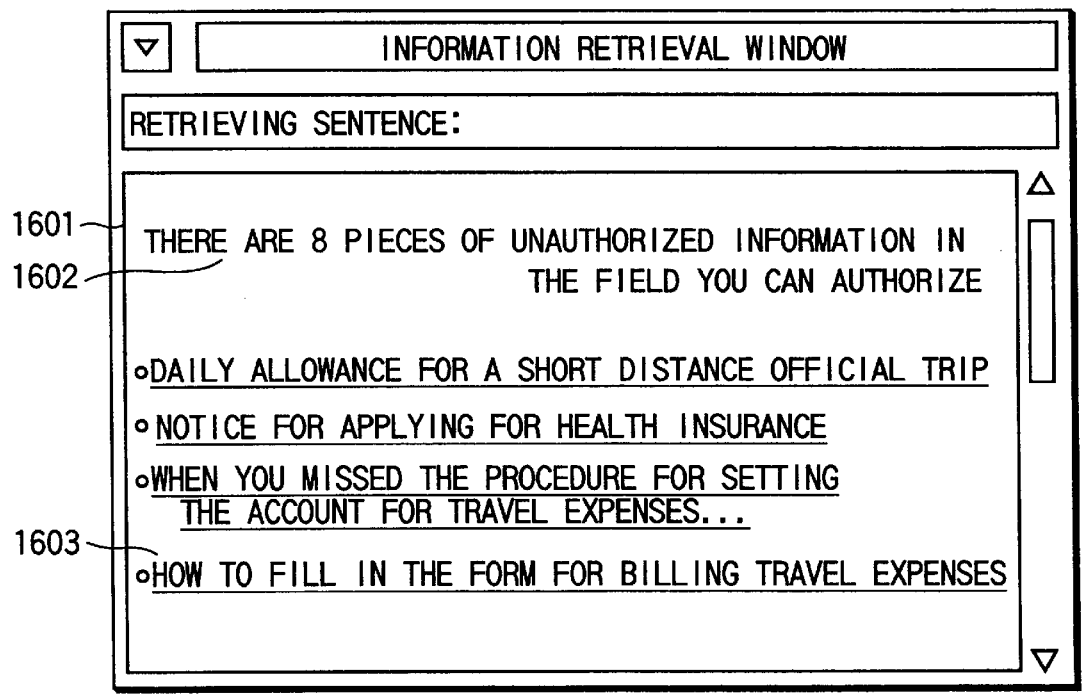

FIG. 160 shows an exemplary image on the display screen of the information referencing section, showing disclosed information.

Figure 161:
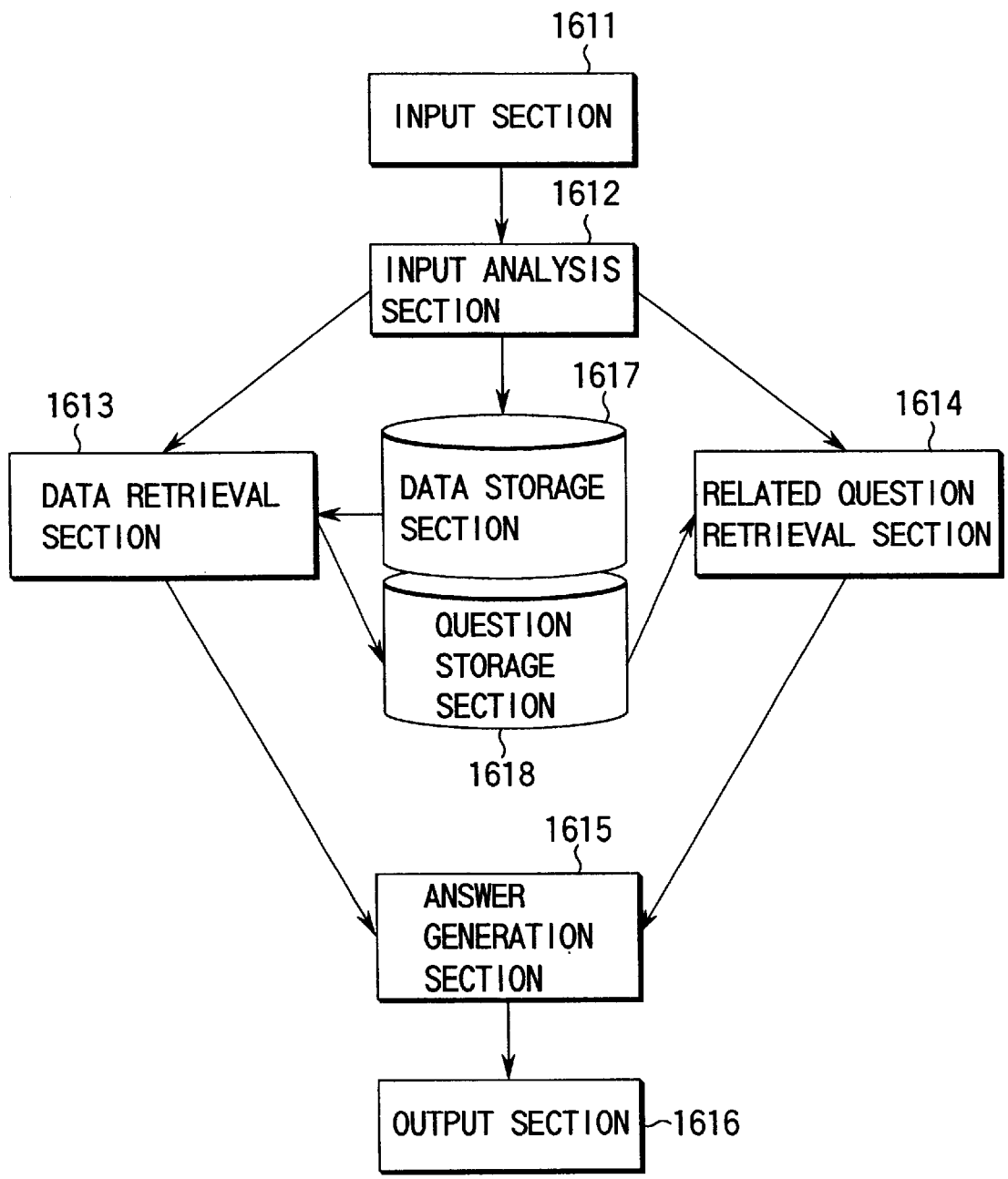

FIG. 161 is a schematic block diagram of a twelfth embodiment of information sharing support system according to the invention.

Figure 162:
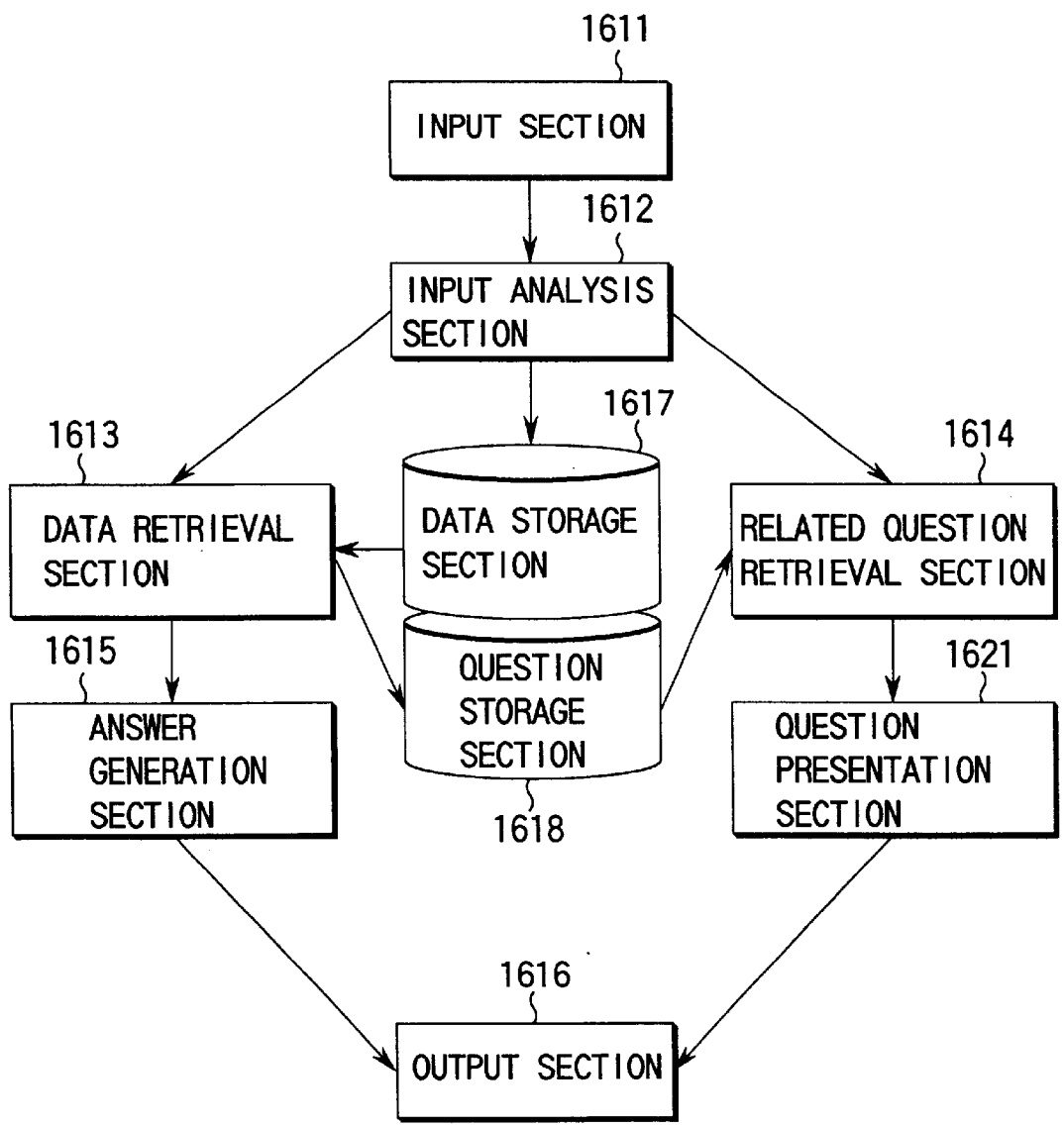

FIG. 162 is a schematic block diagram of a twelfth embodiment of information sharing support system according to the invention and having a modified configuration.

Figure 163:
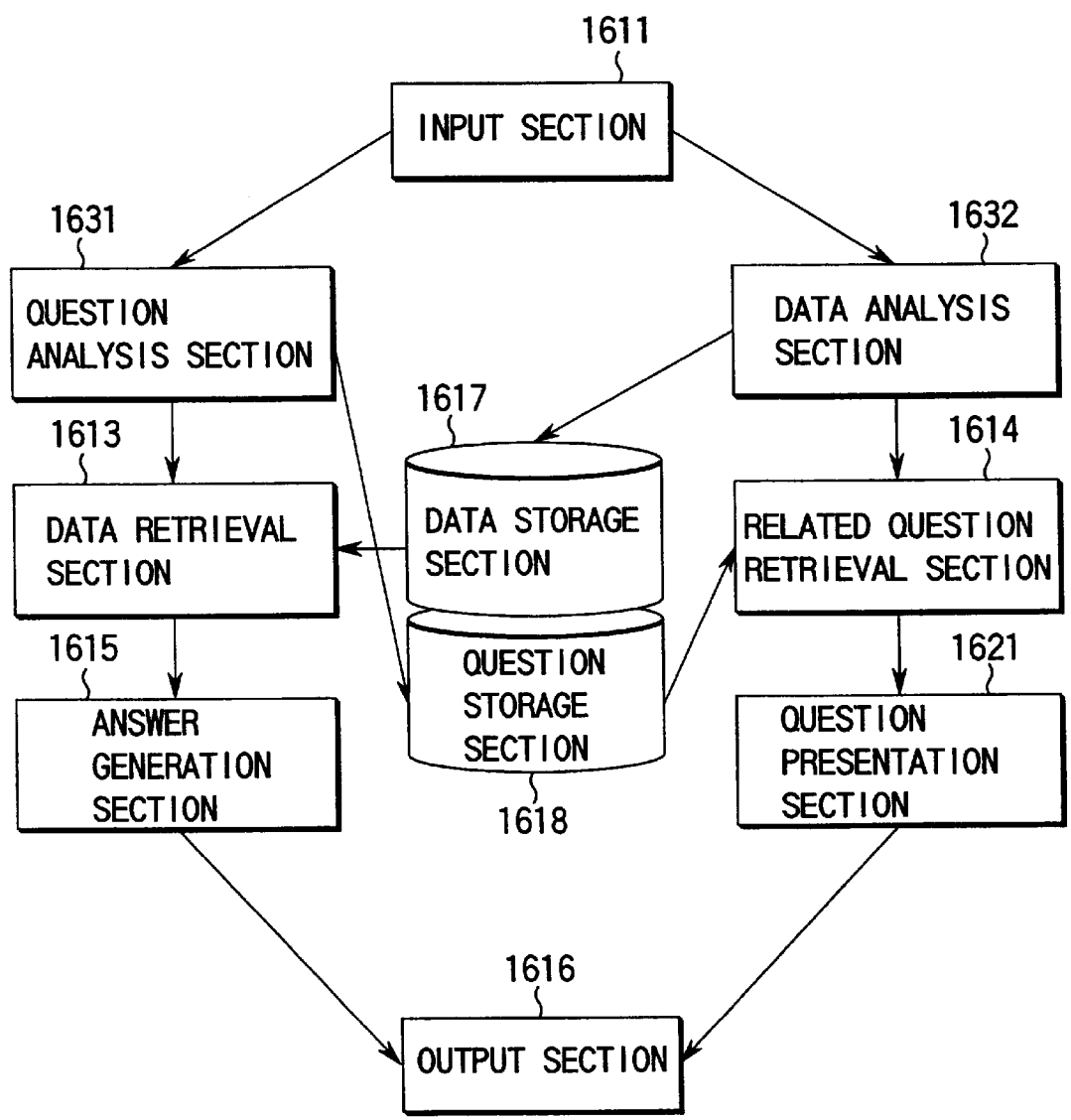

FIG. 163 is a schematic block diagram of a twelfth embodiment of information sharing support system according to the invention and having another modified configuration.

Figure 164:
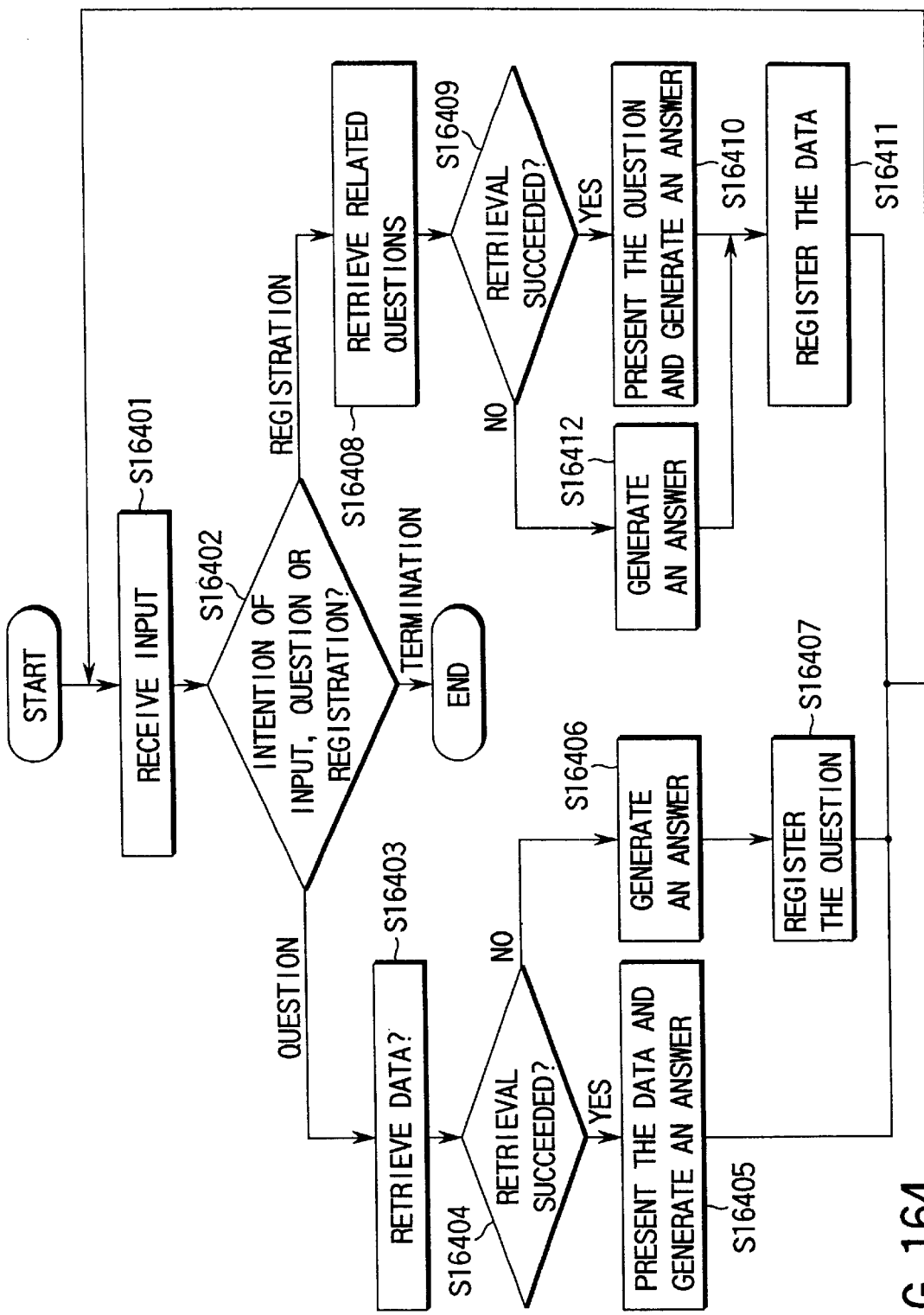

FIG. 164 is a flow chart for a processing operation of the twelfth embodiment of information sharing support system.

Figure 165:
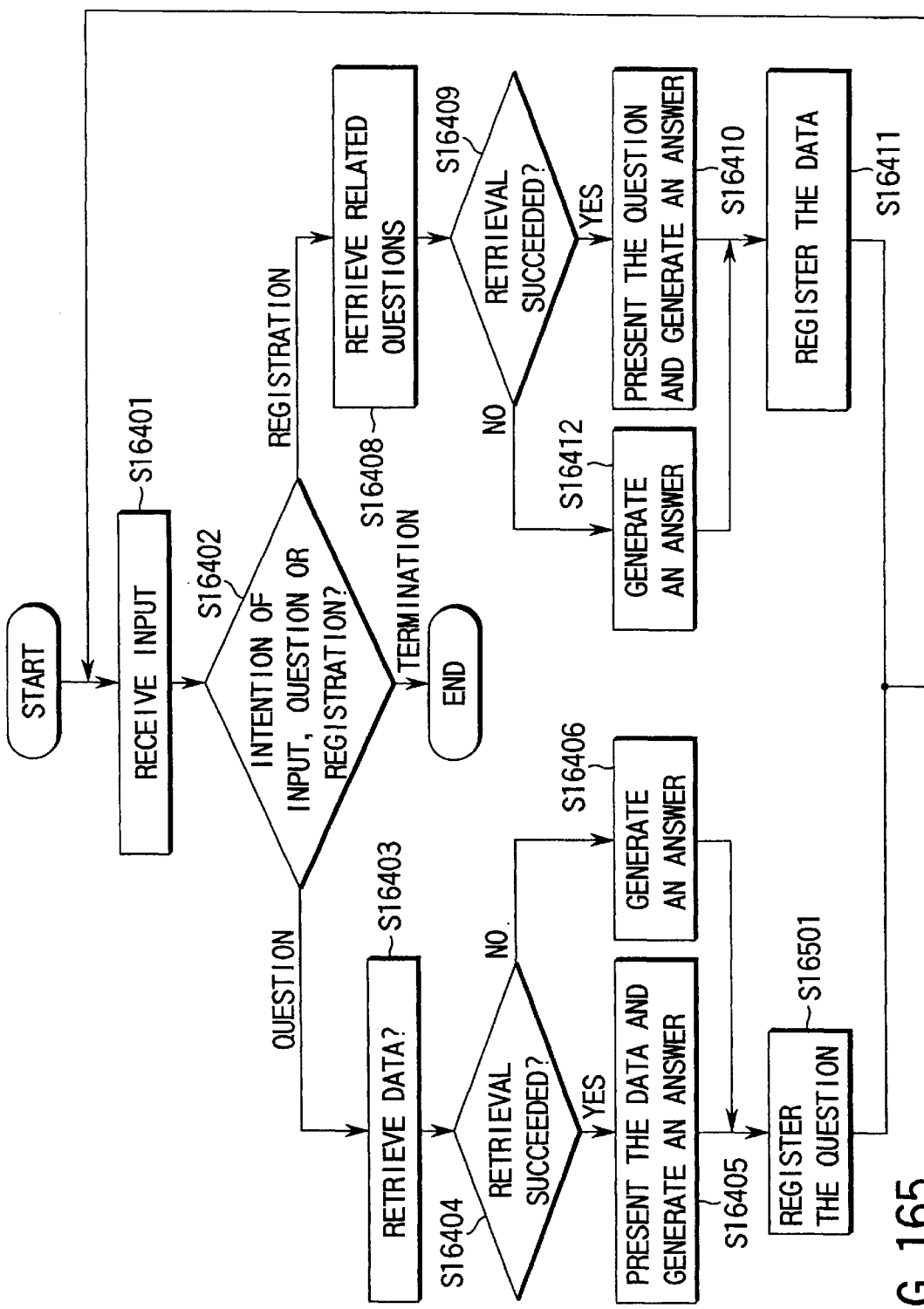

FIG. 165 is a flow chart for another processing operation of the twelfth embodiment of information sharing support system.

Figure 166:
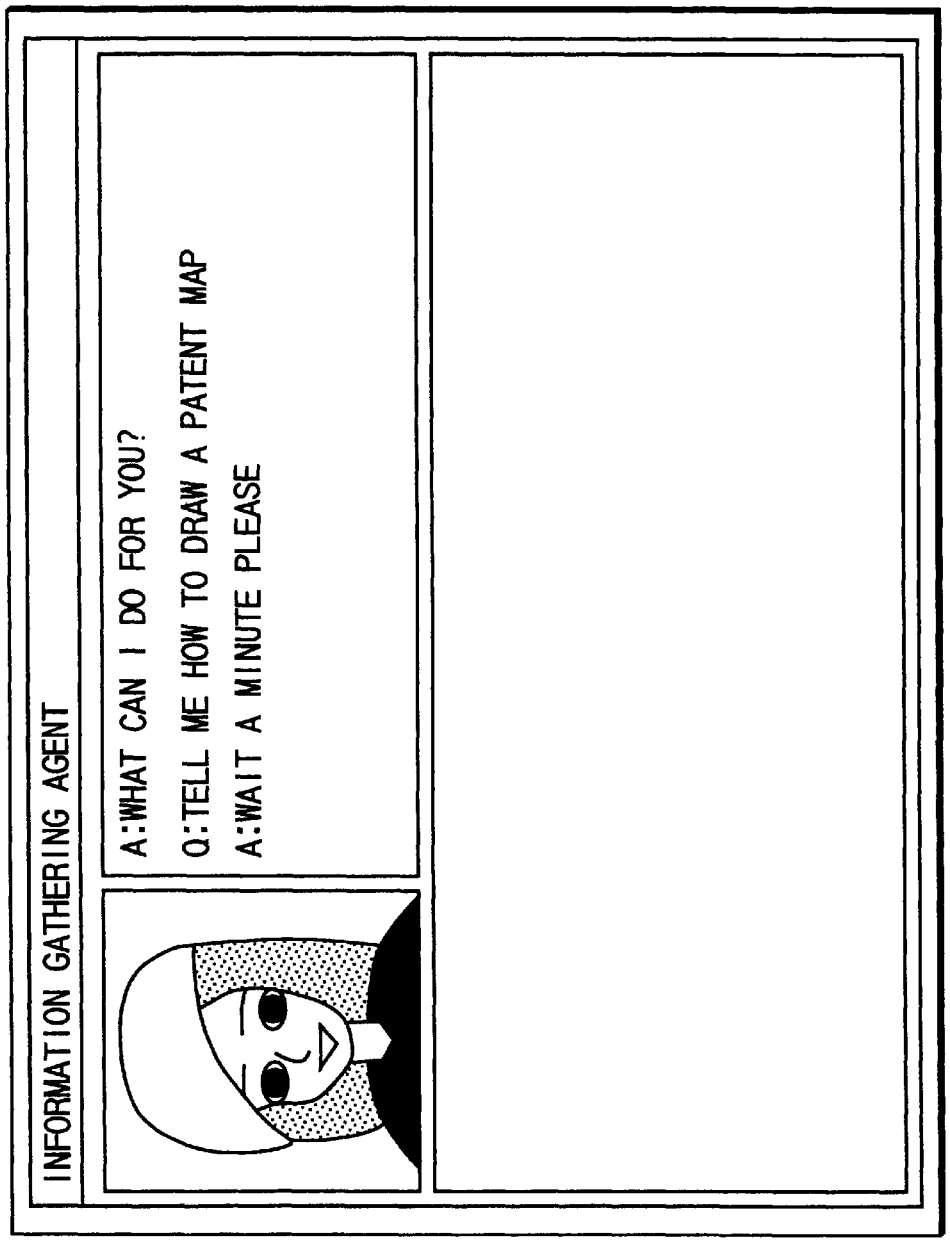

FIG. 166 shows an exemplary image on the display screen for an input operation displayed to an accessing user by way of the input section.

FIG. 167 shows an exemplary result of morpheme analysis at the input analysis section.

FIG. 168 shows an exemplary table of grammatical rules that can be used for syntax analysis at the input analysis section.

FIG. 169 shows an exemplary list of keywords of a keyword dictionary that can be used for input analysis by the input analysis section.

Figure 170:
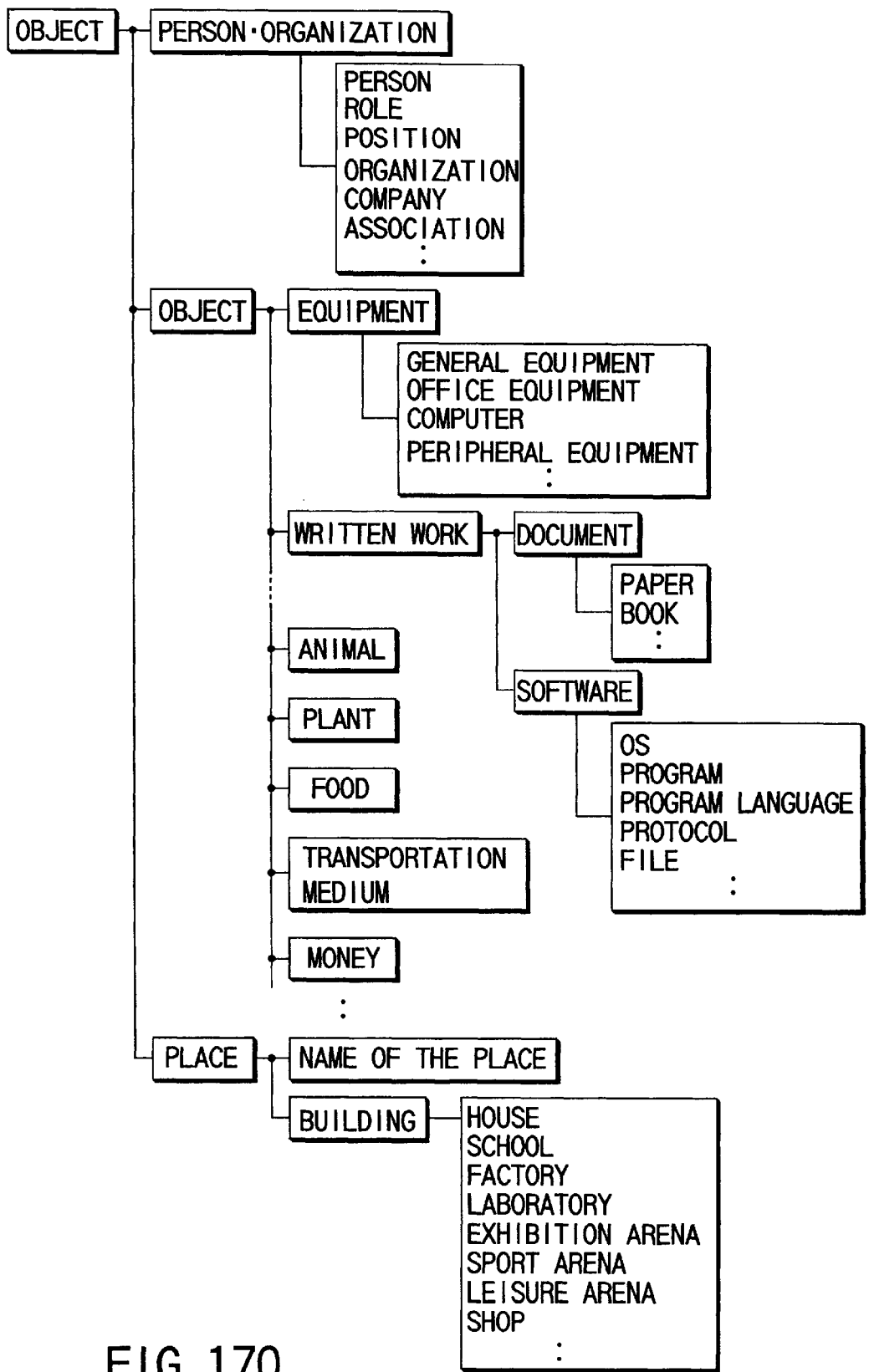

FIG. 170 shows an exemplary table of conceptual system that can be used for the keyword dictionary of FIG. 61.

Figure 171A:
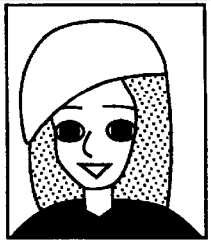
Figure 171B:
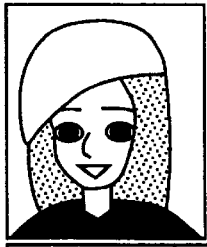

FIGS. 171A and 171B show exemplary images on the display screen of the data retrieval section illustrating results obtained by a retrieval operation.

Figure 172A:
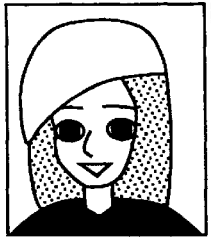
Figure 172B:
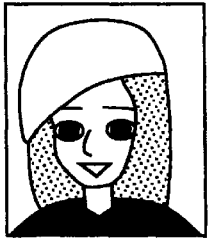

FIGS. 172A and 172B show exemplary images on the display screen displayed when additional retrieval conditions are requested for the result of a retrieval operation by the data retrieval section.

Figure 173:
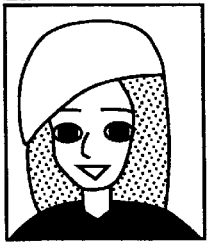

FIG. 173 shows another exemplary images on the display screen of the data retrieval section illustrating a result obtained by a retrieval operation.

Figure 174A:
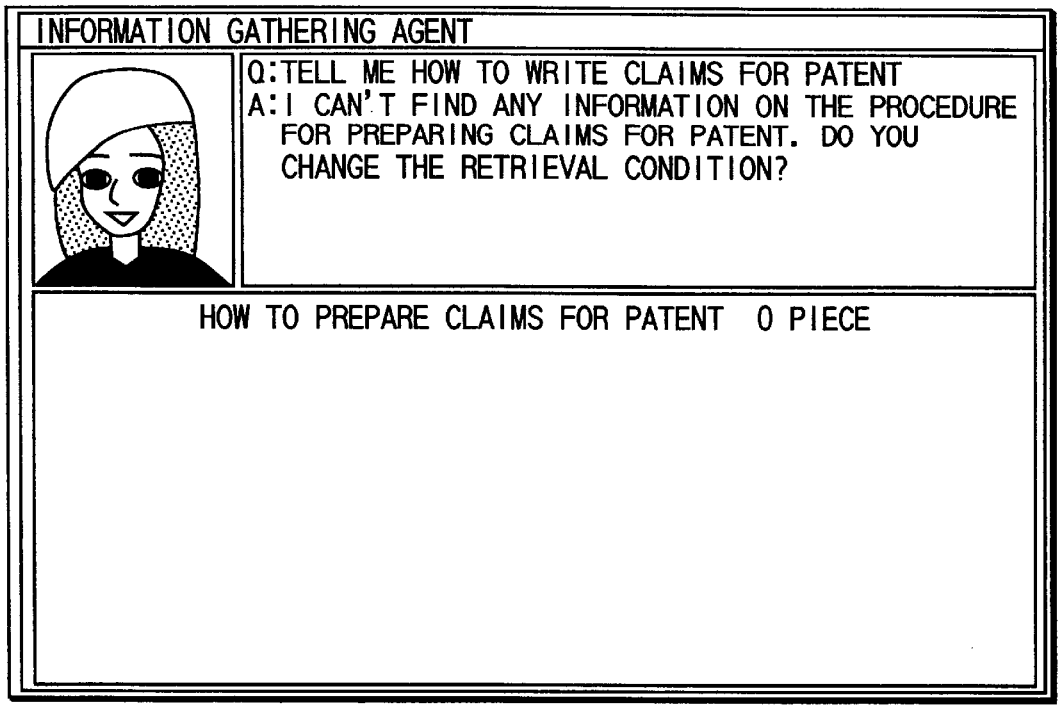
Figure 174B:
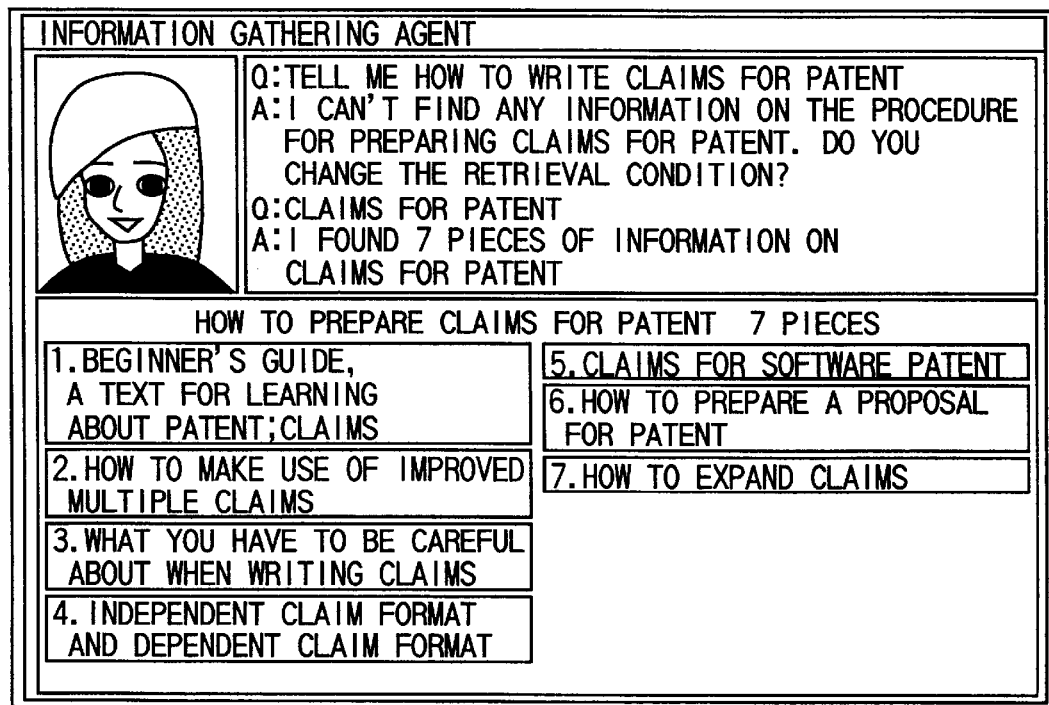

FIGS. 174A and 174B show exemplary images on the display screen that can be displayed when the result of a retrieval operation is fruitless.

Figure 175:
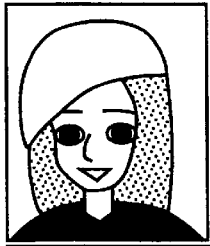

FIG. 175 shows another exemplary image on the display screen that can be displayed when the result of a retrieval operation is fruitless.

FIG. 176 shows an exemplary table of input sentences (for fruitless retrieval operations) and related retrieval formulas to be stored in the question storage section.

FIG. 177 shows another exemplary table of input sentences (for fruitless retrieval operations) and related retrieval formulas to be stored in the question storage section.

FIG. 178 shows still another exemplary table of input sentences (for fruitless retrieval operations) and related retrieval formulas to be stored in the question storage section.

FIG. 179 shows still another exemplary table of input sentences (for fruitless retrieval operations) and related retrieval formulas to be stored in the question storage section.

FIG. 180 shows still another exemplary table of input sentences (for fruitless retrieval operations) and related retrieval formulas to be stored in the question storage section.

FIG. 181 shows still another exemplary table of input sentences (for fruitless retrieval operations) and related retrieval formulas to be stored in the question storage section.

Figure 182:
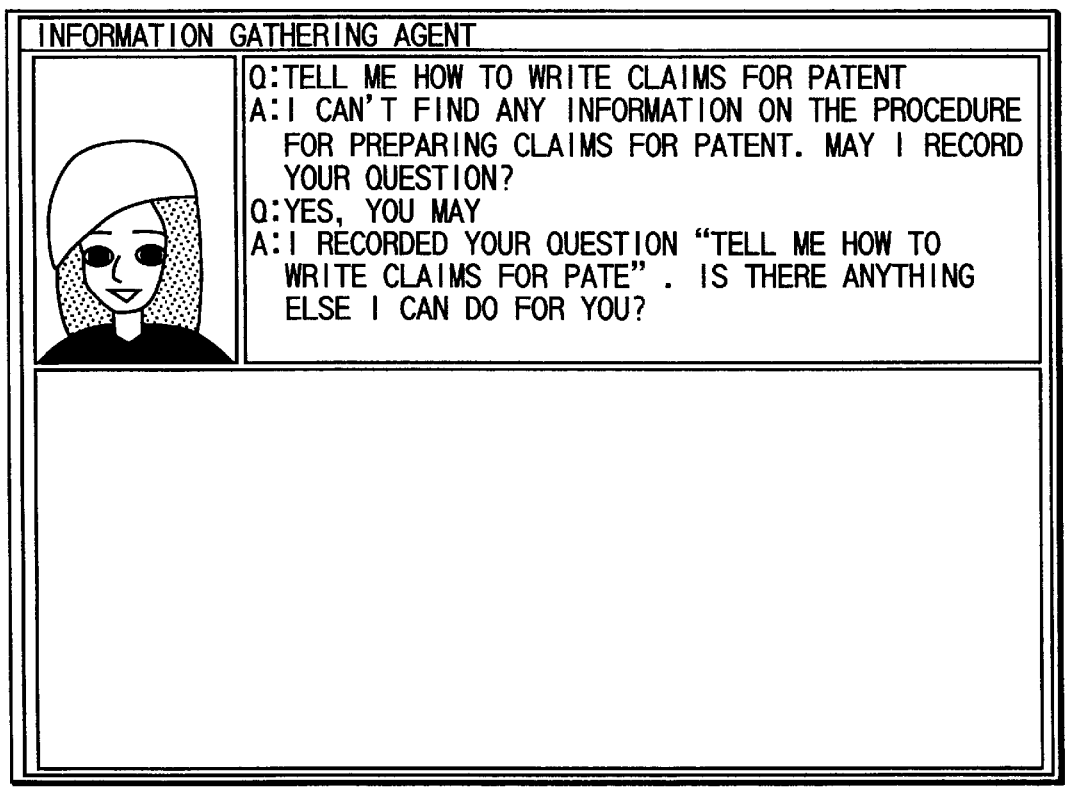

FIG. 182 shows an exemplary image on the display screen, asking the user who has input a question if he or she wants to record it or not.

Figure 183:
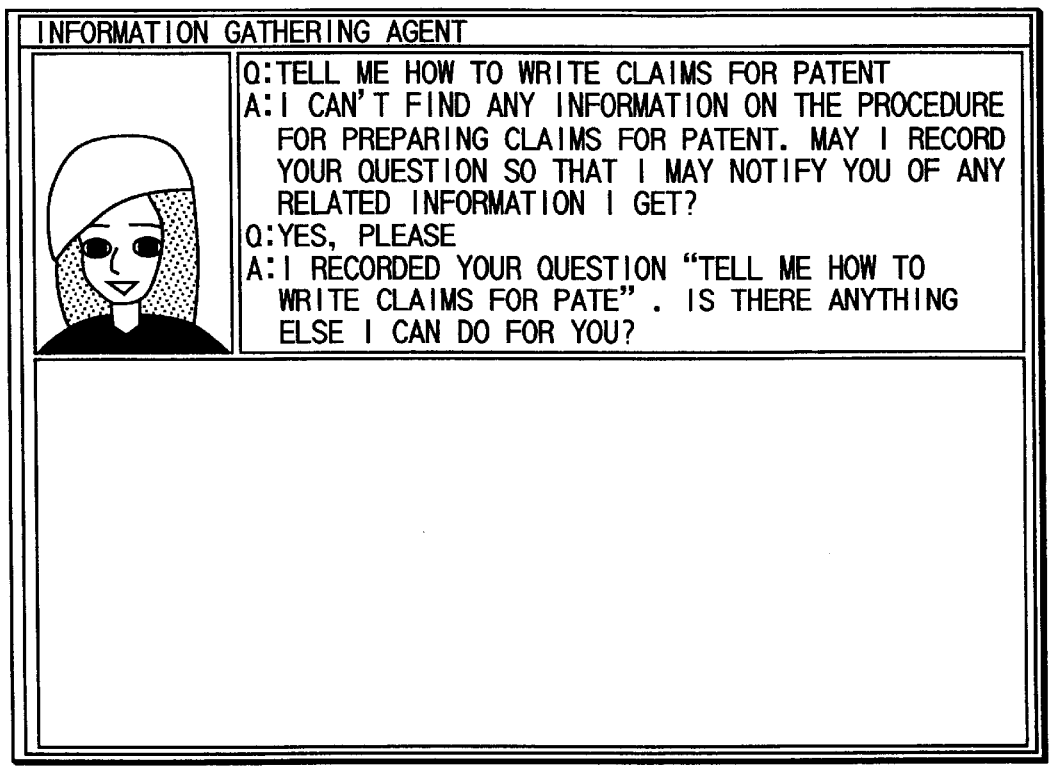

FIG. 183 shows an exemplary image on the display screen, asking the user who has input a question, if he or she want to be notified of the answer obtained for the question or not.

Figure 184:
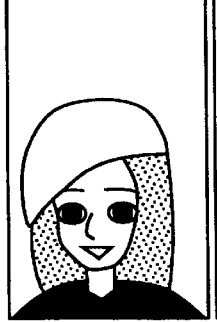

FIG. 184 shows an exemplary image on the display screen, asking the user who has input a question, in case when no answer is obtained for the answer, if he or she want to be notified of the fact.

FIG. 185 shows an exemplary image on the display screen, displaying the result of an information retrieval operation performed in response to a request of a user.

Figure 186:
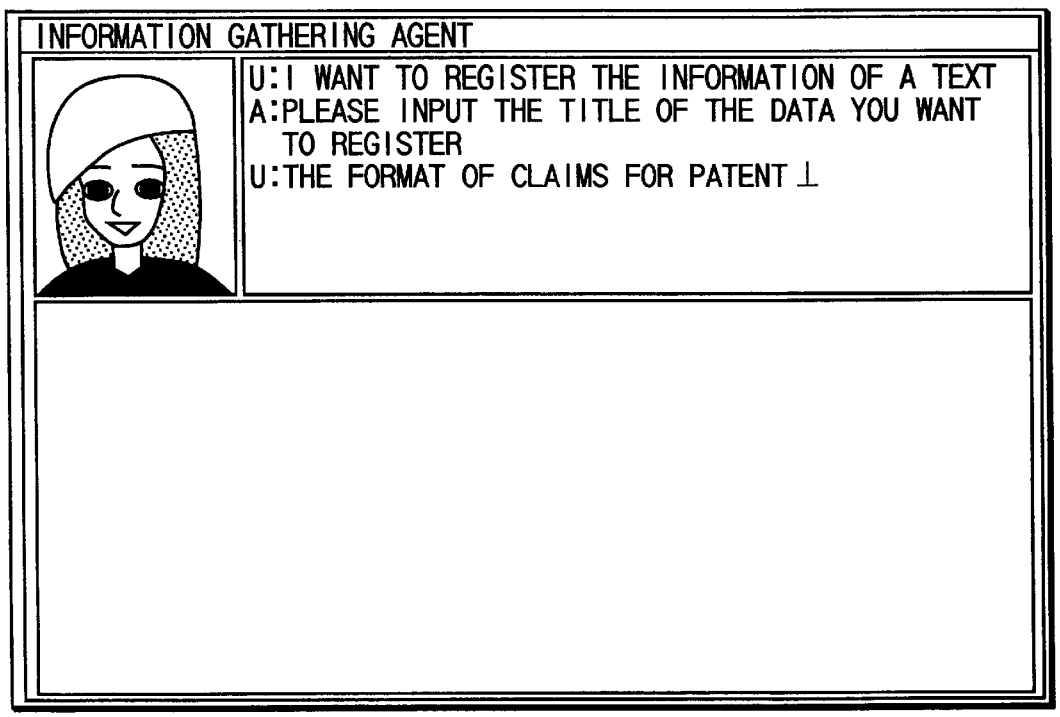

FIG. 186 shows an exemplary image on the display screen that can be displayed when requesting registration of a piece of information by way of the input section.

FIG. 187 shows an exemplary image on the display screen for a registration operation.

FIG. 188 shows an exemplary table of input sentences and related retrieval formulas to be stored in the question storage section that can be displayed when sorted according to the reappearing ratio and the applicability ratio.

FIG. 189 shows an exemplary image on the display screen displaying questions relating to a piece of information being registered.

Figure 190:
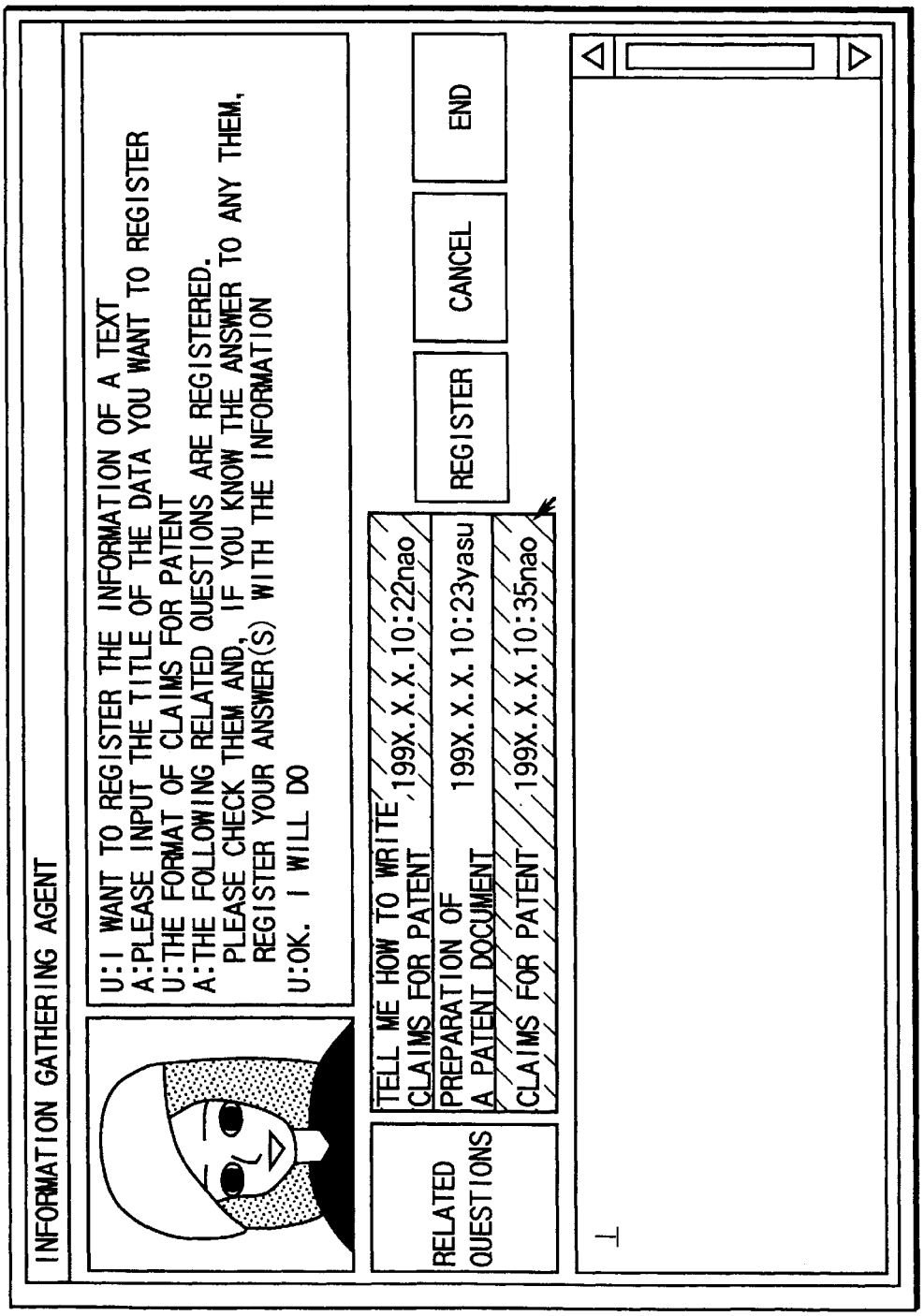

FIG. 190 shows another exemplary image on the display screen displaying questions relating to a piece of information being registered.

FIG. 191 shows an exemplary image on the display screen that can be displayed when sentences are registered as information.

Figure 192:
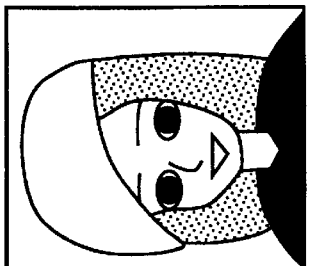

FIG. 192 shows another exemplary image on the display screen that can be displayed when sentences are registered as information.

Figure 193:
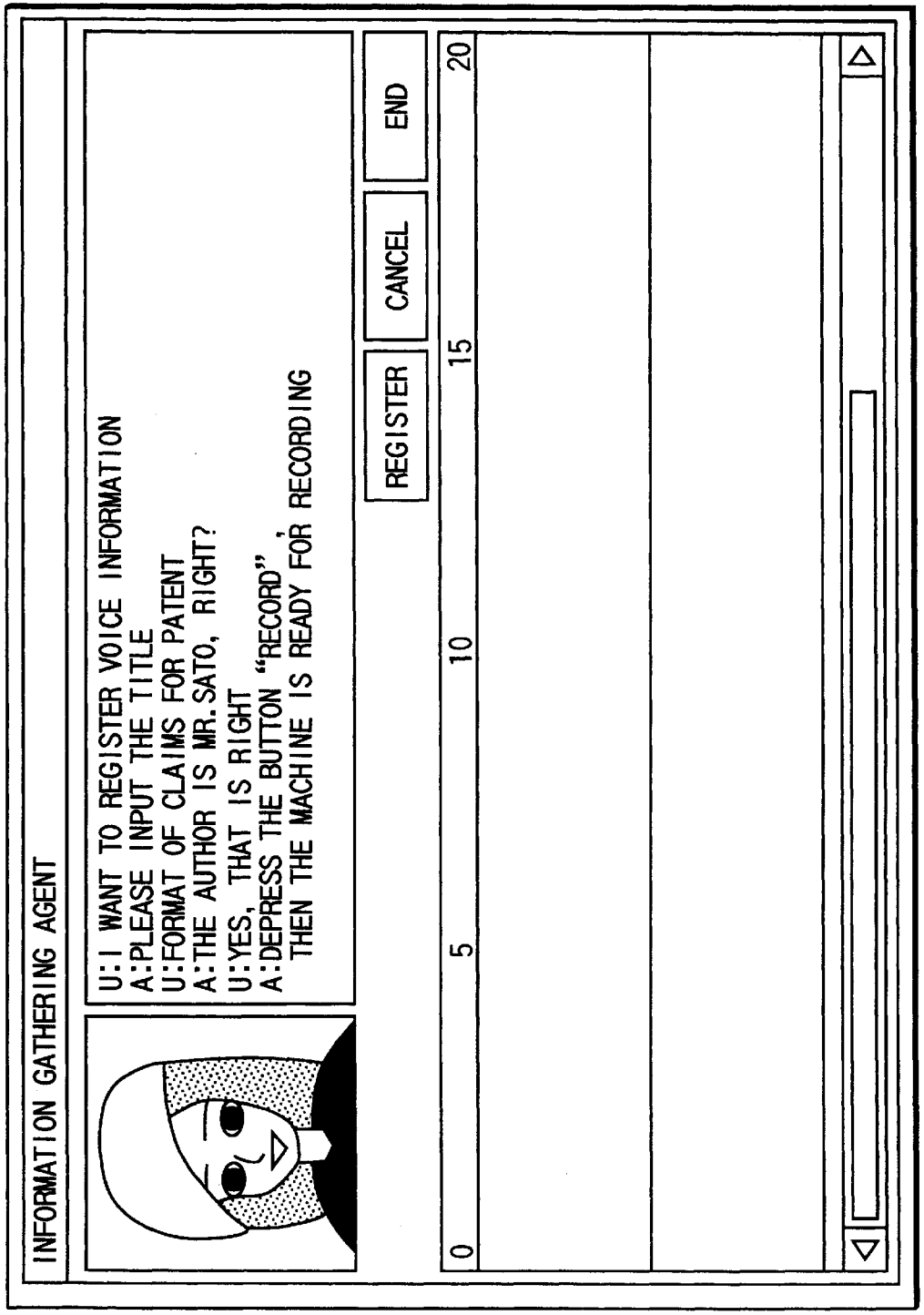

FIG. 193 shows an exemplary image on the display screen for voice registration.

DETAILED DESCRIPTION OF THE INVENTION

Now, the present invention will be described by referring to the accompanying drawing that illustrates preferred embodiments of the invention. In view of the large number of views contained in the drawing, the leading one, two or three digits of the reference symbols denoting the components refer to the respective numbers allocated to the views in order to clarify the correspondence between the components and the related views.

First Embodiment (Configuration)

Figure 1:
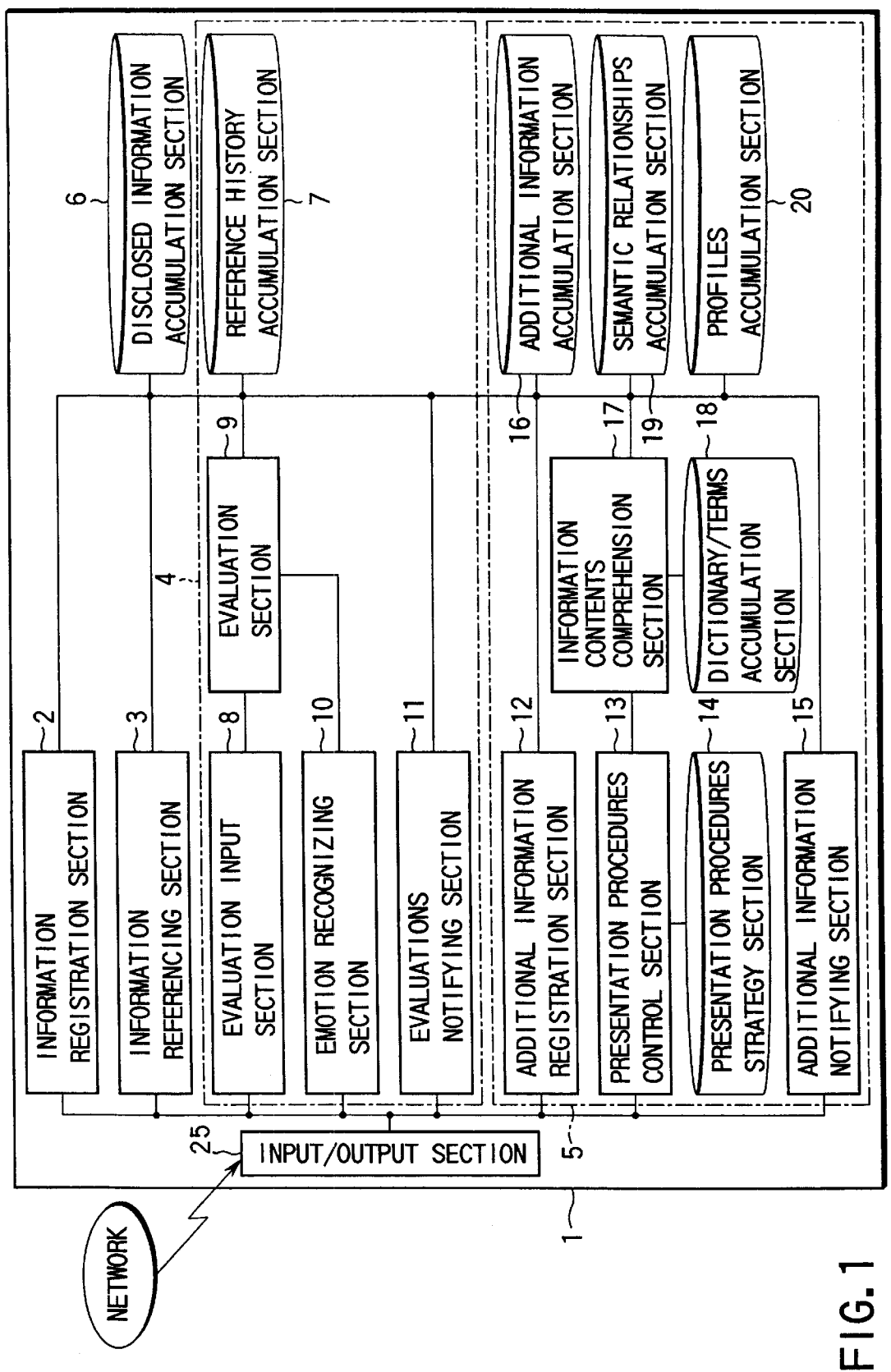
FIG. 1 is a schematic block diagram showing the configuration of a first embodiment of information sharing support system according to the invention.

FIG. 1 is a schematic block diagram of a first embodiment of information sharing support system according to the invention.

Referring to FIG. 1, the information sharing support system 1 comprises an information registration section, an information referencing section 3, an evaluation information processing section 4 and an additional information processing section 5.

The information registration section 2 operates to accumulate documents describing disclosed information including personal knowledge and know hows along with computer software and images in the disclosed information accumulation section 6.

The information referencing section 3 operates to retrieve and reference information from the information accumulated in the disclosed information accumulation section 6 in response to the request of a user, or an information referencer, other than the information discloser. The information referencing section 3 accumulates the reference history of the disclosed information in the reference history accumulation section 7 after correlating it with the disclosed information accumulated in the disclosed information accumulation section 6.

Upon receiving an evaluation on the disclosed information from the information referencer, the evaluation information processing section 4 operates to process the evaluation. The evaluation information processing section 4 comprises an evaluation input section 8, an evaluation section 9, an emotion recognizing section, an evaluation notifying section 11 and an input/output section 25.

The evaluation input section 8 operates to receive evaluations to the disclosed information input by the information referencer who has accessed the information.

The evaluation section 9 operates to retrieve the information disclosure records from the disclosed information accumulation section 6 and information referencing records from the reference history accumulation section 7 and totalize the evaluations input into the evaluation input section 8. The result obtained by the operation of the evaluation section and the identification information on a referencer and his or her evaluation on the disclosed information input into the evaluation input section 8 are correlated to the disclosed information and accumulated in the reference history accumulation section 7.

The emotion recognizing section 10 operates to recognize the emotion of the information referencer to the disclosed information on the basis of the data input by the information referencer consciously or unconsciously. The emotion recognized by the emotion recognizing section 10 is then input into the evaluation section 9 as a satisfaction point given to the referenced information by the information referencer.

The evaluation notifying section 11 operates to take out the evaluations correlated to the disclosed information and stored in the reference history accumulation section 7 to notify the information discloser and authorized persons thereof.

On the other hand, the additional information processing section 5 operates to manage the information (additional information) added to the disclosed information by the information referencer. The additional information processing section 5 comprises an additional information registration section 12, a presentation procedure control section 13, a presentation procedure strategy section 14, an additional information notifying section 15, an additional information accumulation section 16, an information contents comprehension section 17, a dictionary/terms accumulation section 18, a semantic relationships accumulation section 19 and a profiles accumulation section 20.

The additional information registration section 12 operates to receive and process additional information including "additions", "corrections" and "comments" input for the disclosed information referenced by way of the information referencing section. The additional information processed by the additional information registration section 12 is accumulated in the additional information accumulation section 16. The data relating to the semantic relationship between the disclosed information and the additional information (e.g., "addition", "correction", etc.) are accumulated in the semantic relationships accumulation section 19.

The presentation procedure control section 13 operates to control the method of presenting additional information according to the instruction of the presentation procedure strategy section 14 when presenting the additional information to the information referencing section 3.

The information contents comprehension section 17 operates to check the contents of the disclosed information to see if the information comprises an objective fact or a subjective view and specify the technical field of the disclosed information. The dictionary/terms accumulation section 18 operates to accumulate terms including keywords necessary for the information contents comprehension section 17 to check the contents of the information.

The profiles accumulation section 20 operates to accumulate professional profiles of individuals and groups. The information contents of the information contents comprehension section 17 and the individual and group profiles accumulated in the profiles accumulation section 20 are referenced when the presentation procedure strategy section 14 determines the reliability of the additional information.

The additional information notifying section 15 operates to notify the information discloser of the fact that additional information is added to the disclosed information.

The input/output section 25 is connected to each of the above processing sections so that the user may input any necessary information and information may be displayed to the user. The information sharing support system 1 is connected to one or more than one information sharing support systems 1 by way of said input/output section 25 and a network. Thus, the information sharing support systems 1 on the network and mutually connected with each other can communicate with each other by way of the respective input/output sections 12 to access any disclosed information accumulated in the other systems.

While FIG. 1 shows a system that can be accessed for disclosed information by some other information sharing support system 1 by way of a network, it may alternatively be implemented as a stand alone system. That is, such an information sharing support system may be so arranged that both information providers and information referencers can access it. Note that an information sharing support system 1 may simply be referred to as a terminal in the following description.

(Registration and Retrieval of Information)

FIGS. 2A and 2B shows examples of disclosed information stored in the disclosed information accumulation section 6. Referring to FIG. 2A, each piece of information includes an information identification number 21, attributes 22 and an attribute value 23. The attribute may be expressed in terms of classification and category such as title, discloser, date of disclosure, knowhow, software, picture, topic, related information, keyword, contents, reference history and so on.

FIG. 2A shows an exemplary knowhow. In the disclosed information shown in FIG. 2A, the title is a lecture meeting holding procedure, the discloser is Taro Yamada, the date of disclosure is Oct. 1, 1995, the category is knowhow, the classification is visitor services, the related information is how to write a letter of request (information ID#200) and a list of scholars (information ID#350), the keywords are lecture, visit, professors and agenda and the contents are (1) through (7) as listed there.

The reference history describes reference history per individual in the form of file ID# and includes/log /#24, /log/#38 and /log/#105.

FIG. 2B shows an example of disclosed information which is computer software. According to the information, the title is a budget control program, the discloser is Momoko Yoneyama, the date of disclosure is Oct. 1, 1995, the category is software, the classification is budget control service, the related information is a list of issued requests for arrangement, the keywords are budget, scheduled procurements and overtime, the contents are program file /etc/yosan_kanri and the reference history includes /log/#60, /log/#62 and /log/#120.

Now, the processing operation of inputting a piece of disclosed information through the information registration section 2 will be described.

Figures 3, 4:
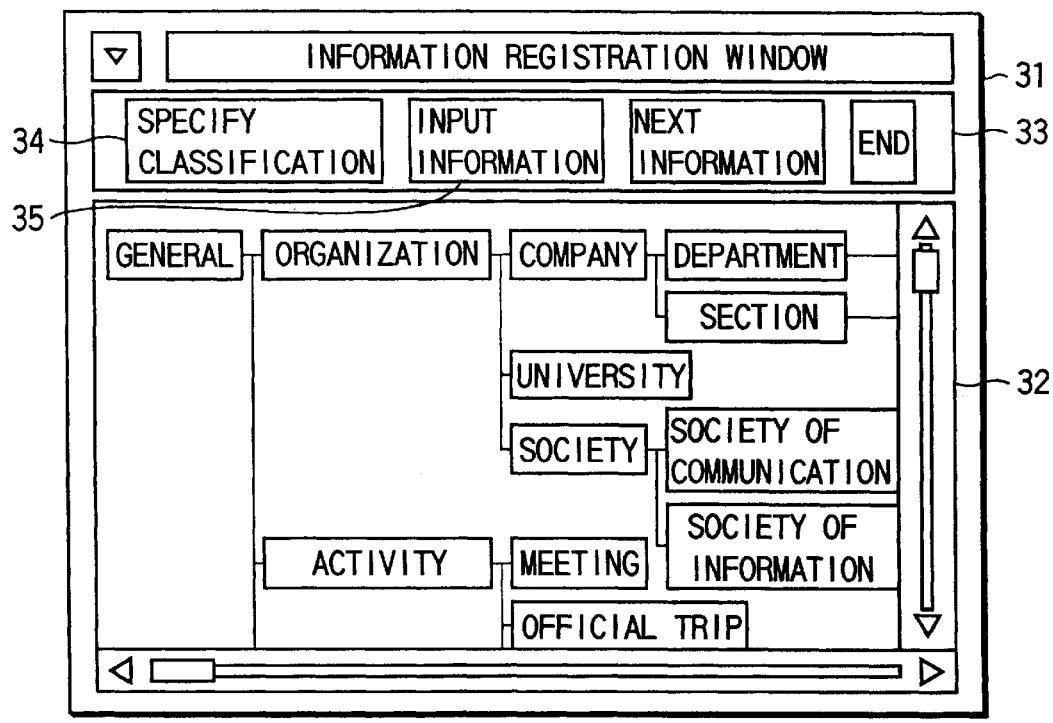
FIG. 3 shows an exemplary image on the display screen of the information registration section.
FIG. 4 shows an exemplary image on the display screen of the information registration section, where information is being registered.

FIG. 3 shows an exemplary image on the user interface screen provided by the information registration section 2.

The information registration window 31 comprises a main screen 32 and a control panel 33.

The control panel 33 has a "specify classification" button 34 for specifying the classification of the information to be registered. Classification is one of the attributes of the information stored in the disclosed information accumulation section 6 and refers to the operational classification or the information category to which the information belongs. The disclosed information is accumulated in the disclosed information accumulation section 6 when a classification is assigned to the disclosed information by the information discloser to correlate it to the classification.

More specifically, as the information discloser depresses the "specify classification" button on the control panel 33, a conceptual image of the classification system to which the information is correlated is displayed on the main screen 32 typically in a hierarchical form as shown. Then, the information discloser can correlate the disclosed information to one or more than one classification by selecting one of the classification items displayed on the window 32.

The "input information" button 35 on the control panel is used to switch the interface to the mode for inputting disclosed information. As the information discloser depresses the "input information" button 35 on the control panel 33, the main screen 32 is switched to show an image for prompting an information input.

FIG. 4 shows an exemplary image on the display screen on the information registration window 31 that can be used when the information discloser inputs information in the form of text.

More specifically, the information discloser inputs the title, the category, the format and the contents of the information he or she is going to disclose. The discloser may input the contents directly or, alternatively, by specifying a specific file that has already been edited and referencing to the contents of the file. Note that information that can be registered in the disclosed information accumulation section 6 is not necessarily in the form of text. The information discloser can register information in the form of a still picture, movie, speech or program by specifying a file name. A plurality of pieces of information may share a common file when such a file is specified by the information discloser.

Now, the operation of retrieving/referencing the disclosed information accumulated in the disclosed information accumulation section 6 by way of the information referencing section will be described.

Figure 5A:
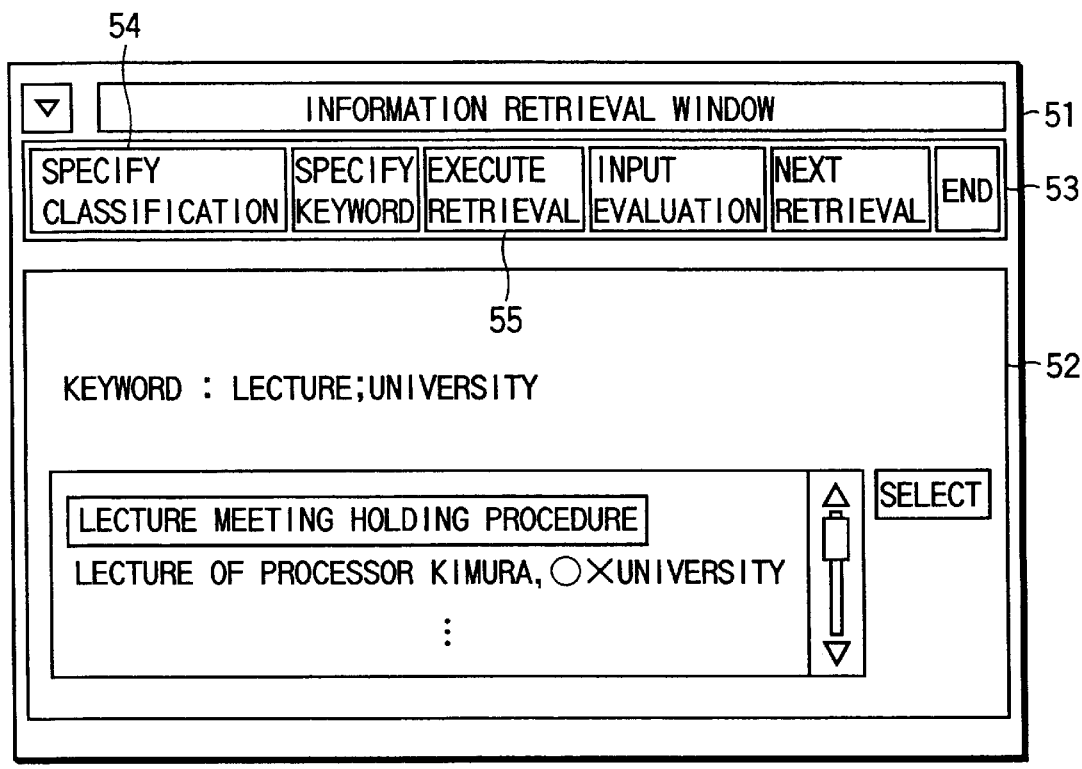
FIGS. 5A and 5B show exemplary images on the display screen of the information referencing section.
Figure 5B:
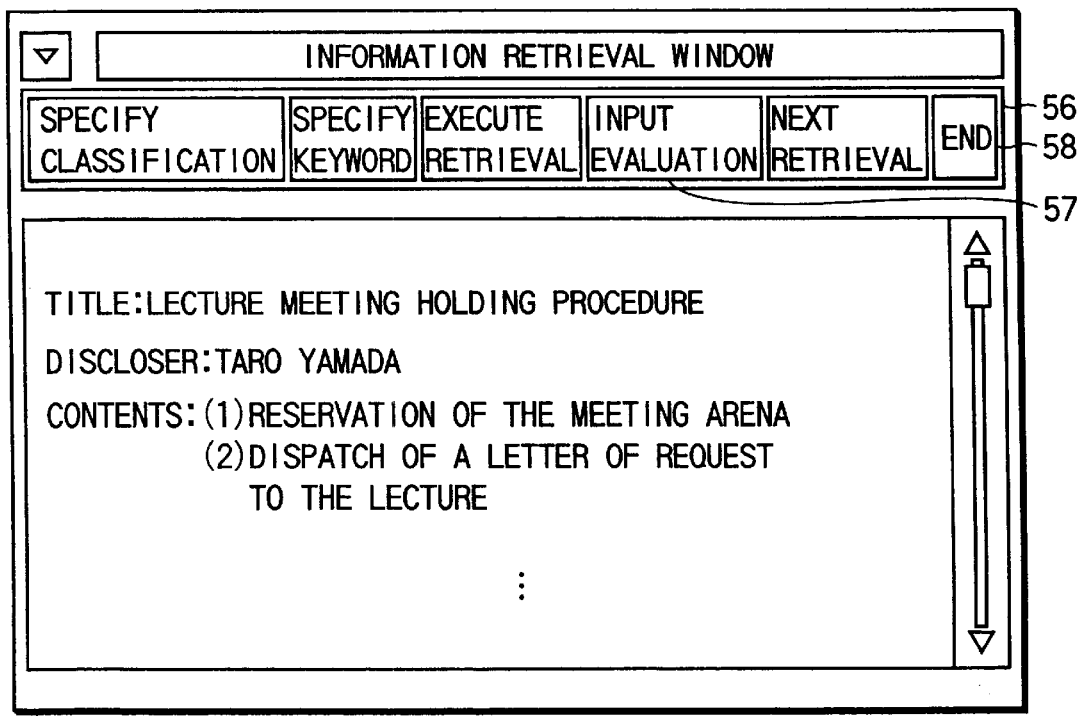

FIGS. 5A and 5B show exemplary images on the user interface that can be used for retrieving/referencing information.

Referring to FIG. 5A, the information retrieval window 51 comprises a main screen 52 and a control panel 53. The user specifies the information to be retrieved by section of the "specify classification" button and the "specify keyword" button on the control panel 53. For example, as the "specify classification" button is depressed, a conceptual chart illustrating the information classification system is displayed on the main screen 52 so that the user can select the classification he or she wants.

After specifying a classification and a keyword, the information referencer depresses the "execute retrieval" button 55 on the control panel 53. Then, a set of pieces of information relating to the specified classification and keyword will be retrieved. When more than one pieces of information are retrieved, their titles are displayed on in the information referencing section as a list of titles so that the user may select one of the pieces of information he or she want to reference from the title list.

In FIG. 5A, a title list having a plurality of information titles is displayed on the main screen 52.

In FIG. 5B, the information retrieved by selecting its title is actually displaced on the main screen.

(The Role of the Evaluation Information Processing Section 4)

Now, an embodiment adapted to evaluate disclosed information by section of the evaluation information processing section 4 will be described.

With this embodiment, the information referencer can input an evaluation on the information he or she has referenced by using the information referencing section 3 by way of the evaluation input section 8. Referring beck to FIG. 5B, when the "evaluation input" button 57 is depressed on the control panel 56, the screen shows an image for an evaluation input operation so that the information referencer can input his or her evaluation on the referenced information.

It may be so arranged that, if the information referencer selects the "end" button 58 without entering his or her evaluation, the evaluation input screen is automatically selected to prompt the information referencer to input his or her evaluation.

Figures 6A, 6B:
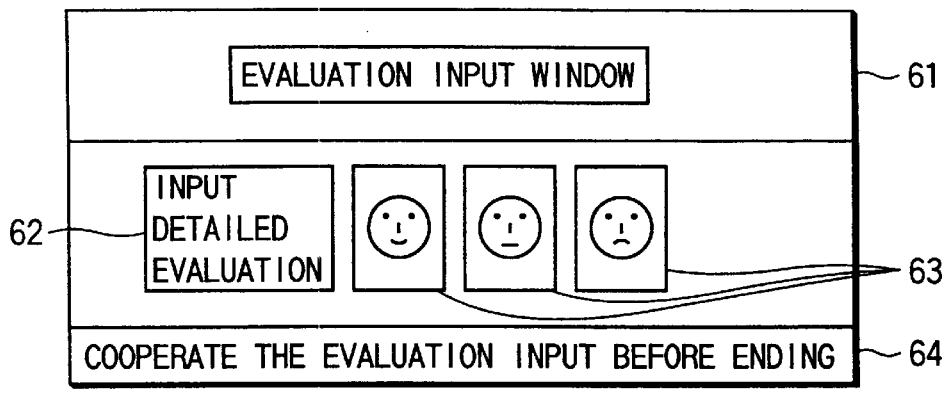
FIGS. 6A and 6B show exemplary images on the display screen of the evaluation input section.

For an evaluation input operation, an image as shown in FIG. 6A appears firstly. The screen shows on the evaluation input window 61 a button 62 for selecting the evaluation input mode and three buttons 63 of "good", "medial" and "bad" as expressed by respective face marks for approximate evaluation to be selected by the user. Thus, the user may select the button 62 if he or she wants to enter his or her evaluation in a detailed way. Otherwise, the user may select one of the three buttons 63 of "good", "medial" and "bad" particularly if he or she does not want spend much time for the input operation.

Thus, every information referencer will give a rating to the information he or she referenced as simple evaluation buttons 63 are provided.

Alternatively, a message 64 for prompting the user to enter his or her evaluation may be displayed so that each and every information referencer may give a rating to the information he or she referenced.

FIG. 6B shows an exemplary image that may be displayed on the detailed evaluation input screen when the "detailed evaluation input" button 62 in FIG. 6A is selected. The information referencer can give numerical ratings to the listed respective items such as effectiveness, reusability and recommendability to others or enter his or comment other than numerical values. The entered evaluation is then stored in the reference history accumulation section 7.

The information discloser may be directly notified of the entered evaluation typically by electronic mail if the button 65 "notification to those who registered" is depressed. Then, the information discloser can quickly become aware of the response to the disclosed information by seeing the comment sent to him or her by electronic mail so that he or she may be motivated to provide additional information, upgrade the original information or disclose a different piece of information.

Now, the operation of notifying the information discloser of the obtained evaluations will be described by referring to the flow chart of FIG. 12.

Assume that an information discloser wants to know the evaluations given to the information disclosed by him or her. Firstly, the information discloser retrieves all the pieces of information registered by him from the disclosed information accumulation section 6 (Step S1) and makes them displayed on the screen as a list (Step S2).

FIGS. 7A through 7D show exemplary images that may be shown at this step.

Figure 7A:
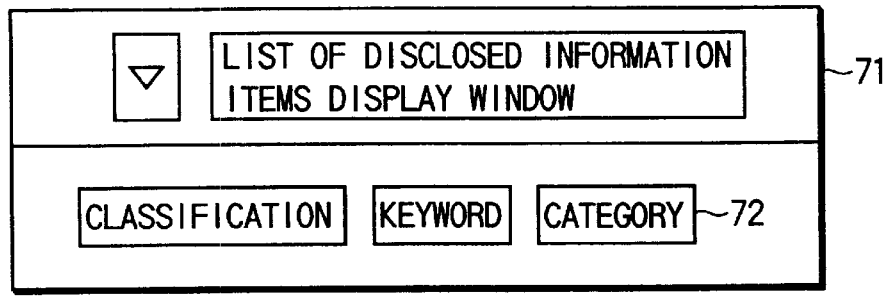
FIGS. 7A, 7B, 7C and 7D show exemplary images of disclosed information on the display screen.
Figure 7B:
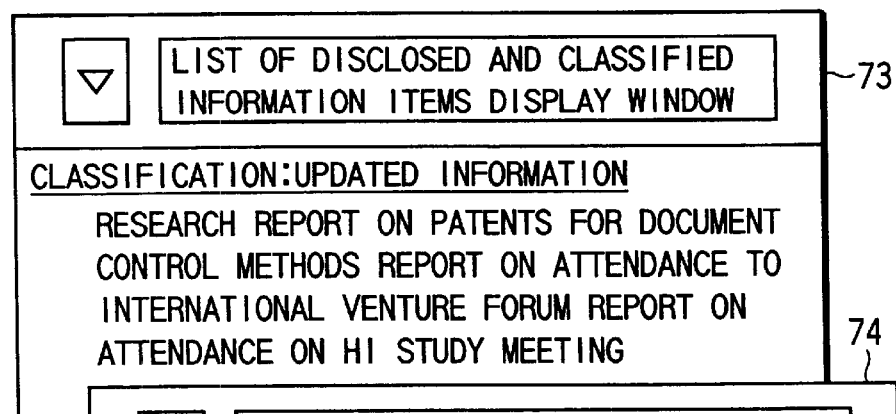
Figure 7C:
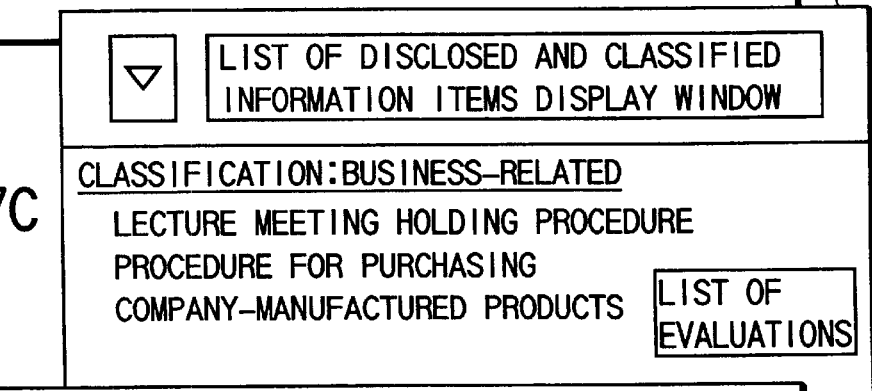

In FIG. 7A, reference numeral 71 denotes "list of disclosed information items display window". A list of disclosed information items will be displayed by selecting one of the buttons 72 of "classification", "keyword" and "category". If, for example, the button "classification" is selected, the classification system used therein is graphically displayed as shown in 3. Then, by selecting a specific classification, a list of information items relating to the selected classification will be displayed. For example, if the classification of "updated information" is specified, an image 73 as shown in FIG. 7B will appear. If, on the other hand, the classification of "business-related" is specified, an image 74 as shown in FIG. 7C will appear. If, finally, the classification of "software" is specified, an image 75 as shown in 7D will appear.

Then, the information discloser can see a list of all the pieces of information he or she has disclosed along with the evaluations give to it.

Figure 7D:
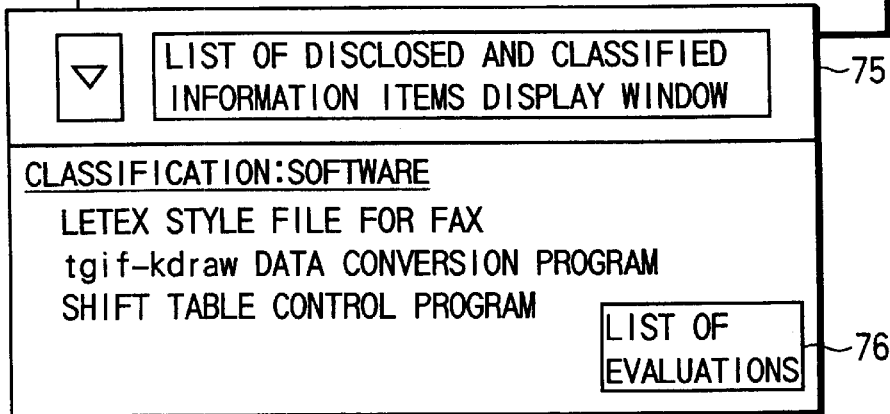

For example, assume that the button "list of evaluations" 76 is selected in FIG. 7D (Step S3), all the evaluations given to the pieces of disclosed information listed on the screen will be displayed (Step S4).

Figure 8:
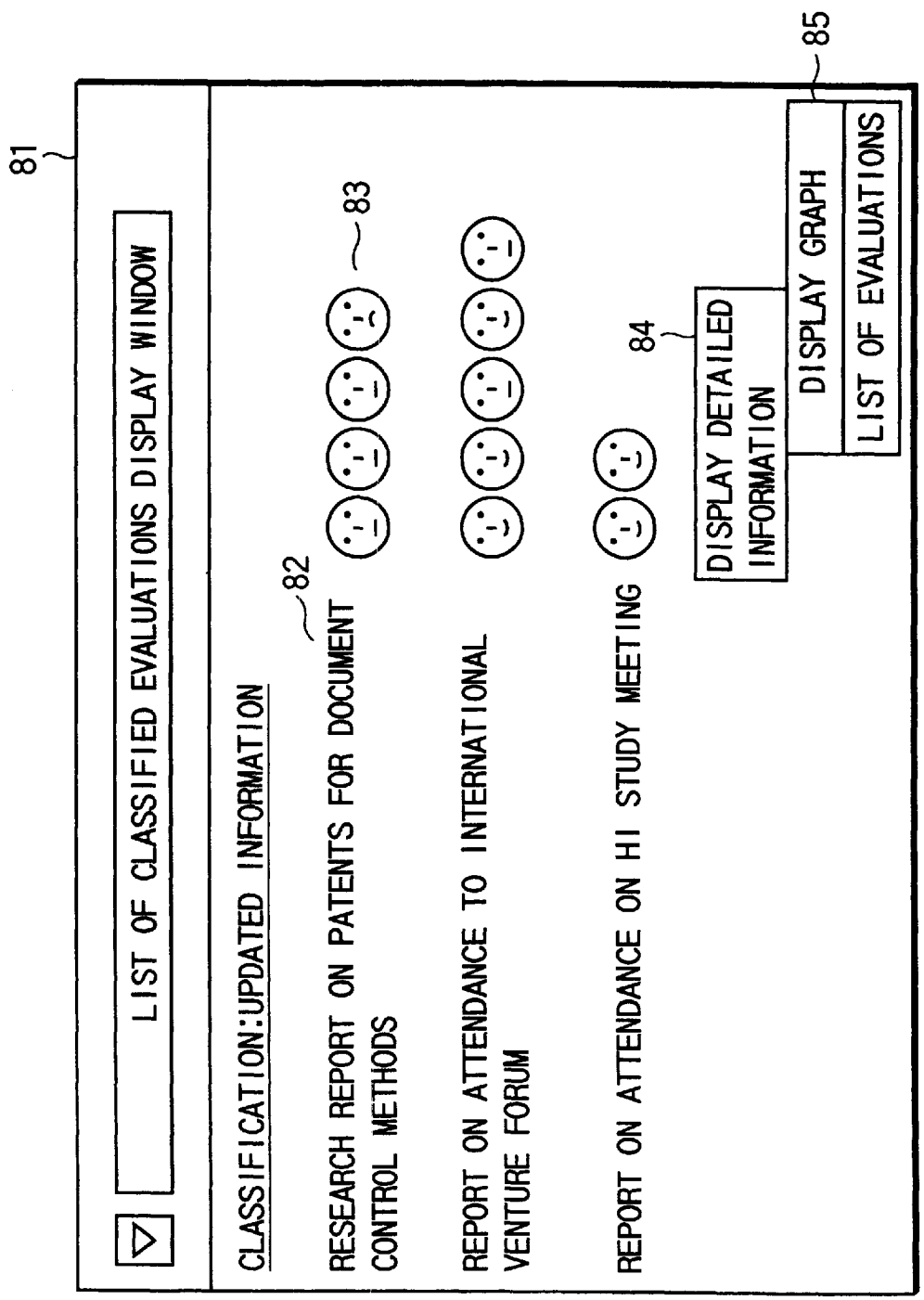
FIG. 8 is an exemplary image of classified evaluations on the display screen.

FIG. 8 is an exemplary image of classified evaluations shown on the display screen. In FIG. 8, reference numeral 81 denotes a window for showing a classified evaluation list. In this example, evaluations given to the disclosed information classified as "updated information" are displayed. More specifically, approximate evaluations that have been input by section of the buttons 63 in FIG. 6 are shown in a graphic form to the right of the titles 82. The number of face marks for each title refers to the number of times the information with that title is referenced. Thus, the information discloser can grasp an approximate summary of the evaluations give to the information disclosed by him or her by seen the face marks.

If the information discloser wants to see a more detailed outcome of the evaluations given to the information disclosed by him or her, the detailed information display button 84 should be selected (Step S5) in FIG. 8. Then, a submenu 85 is displayed and if "graph display" is selected there, a graph representing the evaluations given to a selected title will be shown.

Figure 9:
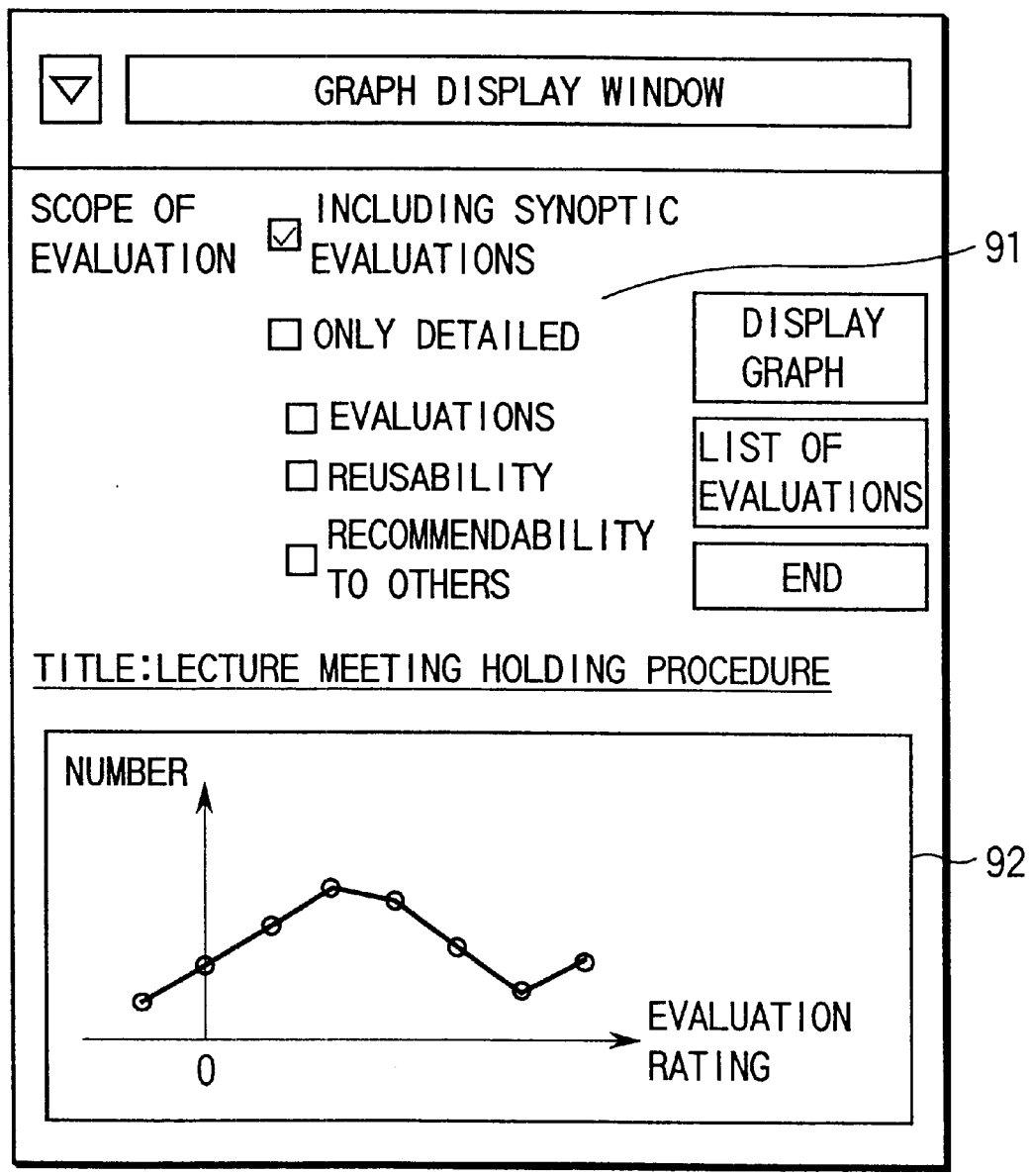
FIG. 9 is an exemplary image of a graph representing the evaluations on a piece of disclosed information on the display screen.

FIG. 9 is an exemplary image of a graph representing the evaluations on a piece of information and displayed on the display screen. The information discloser can select one of the indexes 91 including "effectiveness", "reusability" and "recommendability to others". Then, the evaluations relating to the selected index are totalized and the values obtained by section of an evaluation function for the selected index are displayed in the form of graph 92 as shown in FIG. 9.

If "list of evaluations" is selected here, the display now proceeds to show detailed evaluations. Note that any of the titles shown in FIGS. 7A through D may also be used to proceed to the next step (Step S6).

Then, in Step S7, the reference history of the selected information will be retrieved and the referencers and their evaluations will be displayed on the basis of the reference history (Step S8).

FIG. 10 is an exemplary of a list of evaluations given to a piece of disclosed information shown on the display screen.

Referring to FIG. 10, the ID codes 101 of the referencers (which may be, for example, log-in names or mail addresses) are listed with the evaluations 102 given by them and expressed in numerical values obtained by using an evaluation function in the descending order of the evaluation values 102.

Then, the information discloser may select an information referencer by shading it as shown to look into the detail of his or her evaluation (FIG. 11). For example, if "per individuals" button is depressed (Step S9), the detail of the evaluations of the selected information referencer is displayed (Step S10).

FIG. 11 is an exemplary image of personal evaluations that can be made by an information referencer and shown on the display screen. It contains the ID code 111 of the information referencer, the indexes to be selected in FIG. 9 for totalizing the evaluations and the values given by the information referencer 112 and the comment 113 given by the information referencer. Then, the information discloser can see the extent to which the information disclosed by him is effective and reusable to the information referencer. Additionally, the information discloser can read the comment of the information referencer to fully understand what the information referencer has in mind about the disclosed information. Thus, the information discloser can get useful suggestions that may be useful for expanding and/or improving the disclosed information and disclosing other pieces of information.

If "information on referencer" button 114 is selected (Step S11), the profile of the information referencer including the vocation is displayed (Step S12). Then, the information discloser may be able to understand to what types of people the disclosed information is useful.

Figure 13:
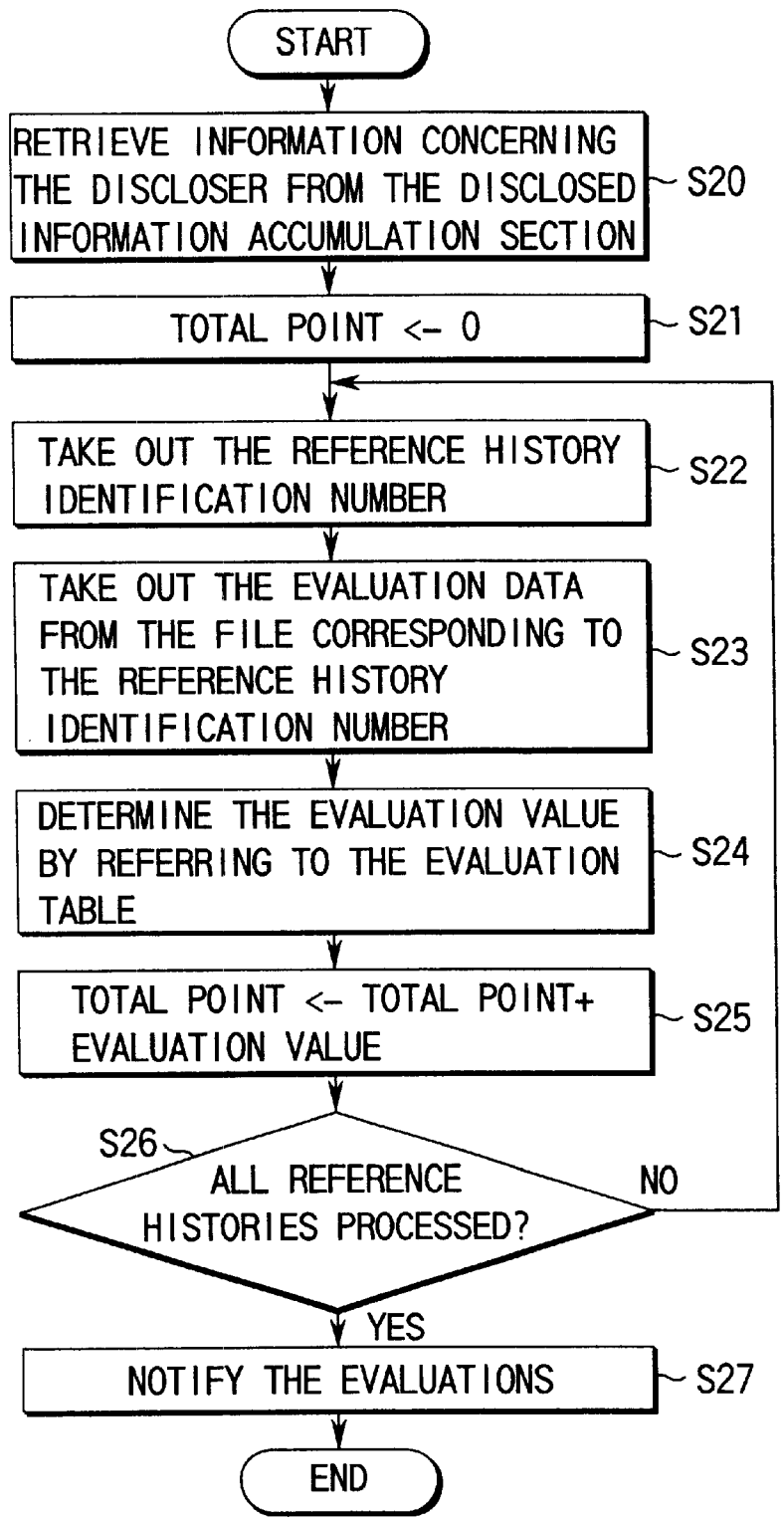
FIG. 13 is another flow chart for a processing operation of the evaluation notifying section.

It may be so arranged that an authorized person, who may be a manager and authorized to see the evaluations given to the disclosed information, is notified of the evaluations broken down into the information disclosers. FIG. 13 is a flow chart for such an operation.

Referring to FIG. 13, the disclosed information registered by the information discloser is retrieved from the disclosed information accumulation section 6 by operating a given display window (Step S20) so that the evaluations on the information discloser may be referenced and the total point is then initialized ([0]) (Step S21). Thereafter, a reference history identification number is taken out of the reference history accumulation section 7 (Step S22) and the evaluation data are taken out from the corresponding file (Step S23).

Then, an evaluation value is determined by referring to the evaluation data and a predetermined evaluation table (Step S24), which is added to the total point (Step S25). Steps S22 through S25 will be repeated until the above operation is completed for all the reference histories (Step S26) and the determined total point is notified as the outcome of the evaluations (Step S27).

Thus, the manager can see the evaluations given to each of the information disclosers to improve the management of the disclosed information.

(How Additional Information is Processed)

Now, the operation of processing additional information by section of the additional information processing section 5.

In this system 1, an information referencer can input additional information for the information he or she has referenced by way of the information referencing section 3. FIGS. 14A and 14B are exemplary images on the interface screen provided by the additional information registration section 22.

Referring to FIG. 14A, the information referencer selects the presentation zone 141 to which he or she want to provide additional information by depressing the menu button of the mouse. Then, a menu as indicated by 142 will be displayed. Then, the information referencer may select "correction" from the menu 142. Then, additional information registration window 143 will be displayed as shown in FIG. 14B. Now, the information referencer inputs his or her name (the name of the registerer of additional information) 144 and the content of the additional information 145 on the additional information registration window 143 and, thereafter, selects the registration button 146. Thus, the input additional information is registered. Conversely, if the cancel button 147 is selected, the registration of the additional information is canceled and the additional information input mode will be terminated.

FIGS. 15A and 15B are exemplary images shown on a display screen displaying a piece of disclosed information that is provided with additional information. In FIG. 15A, a piece of additional information 151 is added to and laid on the disclosed information of FIG. 14A to cover the latter. Such an arrangement is particularly useful when the disclosed information is part or the company regulations so that the user should and can see the update in the form of additional information.

If additional information is provided in the form of other than correction, the piece of disclosed information 152 provided with additional information is highlighted as in FIG. 15B so that the type of the additional information 153 may be displayed by depressing the menu button of the mouse after selecting the highlighted zone.

FIG. 16 is an exemplary image of additional information accumulated in the additional information accumulation section 16. As seen from FIG. 16, a piece of additional information can be constituted by an information ID number 161, attributes 162 and an attribute value 163. The attributes include the title, the registerer, the data of registration and the contents. FIG. 16 shows the additional information added in FIGS. 14A and 14B and including "procedure for applying for nursery leave" as title, "Natsuki Hasegawa" as registerer, "Dec. 6, 1996" as date of registration and the contents of the additional information.

As shown in FIG. 17, the semantic relationship between disclosed information and additional information may be defined in terms of an information ID number 171, a disclosed information ID number 172, an additional information ID number 173, a flag 174 indicating that the disclosed information describes an objective fact or a subjective view and a semantic relationship 175 showing if the additional is "addition", "correction", "request for addition" relative to the disclosed information.

Figure 18:
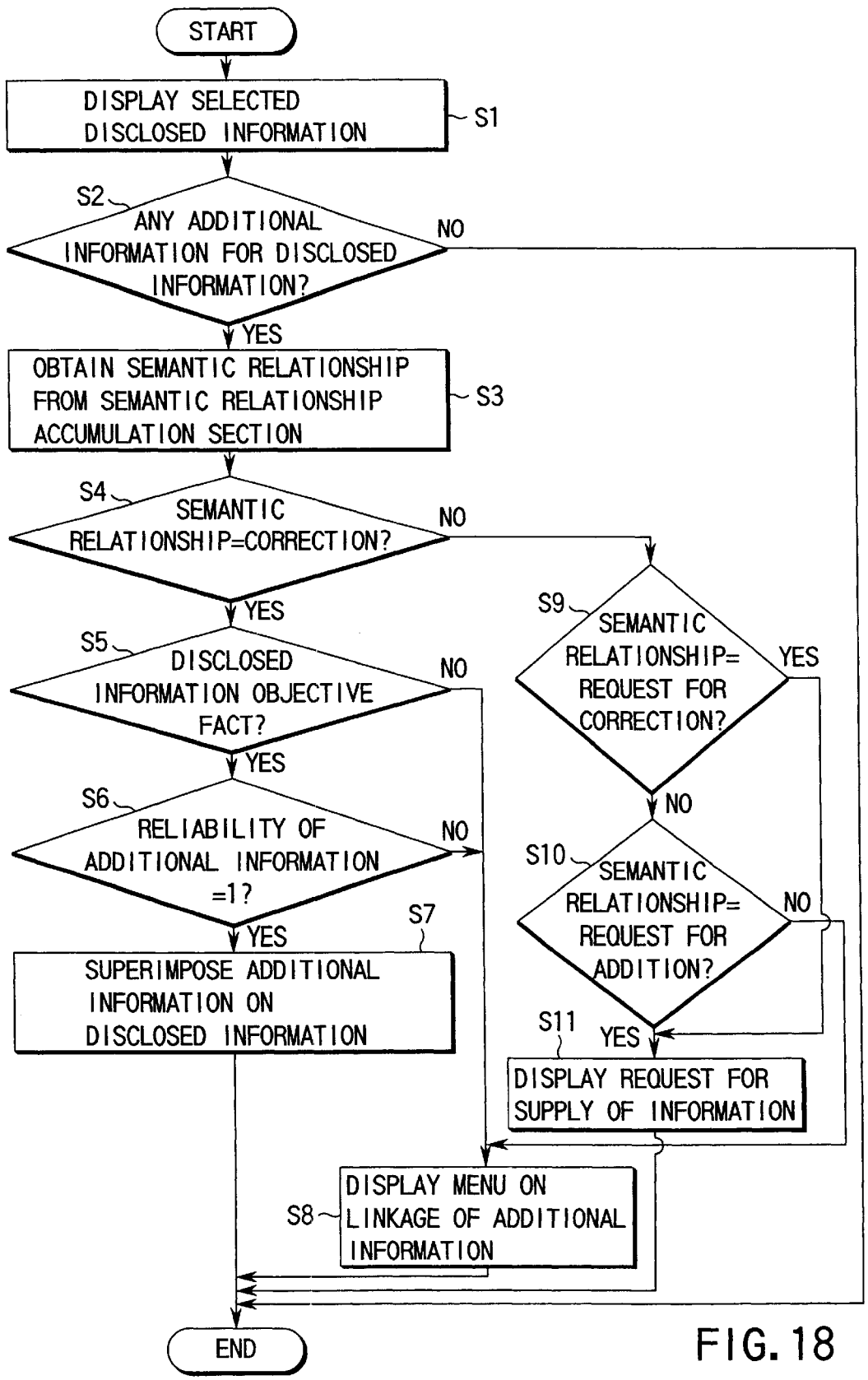
FIG. 18 is a flow chart for a processing operation of the presentation procedures control section.

Now, the information presentation procedure for cases where additional information is provided to disclosed information will be described by referring to the flow chart of FIG. 18.

Firstly, the information referencing section 3 displays the disclosed information selected by the procedure illustrated in FIG. 5 (Step S1). Then, the processing will be terminated if the disclosed information is not checked for any additional information added thereto (Step S2). If the disclosed information has additional information, the information referencing section 3 obtains the semantic relationship between the additional information and the disclosed information from the semantic relationship accumulation section 19 to check the semantic relationship (Step S3).

If the semantic relationship is "correction" (Step S4), the information contents comprehension section 17 checks if the disclosed information represent an objective fact or not by referring to the dictionary of terms of the dictionary/terms accumulation section 18. Alternatively, if the disclosed information represents an objective fact or not may be checked and registered in a predetermined field of the semantic relationship accumulation section 19 by the registerer of the additional information when he or she registers the additional information by referencing the disclosed information. If such is the case, the information referencing section 3 or the presentation procedures control section 13 determines if the disclosed information represents an objective fact or not by referring to the semantic relationship accumulation section 19.

If it is determined that the disclosed information represents an objective fact (Step S5), the information contents comprehension section 17 determines by calculation the reliability of the additional information and, if "1" is obtained to show that the additional information is reliable (Step S6), the presentation procedures control section 13 lays the additional information on the disclosed information for display (Step S7). This is because, if a piece of reliable correcting information is added to the disclosed information representing an objective fact, the users have to be provided with the update. FIG. 15A illustrates such an example. On the other hand, if the semantic relationship is "correction" but the disclosed information does not represent an objective fact and/or the additional information shows a low reliability, the additional information may not necessarily have to be presented to the users so that only the fact that the disclosed information is provided with additional information will be displayed as in FIG. 15B. Note that, in FIG. 15B, the semantic relationship of the additional information is "addition" and "request for addition".

Alternatively, the reliability of the additional information may be determined by calculation when the information referencer registers the additional information by referring to the disclosed information and registered in a predetermined field in the semantic relationship accumulation section 19. If such is the case, the presentation procedures control section 13 only refers to the semantic relationship accumulation section 19 in Step S9.

On the other hand, if it is determined in Step S4 that the semantic relationship is not "correction" but "request for correction" or "request for addition" (Step S9, Step S10), a request for the supply of information will be presented (Step S11). Firstly, a request for the supply of information will be placed with information discloser and, if the information discloser is not able to provide additional information, the users are requested for the supply of information by section of electronic new and/or electronic mail.

If the semantic relationship not "request for correction" nor "request for addition", only the fact that the disclosed information is provided with additional information will be displayed (Step S8).

FIGS. 19A and 19B show exemplary images on the display screen, where an information referencer inputs "request for correction" to a piece of disclosed information. The information referencer selects the information for which a request for correction is placed and selects "request for correction" in menu 191 in the screen of FIG. 19A. Then, as shown in FIG. 19B, an additional information input window 192 is displayed so that the information referencer can input the details of the request for correction.

FIG. 20A shows an exemplary image where the additional information notifying section 15 notifies the information discloser of the request for correction input by section of the screen of FIG. 19B. Note that the registerer 201 in the additional information input window of FIG. 20A is the information discloser.

FIG. 20B shows an exemplary image where general users are requested to correct the additional information. If "request for correction" is selected from the menu 191 in FIG. 19A, the additional information input window 202 of FIG. 20B is displayed.

FIG. 21A shows an exemplary image for notifying the information discloser of a "request for addition" of additional information made to the disclosed information. FIG. 21B shows an exemplary image that can be used to request general users to add additional information. An additional information input window 211 as shown in FIG. 21B may be displayed when "request for addition" is selected from the menu 153 of FIG. 15B.

If the registration button is selected in any of the additional information input windows of FIGS. 19A, 19B, 20A, 20B, 21A and 21B, the additional information is registered in the semantic relationship accumulation section 19. More specifically, the ID number of the additional information and the ID number of the referenced disclosed information are registered. As shown in FIG. 17, the semantic relationship 175 between the additional information and the disclosed information and the graph 174 illustrating the result of determining if the referenced disclosed information represents an objective fact or a subjective view will also be registered.

Figure 22:
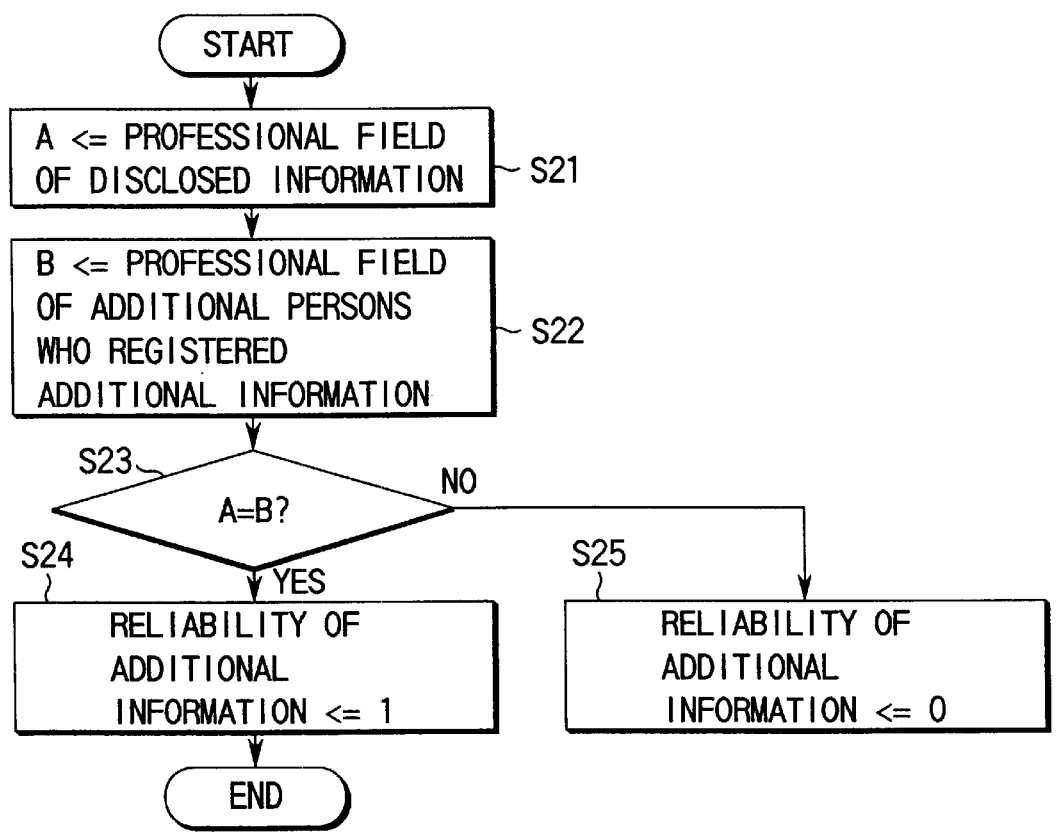
FIG. 22 is a flow chart for a processing operation of determining by calculation the reliability of the additional information.

Now, the processing operation of determining the reliability of the additional information in the presentation strategy section 9 in Step S6 of FIG. 18 will be described by referring to the flow chart of FIG. 22.

The information contents comprehension section 17 identifies the technical field to which the disclosed information belongs as determined by referring to the dictionary of terms in the dictionary/terms accumulation section 18, said disclosed information being provided with additional information, to substitute the variable A with it (Step S21).

Then, the technical field is identified by referring to the profile of the registerer of the additional information accumulated in the profile accumulation section 20 to substitute the variable B with it (Step S22). Then, it is checked if A and B are equal to each other or not (Step S23). If they are equal to each other, "1" will be given to the reliability (Step S24). If not, "0" will be given to the reliability (Step S25).

FIGS. 23A and 23B show examples of terms accumulated in the dictionary/terms accumulation section 18. The dictionary of terms is referenced in the processing step of Step S21 in FIG. 22 and divided into a dictionary of a classification system and a dictionary of synonyms.

FIG. 23A shows examples of terms classified by way of global classification 231, medial classification 232 and minute classification 233. For each basic concept 234, a plurality of keywords 235 that can be used for describing the basic concept 235 are listed on the right side. For example, keywords "accident" and "non-accident" are listed for basic concept "duty".

FIG. 23B shows examples of synonyms. More specifically, a plurality of synonyms 237 are listed for each basic word 236. For example, "short distance" is listed as synonym of basic term "short distance trip".

Inclusion is also used for terms. For example, basic term "transportation" is defined to include the concepts of a plurality of terms 238 such as "train", "bus", "private car" and "aircraft". Note that the basic concept 234 of FIG. 23A has a corresponding basic term 236 in FIG. 23B.

When the technical field of a piece of disclosed information is checked, a basic term may be selected from the terms contained in the disclosed information by referring to FIG. 23B and then a corresponding basic concept may be selected from the classification system of FIG. 23A.

FIG. 24 shows an example of described profiles accumulated in the profile accumulation section 20. A personal profile typically comprises the name 241 of the person or the name of the group to which the person belongs, the attribute 242 and the attribute 243 and an attribute value 244.

Reference numeral 244 denotes the attribute of the professional field of the person and the attribute value shown there corresponds to the basic concept 234 of FIG. 23.

If the basic concept of the professional field obtained for the information discloser as shown in FIG. 23 agrees with the basic concept of the personal professional field obtained for the registerer of the additional information as described in FIG. 24, "1" will be given to the reliability of the additional information.

Now, the operation of determining if the disclosed information represents an objective fact or a subjective view will be described. Note that the obtained result will be accumulated in the semantic relationships accumulation section 19 of FIG. 25 as flag.

FIG. 25 is an example of terms accumulated in the dictionary/terms accumulation section 18 that can be referenced to determine if the disclosed information represents an objective fact or a subjective view. The dictionary of terms used here contains a table of expressions for describing objective facts as shown by (a) in FIG. 25 and a table of expressions for describing subjective views as shown by (b) in FIG. 25. Thus, individual expressions 252 and expressions 254 are registered in the dictionary.

The information contents comprehension section 17 checks the contents of the disclosed information by referring to the tables as shown by FIG. 25A and 25B.

Figure 26:
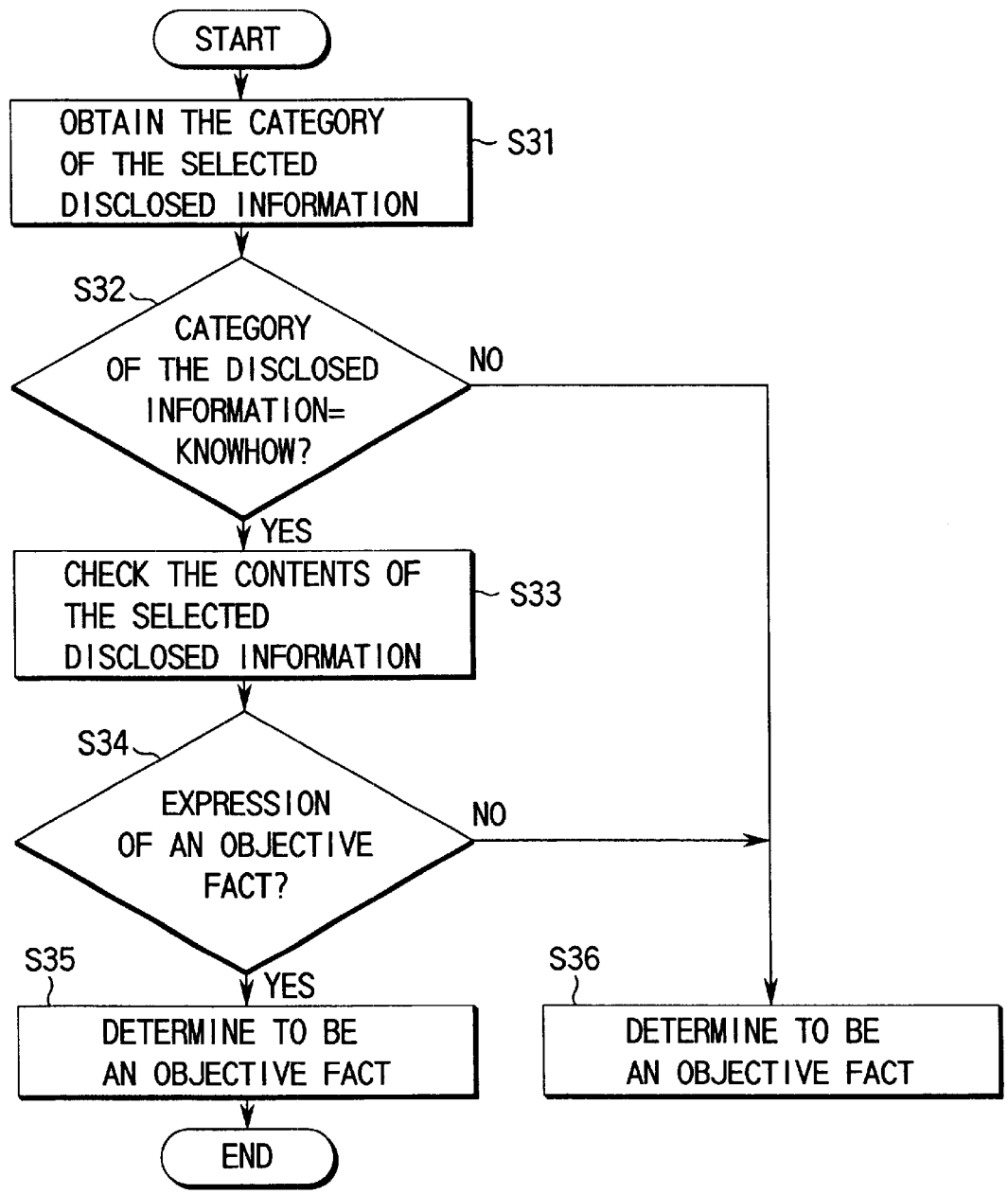
FIG. 26 is a flow chart of a processing operation of the information contents comprehension section.

FIG. 26 shows a flow chart for the processing operation of the information contents comprehension section 27.

Firstly, it takes out the type of information from the disclosed information accumulation section 6 (Step S31). Types of information include documents containing personal knowledge and know hows and computer software. Documents are classified into a group of report papers including papers and reports and a group of know hows describing personal knowledge and information in a non-formatted manner.

Assume here that only knowhows are checked for the type of information. Knowhows refer to personal knowledge and information and include objective facts such as regulations of a company. Thus, it is checked if the disclosed information represents a "knowhow" or not (Step S32).

If it is determined that the disclosed information represents a know how, the contents of the disclosed information will be checked. In other words, it is checked if the expressions for describing the selected disclosed information are those for describing an objective fact or not by referring to the tables of the dictionary of terms of FIG. 25 (Step S33 through S34). More specifically, the disclosed information will be determined to represent an objective fact if it contains more terms for describing an objective fact as listed in the table of objective expressions than terms describing a subjective view as listed in the table of subjective expressions.

If the disclosed information more terms for describing an objective fact than terms describing a subjective view, the disclosed information is determined to represent an objective fact (Step S35). If not, it is determined to represent a subjective view (Step S36).

Note that the present invention is not limited to the above described first embodiment, which may be modified appropriately without departing from the scope of the invention.

The above described first embodiment provides the following effects.

Persons other than the information discloser can add more information to and/or modify the disclosed information in order to provide the users with information that is easy to understand.

While some information may represent universal truth, there are many pieces of information that become obsolete with time. It is not desirable to provide user with obsolete information and such information has to be updated by providing it with additional information before being presented to users.

In an information sharing support system, disclosure of information can be psychologically suppressed in fear of disclosing false information. If such a system is provided with a scheme for accepting additional information, any obsolete or incorrect piece of information may be updated or corrected without problem so that potential information disclosers may be encouraged to actively disclose information.

As the information discloser is notified of any requests for correction, modification and addition, the information discloser becomes more aware of the type of information that the user want to know so that consequently the quality of the shared information can be improved.

2nd Embodiment

The second through eighth embodiments as will be described hereinafter are obtained by modifying the evaluation information processing section 4 of the above described first embodiment.

Of these embodiments, the second embodiment is adapted to automatically detect the emotional aspects of each disclosed information referencer and exploit them for rating the disclosed information.

Figure 27:
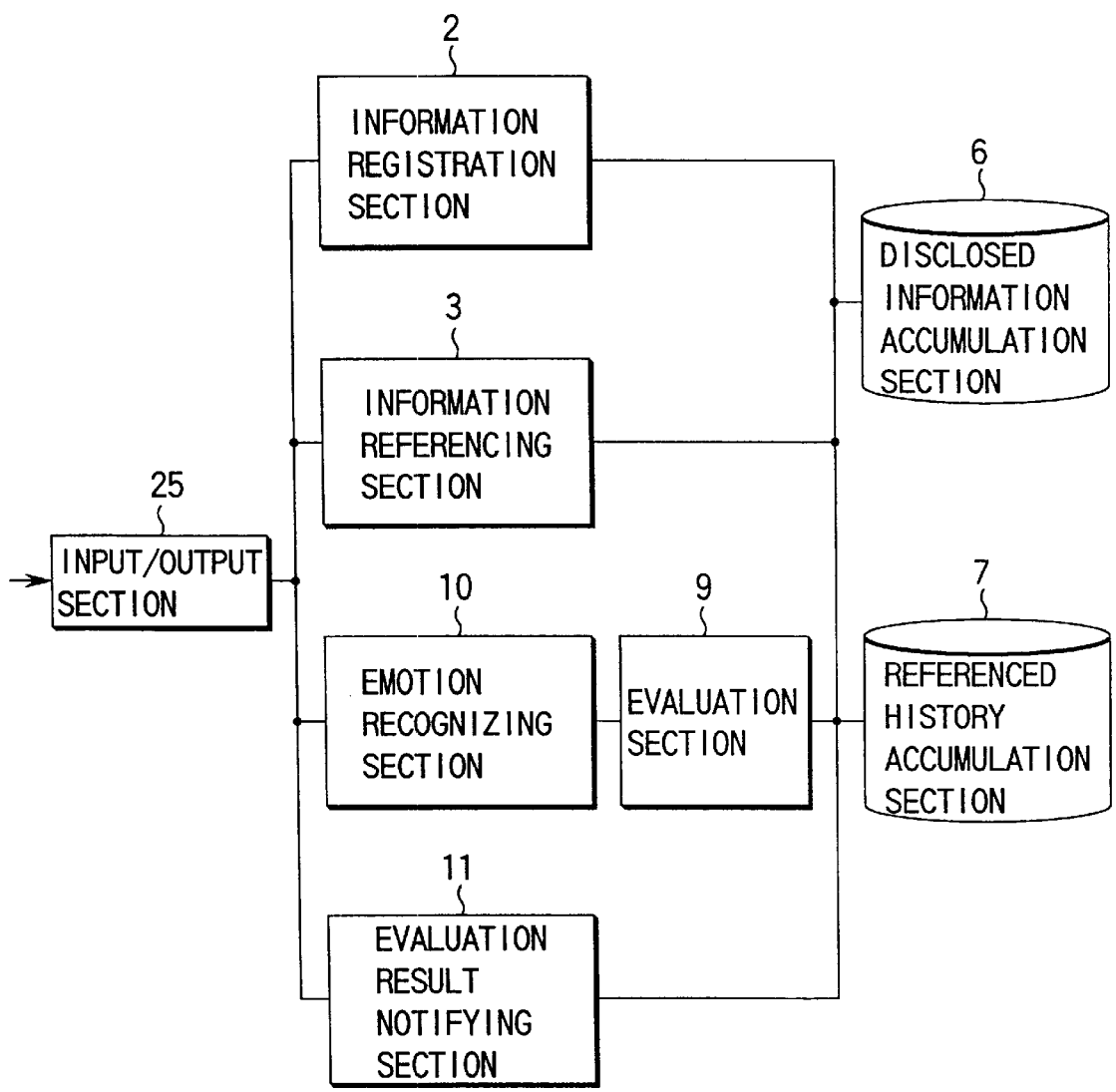
FIG. 27 is a schematic block diagram showing the configuration of a second embodiment of information sharing support system according to the invention.

While the information sharing support system 1 of the second embodiment may have a configuration as illustrated in FIG. 1, it may alternatively have a configuration as illustrated in FIG. 27. Note that the components in FIG. 27 that are same as their counterparts of FIG. 1 are respectively denoted by the same reference symbols.

In this embodiment, the role of the evaluation input section 8 of the above embodiment is neglected in this embodiment and only the result obtained by the emotion recognizing section 10 will be used.

Referring to FIG. 27, the input/output section 25 receives inputs in the form of still picture, movie, speech and/or program by way of a network or directly from an input device such as keyboard, mouse, microphone and/or camera.

The information registration section 2 operates to accumulate pieces of information disclosed by information disclosers in the disclosed information accumulation section 6.

The information referencing section 3 operates to retrieve, reference and utilize information from the information accumulated in the disclosed information section 6.

The reference history accumulation section 7 accumulates identifiers of the pieces of information that have been retrieved and referenced and, if necessary, also information referencing records including the identifiers of information referencers and referenced dates.

The emotion recognizing section 10 operates to recognize the emotion of each information referencer to the disclosed information on the basis of the data input by the information referencer consciously or unconsciously by way of the information referencing section 3.

Figure 28:
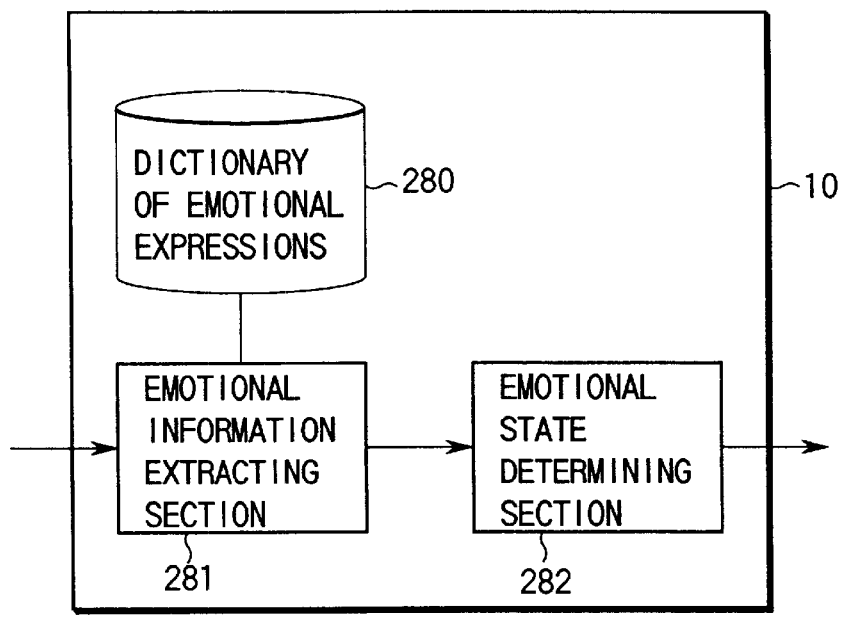
FIG. 28 is a schematic block diagram showing a configuration of the emotion recognizing section.

The emotion recognizing section 10 typically has a configuration as illustrated in FIG. 28. More specifically, it comprises a dictionary of emotional expressions 280, an emotional information extracting section 281 and an emotional state determining section 232.

With this arrangement, the emotional information extracting section 281 extracts emotional expressions contained in the text or the speech of the information referencer input by the latter from the dictionary of emotional expressions 280 and sends them to the emotional state determining section 282. The emotional state determining section 282 then recognizes the emotion of the information referencer on the basis of the extracted expressions.

Figure 29:
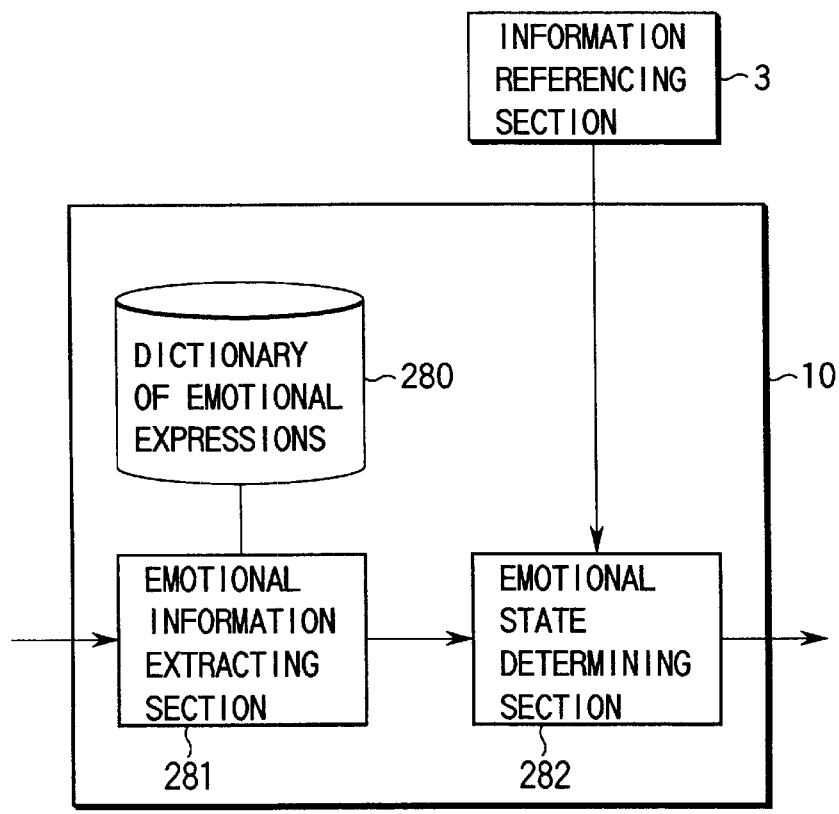
FIG. 29 is a schematic block diagram showing another configuration of the emotion recognizing section.

The emotion recognizing section 10 may alternatively have a configuration as illustrated in FIG. 29.

With the arrangement, the emotional state recognizing section 282 determines the emotional state of the information referencer on the basis of both the outcome of the operation of the emotional information extracting section 281 and the data input by the information referencer by way of the information referencing section 3.

On the other hand, the evaluation section 9 of FIG. 27 operates to carry out computational operations on the personal evaluation values given to the disclosed information and the statistic figures of evaluation values, using the information reference records accumulated in the reference history accumulation section 7 and the outcome of emotion recognizing operations. The computed results of evaluations are then accumulated in the reference history accumulation section 7.

The evaluation result notifying section 11 operates to notify the authorized persons (including the information provider, the person referencing the information) of the obtained personal evaluation values.

The processing operation of the second embodiment of information sharing support system will be described by referring to the flow chart of FIG. 30.

Figure 31A:
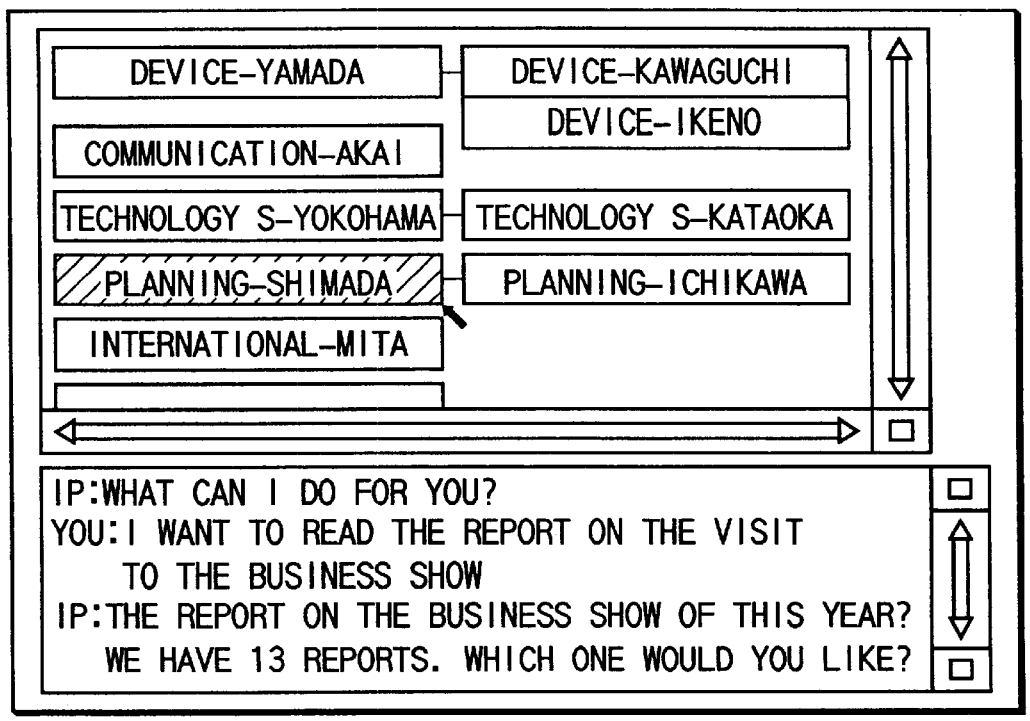
FIGS. 31A and 31B are exemplary images of the display screen of the information referencing section.
Figure 31B:
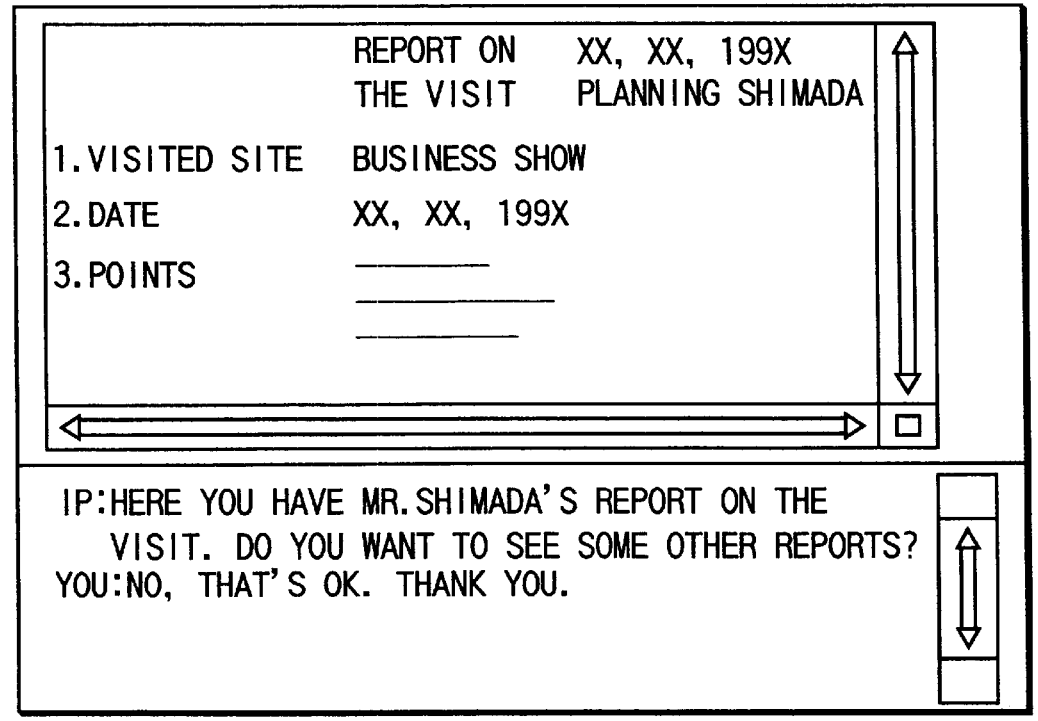

FIGS. 31A and 31B show exemplary images on the interface screen of the embodiment.

Figure 30:
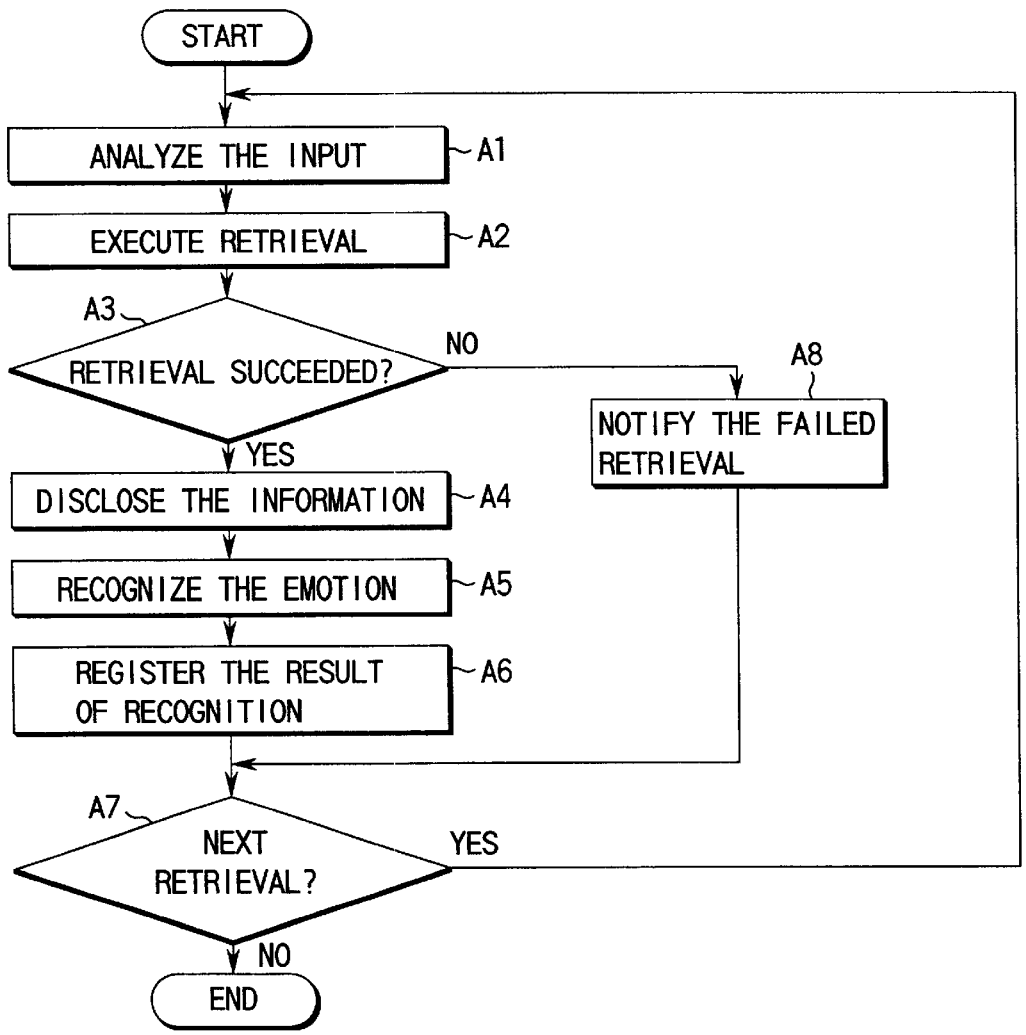
FIG. 30 is a flow chart for a processing operation of the emotion recognizing section.

Upon comprehending the input of the input of the information referencer, the information referencing section 3 retrieves one or more than one pieces of information that meet the demand of the information referencer from the disclosed information accumulation section 6 and presents the retrieved information to the information referencer (Steps A1 through A4 in FIG. 30). The operation of retrieving data and preparing response sentences in a natural language may be carried out by a method described, for example, in Japanese Patent Application Laid-Open No. 7-86266 or No. 7-235805.

The information referencing section 3 may alternatively be so arranged as to comprehend the input and prepare a response sentence not by solely relying on texts but by using menus or voice recognition and voice synthesis or a combination thereof. The use of voice may be made according to a method disclosed in Japanese Patent Application Laid-Open No. 5-216618.

When, for example, the information referencer input a command, an image as shown in FIG. 31A may be displayed on the input/output interface screen. The upper half of the input/output interface screen is a graphic or text window for displaying the retrieved data and the lower half of the interface screen is a text window for receiving a retrieval instruction and displaying a response to the instruction.

For example, the lower text window may display a message "What can I do for you?". If the information referencer inputs a retrieving sentence such as "I want to read the report on the visit to the business show", the result of the subsequent retrieval operation will be displayed on the upper window, saying "We have 13 reports. Which one would you like?". If the information referencer selects the document of "Planning—Shimada" by section of a pointing device such as a mouse, the selected document will be displayed as shown in FIG. 31B.

The window shows a sentence of "Do you want to see some other reports?" and the information referencer may answer "No, that's OK. Thank you".

Now, the operation proceeds to Step A5 in FIG. 30 to recognize the emotion of the information referencer. Roughly speaking, there are three ways for recognizing emotion. Firstly, expressions that may represent the emotion of the information referencer may be recognized by extracting emotional expressions from the conscious or unconscious behaviors (input sentences, speeches, gestures, countenance, etc.) on the part of the information referencer. Secondly, the emotional state of the information referencer may be recognized by analyzing the current psychological conditions of the information referencer. Finally, the preceeding two techniques may be combined. Techniques for recognizing the countenance include the one described by Morishima et al. (NICOGRAPH: Papers, pp. 17–25, 1993), whereas those for recognizing the emotion from nonverbal information such as rhythmic information include the one reported by Kanazawa et al. (The Electronic Information Communication Society: Papers, D-II, Vol. J77-D-II, No. 8, pp. 1512–1521).

Voice recognition for emotional expressions containing verbal information other than rhythmic information is described by researchers including Takebayashi et al. (The Electronic Information Communication Society: Papers, D-II, Vol. J77-D-II, No. 8, pp. 1417–1428). Japanese Patent Application Laid-Open No. 7-86266 describes a method of recognizing emotion by section of voice recognition using both verbal information and nonverbal information.

Known methods of understanding the emotion from the circumstances include these proposed by Lehnert et al. (Cognition and Emtion, pp. 199–322, 1987) and Dyer (Emotions and their Computations: Three Computer Models", 1987), who tried to understand the emotions of the characters in stories. Shibazaki et al. proposed a technique that combines these methods (Japanese Patent Application Laid-Open No. 7-235805).

If the above described first technique is used in the emotion recognizing section 10, a dictionary of additional expressions 280 as illustrated in FIGS. 32A and 32B will be used so that emotional expressions contained in the input of the information referencer may be extracted therefrom.

The emotional information extracting section 281 refers to the dictionary of emotional expressions 280 as partly shown in FIGS. 32A and 32B and extracts "that's OK→medial satisfaction" and "Thank you→medial satisfaction" from the user input of "No, that's OK. Thank you.".

The emotional state determining section 232 determines the emotional state of the user to be "emotion: satisfied, degree: medial" typically by calculating an average value for the emotional information.

Emotion may be described not only in terms of satisfaction and dissatisfaction but also in terms of surprise, distrust, sorrow and dullness to expand the scope of emotion. Additionally, monologues such as "Jesus" and nonverbal expressions such as nodding and smile may be used as items that can be extracted from the dictionary along with texts.

The evaluation section 9 determines an evaluation value from the above described emotional state of the user. For example, a positive value will be given to an expression of satisfaction and the value may be +2 for medial satisfaction, which will then be accumulated in the reference history accumulation section 7 (Step A6). The evaluation values of different users stored in the reference history accumulation section 7 may be used to calculate averages and determine a relative evaluation value for a specific piece of information as compared with the remaining pieces of information.

The above retrieving steps will be repeated if required by the user (Step A7). If the disclosed information requested by the information referencer is not retrieved in Step A3, the operation also proceeds to Step A7.

Figure 33A:
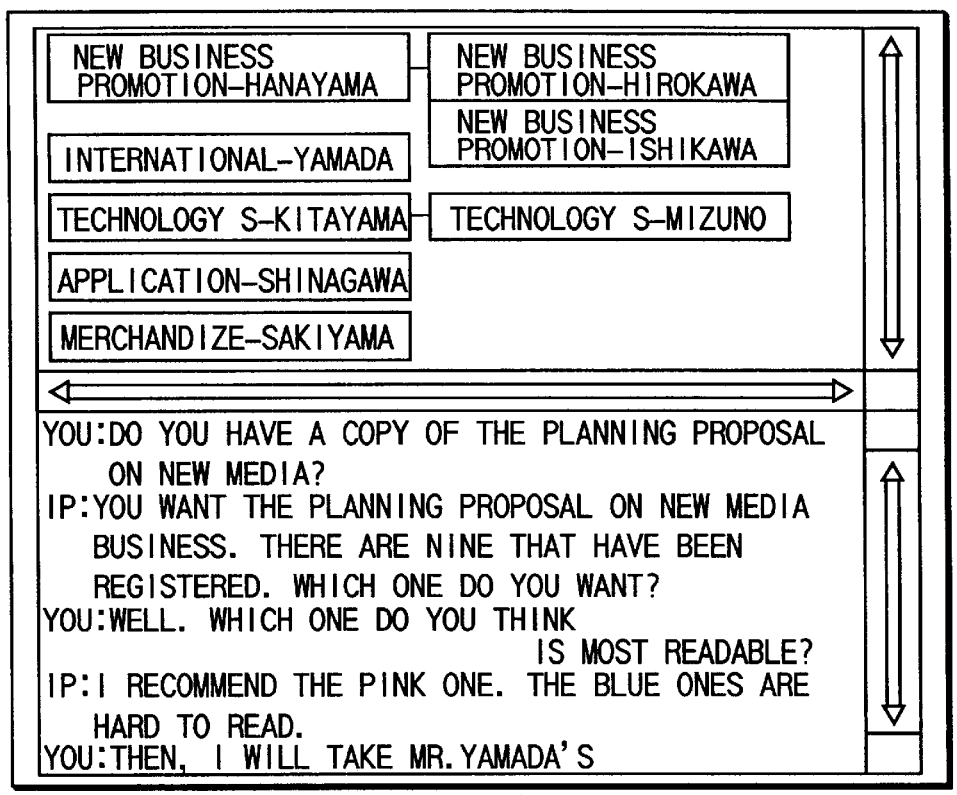
FIGS. 33A and 33B are exemplary images showing two possible dialogues between the system and an information referencer on the display screen.

The obtained evaluation values, average values and relative evaluation values may be displayed when the information referencer retrieves information. Referring to FIG. 33A, for example, if the information referencer uses a retrieving sentence of "Which one do you think is most readable?", retrievable pieces of information are presented with values determined in terms of "recommendable" and "hard to read".

Figure 33B:
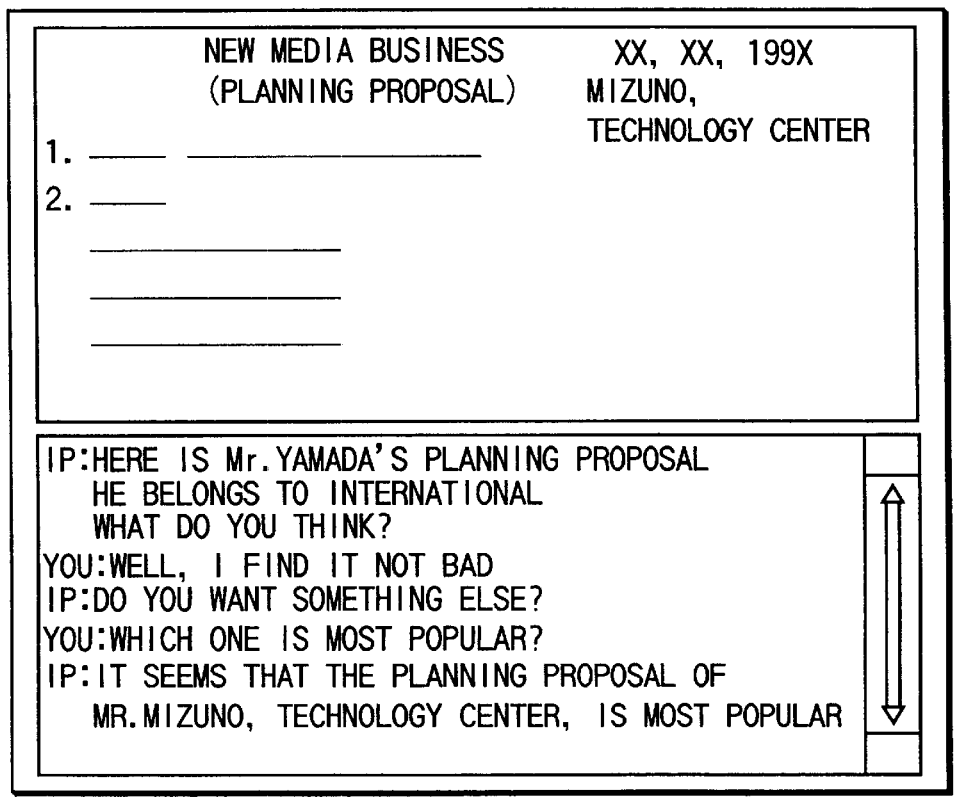

If the information referencer inputs "Which one is most popular?" as shown in FIG. 33B, the most popular piece of information will be presented.

Figure 34:
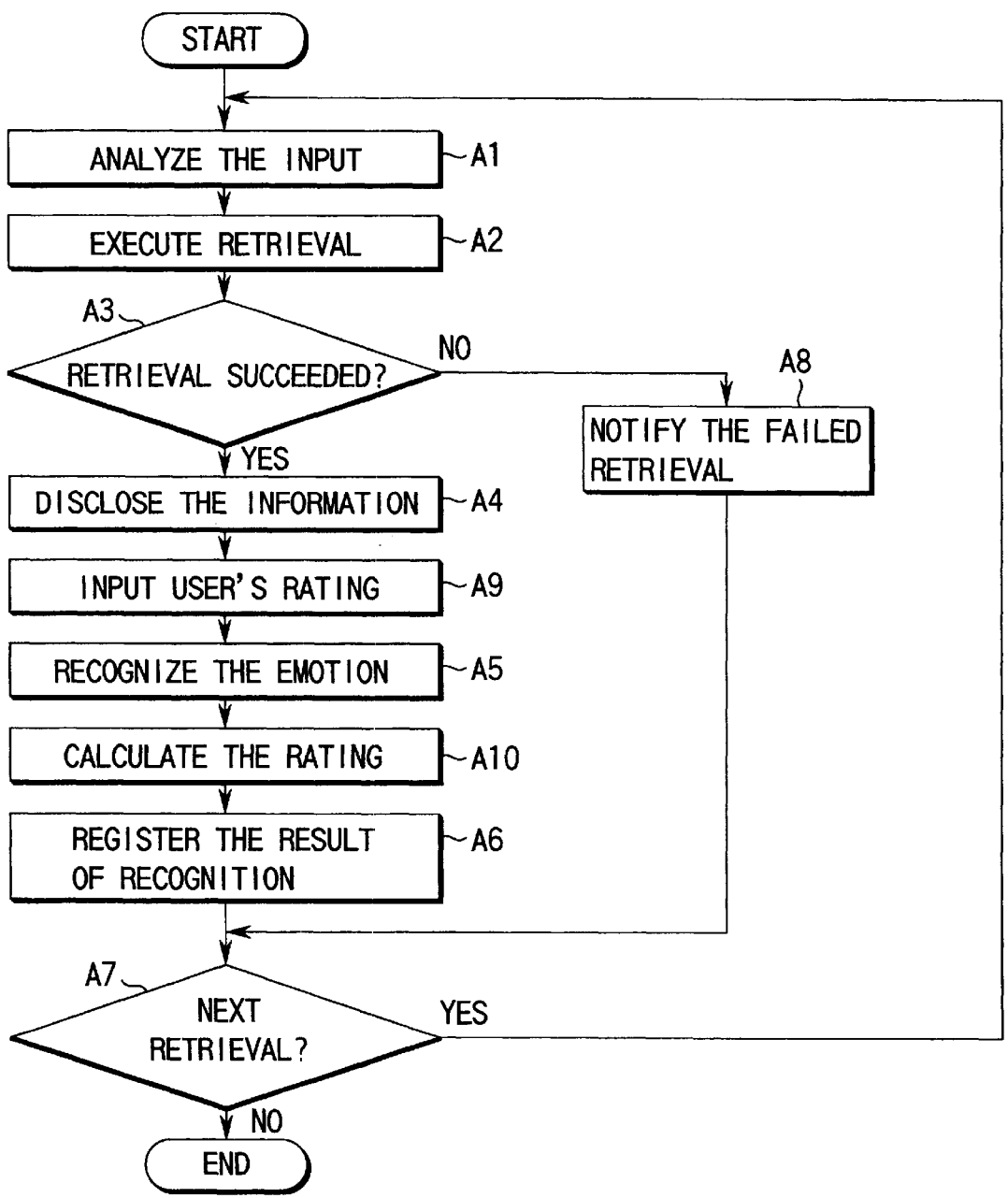
FIG. 34 is a flow chart of another processing operation of the emotion recognizing section.

If the information referencer inputs an evaluation value and, at the same time, the emotional perception of the information referencer is detected, the evaluation section 9 determines by calculation an evaluation value for the retrieved information from the both sources of evaluation as shown in the flow chart of FIG. 34 (Steps A9 and A10).

Figure 35:
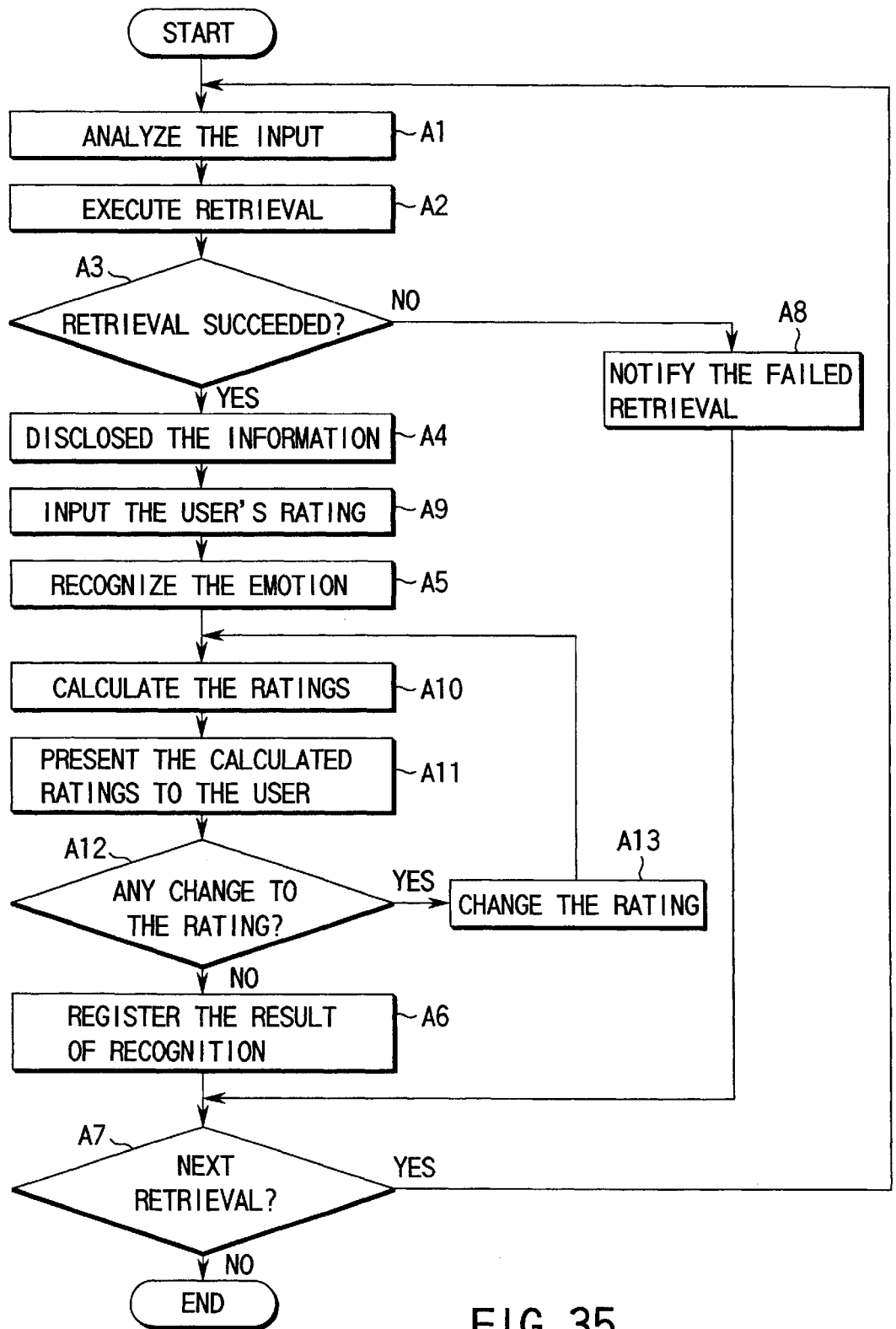
FIG. 35 is a flow chart of still another processing operation of the emotion recognizing section.

Alternatively, as shown in the flow chart of FIG. 35, the evaluation value determined in Step A10 is presented to the information referencer (Step A11) so that the value may be modified by the information referencer (Steps A12 and A13).

Figure 36:
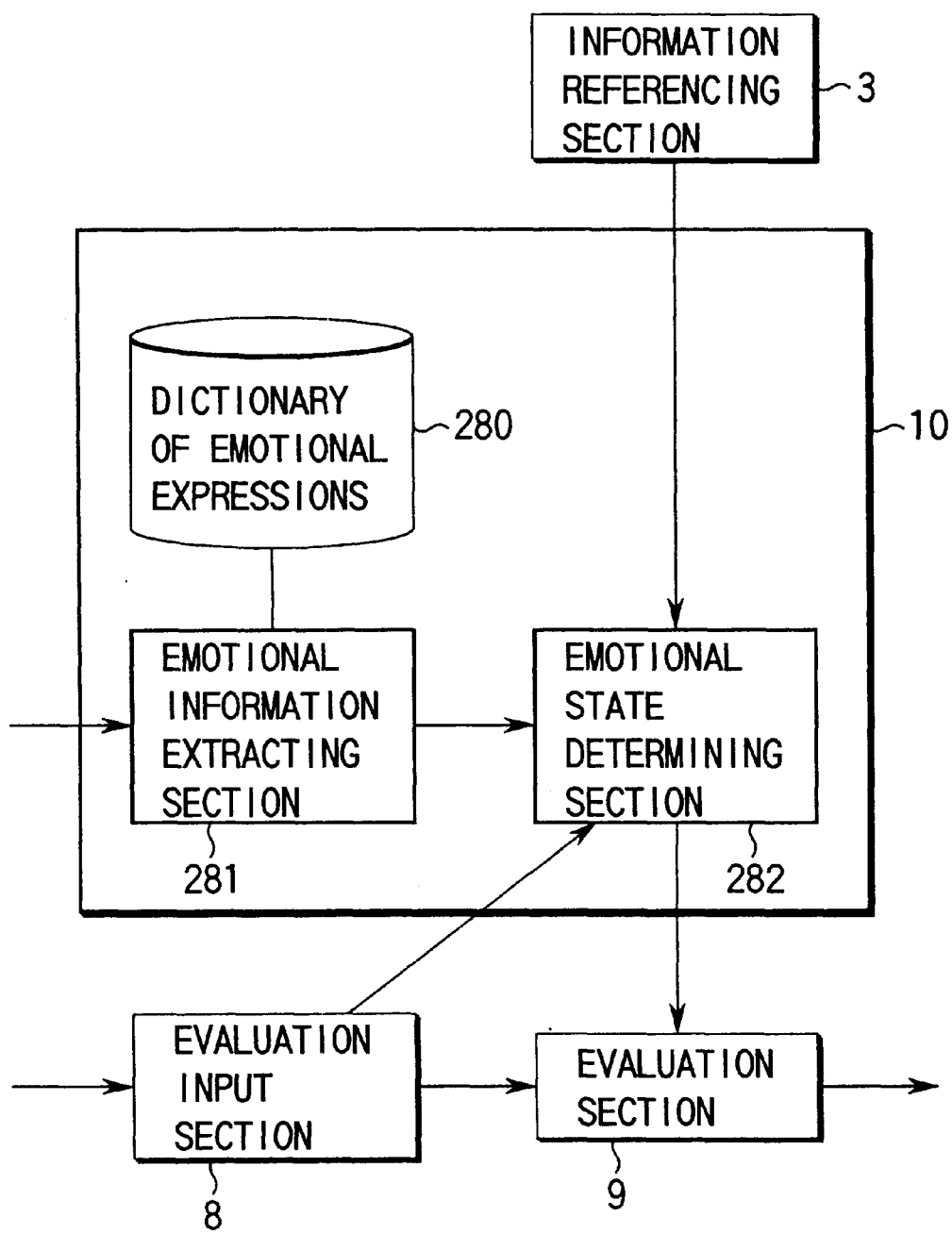
FIG. 36 is a schematic block diagram showing still another configuration of the emotion recognizing section.

The emotion recognizing section 10 may have an alternative configuration as shown in FIG. 36. With this arrangement, the evaluation data obtained from the input of the information referencer is used to determine the emotional state of the information referencer.

For example, after the information referencing section 3 presents a piece of information to the information referencer as shown in FIG. 33A, the evaluation input section 8 prompts the user to input his or her evaluation by asking "What do you think?" or "Do you find it interesting?". Then, the user input such as "Not bad" will be analyzed to determine the evaluation value on the part of the user. At the same time, the emotion recognizing section 10 may obtain emotional information such as "emotion: satisfaction, degree: low". Then, the evaluation section 9 determines an evaluation value from the both sources of evaluation.

FIG. 37 shows an exemplary list of referenced histories accumulated in the reference history accumulation section 7 of this embodiment of information sharing support system. The reference records of a specific piece of information are accumulated in the form of table along with the referencers and the evaluation items. Reference numeral 371 denotes the items of the table and numeral 372 denotes the values given to the items.

In FIG. 37, the column of log # is for the ID numbers of the reference records, user ID is for the ID numbers of the referencers, evaluation A is for the evaluations input by way of 63 of the screen of FIG. 6A and the evaluation input section 8, where (3), (2) and (1) represent "good", "medial" and "bad" respectively, and evaluation B is for the evaluations obtained by way of the emotion recognizing section 10, where (3), (2) and (1) represent "satisfied", "not very satisfied" and "dissatisfied" respectively. The effectiveness, reusability and recommendability are rated for each log by the evaluation section 9 on the basis of the inputs entered by way of the evaluation input section 8 and the emotion recognizing section 10. In the column of comment, the file names storing the comments entered by way of the screen of FIG. 6B are listed.

The referenced time is expressed in terms of the number of seconds during which each listed piece of information is referenced. The column of copy yes/no is for indicating if each listed piece of information has been down-loaded or not. The referenced time and the copying record can be used when objectively evaluating the information.

With the above described arrangement, the emotional state of the information referencer is automatically determined each time when a piece of disclosed information is referenced and evaluated by an information referencer to reduce the effort for evaluating each piece of disclosed information and promote the utilization of the information sharing support system. Additionally, this arrangement can reliably obtain each information referencer's evaluation.

3rd Embodiment

Now, the third embodiment of the invention will be described. In this embodiment, the information referencing section 3 calculates the effectiveness of each piece of disclosed information in terms of an expectancy value on the basis of the evaluations given to it and presents it to the user.

Figure 38:
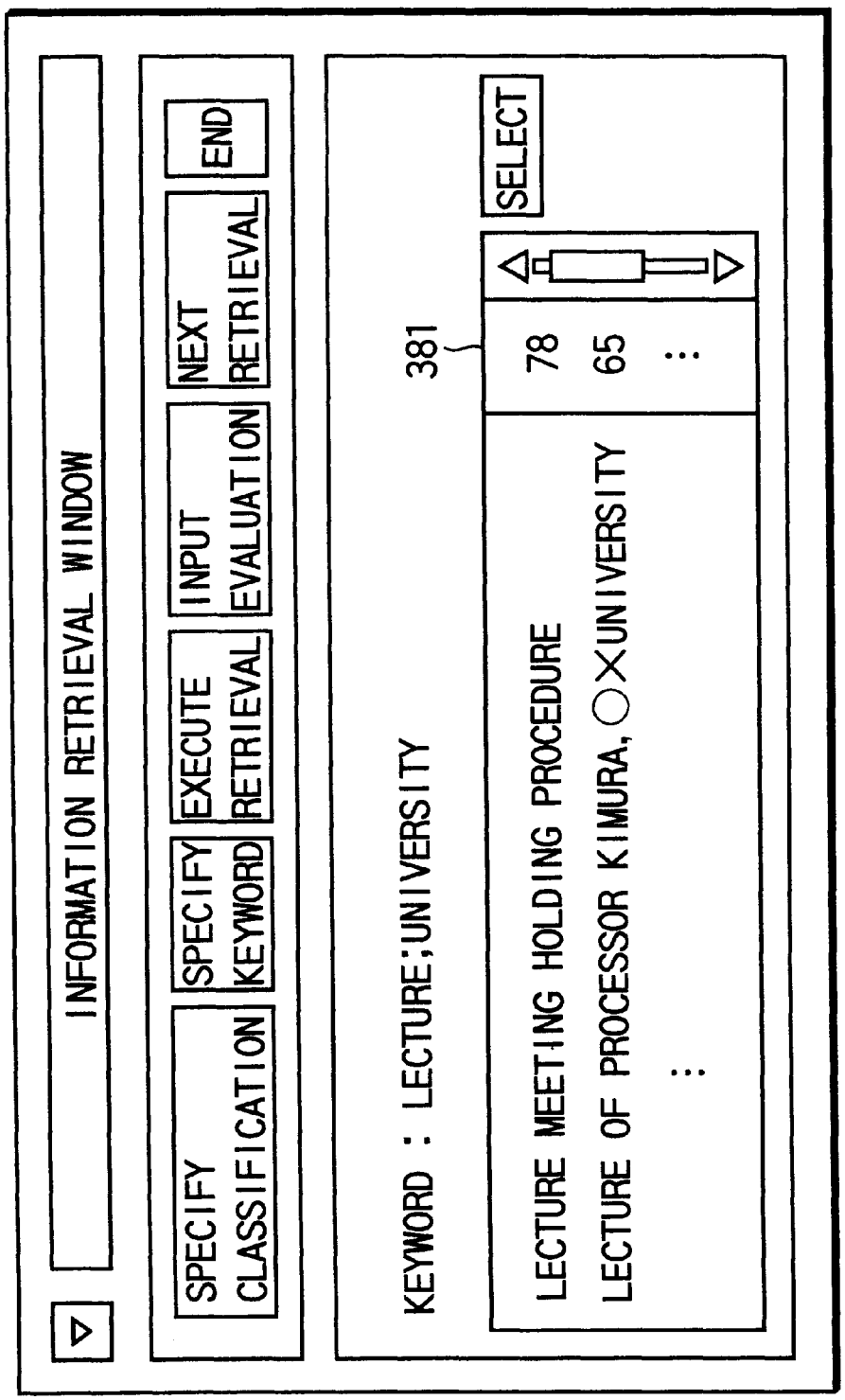
FIG. 38 is an exemplary image on the display screen of the information referencing section of a third embodiment of the invention.

FIG. 38 shows an exemplary image displayed on the interface screen for retrieving and referencing information by way of the information referencing section 3. Note that the expectancy value 381 of each piece of disclosed information is added to the image of the user interface screen of FIG. 5. Also note that the listed pieces of disclosed information are arranged in the descending order of their expectancy values.

The expectancy value of each piece of disclosed information in FIG. 38 represents the average of the total points listed in the evaluations display window of FIG. 10. The expectancy value can be used as a cue for the information referencer to select highly effective information from a large stock of information. Conventional information retrieval is based solely on if a selected piece of information meets the requirements of retrieval or not. To the contrary, with this embodiment, each piece of disclosed information is provided with an additional index of effectiveness.

The expectancy value of each piece of information can be determined in several different ways.

For example, the persons authorized to access the stored information may be weighted so that the expectancy value is determined by averaging weighted points. A list of weights may be used for such a weighting system, where a specific weight may be assigned to each post in the company. Then, the expectancy value may reflect the experience and the history of each information referencer.

Alternatively, the expectancy value may be determined so as to reflect the date when each piece of information is disclosed. For example, a value of 10/years may be subtracted from the expectancy value, where years represent the number of years that have elapsed since the disclosure of the information.

Or, the expectancy value may be determined as a function of the expectancy values of related information. For example, the expectancy value may represent the average of the proper expectancy value and those of the related information to reflect the effectiveness of the related information.

With this arrangement, each piece of information may be evaluated more appropriately to improve the utilization of the information sharing support system.

4th Embodiment

Now, the fourth embodiment of the invention will be described.

While all the pieces of disclosed information stored in the system can be listed on the retrieval window of FIG. 5A of the first embodiment, such a unitary listing system or a unitary management system can produce difficulties on the part of the system user in specifying the right classification and selecting the right keywords particularly when there are a large number of pieces of registered and disclosed information so that eventually the user may end up without finding the information exactly he or she wants in a reasonably short period of time and the disclosed information may be hindered from convenient utilization.

Therefore, a distributed information management system may be a choice that surpasses the unitary or centralized information management system of the first embodiment from the viewpoint of the efficiency of information retrieval. With such a distributed system, each member of a group that share information is charged with a specific assignment in the operation of information management depending on his or her profession and/or current job responsibility so that, when accessing a piece of disclosed information, the user can select the technical field to which the information belongs by referring to the member in charge of that technical field. With this arrangement, unrelated and unnecessary information may be preliminarily excluded from the scope of information retrieval to make the information retrieval effective and efficient.

Figure 39:
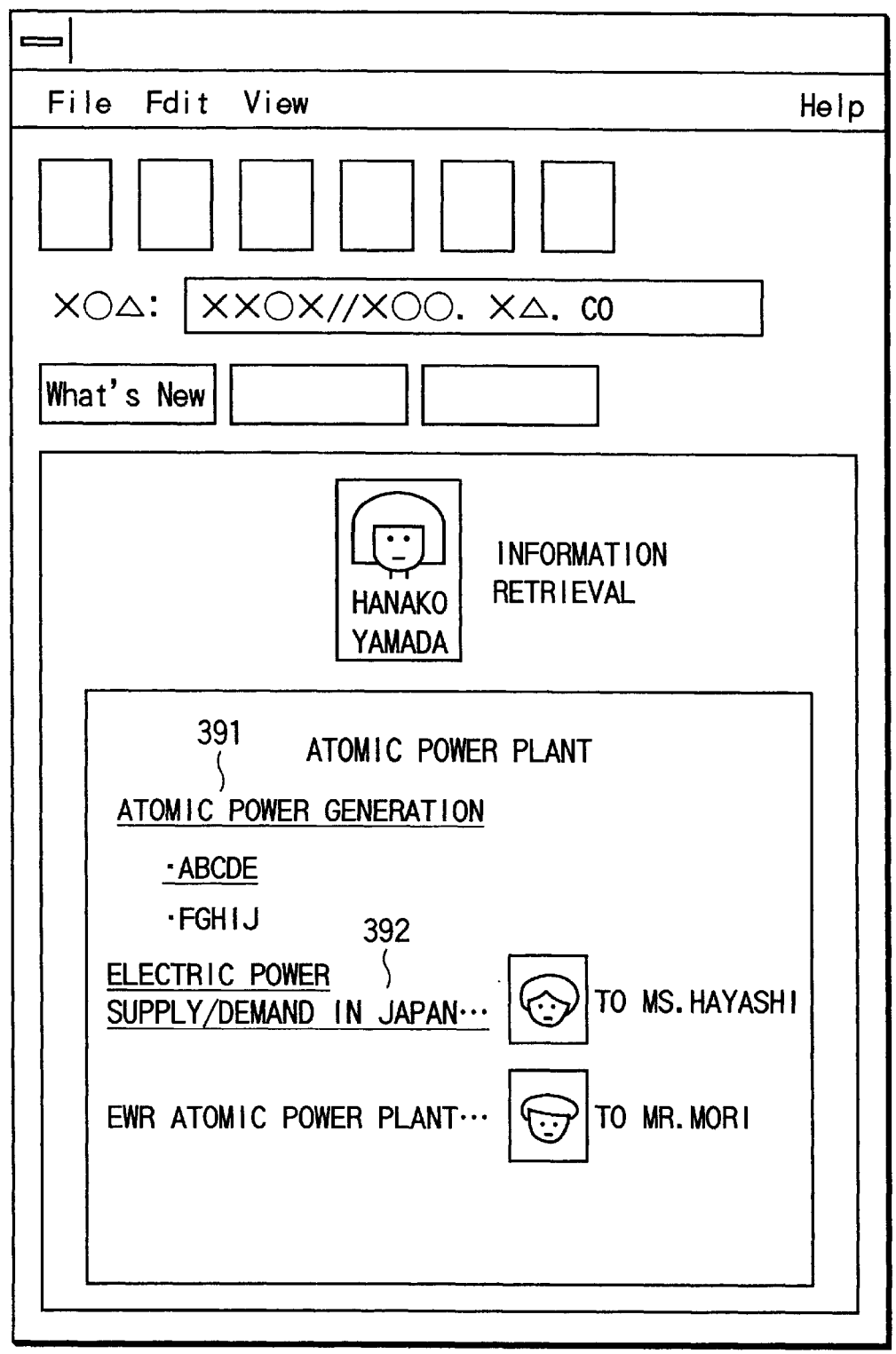
FIG. 39 is an exemplary image on the display screen of the information referencing section of a fourth embodiment of the invention.

FIG. 39 shows an exemplary image that can be displayed on the display screen in this embodiment when retrieving shared information by way of the home pages of the individual members. Each member of the group is authorized to provide classifications and a link hierarchy that optimize the utilization of the shared information by resorting to his or her professional knowledge and skills. For example, the member may register the heading 391 in FIG. 39 as a hyper-link so that the members can disclose the information they have to each other.

Additionally, a unitary management system can be accompanied by a drawback that the system manager can lose flexibility and become biased in managing the system, whereas a distributed management system provides the advantage that the professional knowledge of the members can be exploited and utilized to manage the system in an efficient and effective way.

However, it should be noted that a distributed management system as described here for this embodiment may eventually face the problem of handling too many pieces of information to make it difficult to locate and retrieve desired information as in the case of a centralized management system when the volume of information managed by each member becomes too large.

A good solution for such a problem may be the use of links connecting specific pieces of information particularly when a hyper-text system as described here is involved. In fact, many existing hyper-text systems are provided with a "bookmark" feature of recording and accumulating specific links (e.g., HotList of Mosaic and BookMarks of Netscape). Then, a group of selected pieces of useful information are managed in a specific way to customize them and make it possible to retrieve a required piece of information quickly.

The information managed by a specific person in a specific way in a distributed management system is obviously useful at least to that person. In other words, the information managed in such a way and hence the provider of the information are evaluated positively by the managing person.

Thus, according to the invention, the selected information is preferably marked with a positive point in an automatic way apart from the evaluations made by the evaluation input section of the preceding embodiments as described above by referring to FIGS. 6A and 6B.

In this embodiment, the information that is specifically selected and registered will be automatically provided with a "+" mark and the evaluation input section of FIGS. 6A through 7D is used only when the information manager wants to give a specially high point to it or when he or she wants to send a special message to the information discloser.

In addition to the fact that the list of selected pieces of information prepared for information management is useful to the individual who has selected them, they can be of universal value because they are filtered by the professional knowledge of the individual so that desirably they should be disclosed to and shared by many people. By disclosing and sharing information, the information retrieving knowhows of the participants can also be shared by many people to improve the efficiency of access to information.

In this embodiment, the information relating to a heading as indicated by 392 in FIG. 39 can be retrieved by tracing the link to the home page of the information manager in charge of the heading.

The disclosed list itself should provides an object of evaluation to others just as any disclosed ordinary information. If the list is marked positively, then the pieces of information linked to the list should be automatically marked positively. Therefore, in this embodiment, when the list is marked positively, all the pieces of information registered and linked to the list are marked with a point that is automatically calculated by section of a given formula.

However, if the list is marked negatively for some reason or other, it may be reasonable to make the negative marking not to propagate to any information linked to it.

It should also be noted that such a list may be prepared not only by an individual but also by a group of individuals. If such is the case, the marks given to the list should be allocated to the co-authors of the list in a specifically defined way.

With a distributed information management system as described above, all the members sharing the disclosed information may be listed on a single list or, alternatively, it may be a good idea to prepare lists of different members selected, for example, by professional fields or organizational sections to make it easy for an information referencer to pinpoint the person who manages the information he or she wants.

Figure 40:
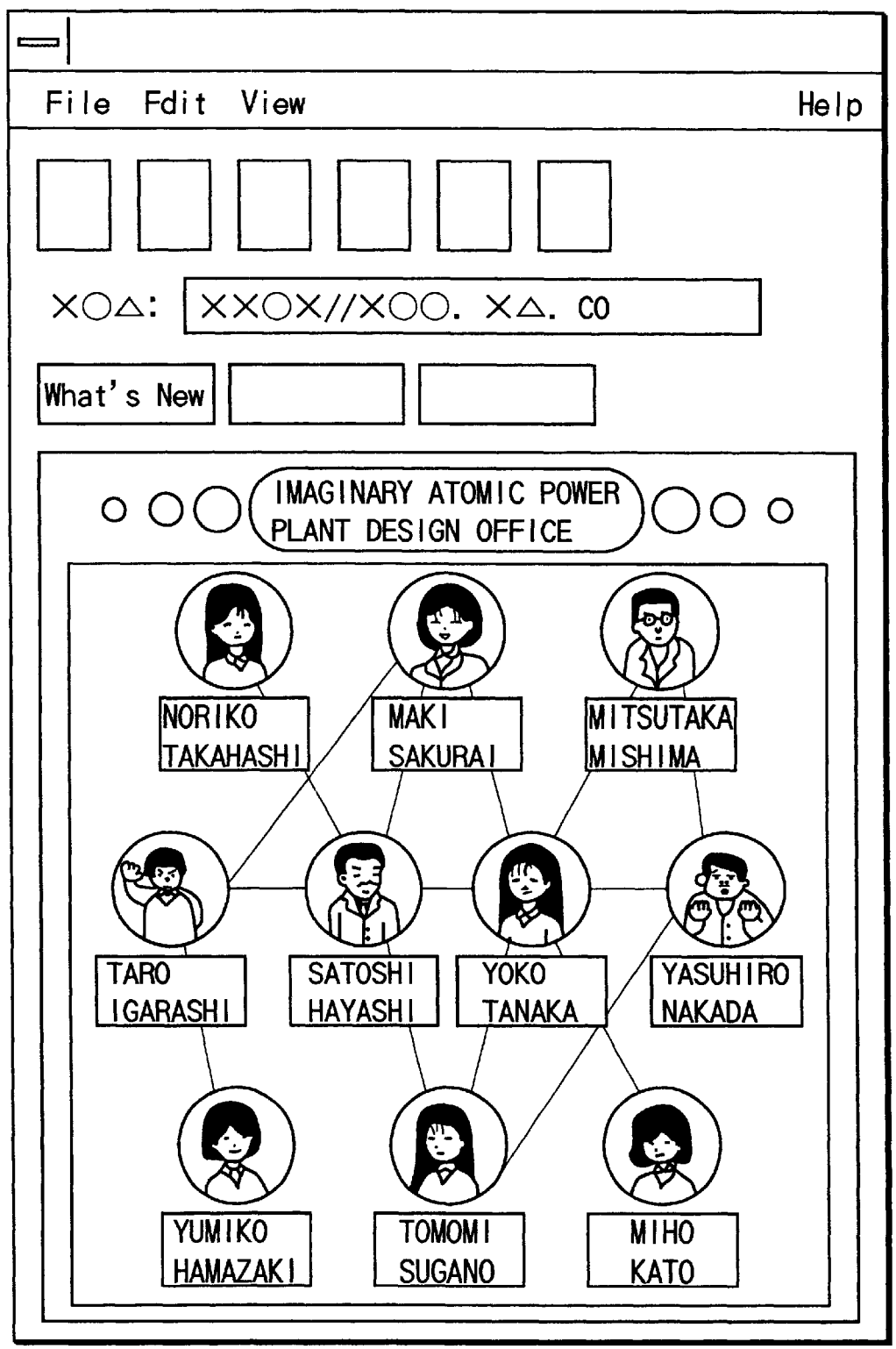
FIG. 40 is another exemplary image on the display screen of the information referencing section.

FIG. 40 shows an exemplary image that can be displayed on the interface window for such an arrangement. While only the names of the members are listed in FIG. 40 for the purpose of simplicity, each of the names on the list may be accompanied by a brief profile of the person that can be displayed by clicking the mouse in order to help the information referencer to select the right information manager.

The interface window may also be used as the one illustrated in FIG. 11, where a specific authorized person can display the evaluations given to each member.

The network in FIG. 40 illustrates the relationships among the members in terms of information links. Thus, the information referencer can visually understand who is linked to whom in terms of disclosed information and trace the information links among the members.

While the lines in FIG. 40 linking the members are uniform and not directional, lines with different widths may be used and/or the lines may be made directional in order to show the relationships among the members more clearly.

Thus, with the fourth embodiment, the disclosed information are managed in a distributed manner by a plurality of members, relying on their respective professional knowledge and skills, to improve the efficiency of retrieving disclosed information. With such an arrangement, the professional knowledge of each of the members is reflected to the list of the pieces of the disclosed information that are managed by them to make the list itself highly valuable. Additionally, since the members are linked to the evaluation of the disclosed information, they are highly motivated to disclosure of information.

5th Embodiment

Figure 41:
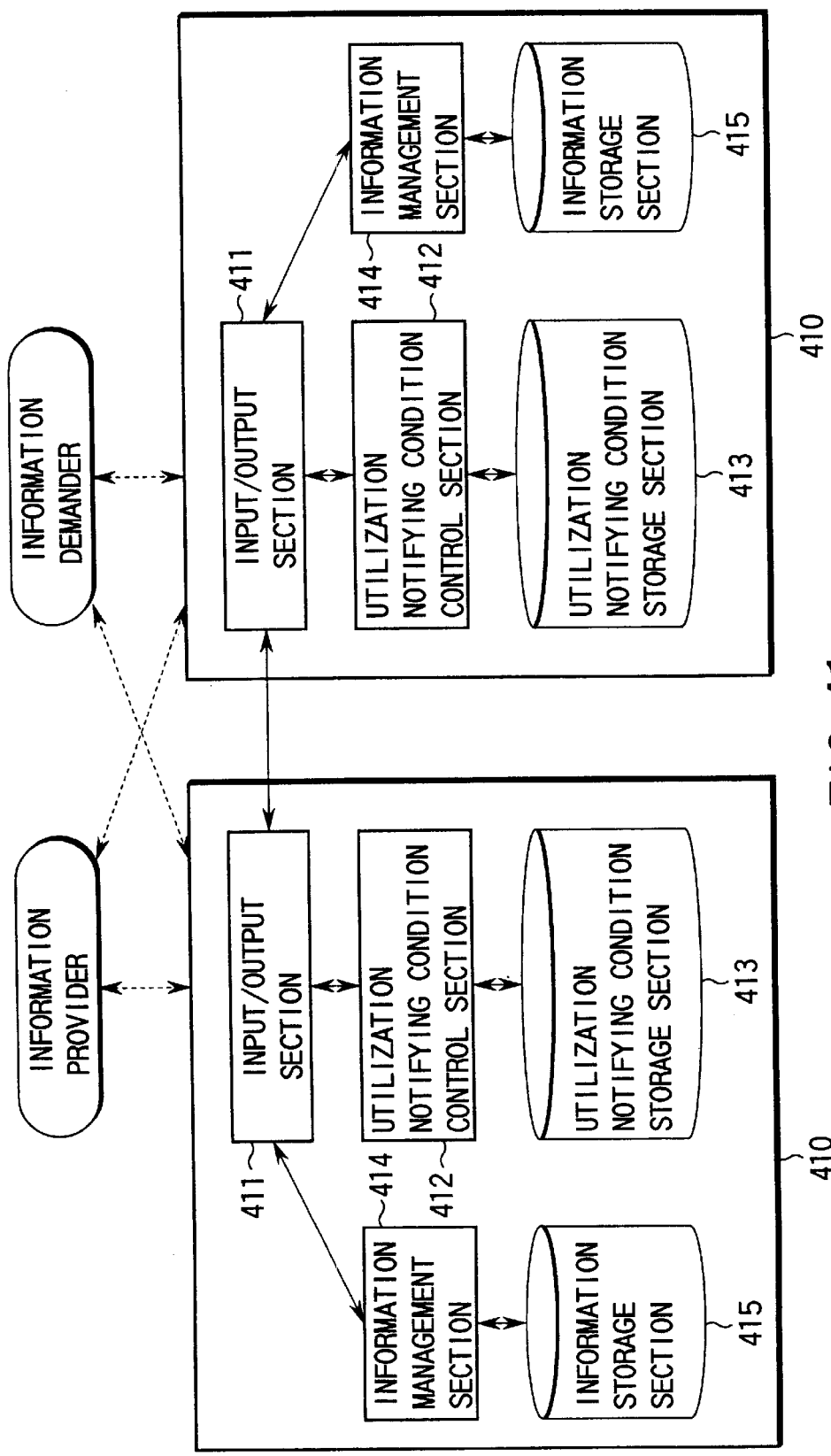
FIG. 41 is a schematic block diagram of a fifth embodiment of information sharing support system according to the invention.

FIG. 41 is a schematic block diagram of the fifth embodiment of information sharing support system according to the invention.

The information sharing support system 410 of FIG. 41 comprises an input/output section 411, a utilization notifying condition control section 412, a utilization notifying condition storage section 413, an information management section 414 and an information storage section 415.

The information storage section 415 stores various pieces of disclosed information and information annexed to the disclosed information. The information management section 414 operates to manage the information stored in the information storage section 415.

The input/output section 411 operates to receive inputs from information referencers directly and/or by way of other systems 410 and also transmit responses to the information referencers. More specifically, the input/output section 411 transmits the request of an information referencer to the information management section 414, which then retrieves appropriate information from the information storage section 415 and presents it to the referencer.

The input/output section 411 also receives personal data on the information referencer and transmits the data to the information storage section 415 by way of the information management section 414.

On the other hand, the utilization notifying condition control section 412 operates to notify the information provider of the fact that the information disclosed by the information provider is utilized by the information referencer each time such an incident occurs. The conditions for the notification and the message to be sent to the information provider are stored in the utilization notifying condition storage section 413.

Thus, the utilization notifying condition management section 412 prepares and edits the utilization notifying conditions and stores them in the utilization notifying condition storage section 413. Additionally, it retrieves the utilization notifying conditions and transmits them to the input/output section 411.

While the information sharing support system 410 illustrated in FIG. 41 can be linked to a plurality of similar systems by way of a network, it may also be used as a stand-alone system (as will be described hereinafter).

Figure 42:
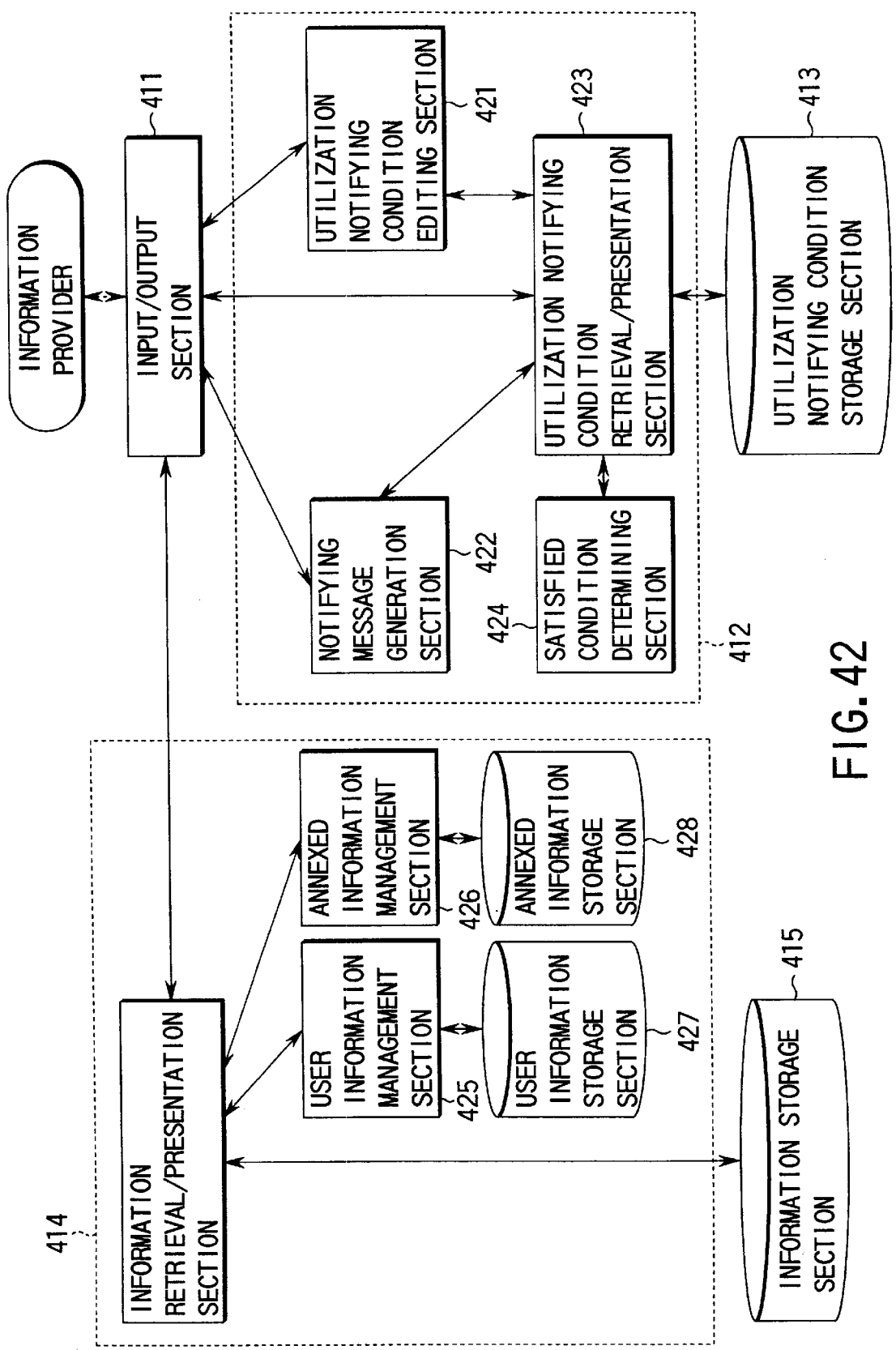
FIG. 42 is a block diagram illustrating the information sharing support system of FIG. 28 in greater detail.

FIG. 42 is a block diagram that illustrates the system 410 in greater detail.

The information management section 414 comprises a user information storage section 427 for storing user information including information on the information referencers and the information disclosers, a user information management section 425 for carrying out operations of retrieving, presenting, adding and editing user information for the user information stored in the user information storage section 427, an annexed information storage section 428 for storing information including the information on the information providers, the information retrieving keywords and the scope of disclosure (scope of information demanders to which information is disclosed) to be annexed to the information stored in the information storage section 415 and an annexed information management section 426 for carrying out operations of retrieving, presenting, adding and editing annexed information for the annexed information stored in the annexed information storage section 428.

On the other hand, the utilization notifying condition control section 412 comprises a utilization notifying condition retrieval/presentation section 423 for carrying out operations of retrieving, presenting and adding utilization notifying conditions for the utilization notifying conditions stored in the utilization notifying condition storage section 413, a utilization notifying condition editing section for editing the utilization notifying conditions stored in the utilization notifying condition storage section 413 by way of the utilization notifying condition retrieval/presentation section 423, satisfied condition determining section 424 for determining if the utilization notifying conditions are satisfied or not and a notifying message generation section 422 for generating a notifying message to be sent when the notifying conditions are met.

Figure 43:
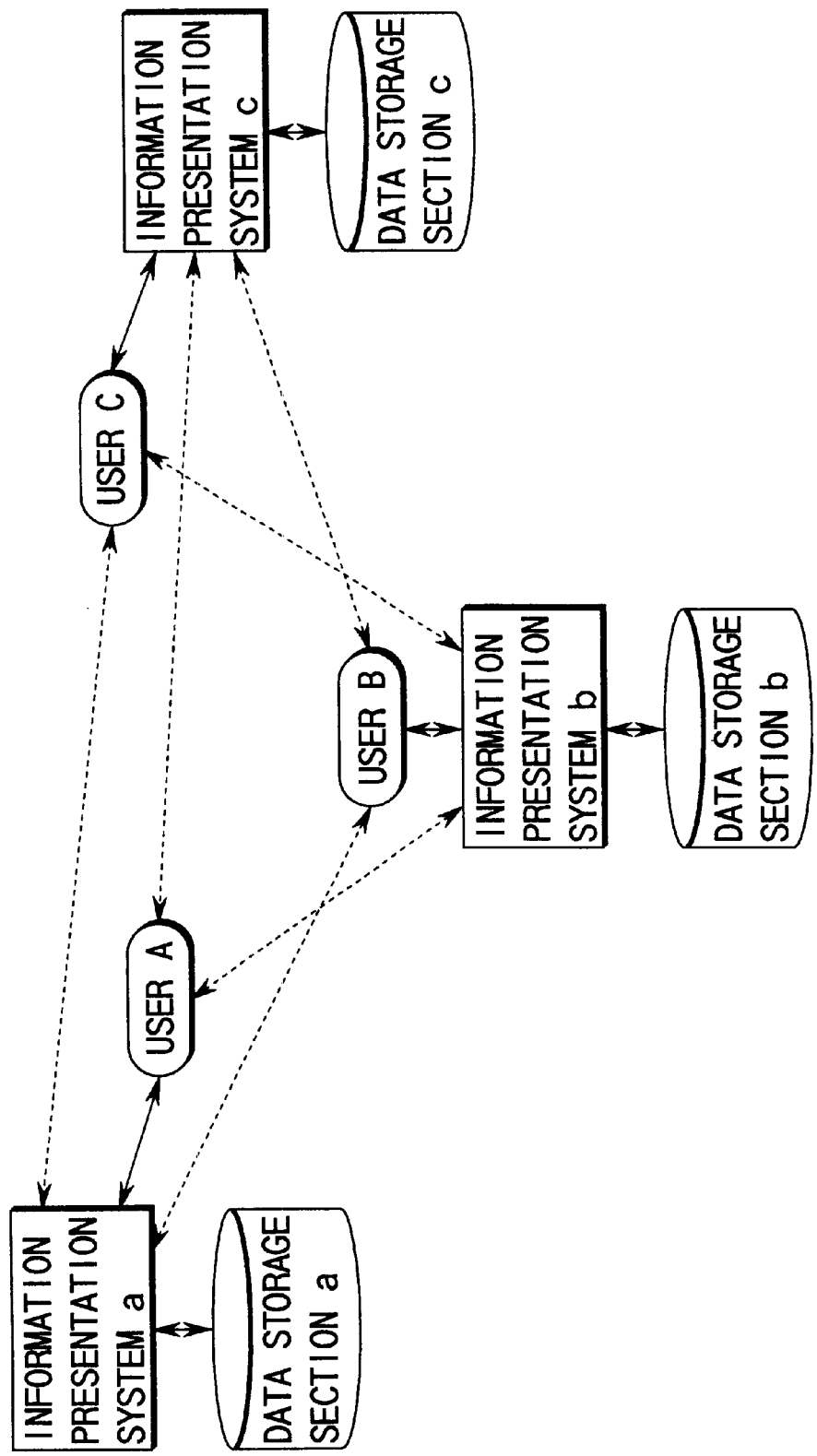
FIG. 43 is a chart illustrating how data flow among a plurality of information sharing support systems.

FIG. 43 is a chart illustrating how data flow among a plurality of users having respective information sharing support systems 410. Referring to FIG. 43, the information sharing support systems a, b and c can retrieve disclosed information from any of the data storage section a of user A, the data storage section b of user B and the data storage section c of user C and present the retrieved information to the information referencer.

Note that each of the data storage section a through c comprises an information storage section 415 and a utilization notifying condition storage section 413 as shown in FIG. 41.

Referring to FIG. 43, the user A can request the user B to present information stored in the data storage section b of the information sharing support system b by way of the information presentation system b. Additionally, the user A can register and store the presented information in the user A's own information sharing support system a. Similarly, the user C can request the information sharing support systems a and b to present information stored in the data storage sections a and b.

Figure 44:
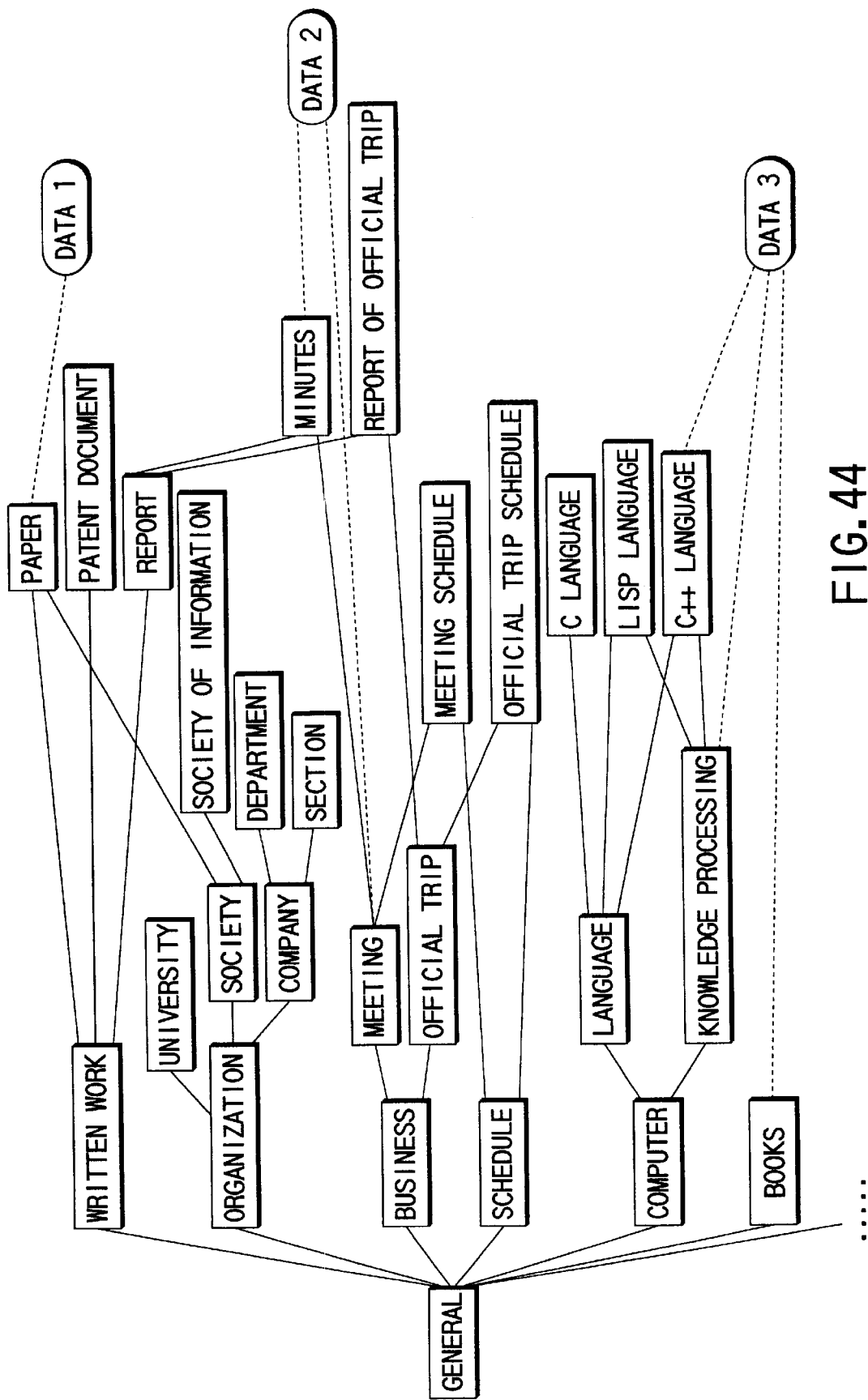
FIG. 44 is a chart of ramified retrieving keywords that can be stored in the information storage section.

FIG. 44 is a chart of ramified retrieving keywords that may be added to the annexed information stored in the annexed information storage section 428. Referring to FIG. 44, the retrieving keywords including "written work", "organization" and "meeting" are hierarchically arranged according to their upper-lower semantic relationships. In FIG. 44, upper and general retrieving keywords are arranged to the left, whereas lower and specific retrieving keywords are arranged to the right.

Each piece of disclosed information is provided with one or more than one retrieving keywords. For example, "data 2" in FIG. 43 is accompanied by retrieving keywords of "minutes" and "meeting".

FIGS. 45A through 45C show examples of retrieving keywords that can be selected from the ramified structure of retrieving keywords and related information. For example, in FIG. 45A, retrieving keyword "written work" has keyword "general" as "upper keyword" and "paper", "patent document" and "report" as "lower keywords". The item of "synonym" contains one or more than one words that can be used as synonyms for the keyword. For example, "synonyms" of retrieving keyword "written work" include "documents", "paper" and "data". The annexed information management section 426 can locate the information requested by the information demander by section of these keywords.

Figure 46:
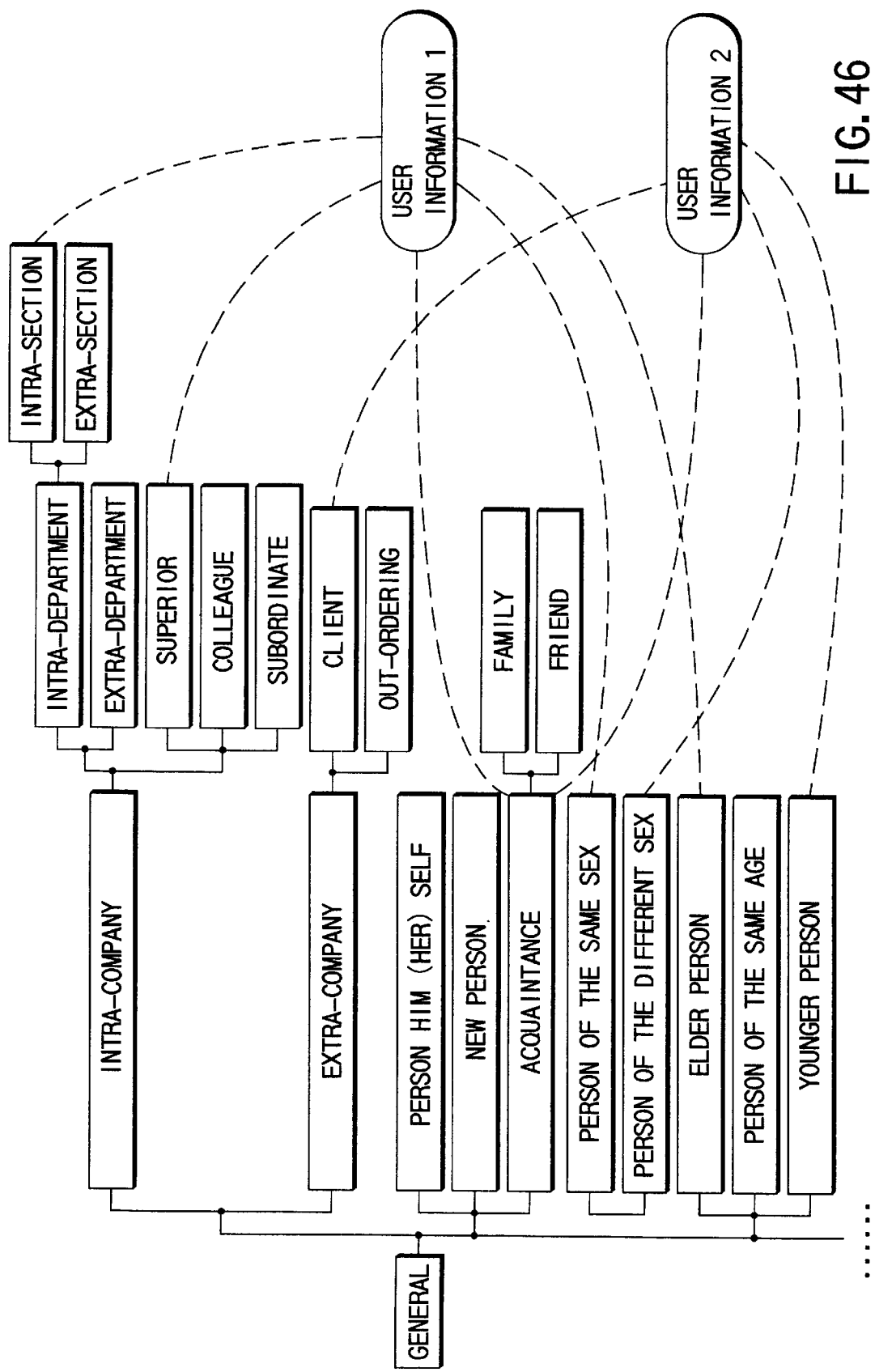
FIG. 46 is a structured list of personal categories that can be stored in the user information storage section.

FIG. 46 is a structured list of personal categories that can be stored in the user information storage section 427 for information providers and potential information demanders. Referring to FIG. 46, personal categories such as "intra-company", "extra-company" and "intra-section" are arranged into a ramified hierarchical structure by their general-specific semantic relationship. In FIG. 46, upper and general categories are arranged to the left, whereas lower and specific categories are arranged to the right.

Specific individual pieces of user information are classified and made to belong to one or more than one semantic categories (as indicated by dotted lines). Thus, the user information of each user contains information on the personal classification of the user. For example, "user information 1" contains information relating to personal categories "intra-section", "superior", "acquaintance", "person of the same sex" and "elder person".

FIGS. 47A through 47C show exemplary personal categories in the hierarchical structure of FIG. 46. For example, FIG. 47B shows "name", "address", "sex", "date of birth", "assignment", "position", "personnel ID number" and "extension" as common attributes of personal category "intra-company", which are correlated by the upper-lower relationship of personal categories.

FIG. 48 shows exemplary pieces of annexed information that can be stored in the annexed information storage section 428. Annexed information contains attributes 481. The attributes 481 may include the "provider" of the information, the "utilization notifying conditions" of the information, the "reference information" indicating the source information, if any, from which the annexed information is produced, the "retrieval key" indicating the relationship between the information and the retrieving keyword (s) as shown in FIG. 44, the "information name" given to the information, the "contents" showing the contents of the information, the "file name" referring to the file name in the information storage section 415 that corresponds to the annexed information, the "scope of disclosure" indicating the scope of users to which the information can be disclosed and the "referencer list" for controlling the names of the users, if any, to whom the information has been disclosed.

FIG. 49 shows an exemplary list of utilization notifying conditions stored in the utilization notifying condition storage section 413. "Utilization notifying conditions" refer to the conditions under which the provider of the disclosed information is notified of when it is utilized in a predetermined format. The utilization notifying conditions are provided with certain attributes 491, which may include the "annexed information name" referring to the annexed information to which the utilization notifying conditions relate, the "notifiee" who is to be notified of the fact, if any, that the information is utilized, the "notifying conditions" under which the notification is made, the "method of notification" indicating how the notification is made and the "time limit of notification" for notifying the fact, if any, that the information is utilized.

FIG. 50 is a chart illustrating utilization notifying conditions in terms of their attributes.

Referring to FIG. 50, the item of notifying condition "registration" describes the method of determining if the information provider (discloser) should be notified of the fact that the disclosed information was registered in some other system or not.

The item of notifying condition "editing" describes the method of determining if the information provider (discloser) should be notified of the fact that the disclosed information was edited by some other system or not. Specifically, the information provider will be notified when any difference is found between the original information and the edited outcome.

The item of notifying condition "access" describes the method of determining if the information provider (discloser) should be notified of the fact that the disclosed information was accessed by a third person or not. Specifically, the information provider will be notified when the information is presented to some other information sharing support system.

The item of notifying condition "comment" described the method of determining if the information provider (discloser) should be notified of the fact that some other person added a comment to the disclosed information or not.

It will be understood that the above notifying conditions are shown only as examples and there may be many other conditions that should be defined under certain circumstances.

FIGS. 51A through 51C show respectively exemplary annexed information, an exemplary utilization notifying condition and exemplary disclosed information.

Reference numeral 510 (FIG. 51B) shows document information that may be disclosed and stored in the information storage section 415. The information is managed under the file name of "takagi/refs/papers/data1. doc".

Reference numeral 511 (FIG. 51A) shows the annexed information that corresponds to the document information 510. In this example, the "information name" of information 511 is "intra-company report retrieval result" and the "contents" refer to "report on document DB retrieval system". The "retrieval keys" are "document", "retrieval", "data base", "report" and "research" and there is no "reference information". The "scope of disclosure" is "intra-section" and the "referencer list" includes "(Fumio Ohta, Susumu Inada)". The "utilization notifying condition" is related to "notifying conditions 1".

Reference numeral 512 (FIG. 51C) denotes the "notifying conditions 1". In this example, the utilization notifying condition "notifiee" relating to the annexed information 511 is "Ichiro Takagi" who is the provider of the disclosed information and the "notifying conditions" include "registration", whereas the "method of notification" is "window" and the "time limit of notification" is "none". Thus, a user who accessed the disclosed information 510 and registered it in his or her own information sharing support system should notify "Ichiro Takagi" of the fact by displaying the fact on the "window" of "Ichiro Takagi"'s terminal.

FIGS. 52A through 52D show examples of user information. User information include data describing the personal category of the information demander or the information provider, whichever appropriate, and the annexed information of the user. For example, the user information of "Ichiro Takagi" shown in FIG. 52A includes the "person category" of "person himself" indicating that Ichiro Takagi is the manager and the information provider of the information sharing support system in question. The annexed user information includes the "address", the "date of birth" and the "assignment" of the user himself.

The user information of "Kyoko Yamada" (FIG. 52B) includes the "person category" of "friend", "subordinate", "younger" and "different sex" relative to the "person himself" of "Ichiro Takagi", whereas the user information of "Noboru Takenaka" (FIG. 52C) includes the "person category" of "superior" relative to the "person himself" of "Ichiro Takagi".

The user information of "? Goto" (FIG. 52D) includes the "person category" of "acquaintance" but some of the attributes including "address" are unknown because he is an "extra-company" person.

Figure 53:
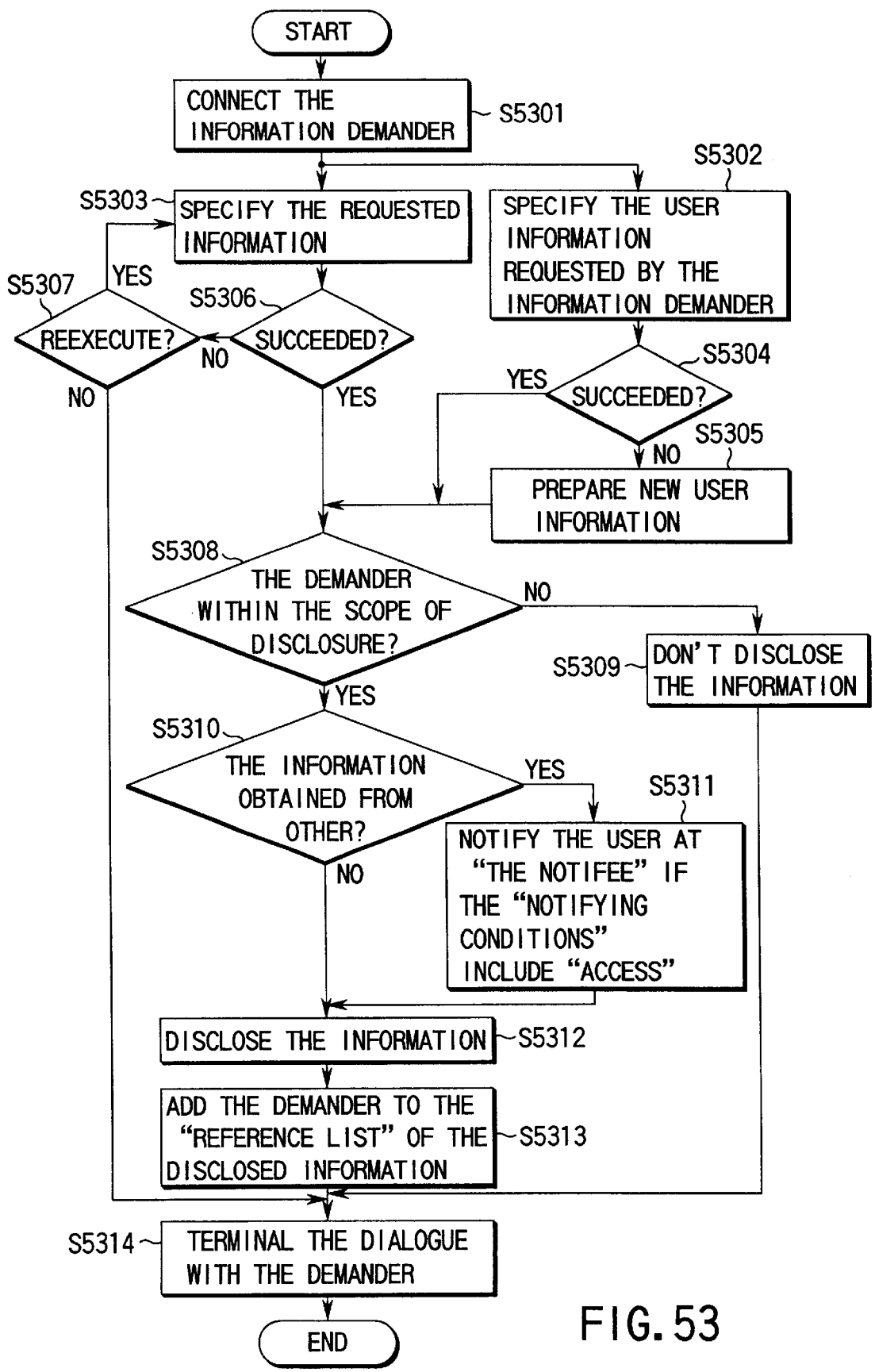
FIG. 53 is a flow chart for a processing operation for information retrieval/presentation in the information sharing support system of FIG. 28.

FIG. 53 is a flow chart for a processing operation for information retrieval/presentation in the information sharing support system.

The user who requests the presentation of information to this information sharing support system will be referred to as information demander hereinafter.

As the information sharing support system is connected to the information demander (Step S5301), it starts storing the response records. Then, the information sharing support system specifies the user information of the information demander (Step S5302) and the requested information (Step S5303).

More specifically, the user information is specified by the user information management section 425. If the user information storage section 427 has not information on the information demander, the system regards the information demander as new person and prepares new user information (Steps S5304 and S5305).

The requested disclosed information is specified by the annexed information management section 425. If it cannot specify the retrieving keyword(s) for the requested information, it may have a dialogue with the information demander to specify the requested information (Step S5306 and S5307). If it cannot specify the requested information after having a predetermined number of dialogues, it operates for an error and terminates the processing operation (Step S5306, S5307 and S5314).

If the system succeeded in specifying the user information and the annexed information of the information requested by the information demander, it then checks if the annexed information can be disclosed to the information demander.

More specifically, it firstly refers to the value of the attribute "scope of disclosure" of the annexed information relating to the requested disclosed information to determine if the information demander is found within the scope as defined by the attribute "scope of disclosure" (Step S5308). If the information demander is not within the scope of disclosure, the requested information will not be disclosed to the information demander (Step S5309). If, on the other hand, the information demander is found within the scope of disclosure, it checks the attribute "provider" of the annexed information to determine if the information is acquired from the information sharing support system of some other user or not (Step S5310).

If it is determined that the information is acquired from the information sharing support system of some other user, it then checks the attribute "notifying conditions" of the utilization notifying condition relating to the information and the annexed information. If the detected value represents "access", it notifies the user defined by the attribute "notifiee" of the fact that the information has been accessed (Step S5311).

Then, the information sharing support system discloses the information to the information demander (Step S5312). It also adds the name of the information demander to the attribute "referencer list" of the disclosed information (Step S5313) and then terminates the dialogue with the information demander (Step S5314).

Figure 54:
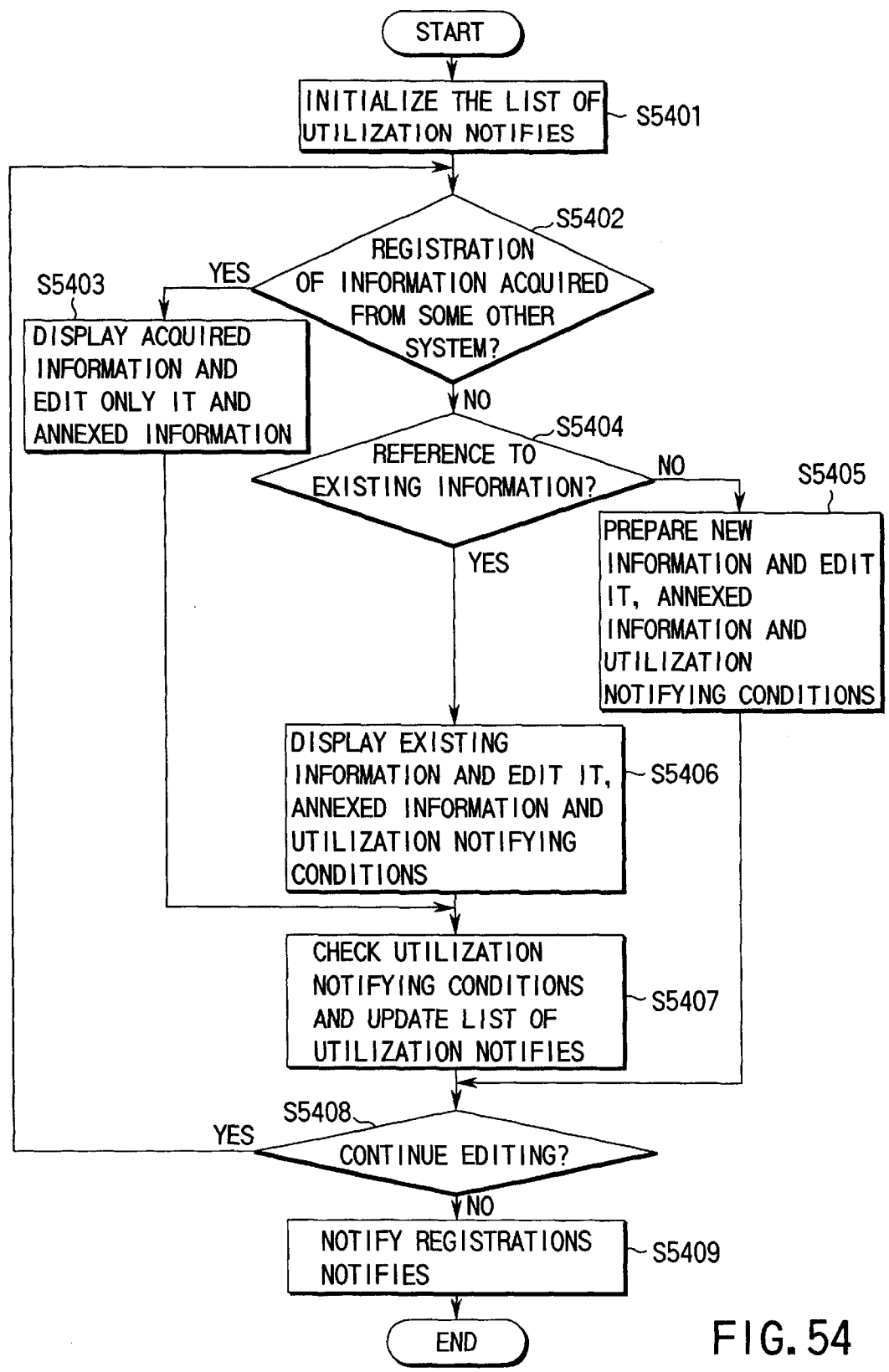
FIG. 54 is a flow chart for a processing operation of information registration/addition/edition in the information sharing support system of FIG. 28.

FIG. 54 shows a flow chart for a processing operation of information registration/addition/edition in the information sharing support system.

The user can register the disclosed information acquired from the other information sharing support system in his or her own information sharing support system and generates new information by editing the acquired information. Then, once the user registers the information in his or her own information sharing support system, the user who owns the information sharing support system will also be referred to as information provider.

Firstly, the information sharing support system initializes the list of users who are notifiees to whom the outcome of the operation of registration/addition/edition for the information and the contents of information are to be notified (Step S5401).

Then, the information sharing support system checks if the operation by the information provider is registration of the information acquired from some other information sharing support system or not (Step S5402). If it is acquired from some other information sharing support system, it permits only editing the information relating to the acquired information and the information in question and does not permit editing the utilization notifying conditions (Step S5403).

If, on the other hand, the operation is not registration of the acquired information, it checks if it is for the information that has been registered in the information sharing support system or not (Step S5404).

If the operation is found to be for unregistered or new information, it calls the new information registration section and prompts it to generate new information. When generating new information, the information provider edits the information, the annexed information and the utilization notifying conditions relating to it (Step S5405).

When the information provider edits the information by referencing the information that has been registered in the information sharing support system, he or she also edits both the annexed information and the utilization notifying conditions relating to the information (Step S5406).

Thereafter, the information sharing support system checks if the information provider has edited according to the utilization notifying conditions relating to the information and, if necessary, added the user to be notified and the notification message to the list of the utilization notifiees (Step S5407).

After the completion of the editing operations (Step S5408), the information sharing support system notifies the updated data to the persons requesting information on the utilization by referring to the list of utilization notifiees (Step S5409).

Figure 55:
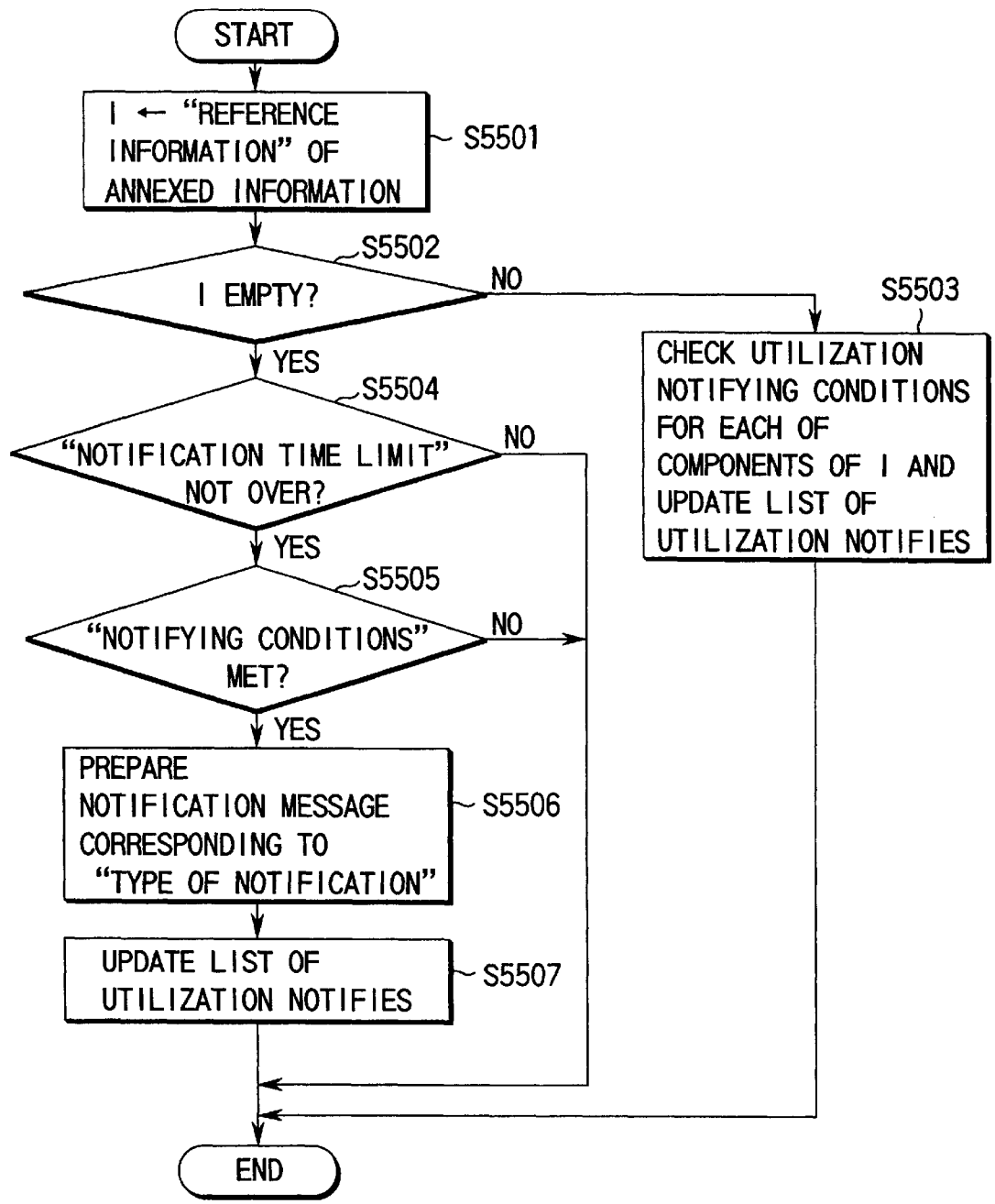
FIG. 55 is a flow chart for a processing operation of the evaluation of utilization notifying conditions in the information sharing support system of FIG. 28.

FIG. 55 is a flow chart for a processing operation for checking the utilization notifying conditions and updating the list of utilization notifiees in the information sharing support system as shown in Step S5407 of FIG. 54.

Firstly, the information sharing support system checks the attribute of "reference information" of the annexed information relating to the information edited by the information provider to determine if the information is prepared by referencing other information (Step S5501 and S5502). If so, it executes the processing operation of FIG. 55 on each of the referenced pieces of information (Step S5503).

If it is found that the information is prepared without referencing other information, the information sharing support system checks if the attribute of "notification time limit" of the utilization notifying conditions relating to the information is over or not (Step S5504). If the "notification time limit" is not over, it checks if the conditions described in the attribute of "notifying conditions" are met by the processing operation executed by the information sharing support system (Step S5505).

If it is found that the "notifying conditions" are met, it refers to the attribute of "type of notification" to prepare a notification message corresponding to the description contained in it (Step S5506).

Then, it refers to the attribute of "notifiees" of the utilization notifying conditions and adds the notifiee and the notification message prepared in Step S5506 to the list of utilization notifiees (Step S5507).

In the above described processing operation, the dialogue between the information demander and the information sharing support system and between the information provider and the information sharing support system may proceed by section of a natural language or a visual interface.

When the disclosed information or the user information is updated, the information sharing support system prompts the information provider to prepare new information or modify the provided information by presenting a visual interface, which will be described in greater detail hereinafter way of examples.

While utilization notifying conditions are related to each piece of information in the above description, they may be made to be related to each information retrieval key when they are stored. If such is the case, the information provide can specify an identical set of utilization notifying conditions to all the pieces of information related to a retrieval key. By such a mode of specification, the information provider can receive all the responses to the information disclosed by him or her if the information provider considers that the field identified by the retrieval key is important to him or her.

Additionally, the utilization notifying conditions relating to a specific retrieval key can be used to represent a default value for a set of utilization notifying conditions when registering new information to make the operation of specifying a set of utilization notifying conditions less cumbersome at the time of registering new information.

Now, the processing operations from FIG. 53 to FIG. 55 will be described further by way of examples.

Referring firstly to the flow chart of FIG. 53, assume that the information sharing support system of the information provider "Ichiro Takagi" shown as information 520 in FIG. 52 is connected to information demander "Hideki Ohmori" with user information as shown in FIG. 56.

Firstly, the information sharing support system specifies the user information of the information demander (Ohmori) (Step S5301).

Then, it specifies the information requested by the information demander through the input operation of the information demander. In this example, the information corresponding to the input retrieval key(s) will be specified. A retrieval key can be selected as input by extracting it from a sentence entered in a natural language or by dialogically prompting the information demander to enter it on the interface having a template format, although any method of acquiring keywords may be used for the purpose of this example.

FIG. 57 shows an exemplary image on the interface window having a template format.

According to the user input on the user interface of FIG. 57, the information sharing support system specifies that the retrieval keys for the information requested by the information demander are "document", "retrieval, "research" and "report". Then, the annexed information management section 426 retrieves the information from the information storage section 415 to specify that the information requested by the information demander is the information described in FIG. 51 (Step S5303).

Then, the information sharing support system checks if the information can be disclosed to the information demander on the basis of the annexed information 511 shown on FIG. 51. As the attribute of "scope of disclosure" in the annexed information 511 refers to "intra-section", the information sharing support system realizes that the information can be disclosed to the "intra-section" members. Then, the system finds out that the information can be disclosed to the information demander by referring to the user information on the FIG. 56 because the demander is found within the scope of "intra-section" (Step S5308).

Additionally, the information sharing support system also finds out that the requested information is not acquired from the information sharing support system of some other person by comparing the attribute of "provider" which is "Ichiro Takagi" as shown in the annexed information 511 and the possessor of the information sharing support system (Step S5310).

Thus, the information sharing support system presents the disclosed information 510 as shown in FIG. 51 to the information demander (Step S5312) and adds the name of "Akio Ohmori" of the information demander to the attribute of "referencer list" of the annexed information 511 (Step S5313).

Figure 58:
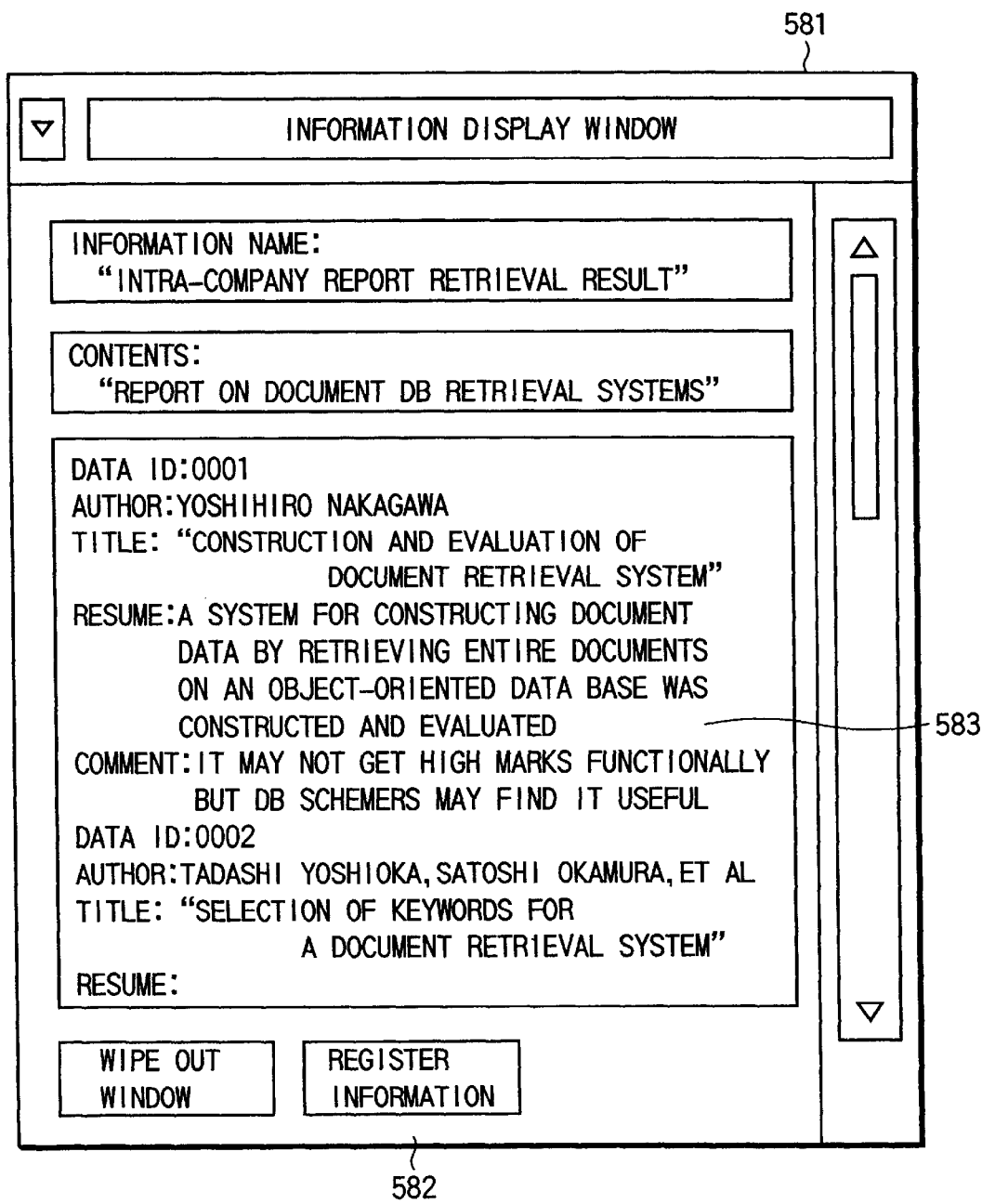
FIG. 58 shows an exemplary image on the information display window.

FIG. 58 shows as an example how the information sharing support system presents the disclosed information to the information demander.

The information display window 581 as shown in FIG. 58 will be displayed on the display screen of the terminal of the information demander "Ohmori". The title and the contents of the information requested by "Ohmori" are shown on the information display section 583 in the information display window. The demander "Ohmori" can register the displayed information as part of the information of his own information sharing support system by operating the information registration button 582.

Now, the information shown in FIG. 58 and provided by "Ichiro Takagi" in FIG. 51 is registered by Ohomori as part of the information in his own information sharing support system. Then, the information sharing support system operate for registration/addition/edition for the information in a manner as will be described below by way of an example and also by referring to FIGS. 54 and 55.

Hereinafter, the information sharing system refers to the information provider Ohmori's information sharing system.

Figure 59:
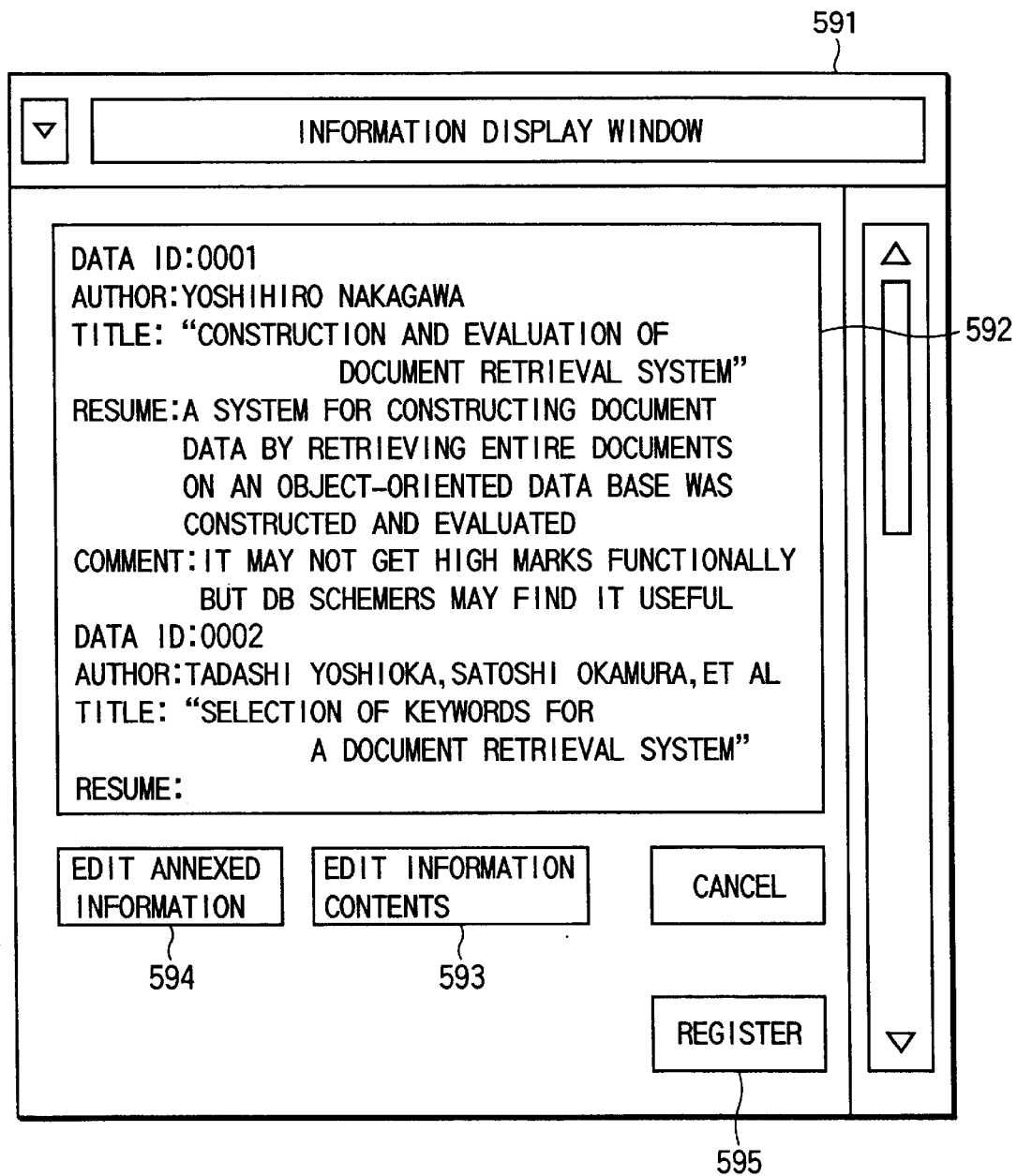
FIG. 59 shows an exemplary image on the information registration window.

FIG. 59 shows an exemplary image that may appear on the interface window displayed to the information demander for registration of information when the information registration button 582 is operated on the information display window 581 of FIG. 58.

Firstly, the information sharing support system initializes the list of users who are notifiees to whom the outcome of the operation of edition for the information and the contents of the information are to be notified (Step S5401).

FIG. 60 shows an exemplary structure of the list of registration notifiees.

With the example of FIG. 59, the information that the information provider is going to register is acquired from some other person (Takagi) and, therefore, the information sharing support system displays the information and permits only the operation of editing the information and the annexed information (Steps S5402 and S5403). Thus, only the contents of the information 592, the information editing button 593 and the annexed information editing button 594 are displayed on the information registration window 591 of FIG. 59. Then, the information provider can edit the contents of the information and that of the annexed information by operating the information editing button 593 and the annexed information editing button 594 respectively.

FIG. 61 shows an exemplary image that can be displayed on the annexed information editing window 611 for editing the annexed information when the annexed information editing button 594 is operated. The attribute(s) necessary for the editing operation are copied from the attributes of the annexed information 511 displayed by Takagi's information sharing support system as shown in FIG. 51 and displayed on the window. The attribute of "utilization notifying conditions" is obtained by copying the related utilization notifying conditions shown in FIG. 51.

Then, the information provider can edit the attributes of the annexed information on the annexed information editing window 611 but cannot alter the "information provider" nor the "utilization notifying conditions". If the information provider tries to do so, the information sharing support system give warning and tells the demander that he or she cannot alter either of them.

Figure 62:
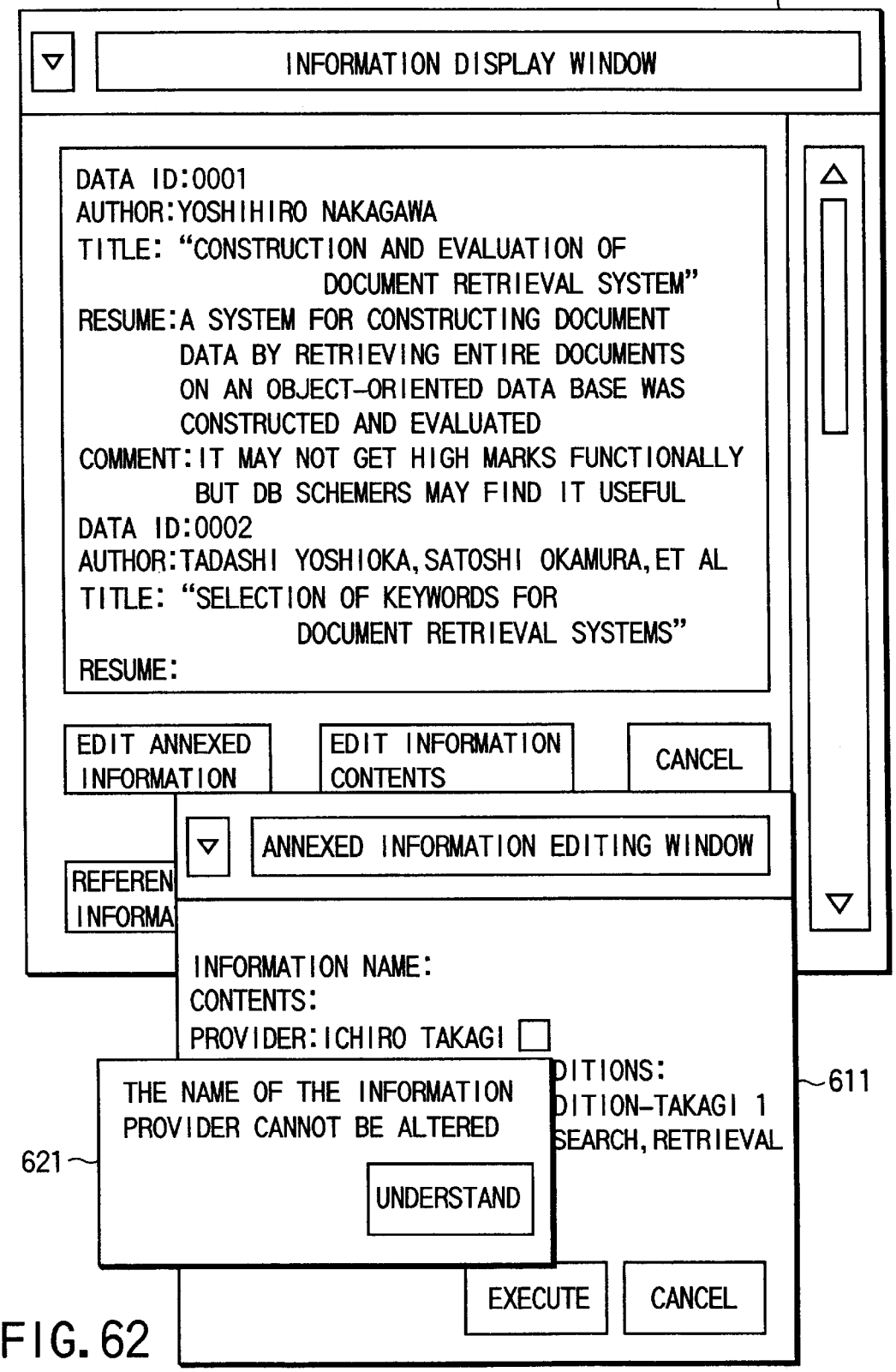
FIG. 62 shows an exemplary image that can be displayed for warning to an attempt to alter the name of an information provider on the annexed editing window of FIG. 48.

In FIG. 62, reference numeral 621 denotes a warning that the information sharing support system can issue.

In FIG. 59, as the provider operate the registration button 595, the edited information is registered in "Ohmori"'s information sharing support system.

FIGS. 63A through 63C show that the disclosed information, the annexed information and the utilization notifying conditions illustrated in FIGS. 51A through 51C are now registered in "Ohmori"'s information sharing support system.

Referring to FIG. 63A, the utilization notifying conditions 631 are obtained as the utilization notifying conditions 512 of FIG. 51 are automatically copied. The title of utilization notifying conditions ("notifying condition Takagi-1" in this example) is automatically added by "Ohmori"'s information sharing support system as an identifiable string of characters.

As the information is registered, the information sharing support system checks if the utilization notifying conditions for the registered information of FIG. 63A are satisfied or not (Step S5407).

Firstly, it checks the attribute of "notification time limit" and confirms that the attribute is currently effective (Step S5504). Then, it checks if "registration" is valid as "notifying condition" (Step S5505).

This condition is found valid because the information of FIG. 63A has just been registered in the information sharing support system. Thus, the information sharing support system adds an item saying that the "notifiee" "Ichiro Takagi" is notified of the fact that the information has been registered" as it is displayed on the "window" (Steps S5506 and S5507).

As a result, the window shows that the fact the disclosed information has been registered is notified to "Ichiro Takagi"'s information sharing support system.

Figure 64:
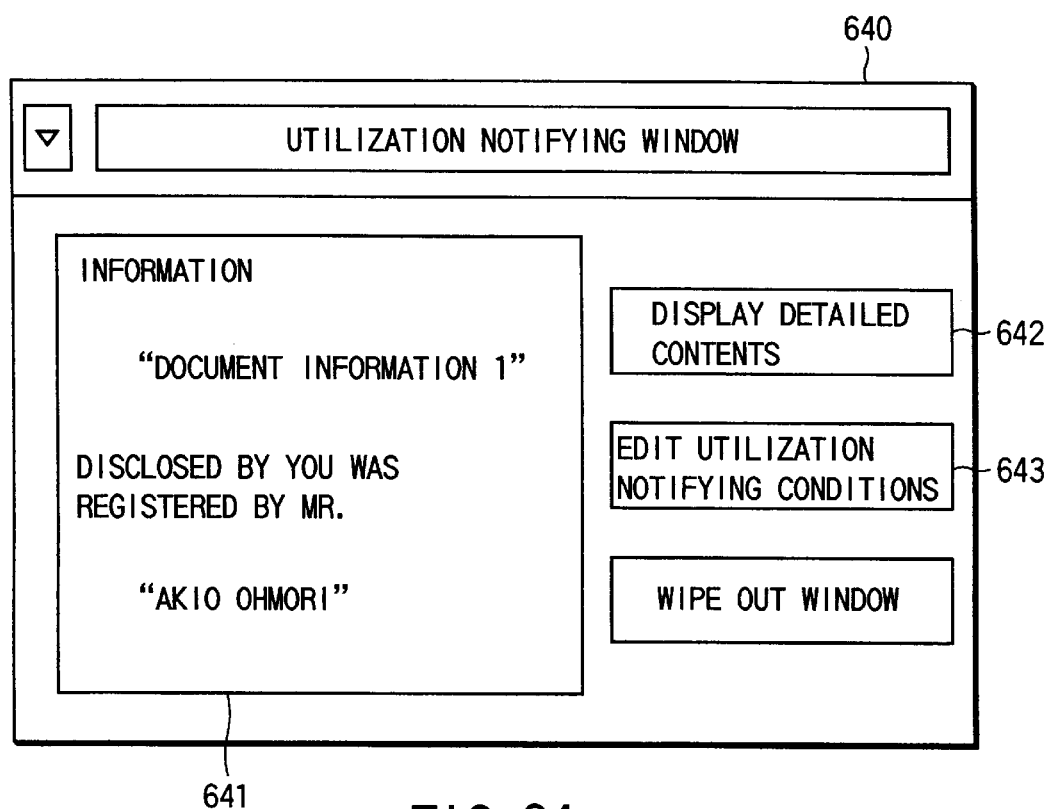
FIG. 64 shows an exemplary image on the utilization notifying window for notifying an information provider of how the disclosed information provided by the information provider has been utilized by other people.

FIG. 64 shows an exemplary image on the utilization notifying window of the information sharing support system of "Ichiro Takagi" who is the provider of the original information (FIG. 51), saying that the information shown in FIGS. 63A through 63C has been registered in user "Ohomori"'s information sharing support system by the user.

The utilization notifying window 640 shows summarized message 641 that the disclosed information has been registered in a user's information sharing support system and the user is "Ohomori", a display button 642 for calling and asking the display section to display the message in greater detail and a utilization notifying condition editing button 643 for calling a section responsible for editing the utilization notifying conditions of the information according to the message.

Figure 65:
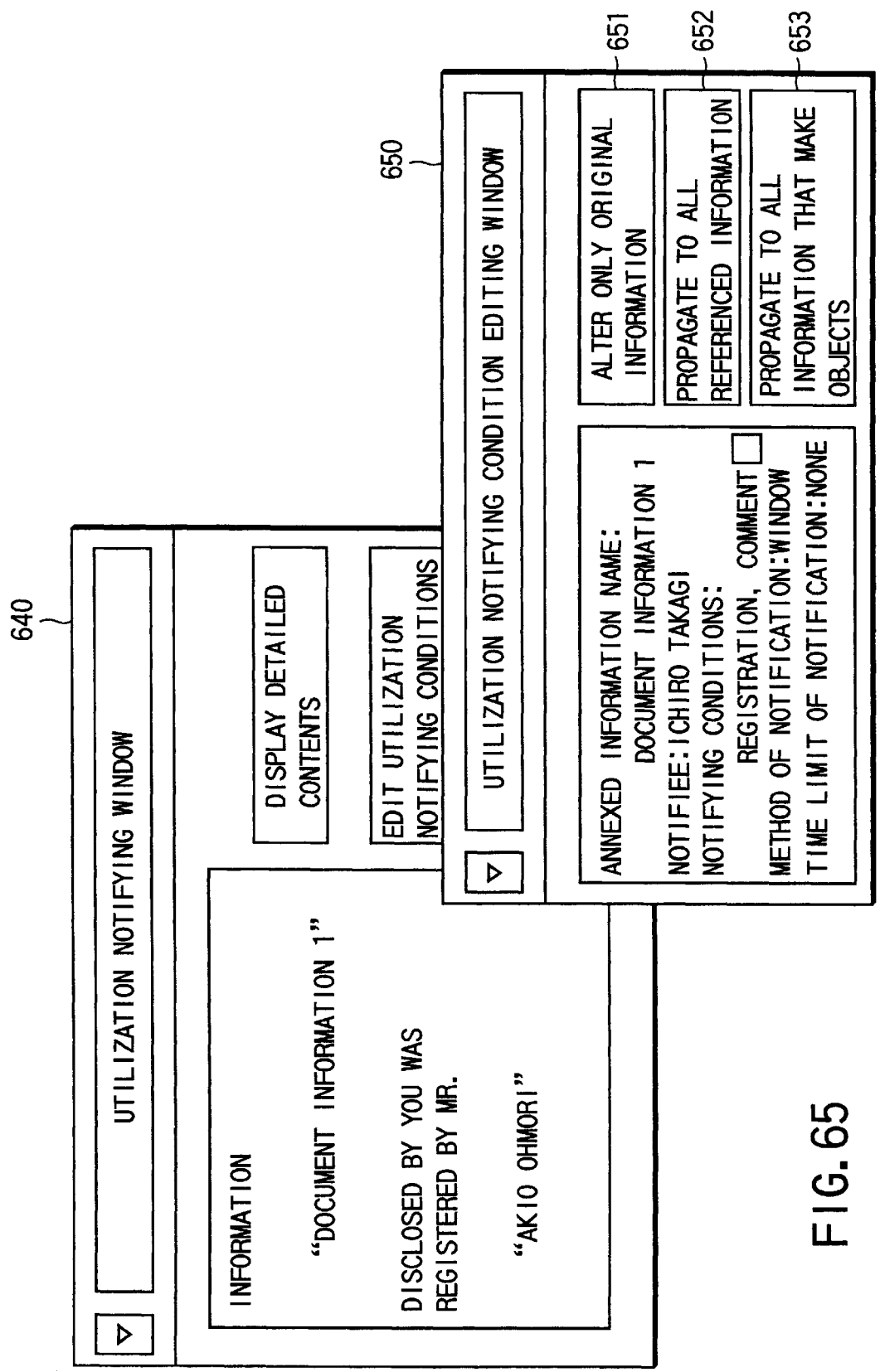
FIG. 65 shows an exemplary image on the editing window for utilization notifying conditions.

FIG. 65 shows an exemplary image on the utilization notifying window that may appear when the utilization notifying condition editing button 643 is operated in FIG. 64. It shows how the utilization notifying conditions will be edited. The information provider can edit on the utilization notifying condition editing window 650 the utilization notifying conditions of the information that has been registered and edited in the information sharing support system of some other user. Additionally, the edited notifying conditions can be propagated to the notified information, which is the information registered by "Ohomori" and shown on FIGS. 63A through 63C in this example, by operating the button 653.

The utilization notifying conditions edited on the utilization notifying condition editing window 650 may be propagated only to the information registered in "Takagi"'s information sharing support system as shown in FIG. 51 or to all the information generated by referencing the information on FIG. 51 by operating the buttons 621 and 652. Thus, the possessor of an information sharing support system can cancel the request for the notification of any information that does not require notification of utilization any more if such information is part of the information sharing support system and change the conditions for notification of utilization and the method of notification.

Figure 66A:
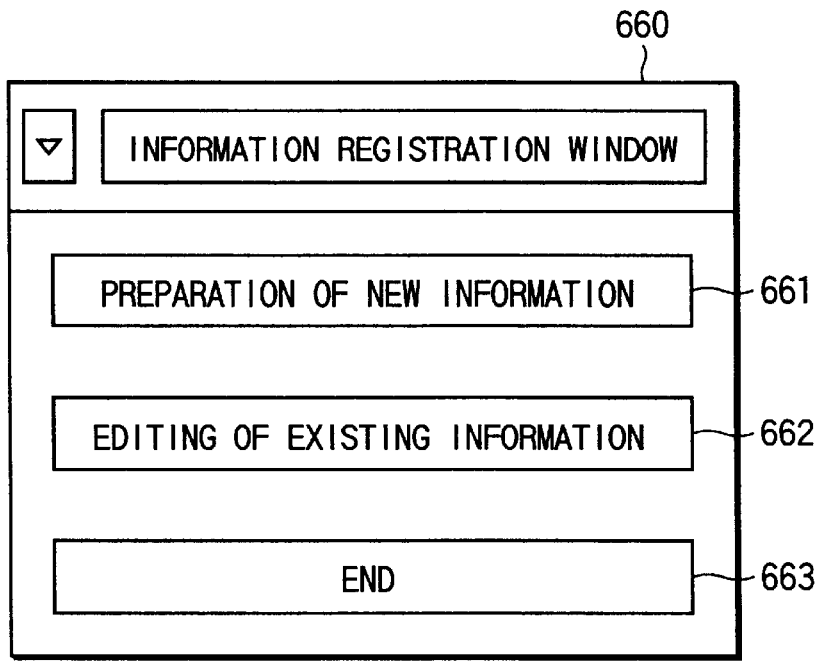
FIGS. 66A and 66B show exemplary images on the information registration window that are displayed initially for an information editing operation.
Figure 66B:
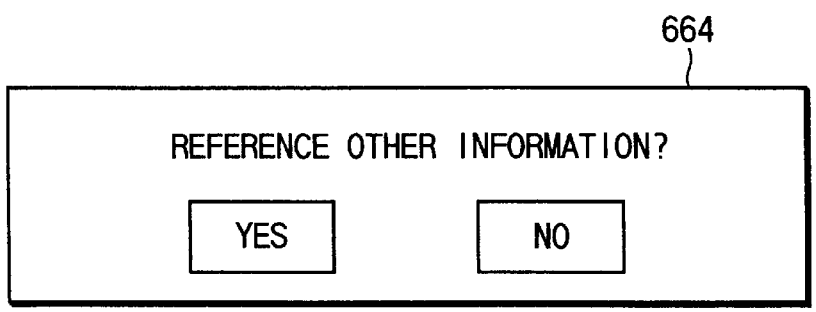

FIGS. 66A and 66B show exemplary images on the information registration window that can be used for adding and/or editing information for the information sharing support system of the information provider.

As the information provider starts adding and/or editing information for his or her information sharing support system, the information registration window 660 as shown in FIG. 63A is displayed on the screen of the provider's terminal. Then, the provider can select either the "preparation of new information" button or the "editing of existing information" button on the information registration window 660.

Now, the processing operation for preparing or editing information by the information provider of the information sharing support system shown in FIG. 54 will be described by referring to the interface windows of FIGS. 66A and 66B.

As the information registration window 660 is displayed, the information sharing support system initializes the list of utilization notifiees (Step S5401).

As the provider operates the "preparation of new information" button 661 on the information registration window 660, the information sharing support system displays window 664 (FIG. 66B) to ask the provider if he or she wants to reference the information already registered in the information sharing support system (Step S5404). If the provider prepare new information without referencing the existing information, the information sharing support system hands over the initiative of editing the utilization notifying conditions after preparing the new information and prompts the provider to edit the information and the annexed information and the utilization notifying conditions relating to the information.

Figure 67:
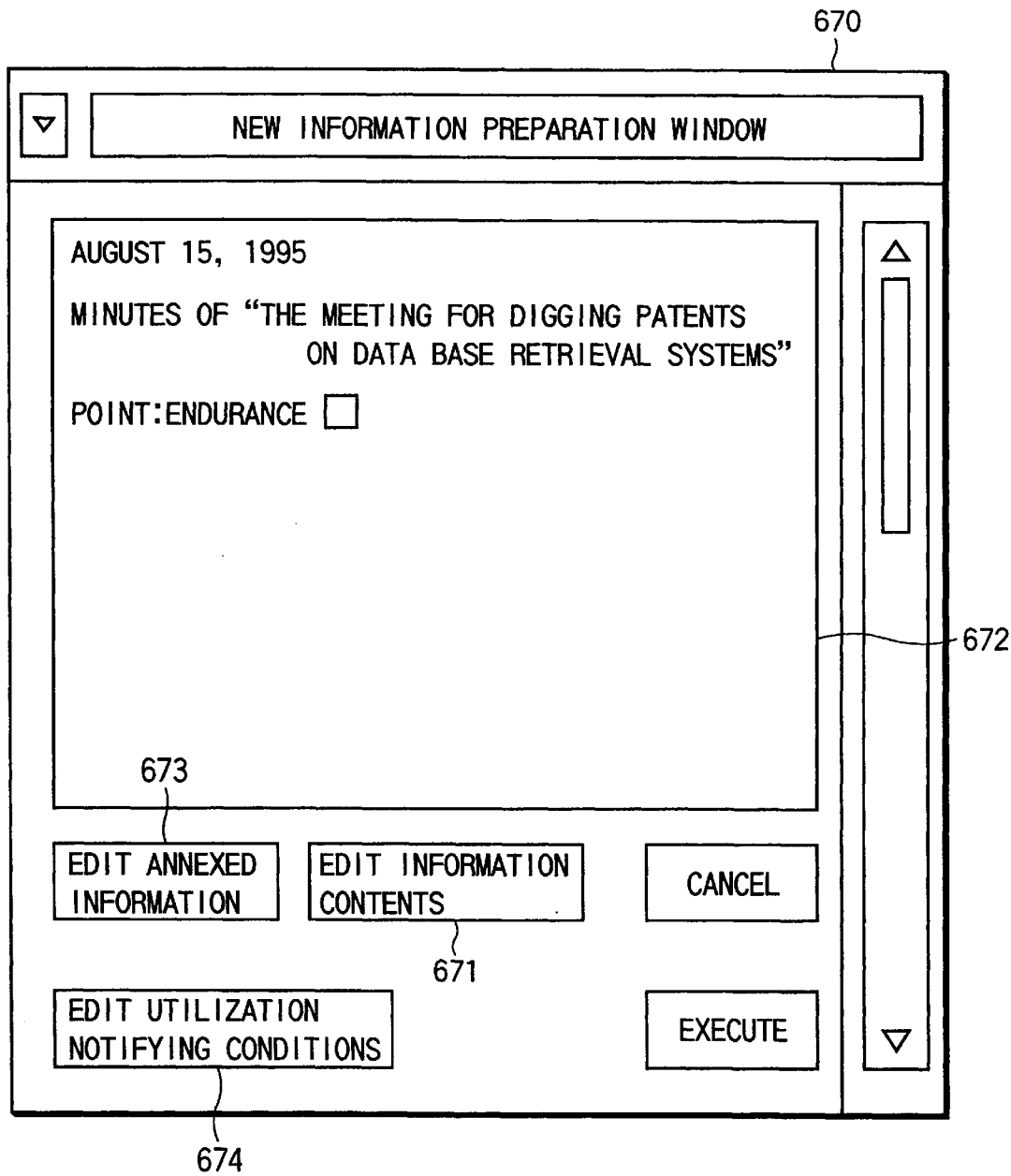
FIG. 67 shows an exemplary image on the new information preparation window.

FIG. 67 shows an exemplary image that can be displayed on the new information preparation window 670. The information provider can edit the information on the information display window 672 by operating the "edit information contents" button 661. It will be appreciated that the image shown in FIG. 67 section that a piece of information is being edited on the information display window 672. The provider can also prepare and edit the annexed information and the utilization notifying conditions by operating the "edit the annexed information" button 673 and the "edit utilization notifying conditions" button 674.

Figure 68:
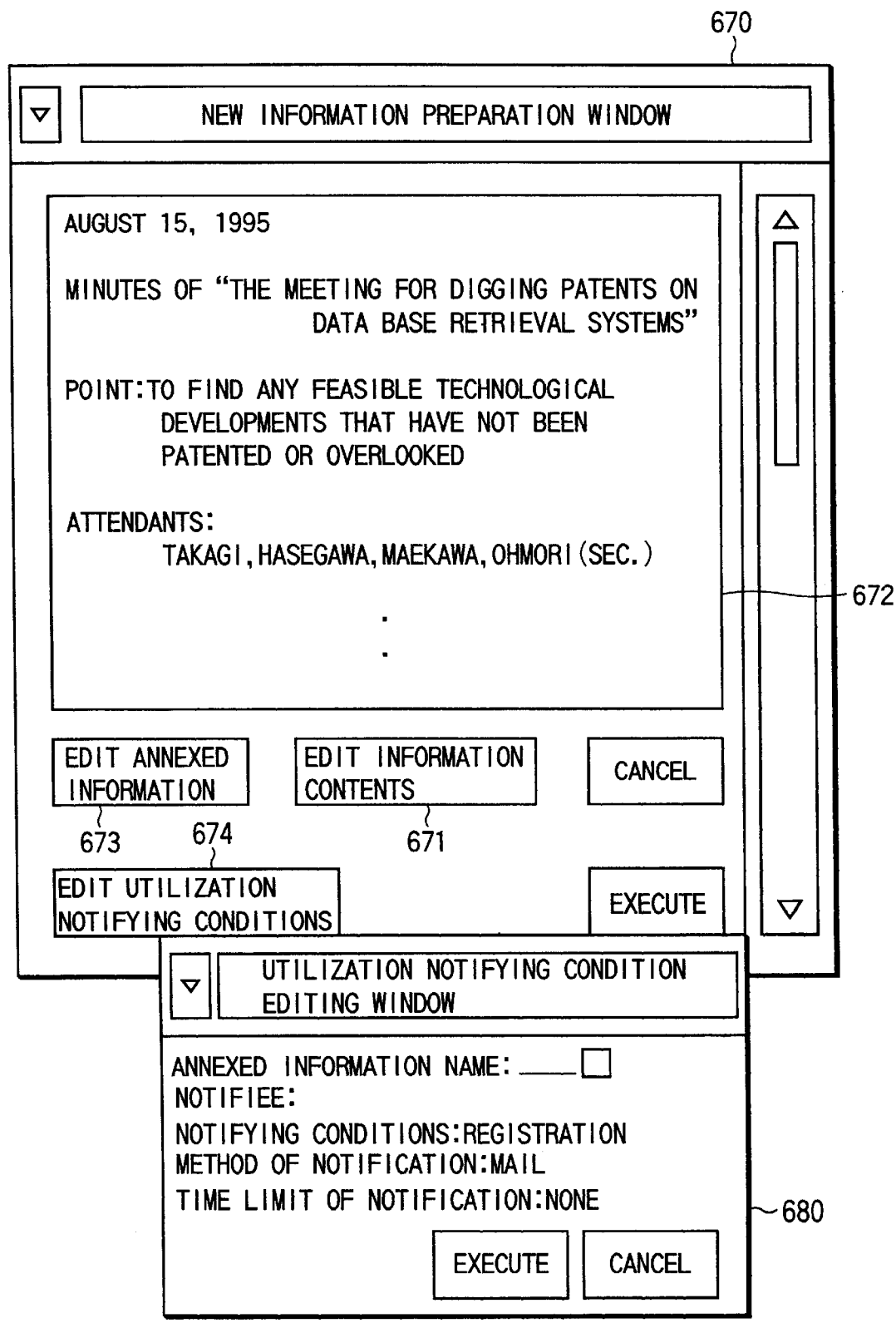
FIG. 68 shows an exemplary image on the utilization notifying conditions editing window for a new information preparing operation.

FIG. 68 shows an image that can be displayed on the screen when the "edit utilization notifying conditions" button 674 in FIG. 67 is operated. Then, a utilization notifying condition editing window 680 is displayed so that the provider can edit the utilization notifying conditions on the window 680.

If the provider operates the "preparation of new information" button 661 on the information registration window 660 of FIG. 66A and then the "yes" button for referencing other information on the window 664 or the "editing of existing information" button 662 on the information registration window 660, the information sharing support system displays an image for information retrieval and prompts the provider to select the information to be referenced.

Figure 69:
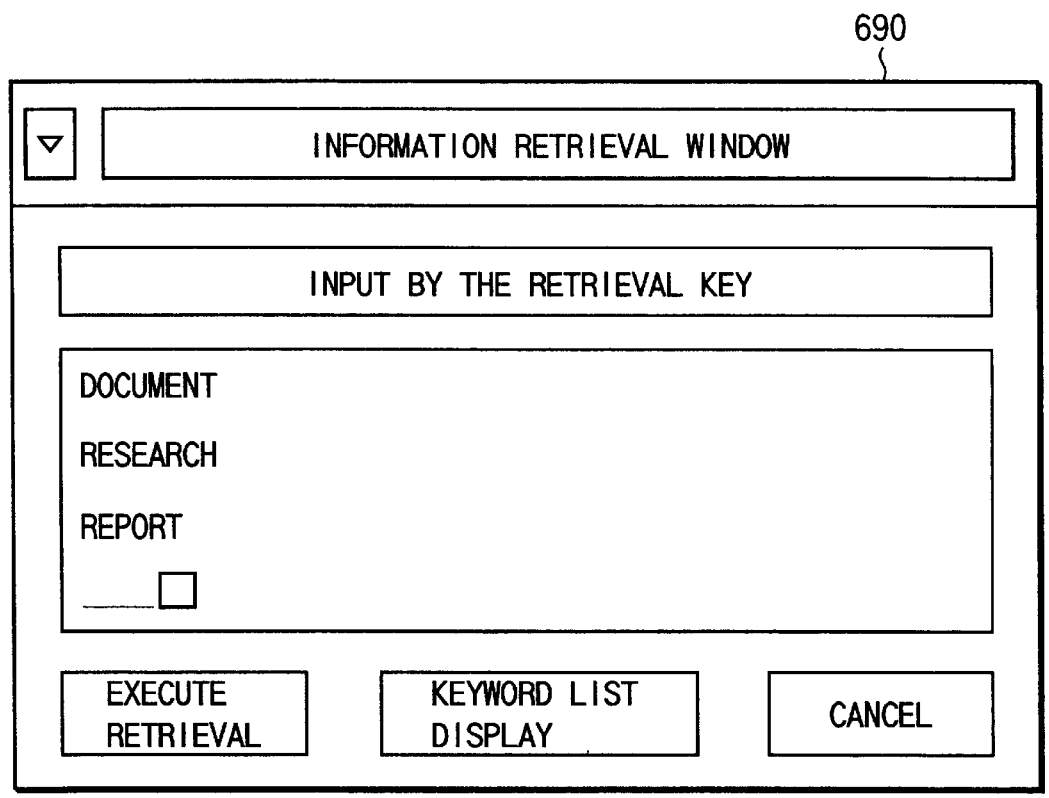
FIG. 69 shows an exemplary image on the information retrieval window for retrieving referenced information when editing existing information.

FIG. 69 shows an exemplary image on the information retrieval window that can be displayed to the information provider of the information sharing support system to select the information to be referenced. As the provider decide the information to be referenced by operating on the information retrieval window 690 of FIG. 69, the information sharing support system displays the selected information and then an image adapted to edit the information, the annexed information and the utilization notifying conditions (Step S5406).

Figure 70:
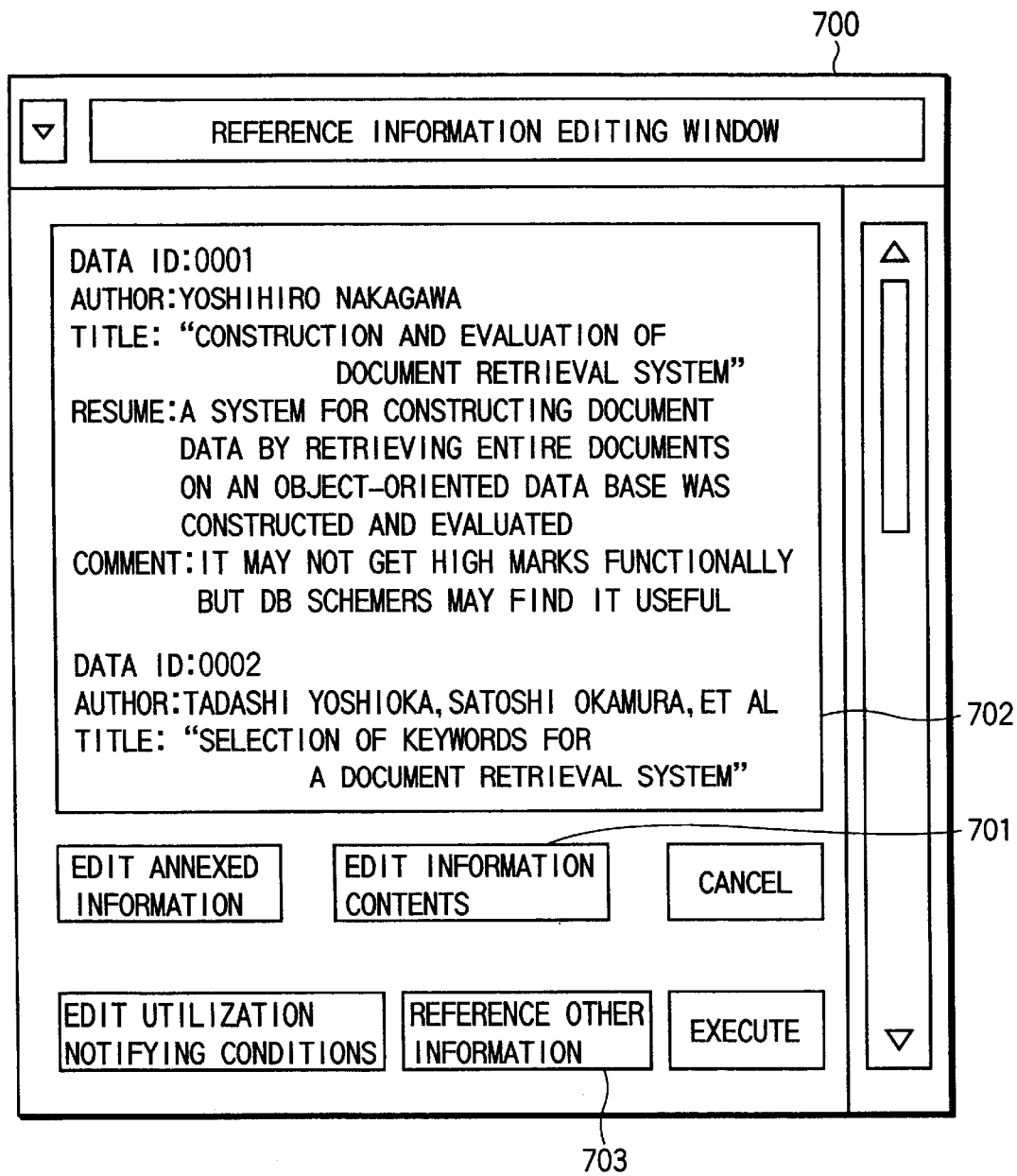
FIG. 70 shows an exemplary image on the referenced information editing window displayed when editing existing information.

FIG. 70 shows an exemplary image that can be displayed for editing the information registered in the information sharing support system.

The information provider can edit some of the information on the information display window 702 by operating the "edit information contents" button 701. Furthermore, he or she can display some other piece of information from the disclosed information to combine it with the information on the information display window 702 and register the combined information.

Figure 72:
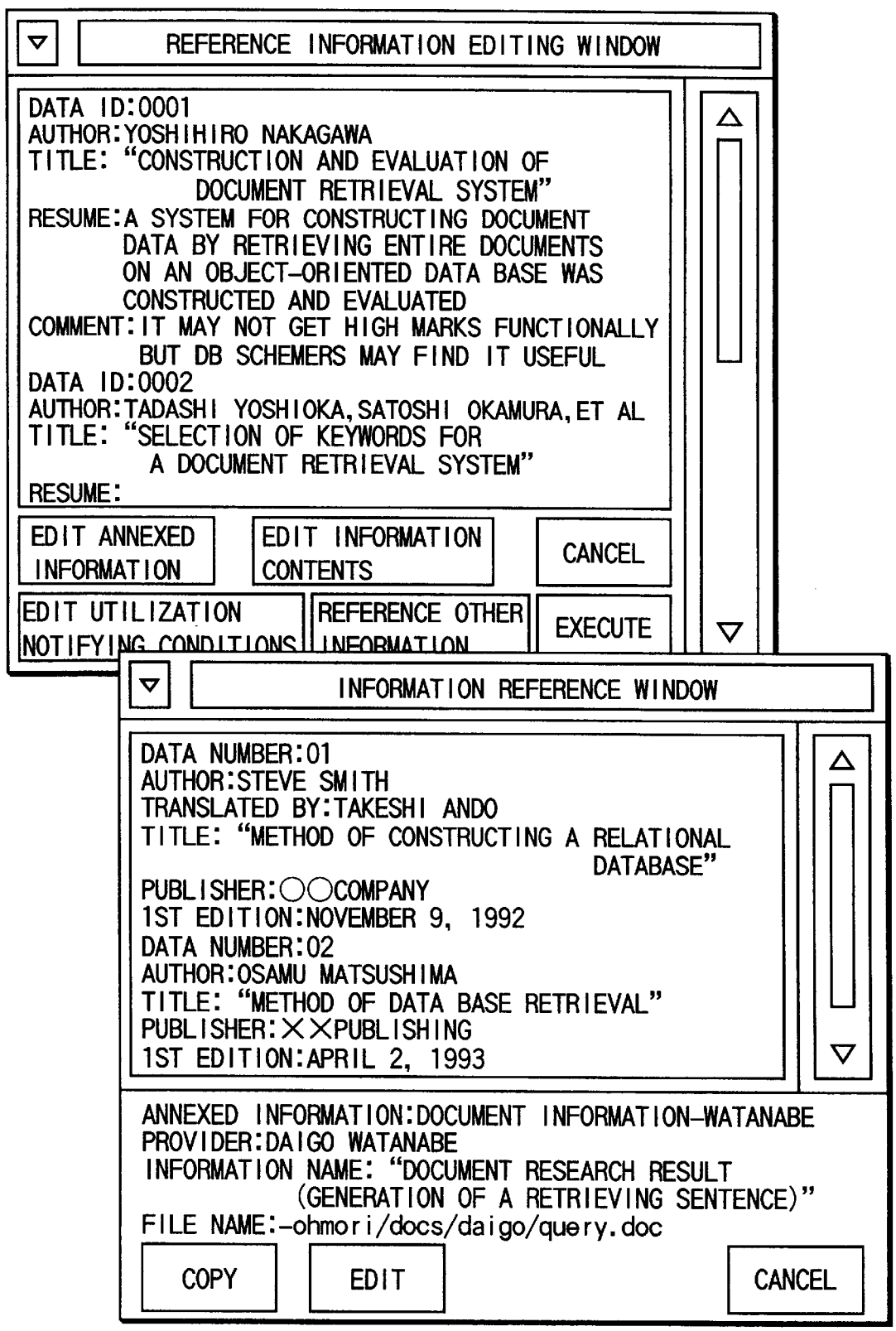
FIG. 72 shows an exemplary image that can be displayed on the referenced information editing window when referencing other information.

FIGS. 71A through 71C exemplary pieces of information that can be registered in the information sharing support system and FIG. 72 shows how the reference information window 700 of FIG. 70 display the information of FIGS. 71A through 71C.

FIG. 73 shows information generated by combining the information of FIGS. 63A through 63C and that of FIG. 71 and editing the combined information.

FIGS. 74A and 74B show exemplary annexed information and exemplary utilization notifying conditions that can be used for the information of FIG. 73.

Since the information of FIGS. 73, 74A and 74B is generated by referencing the information of FIGS. 63A through 63C and 71A through 71C, the attribute "reference information" of the annexed information (see FIGS. 74A and 74B) of the above information describes the titles of the information shown in FIGS. 61A through 61C and 71A through 71C.

In FIG. 73, the information in the dotted broken lines is copied from FIGS. 61A through 61C and 71A through 71C and the information encircled by dotted lines is added by the information provider "Ohmori". The lines containing {reference} are indexes for the information copied from other sources. By using indexes, the pieces of information being referenced can be displayed in various different ways particularly in terms of font and color.

As described above in detail, with the fifth embodiment of the invention of information sharing support system adapted to disclose information that is owned by a person to other people, it can be so arranged that the information provider is notified of each instance where the information is accessed by some other person in a way that satisfies the information provider.

Additionally, the information provider can dynamically redefine the requirements to be met when he or she is notified of each instance where the information disclosed by him or her is accessed by some other person by referring to the contents of the notification to be sent to him or her because the information sharing support system stores the circumstances under which the information is accessed and the types of notification in a systematic way and the utilization notifying conditions are provided to the information demander along with the information itself.

Figure 75:
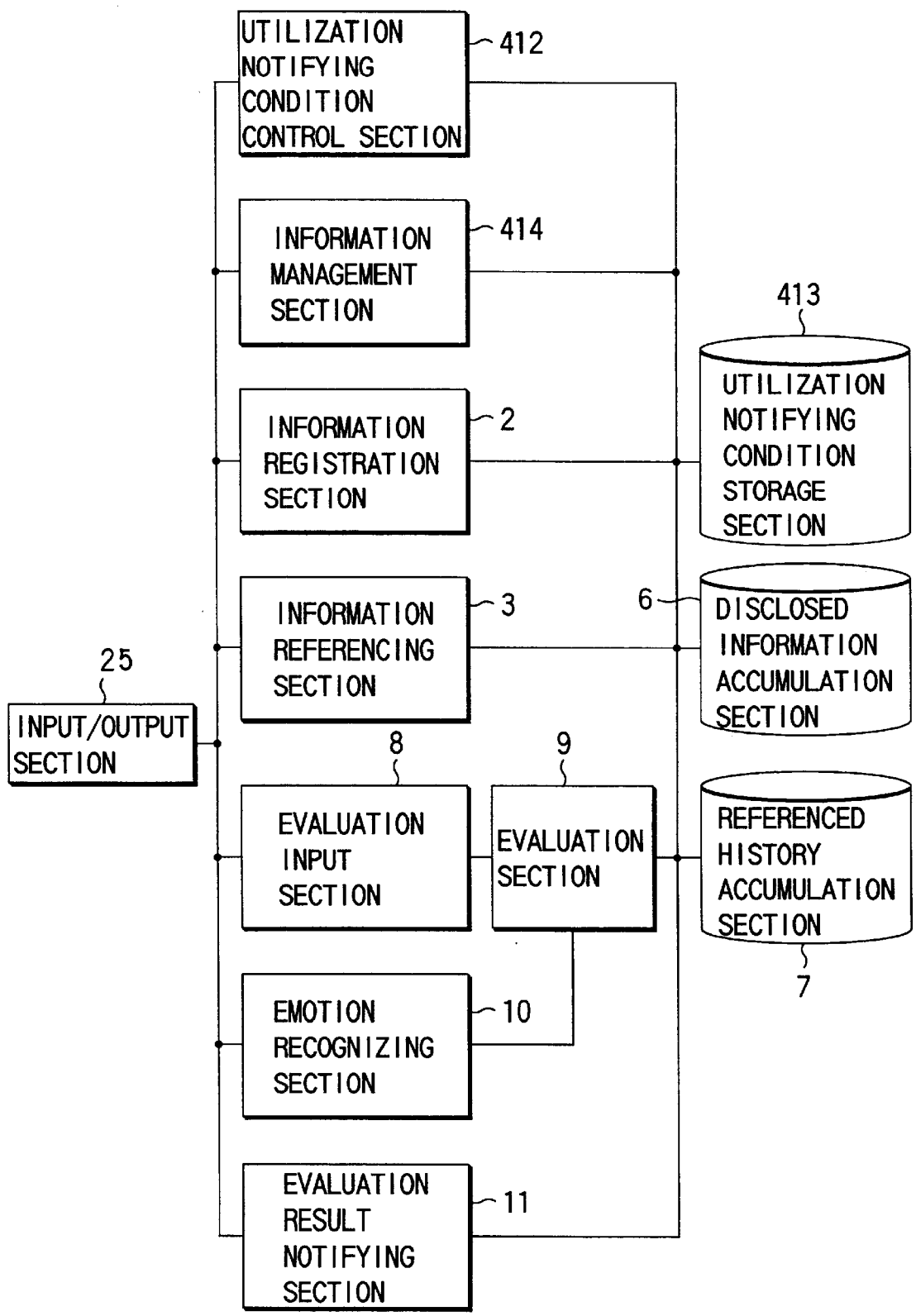
FIG. 75 is a block diagram of another information sharing support system according to the invention.

It may be understood that the above described fifth embodiment can be combined with any of the first through fourth embodiments. FIG. 75 shows a schematic block diagram of such a combined information sharing support system. More specifically, this system is realized by adding an information management section 414, a utilization notifying condition control section 412 and a utilization notifying condition storage section 413 to a system as shown in FIG. 1. The disclosed information accumulation section 6 of this system also operates as information storage section 415 of FIG. 41.

6th Embodiment

Figure 76:
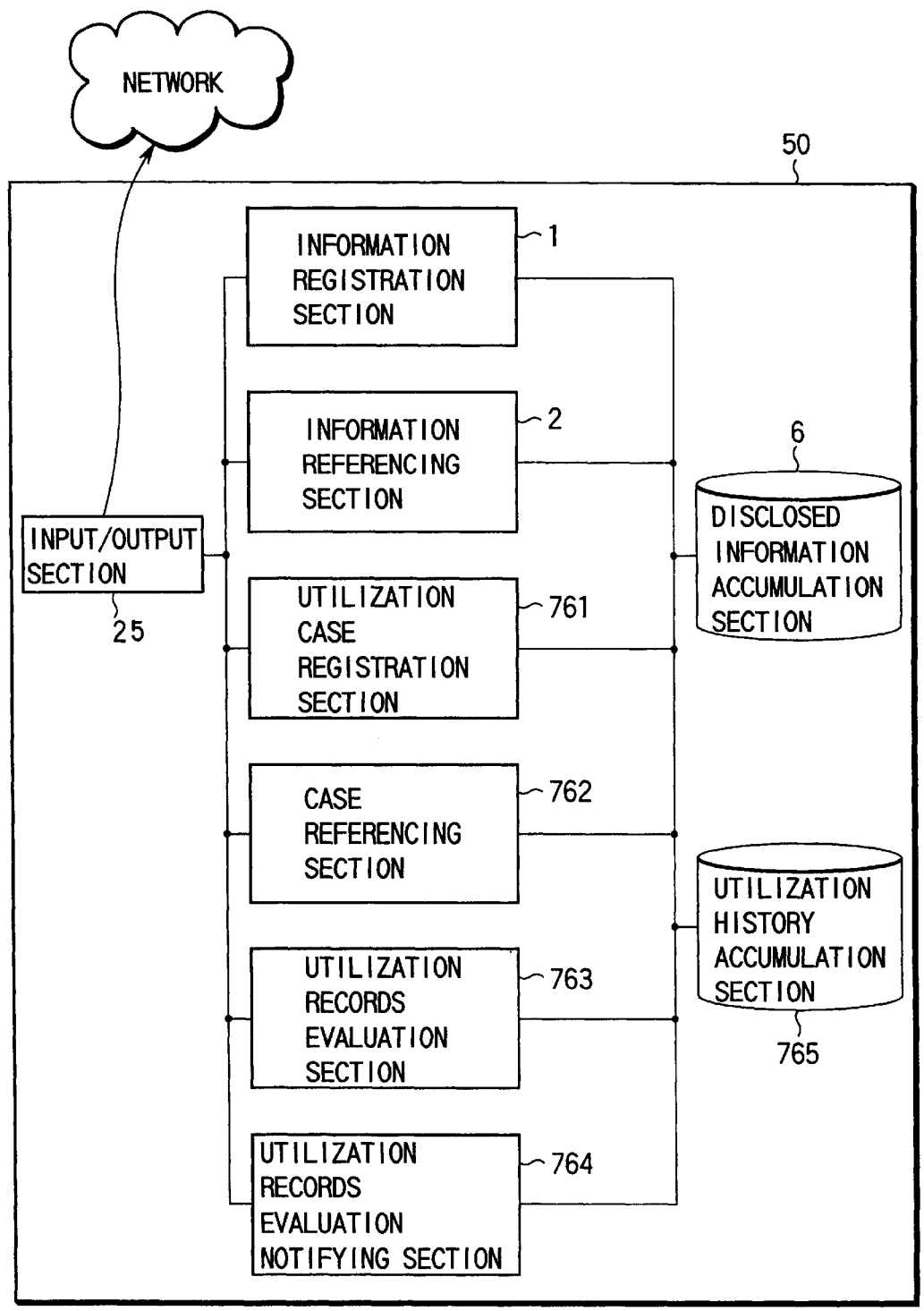
FIG. 76 is a block diagram of a sixth embodiment of information sharing support system according to the invention.

FIG. 76 is a block diagram of a six embodiment of information sharing support system according to the invention. This system comprises an information registration section, an information referencing section, a utilization case registration section 761, a case referencing section 762, a utilization records evaluation section 763, a utilization records evaluation notifying section 764, an input/output section 25, a disclosed information accumulation section 6 and a utilization history accumulation section 765. Note that the components that are common with the first through fifth embodiments are respectively denoted by the same reference symbols and only the components that are specific to this embodiment will be described below.

The utilization case registration section 761 is used by information referencers and utilizers (who may be simply referred to as referencers or users hereinafter) to input the (case) records of reference and utilization of the disclosed information. The cases of utilization registered by way of the utilization case registration section 761 are then correlated to the respective pieces of information in the disclosed information accumulation section 6 by section of the respective identification numbers of the pieces of information and accumulated in the utilization history accumulation section 765.

The case referencing section 763 operates to retrieve from the utilization history accumulation section 765 a case of utilization for the information taken out from the disclosed information accumulation section 6 and reference them mutually.

The utilization records evaluation section 763 operates to detect the records of a person in terms of the pieces of information referenced by him or her from the utilization history accumulation section 763, weight them by using the parameters assigned to that person also the parameters assigned to each of the referenced/utilized piece of information and calculate the evaluation point for the utilization of the disclosed information, which evaluation point is then stored in the utilization history accumulation section 765.

The utilization records evaluation notifying section 764 notifies the information referencers and the manager of the system of the output of the utilization records evaluation section 763.

While a plurality of information sharing support systems 1 are adapted to communicate with each other to access disclosed information by way of a network in FIG. 76, the embodiment may alternatively comprise a single information sharing support system that does not needs the use of a network. If such is the case, it may be so arranged that both information providers and information demanders can access the disclosed information stored in the system.

In the following description, it should be noted that the term "utilization" represents a broad concept that covers referencing disclosed information and preparing a new piece of information by using part of the disclosed information.

FIG. 77A shows exemplary information that can be stored in the disclosed information accumulation section 6. As in the case of FIG. 2, the information comprises a title, the information discloser, the date of disclosure, a category identifier which is knowhow here, classification, related information, retrieval keywords and utilization history.

FIG. 77A shows an example where the disclosed information is a howknow. It says that the title is "lecture meeting holding procedure", the discloser is "Taro Yamada", the date of disclosure is "Oct. 1, 1995", the disclosure category is "knowhow". the classification is "visitor services", the related information includes "how to write a letter of request (information ID#200)" and "list of scholars (information ID#350)" and the keywords include "lecture", "visit", "professors" and "agenda" and the contents include steps (1) through (7). Additionally, it shows the file ID numbers of the pieces of information prepared by using this disclosed information it stores as utilization history, which are /log #24, /log/338 and /log/#105 representing three files.

FIG. 77B shows an example where the disclosed information is computer software. It says that the title is "budget control program", the discloser is "Momoko Yoneyama", the date of disclosure is "Oct. 1, 1995", the disclosure category is "software, the classification is "budget control service, the related information includes "list of issued requests", the keywords include "budget", "scheduled procurements" and "overtime", the contents include a program file "/etc/yosan_kanri" and the utilization history includes "/log/#60", "/log/#62" and "/log/#120" representing three files.

Figure 78:
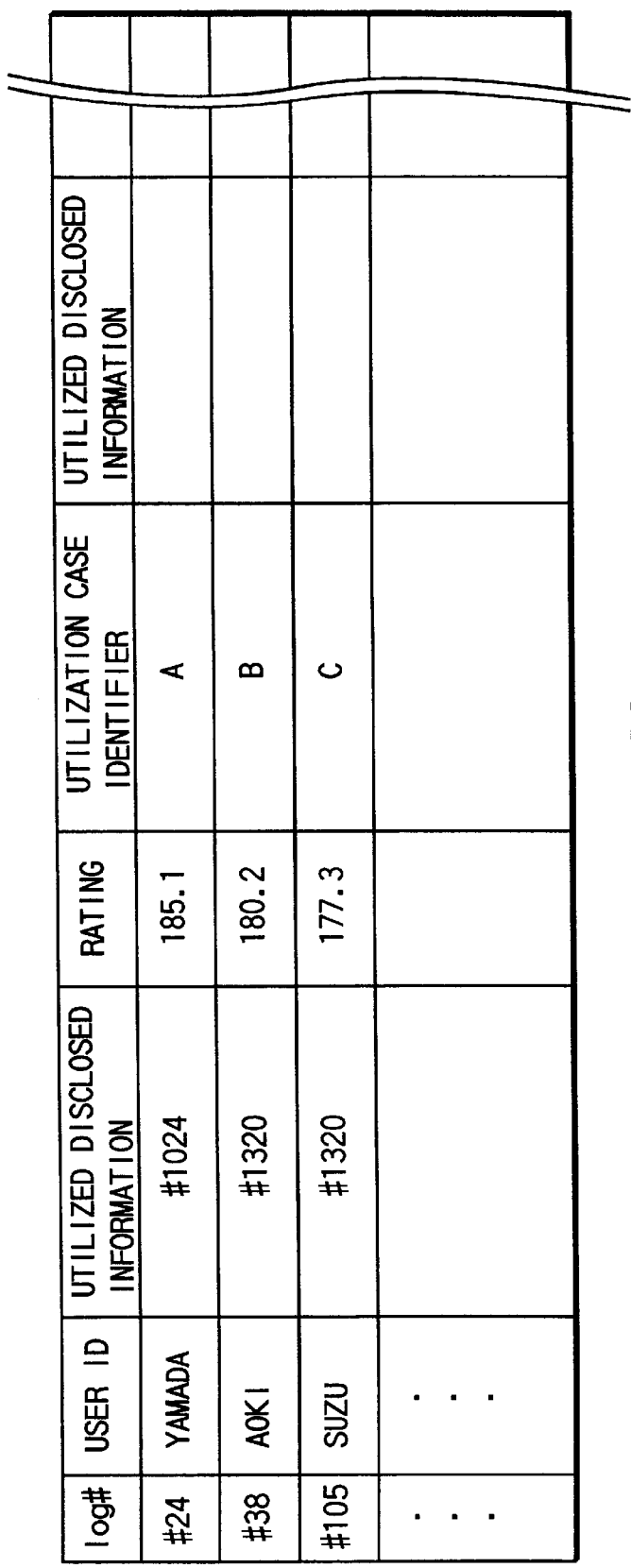
FIG. 78 is an exemplary utilization history accumulated in the utilization history accumulation section.

FIG. 78 shows an exemplary utilization history accumulated in the utilization history accumulation section 765. The utilization history comprises columns of "log #" for identifying the pieces of information newly prepared by utilizing the disclosed respective pieces of information, "userID" for identifying the persons who respectively prepared the pieces of information, "disclosed pieces of information" utilized for preparing the newly prepared respective pieces of information, "rating" given to each of the pieces of information on the basis of the parameters of the disclosed information and those of each of the referencers, "utilization case identifier" for identifying the address of each utilization case.

If a single piece of information is prepared by utilizing a plurality of pieces of disclosed information, each of the pieces of disclosed information may be provided with an identification number, a rating and a utilization case identifier, which are stored as part of the information. If the disclosed information is only referenced, it does not have any log # for the information prepared from it.

Now, the method of retrieving and referencing the pieces of information accumulated in the disclosed information accumulation section 6 way of the information referencing section 3 will be described.

Figure 79:
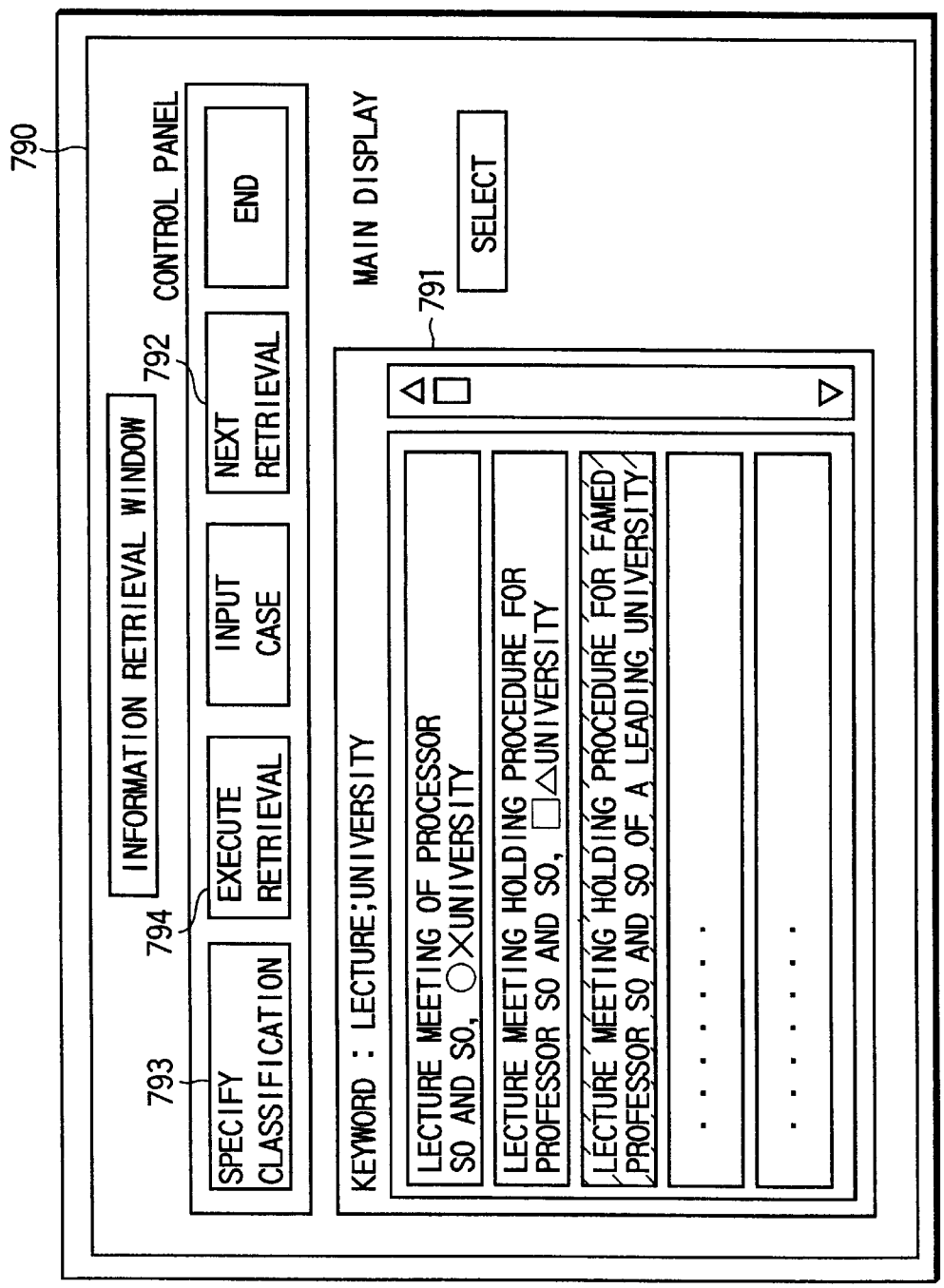
FIG. 79 shows an exemplary image on the display screen for retrieving/referencing information by way of the information referencing section.

FIG. 79 shows an exemplary image that can be displayed on the user interface screen for retrieving and referencing information by way of the information referencing section 3. Referring to FIG. 79, the information retrieval window 790 comprises a main screen 791 and a control panel 792. As the information utilizer operates the "specify classification" button 793 on the control panel 792, a conceptual image used for classifying the information he or she wants is displayed on the main screen 791 so that he or she can select the right classification.

As the user operates the "execute retrieval" button 794 after specifying the classification and a set of keywords on the control panel 792, the information relating to the classification and the set of keywords specified by the user is retrieved and displayed.

If a plurality of pieces of information are selected as a result of the retrieving operation, the user can specify the information he or she wants by selecting the title of the information from the title list. As a matter of fact, a title list containing a plurality of titles is displayed on the main screen 791 of FIG. 79. As the user selects one of them, the screen may display the image as shown in FIG. 80.

Figure 80:
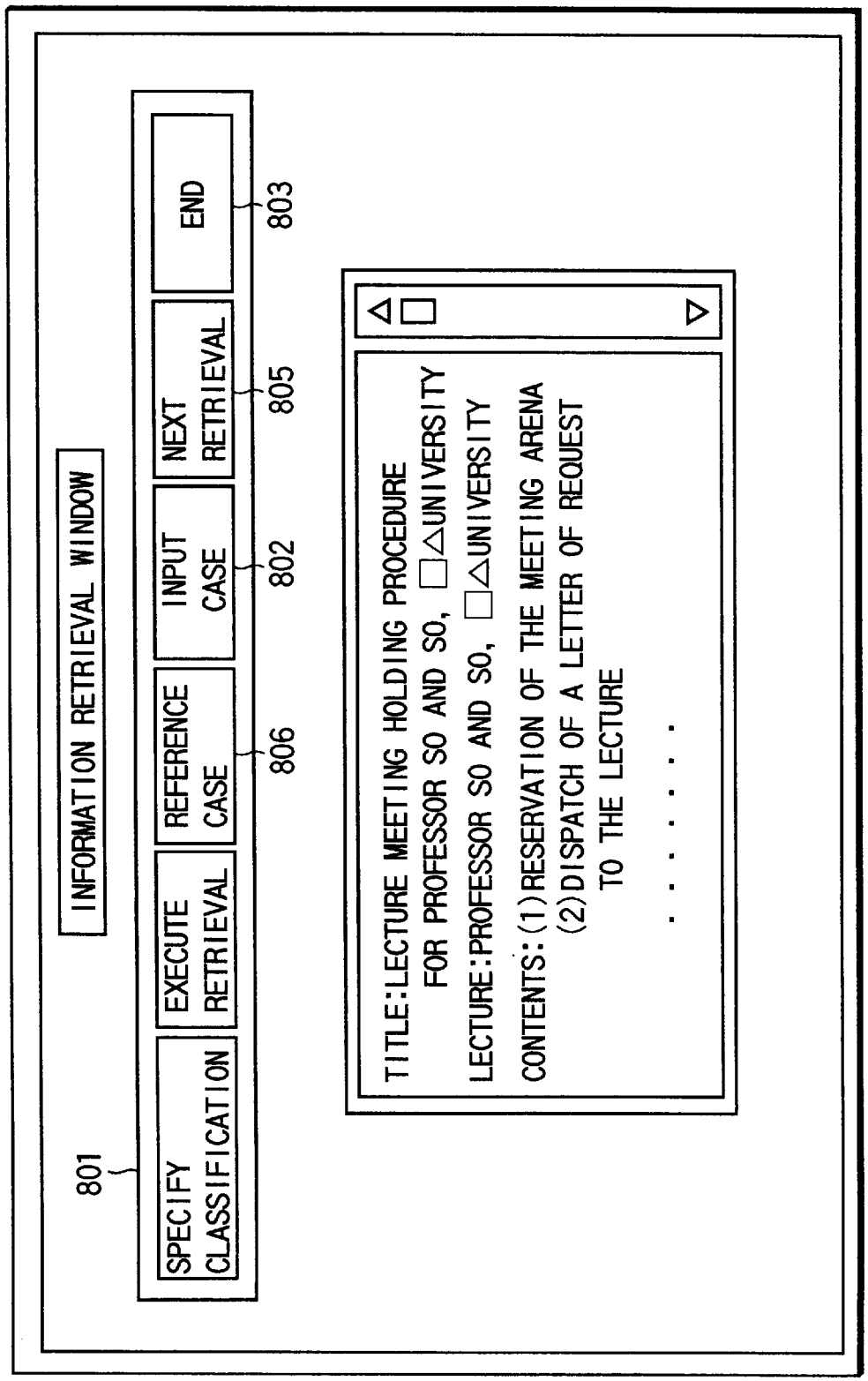
FIG. 80 shows another exemplary image on the display screen for retrieving/referencing information by way of the information referencing section.

FIG. 80 shows an exemplary image that can be displayed when the user references the information selected in the screen of FIG. 78. The user can draw out an instance of utilizing the information referenced by way of the information referencing section 3. More specifically, as the user operates the "input case" button 802 on the control panel 801 of the screen of FIG. 80, the screen displays the image of FIG. 81 that prompts the user to register an instance of utilization of the referenced information.

A case of utilization as used herein refers to a description how a piece of information stored in the disclosed information accumulation section 6 was referenced/utilized, which includes the title, the file name and the file ID# of the referenced/utilized information and, if a new piece of information was prepared by utilizing the disclosed information, the title, the filename and the file ID# of the newly prepared information.

Figure 81:
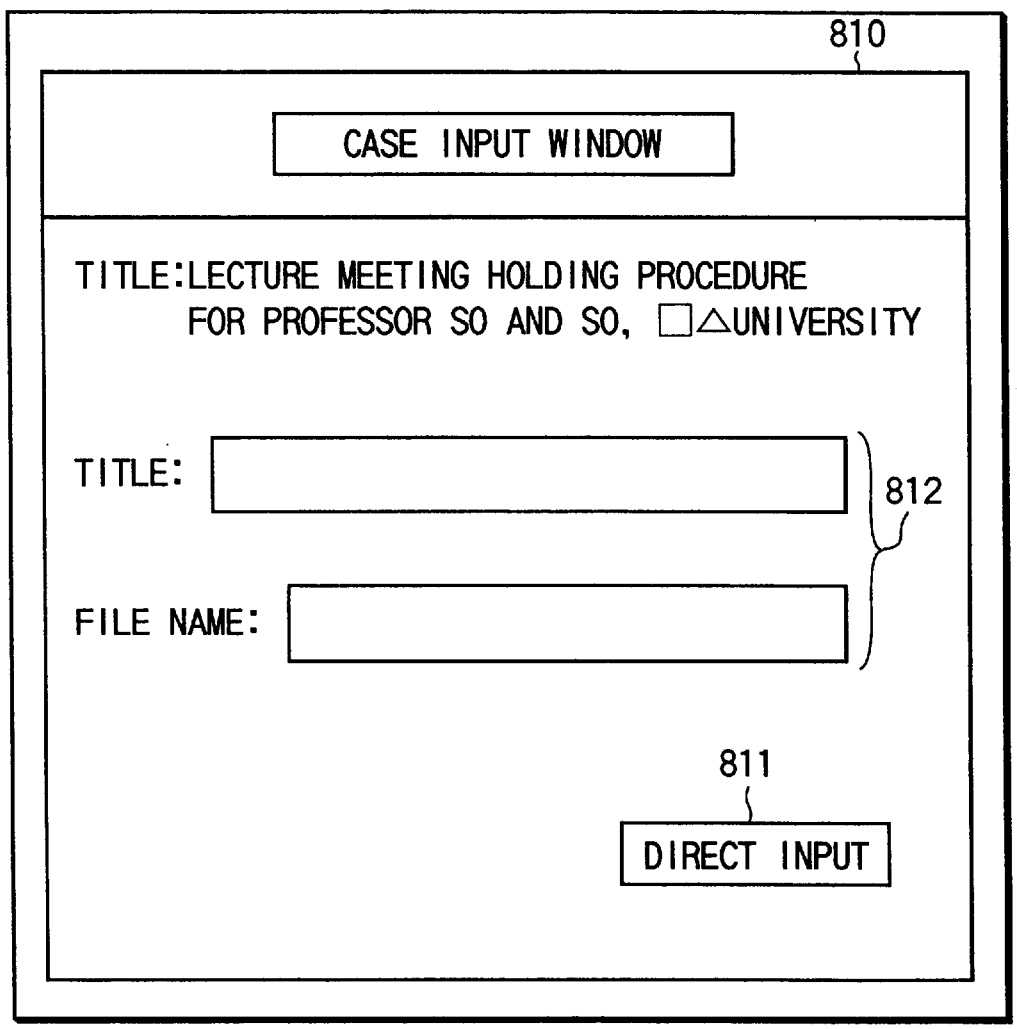
FIG. 81 shows an exemplary image on the display screen for registering a utilization case by way of the utilization case registration section.

Note that FIG. 81 shows an exemplary case input window to be used when a new piece of information is prepared by referencing/utilizing the information selected on the screen of FIG. 79.

If the information referencer does not input any case of utilization and terminates the current information referencing operation by using the "end" button 803 or the "next retrieval" button 805, the system preferably displays a message that prompts the user to register a case of utilization or automatically switches the screen to the case input window of FIG. 81 and prompts the user to register a case of reference.

Preferably, the system is so arranged that it displays the message or automatically switches the screen according to the instruction issued by the user in advance.

The information referencer can make the system display a case of utilization registered by some other information referencer in the format of FIG. 82 by operating the "reference case" button 806. Then, the information referencer can see how the referenced original information has been utilized by other referencers to improve the way in which he or she utilizes it for his or her own job. This can improve the utility of the information as it is expanded and/or improved by the information provider and the information referencers.

Figure 83:
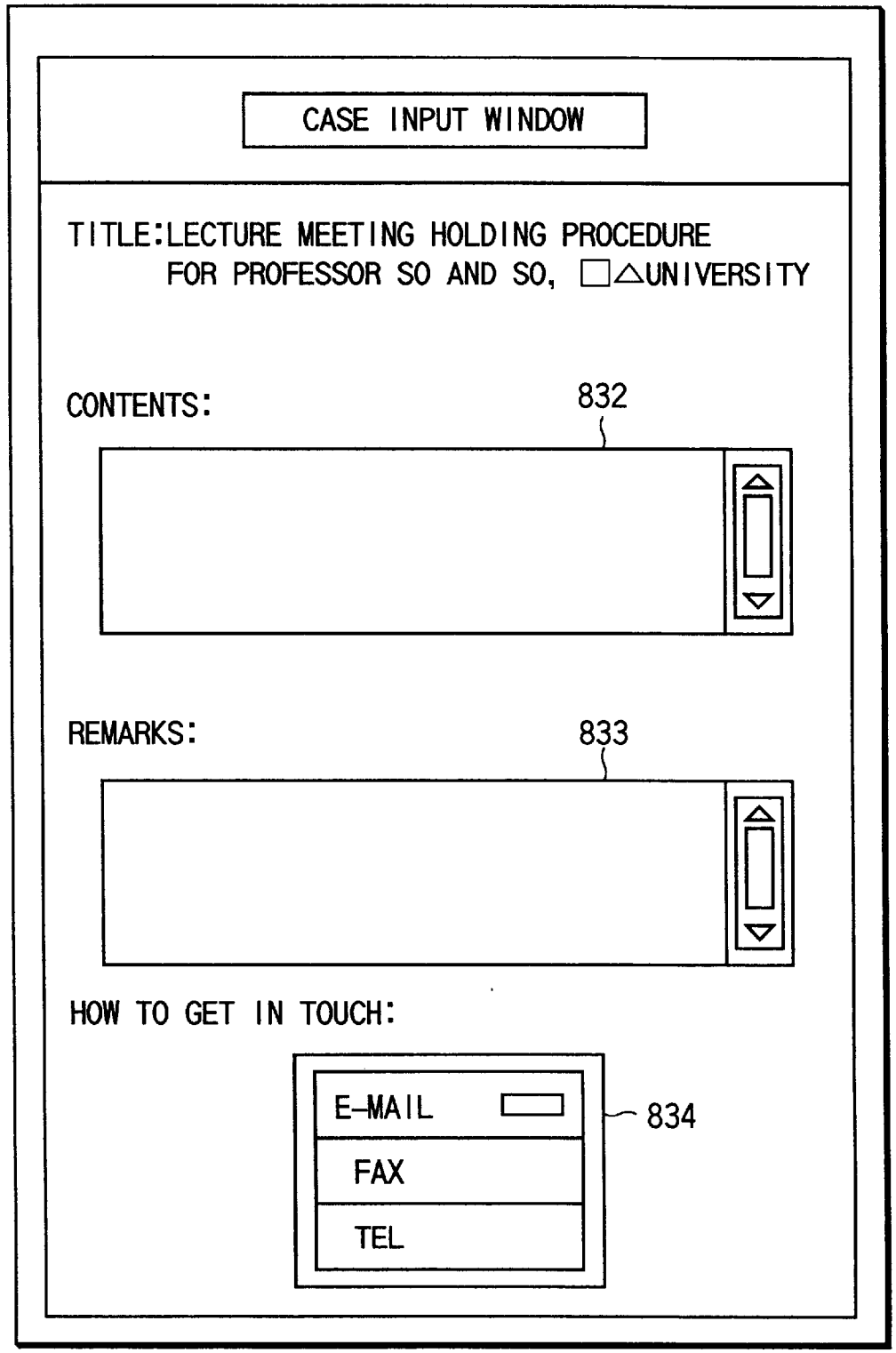
FIG. 83 shows another exemplary image on the display screen for referencing a utilization case by way of the utilization case reference section.

FIGS. 81 and 83 show exemplary images that can be displayed on the screen by the utilization case registration section 761 to prompt the user who has referenced/utilized a piece of information to input a case of utilization.

The image of FIG. 81 comprises a button 811 for switching the screen to an image for directly inputting the description of a case and an input field 812 for simply registering a file prepared on the basis of a piece of referenced information so that the user can input a case in either way by selecting one of the buttons.

The user is prompted to input the title of the case of utilization he or she wants to register so that the information input by the user can be utilized as the title of the additional information added to the utilized information.

When a document newly prepared by utilizing a piece of disclosed information is registered as a case of utilization, it is sufficient for the identification number of the newly prepared file to be input in the input field. Then, it is automatically registered and the other members that can share the information may freely reference it.

If it is desired to register more detailed information or no disclosable outcome such as a prepared document is obtained, the screen can be switched to allow the information to be directly input by selecting the button 811.

The value of the disclosed information will be objectively evidenced by inducing a user to register the description of a specific instance of utilizing the disclosed information. Additionally, the registered description becomes additional information that is added to the disclosed original information to enhance the value of the information.

FIG. 83 shows an exemplary image that can be displayed for registering a case of utilization on the display screen when the "direct input" button 811 is operated in FIG. 81. Then, the user can directly input into the "contents" field 832 the description of what job is done how by him or her by utilizing the referenced information. If the user wants to input additionally information including the alteration and/or the care required when using the referenced information for his or her job and/or a personal comment, he or she can input such information into the "remarks" field 833. Then, the data of the input case of utilization will be sorted and stored in the "log #", the "userID", the "utilized disclosed information" and the "utilization case identifier" as shown in FIG. 78 and the description of the case is stored in the utilization history accumulation section 765.

In the case input window of FIG. 83, there is also provided a "how to get in touch" field 834 for entering the code for electronic mail, the fax number and/or the telephone number of the user who registered the case so that a person who references the case in future may directly get in touch with the user by section of electronic mail, fax or telephone, whichever available, in order to ask any question about the case. This field may also be used to notify the registerer of a report on the utilization of the registered case.

Now, the processing operation of the utilization records evaluation section 763 will be described by referring to the flow chart of FIG. 84.

To evaluate the status of utilization of a piece of disclosed information by an information referencer, the utilization history (see FIG. 78) of the referencer is retrieved from the utilization history accumulation section 765 (Step S8401). At this time, the "total point" which is a variable for added evaluation values is initialized (Step S8402).

Each of the utilization records stored in the system is provided with the ID# of the utilized disclosed information and the identifier of the utilized case as shown in FIG. 78, which are stored in the disclosed information accumulation section 6 so that, as they are retrieved from the utilization history (Step S8403), the parameters relating to the contents of the disclosed information (for example, a parameter expressing the readability of the contents") are retrieved (Step S8404) from the file with the ID# of the disclosed information stored in the disclosed information accumulation section 6 and then the parameters relating to the characteristics of the referencer (for example, a parameter representing the post of the referencer or the number of years for which the referencer has worked in the company) are retrieved from the disclosed information accumulation section 6 or the utilization history accumulation section 765. Then, the status of utilization of the disclosed information is evaluated on the basis of the parameters (Step S8405).

The Steps S8403 through 8405 are carried out for all the utilization records of the referencer and the total point (evaluation point) of the referencer for the utilization of the disclosed information is determined by totalizing the individual evaluations (Step S8406 and Step S8407). The obtained evaluation points are stored in the column of "rating" of the utilization records as shown in FIG. 78 for each utilized piece of information.

The evaluation point for the utilization records of a person on each piece of disclosed information may be determined by 1) the number of instances in which the person utilized the disclosed information;

2) a value obtained by weighting the figure of 1) with a point specific to that person; or 3) a value obtained by weighting the figure of 1) with the level of the contents of the disclosed information.

In other words, it may be so arranged that an instance where a primer piece of information on a job is utilized by a less experienced person will be evaluated higher than an instance where that piece of information is utilized by a more experienced person so that a high mark will be given to a person who referenced a relevant piece of information whereas a low mark will be given to a person who referenced an irrelevant piece of information.

An extra point may be given to the evaluation of a piece of information to which additional information is attached.

Finally, the utilization records evaluation notifying section 764 notifies each of the disclosed information utilizers with the output of the evaluating operation (Step S8408).

Now, the display operation of the utilization records evaluation notifying section 764 will be described below.

Figure 85:
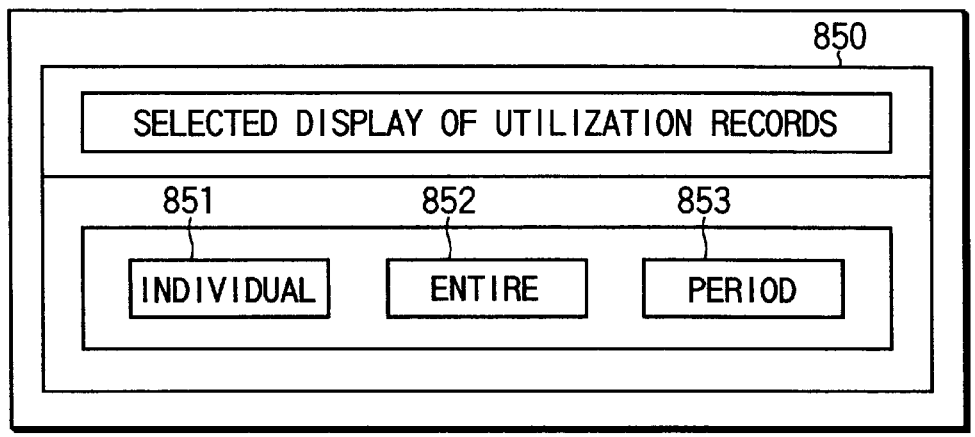
FIG. 85 shows an exemplary image on the display screen for displaying personal and overall utilization records by way of the utilization record evaluation notifying section.

A window for selecting a display mode for displaying the reference/utilization records is displayed on the screen as shown in FIG. 85. When the "individual" button 851 is operated, a list of utilization records will be displayed for the selected individual (see FIG. 86). When the "entire" button 852 is operated, a list of utilization records for the entire group that shares information will be displayed (see FIG. 87). The "period" button 853 is used to specify a specific period during which the selected pieces of information were utilized.

Figure 86:
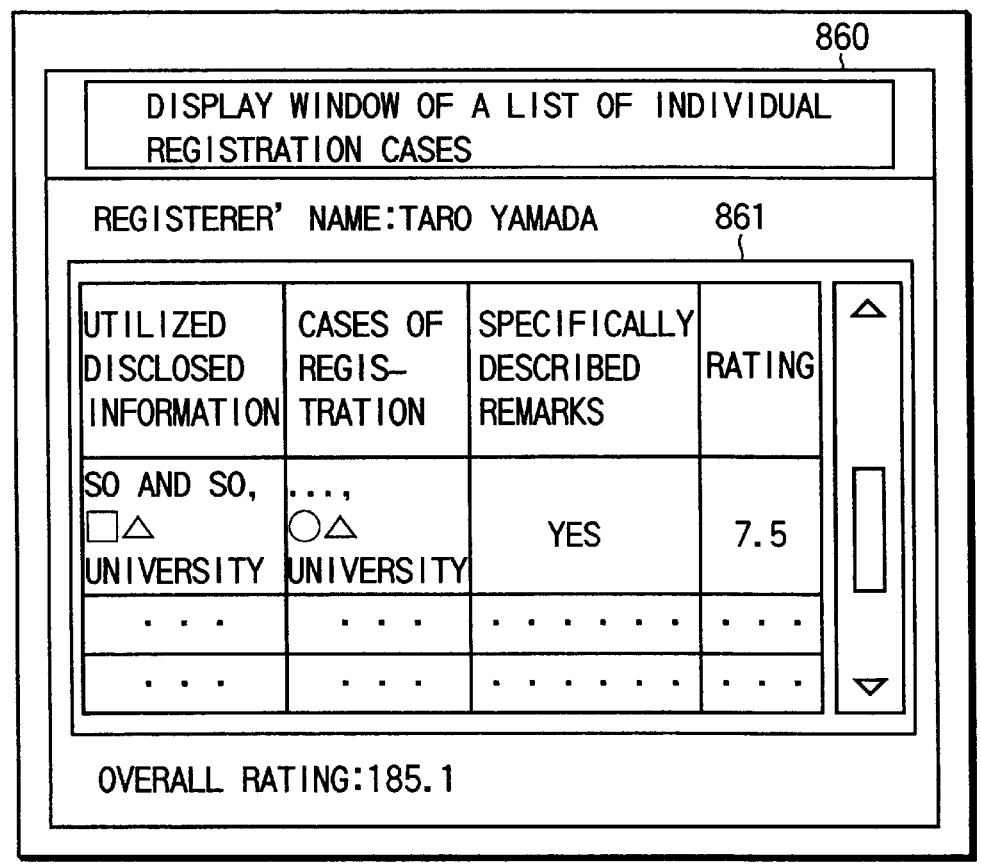
FIG. 86 shows an exemplary image on the display screen for displaying a "personal" utilization records by way of the utilization record evaluation notifying section.

Assume here that the "individual" button 851 is operated. Then, as shown in FIG. 86, a window 860 for displaying a list appears on the screen and the list of evaluations read out from the utilization history accumulation section 765 is displayed. The columns of the list include the "title of utilized disclosed information", the "cases of registration", and the "specifically described remarks" and the "rating".

Then, the information referencer can view his or her own reference/utilization history for selected pieces of disclosed information. Each of the evaluations may be checked for how it was determined by clicking the field of the rating by section of the mouse.

Figure 87:
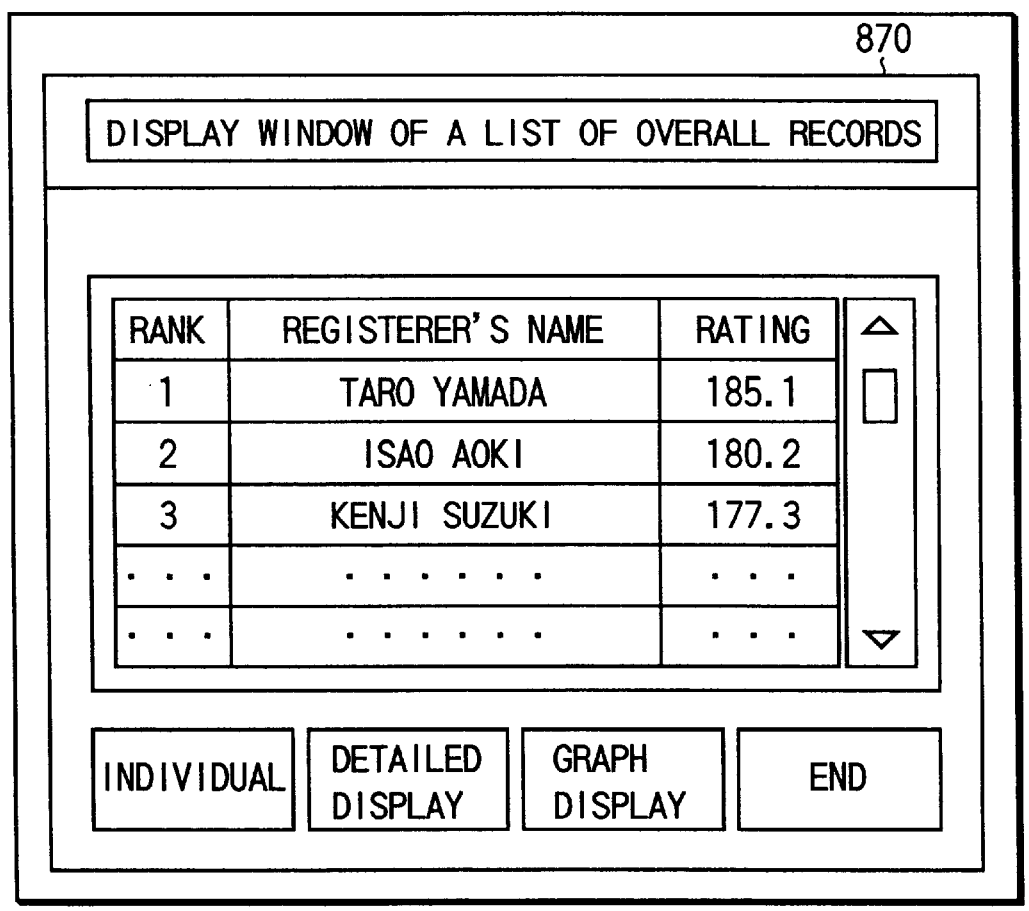
FIG. 87 is an "overall" utilization records by way of the utilization record evaluation notifying section.

When the "entire" button 852 is operated in FIG. 85, a window 879 for displaying a list of utilization records for the entire group that shares information as shown in FIG. 87 will be displayed so that each member can see his or her records in comparison with the other members'.

The records will then operate as incentive for encouraging the utilization of the disclosed information and the manager of the group that shares information can see the status of utilization of the group.

Figure 88A:
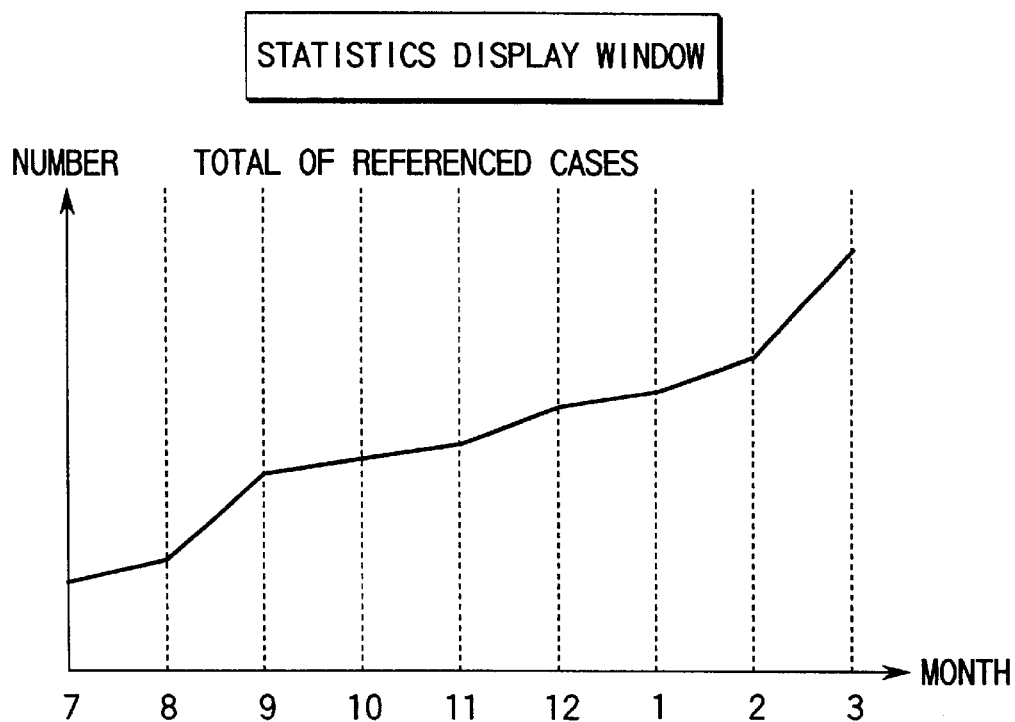
FIGS. 88A, 88B show exemplary images on the display screen illustrating statistics on the utilization of disclosed information obtained on the bases of the utilization histories and the utilization cases accumulated in the utilization history accumulation section.
Figure 88B:
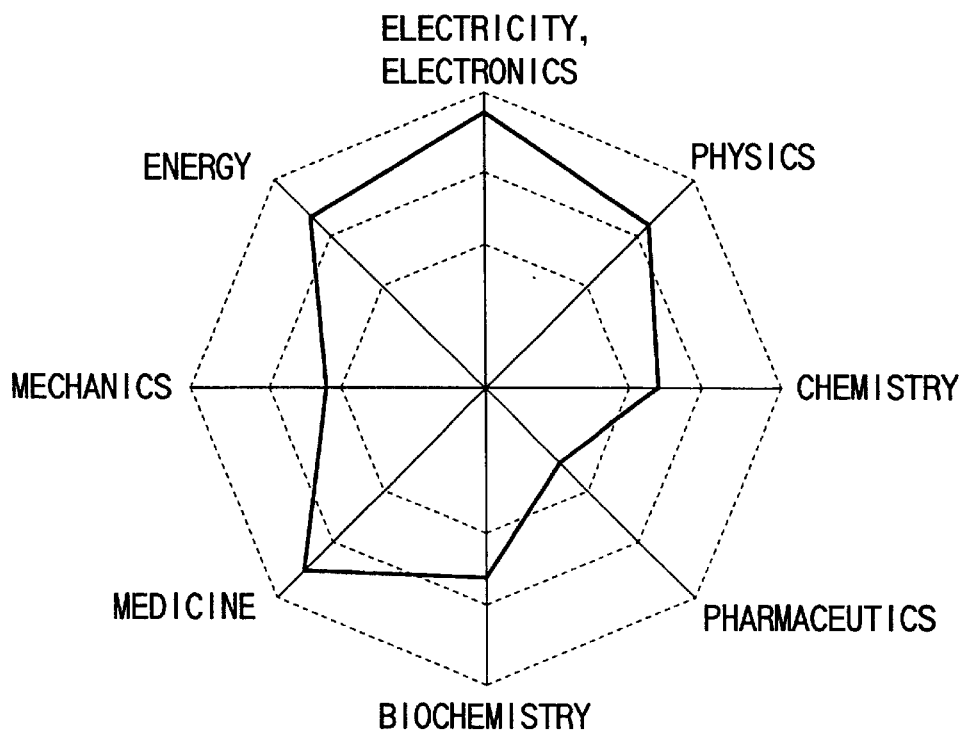

The utilization records evaluation notifying section 764 carries out statistic processing operations for the disclosed information by using the history and the records of the cases of utilization stored in the utilization history accumulation section 765. FIGS. 88A and 88B show graphs that can be displayed as a result of the operations of the utilization records evaluation notifying section 764. Theses graphs make it easy to understand the status of utilization of the disclosed information.

For example, the monthly instances of utilization of the disclosed information by a specific person of the group may be displayed as a whole in the form of a graph of a broken line (FIG. 88A) or for each technical fields (FIG. 88B) in the form of a radar chart by selecting the person from the displayed list of the entire group of FIG. 87.

A particular piece of information may be selected from the list of utilization as shown in the window 860 of FIG. 86 to see the breakdown of the evaluation given to it.

FIG. 82 shows an exemplary image that can be displayed to show how a particular piece of disclosed information has been utilized. It comprises the identifier for identifying the person who utilized the disclosed information and prepared a new piece of information (registerer of an instance of utilization), the date when the instance was registered, the file name of the file containing the newly prepared information, the description of the instance of utilization and the remarks, if any, describing the fact that additional information has been registered for the utilized disclosed information.

However, it will be appreciated that the indexes for retrieving information, the format of description of information and that of the input interface as described above simply represent examples and may be modified appropriately without departing from the scope of the present invention.

As described above, with the sixth embodiment of the invention, when a user utilizes a piece of disclosed information, he or she registers the instance of utilization in the utilization history accumulation section 765 in such a way that the linkage between the utilized information and the registered instance can be easily recognizable. Then, the utilization records evaluation section 763 determines by calculation the evaluation value of each member or of the entire group for each piece of disclosed information on the basis of the instances of utilization of the disclosed information registered in the utilization records accumulation section 765.

Thus, the way in which each particular piece of disclosed and shared information is utilized can be evaluated and its utilization can be encouraged. The quality of that piece of disclosed information may be improved when additional information is added thereto in the form of instances of utilization.

Figure 89:
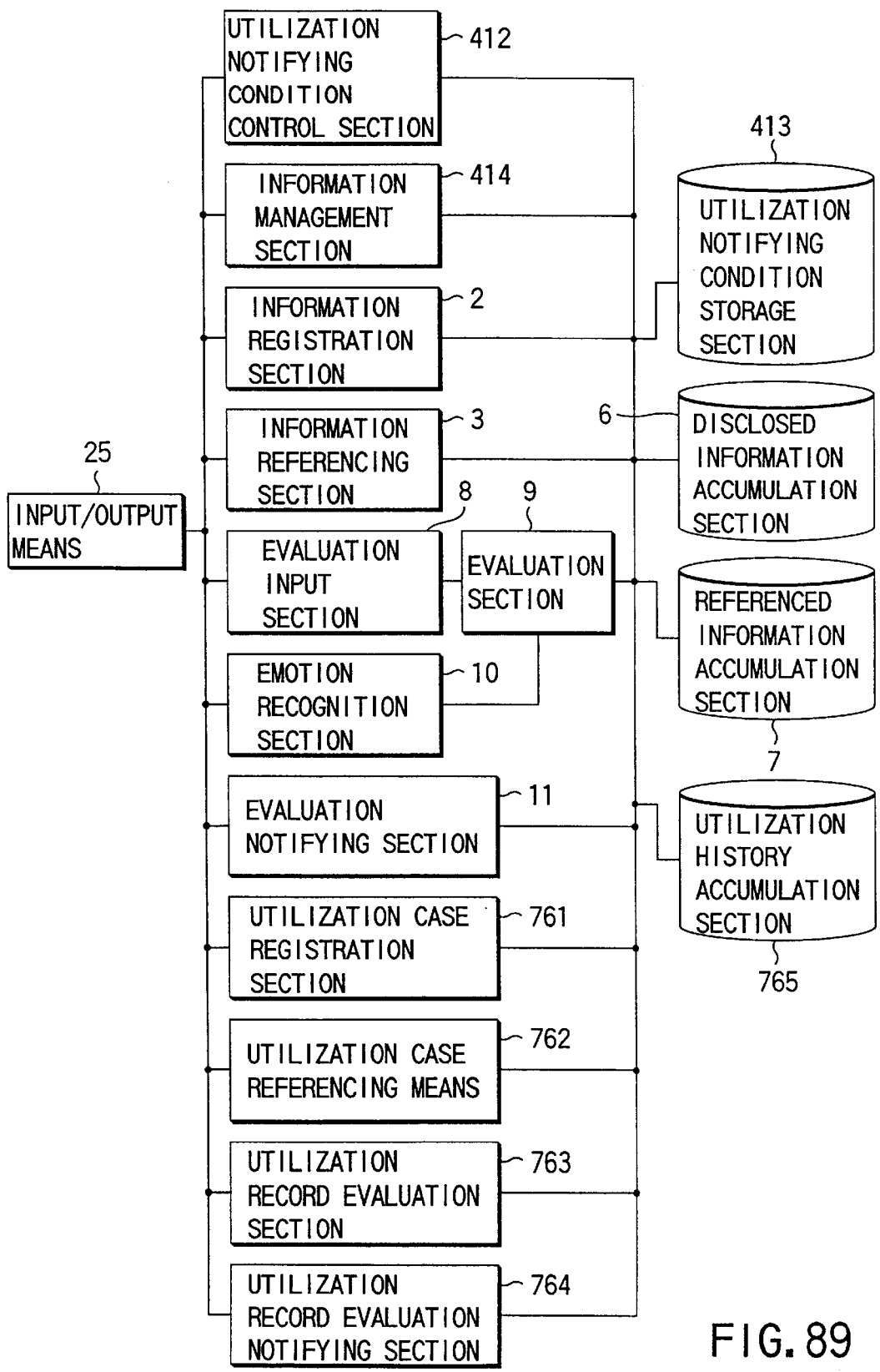
FIG. 89 is a block diagram of still another information sharing support system according to the invention.

It may be understood that the above described sixth embodiment can be combined with any of the first through fourth embodiments and/or the fifth embodiment. FIG. 89 shows a schematic block diagram of such a combined information sharing support system. More specifically this system is realized by adding an utilization case registration section 761, a case referencing section 762, a utilization records evaluation section 763, a utilization records evaluation notifying section 764 and a utilization history accumulation section 765 as shown in FIG. 76 to a system as shown in FIG. 75.

Each of the components of an information sharing support system according to the invention may be divided into a server's part and a client's part so that the server and the client may communicate with each other to carry out the processing operations as described in terms of the first through sixth embodiments. If such is the case, the server may comprise all the components shown in FIG. 89 whereas the client's terminal may be so configured as to comprise all or part of the components except the utilization notifying condition storage section 413, the disclosed information accumulation section 6, the reference history accumulation section 7 and the utilization history accumulation section 765.

7th Embodiment

Now a seventh embodiment of the invention will be described.

Figure 90:
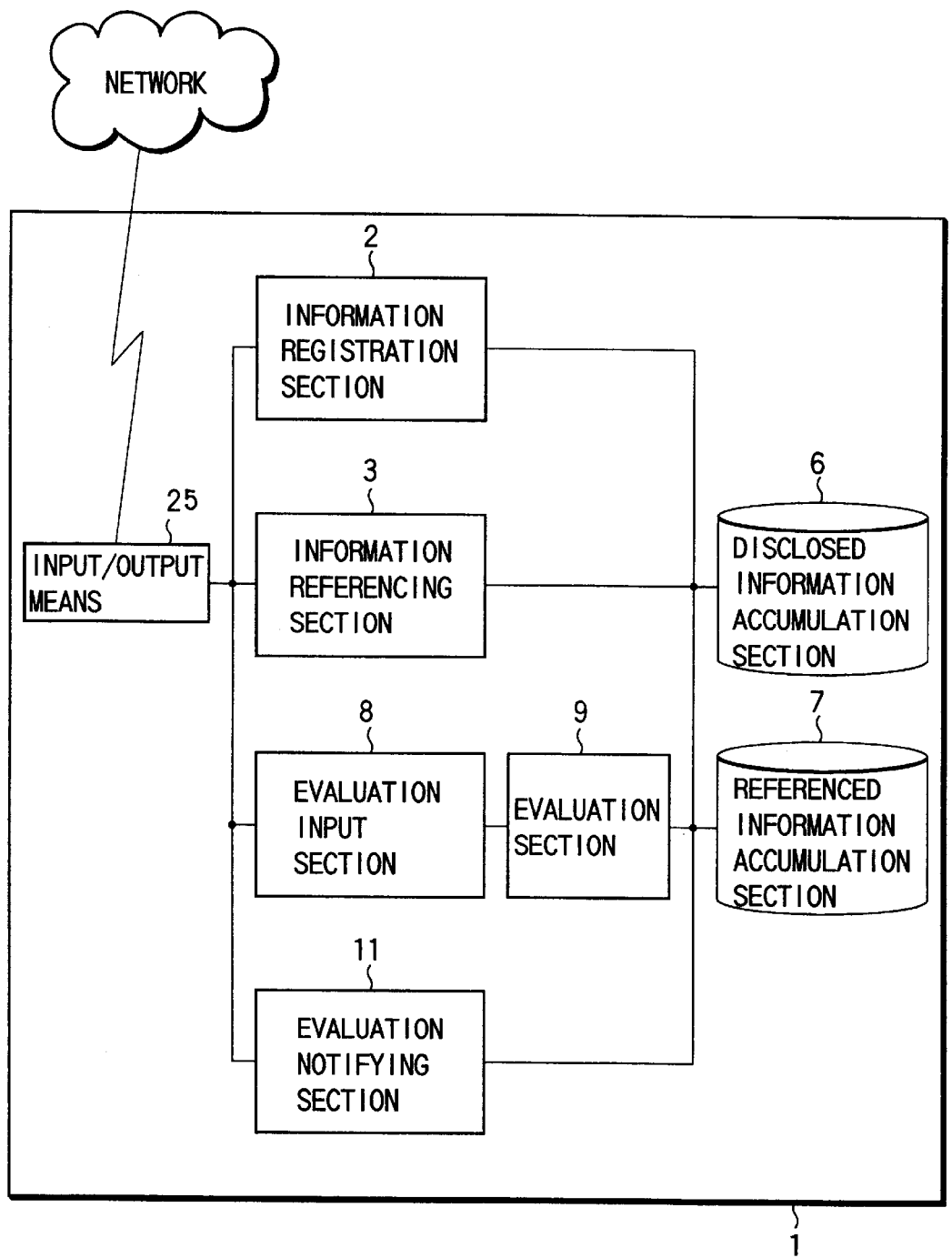
FIG. 90 is a block diagram of a seventh embodiment of information sharing support system according to the invention.

While the seventh embodiment of information sharing support system 1 may well comprise the components of FIG. 1, FIG. 90 shows the components the seventh embodiment should necessarily comprise. Note that the components of FIG. 90 that are same as those of FIG. 1 are denoted respectively by the same reference symbols. Thus, the system configuration of FIG. 90 differs from that of FIG. 1 only in that the evaluation section 9 of FIG. 90 does not uses the outcome of the emotion recognizing operation of the emotion recognizing section 10 but uses only the evaluation data input by the evaluation input section 8.

Referring to FIG. 90, the input/output section 25 can receive one or more than one inputs in the form of text, still picture, movie and/or speech from the network to which it is connected. Alternatively, it may receive inputs directly from a keyboard, a mouse, a microphone or a camera without using a network.

The information registration section 2 operates to register the information disclosed by a user to others in the disclosed information accumulation section 6.

The information referencing section 3 operates to retrieve, reference and utilize the information registered in the disclosed information accumulation section 6.

The reference history accumulation section 7 operates to accumulate the identifiers of the pieces of information that have been retrieved and referenced and, if necessary, accumulates the identifiers of the users and the records of information referencing operations including the dates of such operations.

The evaluation section 9 operates to obtain by calculation personal evaluations on each piece of disclosed information and prepare statistic data from the obtained evaluations. The outputs of the evaluation section 9 are also accumulated in the reference history accumulation section 7.

The evaluation notifying section 11 operates to notify the obtained personal evaluations to the persons with predetermined authority (including the information provider of each registered piece of information, the user currently referencing the information).

Now, the processing operation of the information sharing support system 1 of FIG. 90 will be described by referring to the flow chart of FIG. 91.

The information referencing section 3 comprehends the request input by a user through the input/output section 25 (Steps S9101 and S9102). For the section 3 to comprehend the input, it may be so arranged that the user selects an item from the menu as shown earlier by referring to the first embodiment, that a text in a natural language is used as input as in the case of the second embodiment, that the technology of voice recognition is used or that any two or more than two of the above techniques are combined.

The information referencing section 3 then analyzes the input to find out if the input is a request for retrieving a piece of disclosed information, for registering a piece of disclosed information, or for referencing the evaluations given to a piece of information (Steps S9103 through S9105). If it fails in analyzing the input, it displays the fact that it has failed in analysis by way of the input/output section 25 to prompt the user to input the request for another time (Step S9106).

If the request is found to be for retrieving a piece of disclosed information, for registering a piece of disclosed information, or for referencing the evaluations given to a piece of information, the information sharing support system 50 operates to meet the request (Steps S107 through S9109) and asks the user if he or she wants to proceed to the next processing operation (Step S9110).

Figure 91:
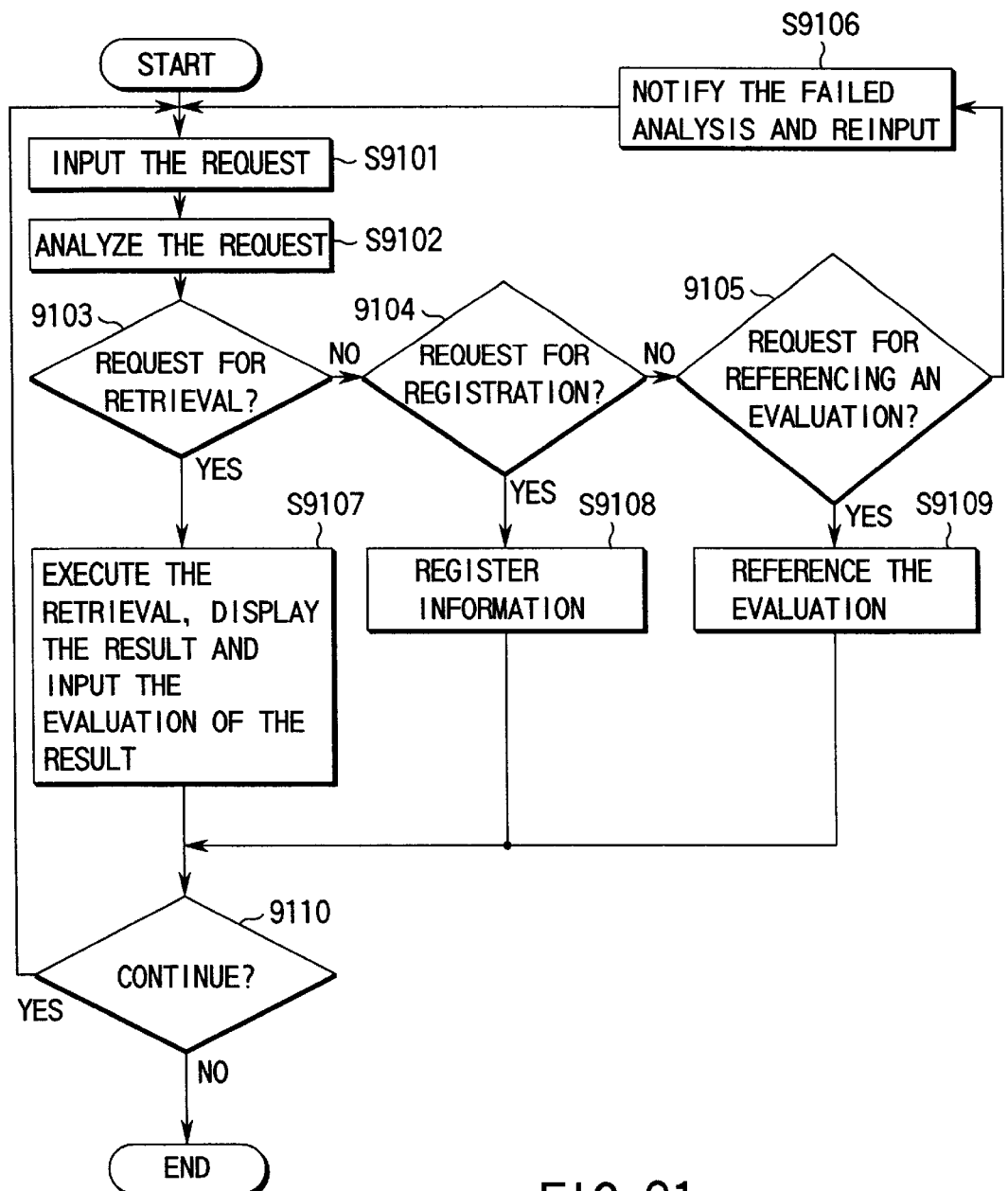
FIG. 91 is a flow chart of a processing operation of the seventh embodiment of information sharing support system.
Figure 92:
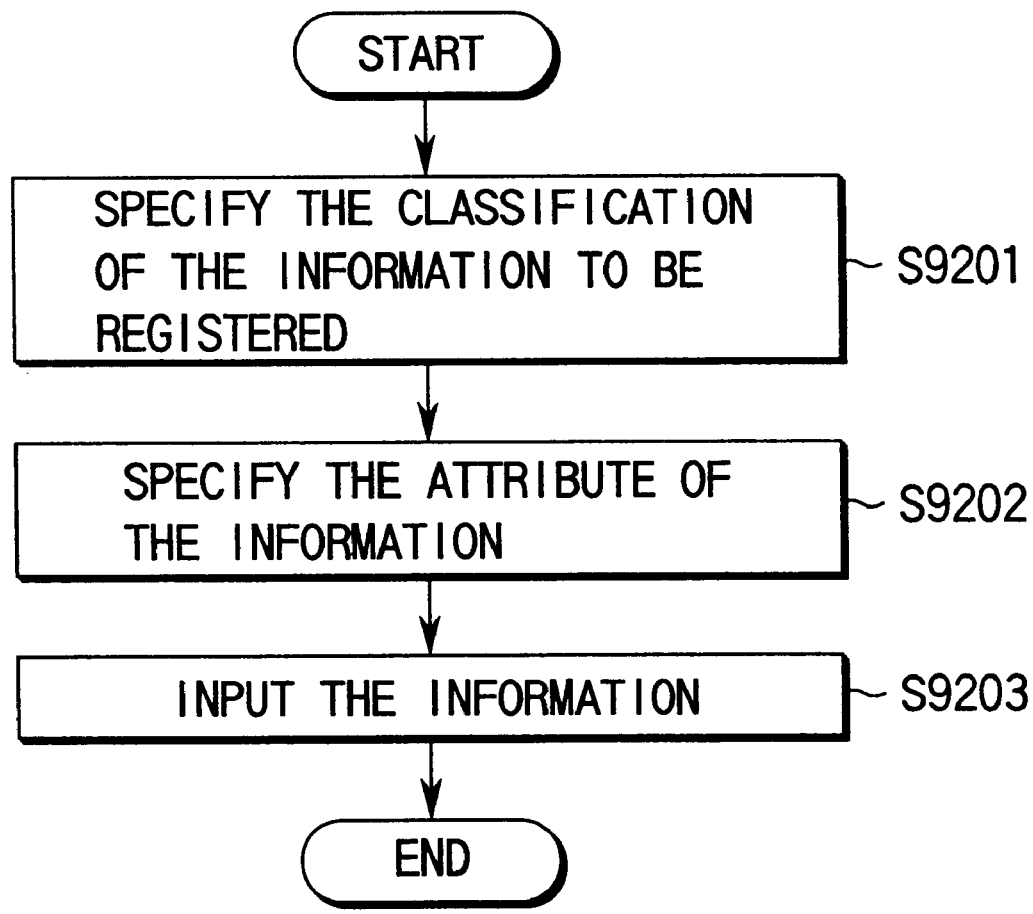
FIG. 92 is a flow chart for a registration processing procedure.
Figure 93:
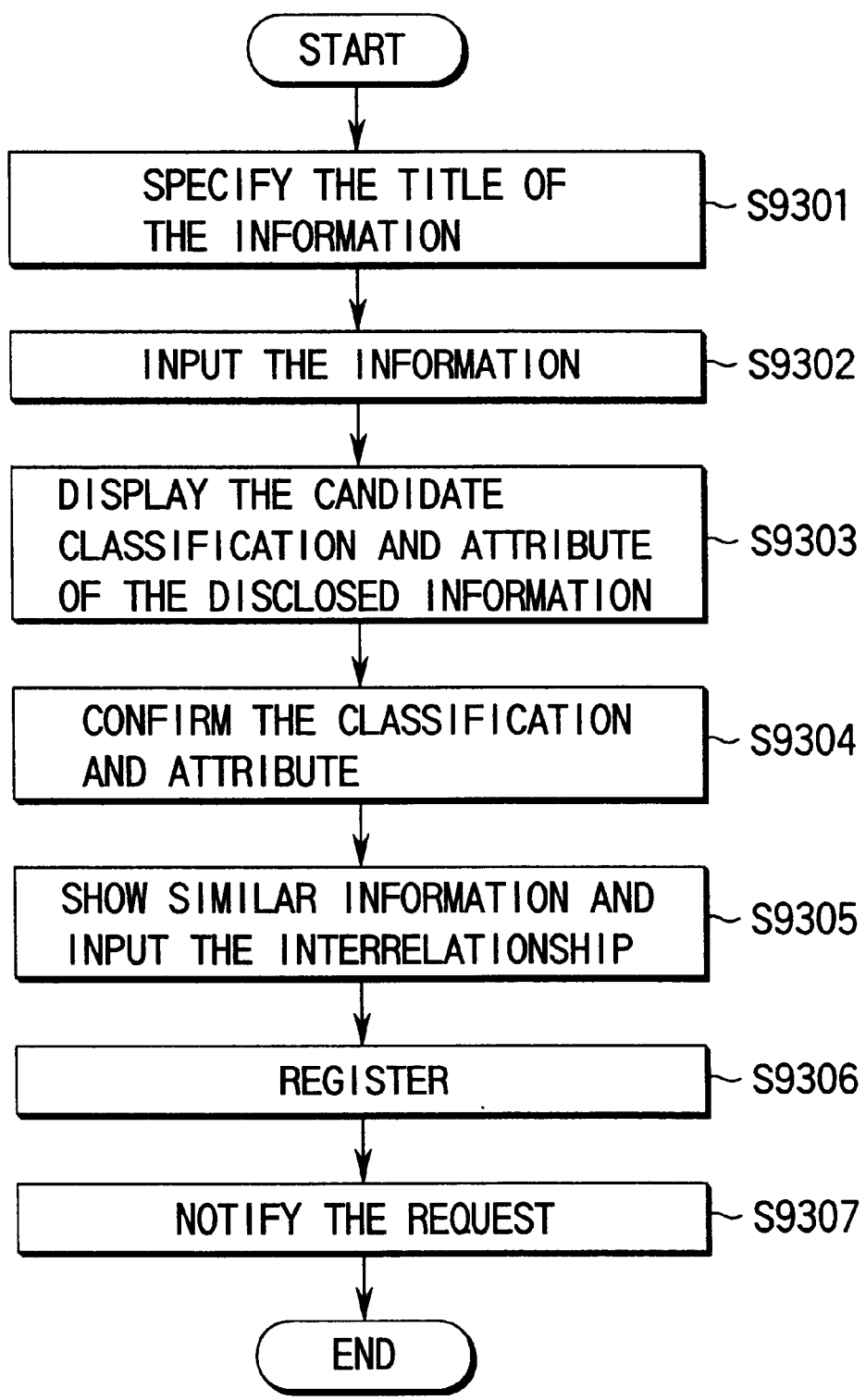
FIG. 93 is a flow chart for another registration processing procedure.

FIGS. 92 and 93 show flow charts for the processing operation of Step S9108 in FIG. 91. Now, the operation for a user to register information in the information sharing support system will be described by referring to FIGS. 92 and 93.

FIG. 92 shows a processing operation for registering information as described earlier by referring to the first embodiment. The user specifies the classification and some of the attributes of the information he or she is going to register (Steps S9201 and S9202) and then inputs the contents of the information (Step S9203) by way of the user interface to register the information. Information that can be registered may not necessarily be in a text format but information in the form of still, movie, speech or computer program may also be registered by specifying a file name in the information sharing support system.

FIG. 93 shows a flow chart for another registration processing procedure. Referring to FIG. 93, as the user requests the system to register information, an interface as shown in FIGS. 94, 95 or 96 may be displayed on the display window to allow the user to register the information.

Firstly, the user inputs the title of the piece of information he or she wants to register in a natural language into the field "title" of the interface of FIG. 94.

Then, the user can input the information to be registered by specifying the file name on the "file name" field. Thus, the user can not only register a piece of information that has been formatted as file but also the text of the information in the field of "text" as shown in FIG. 95 (Step S9302).

The user who has registered the information on the interface of FIG. 94 or FIG. 95 can look for keywords relating to the information from the information already accumulated in the disclosed information accumulation section 6 by referring to the dictionary of terms provided in the information sharing support system and analyzing the title and the text of the information.

Then, the information registration section 2 displays candidate keywords it generates for the information to be registered by him or her by way of the interface as shown in FIG. 96 (Step S9303). For instance, the user can select one or more than one keywords relating to the information he or she is going to register from the "candidate keywords" as shown in FIG. 96 by using the check boxes arranged for the respective keywords. The user can also input any keyword he or she want to correlate with the information by entering it into the "others" field, if it is not displayed by the system (Step S9304).

The information registration section 2 can also retrieve pieces of information that relate to the one to be registered by the user from the information accumulated in the disclosed information accumulation section 6 on the basis of the keywords correlated to the piece of information to be registered by the user and display a list of pieces of information that relate to the one to be registered by the user as shown in FIG. 97. Then, the user can accumulate any of them in the disclosed information accumulation section 6 as related pieces of information (Step S9305). At this time, the user can see the detail of each of the related pieces of information by operating the "reference" button in FIG. 97.

Thereafter, as the user operates the "registration" button in FIG. 97, the information registration section 2 registers the information entered into the disclosed information accumulation section 2 (Step S9306).

Then, the information registration section 2 notifies the user of the contents of the information registered by the user by way of the interface as shown in FIG. 98 and prompts the user to confirm them (Step S9307). At this time, the user can correct the registered information by operating the "amend" button in FIG. 98.

If there is a privileged user who is authorized to control the contents of the information accumulated in the information accumulation section 6, the information registration section 2 also prompts the privileged user to input keywords relating to the information to be registered and correlate it to other pieces of disclosed information.

Figure 12:
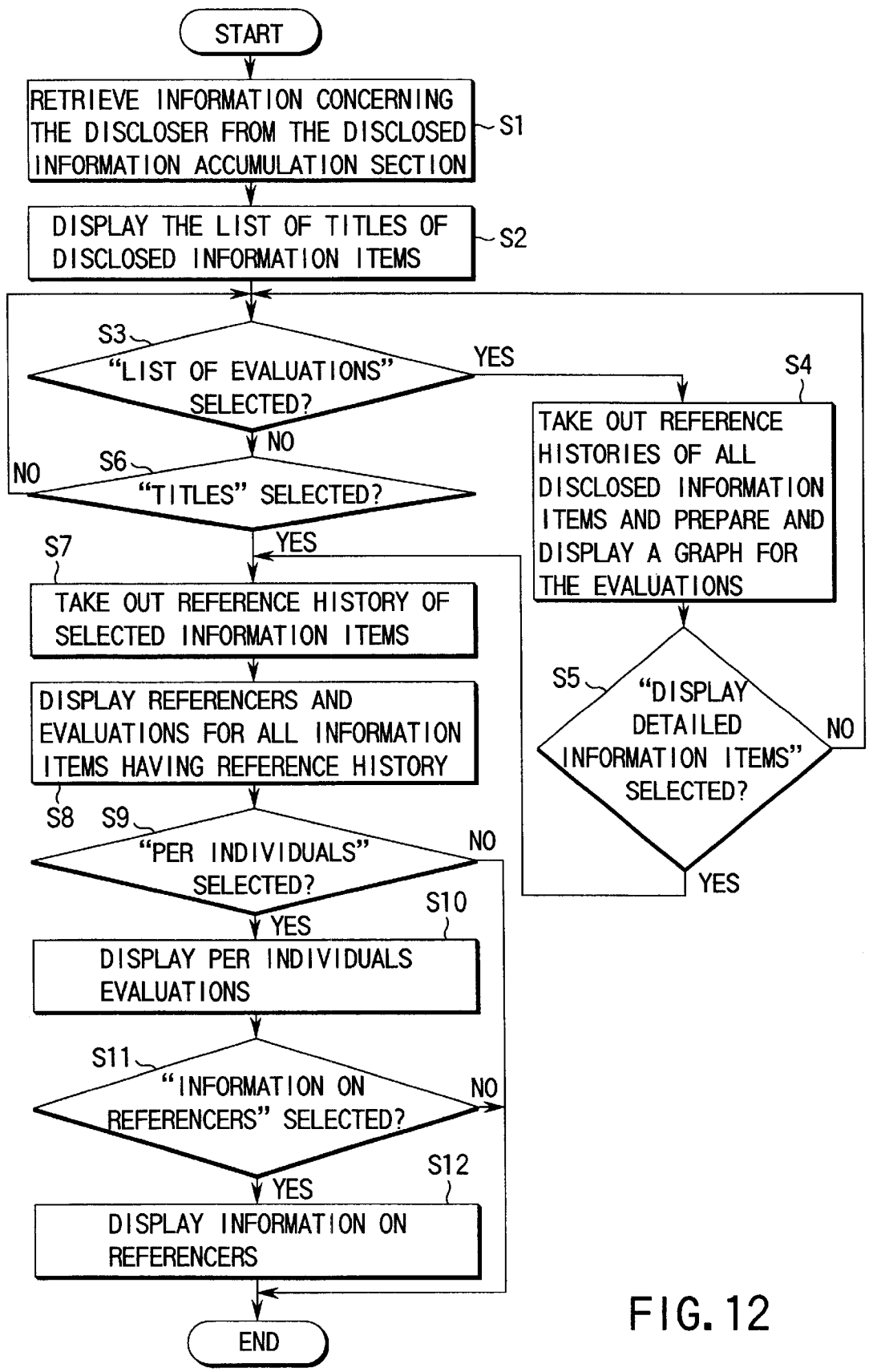
FIG. 12 is a flow chart for a processing operation of the evaluation notifying section.
Figure 84:
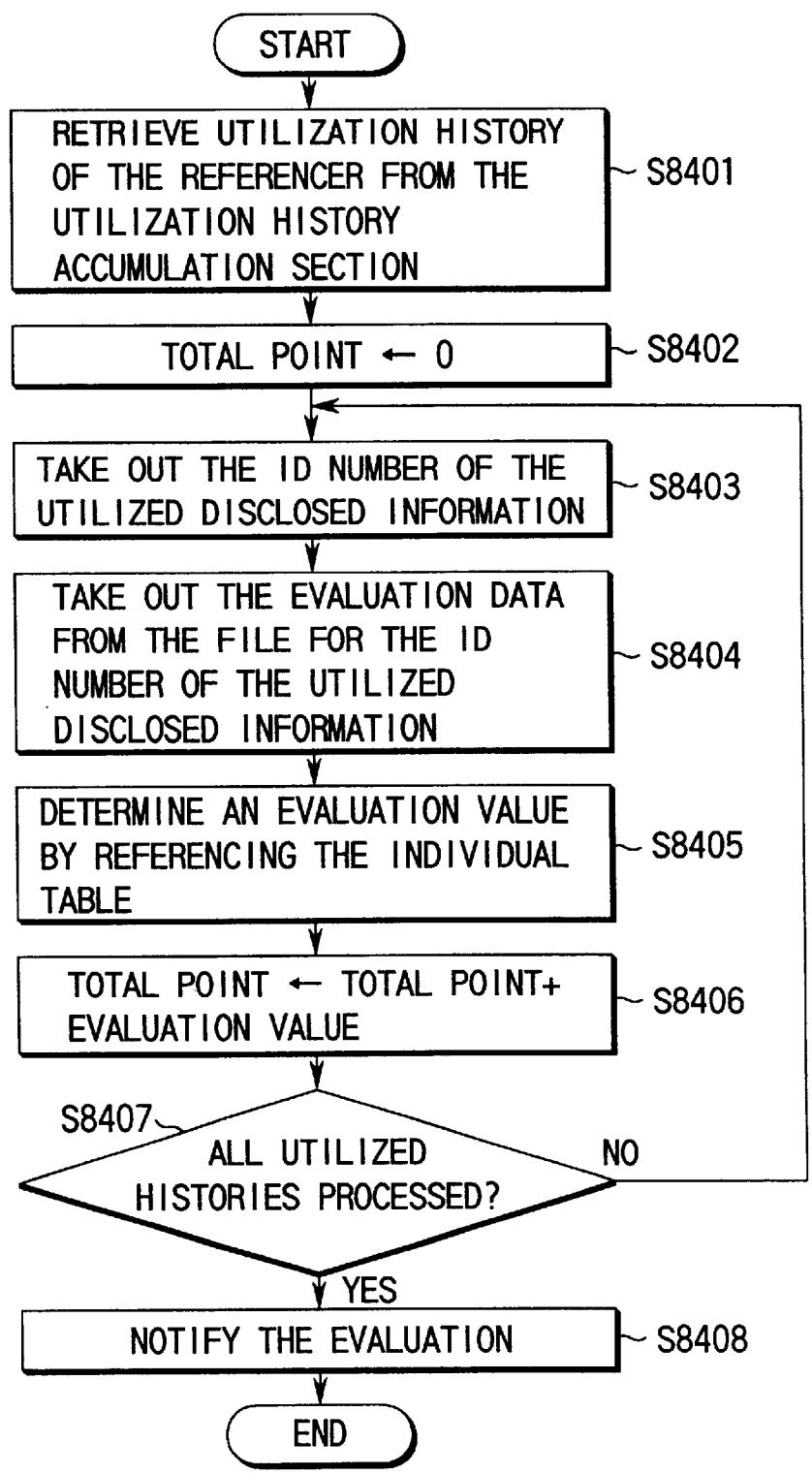
FIG. 84 is a flow chart of a processing operation of the utilization record evaluation section.

If the user requests the information sharing support system to reference the evaluations it has for the information registered by the user or Step S9109 of the flow chart of FIG. 91 is selected, the system operates to make the user reference the evaluations given to the information registered by him or her according to the flow charts of FIGS. 12 and 13 as described earlier by referring to the first embodiment or the flow chart of FIG. 84 as described above by referring to the sixth embodiment.

Now, the processing operation of information retrieval of Step S9107 of the flow chart of FIG. 91 will be described.

Figure 99:
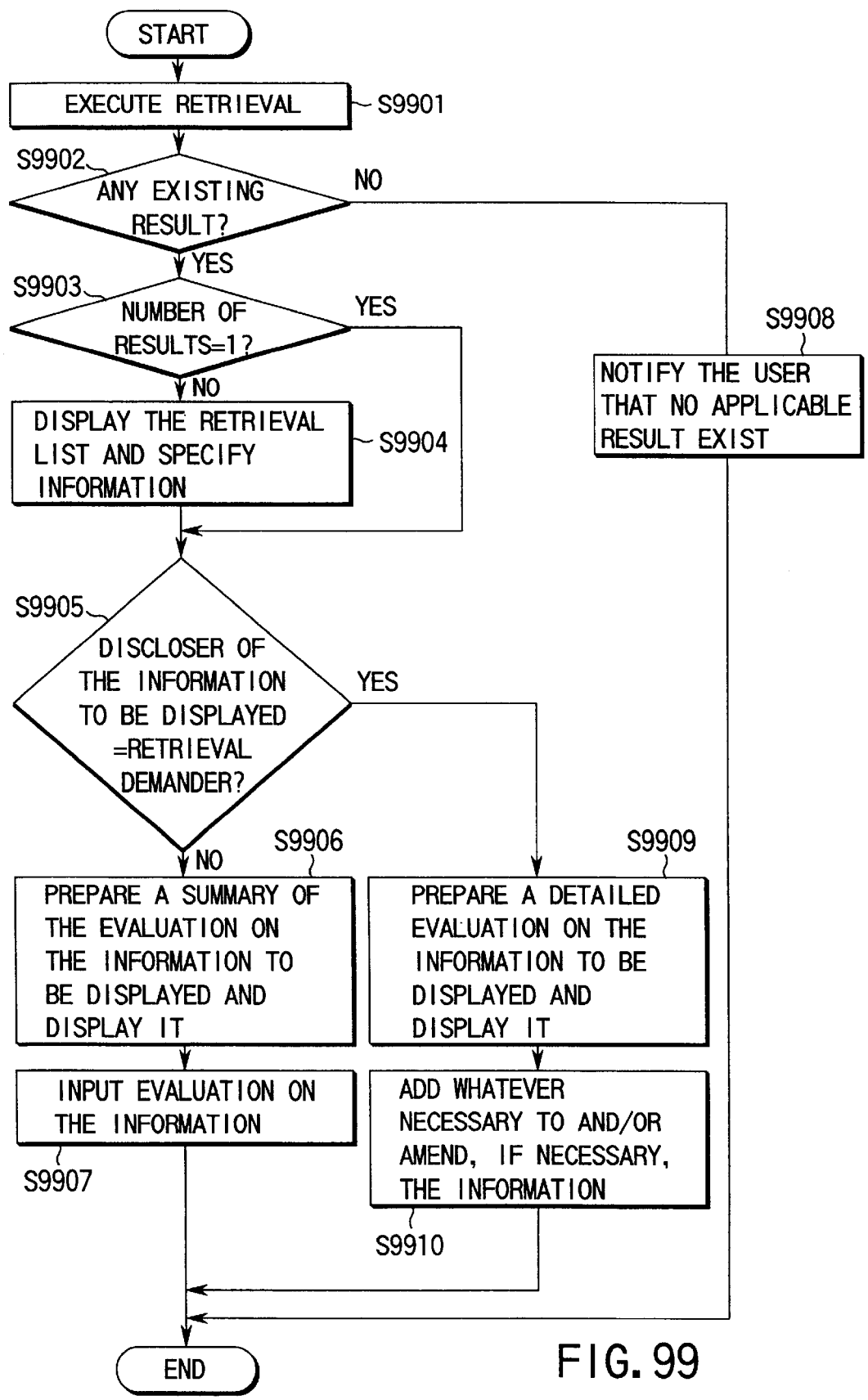
FIG. 99 is a flow chart for an information retrieval processing procedure.

FIG. 99 is a flow chart showing the detail of the operation of Step S9107 of flow chart of FIG. 91.

As illustrated in FIG. 5 for the first embodiment, the user can input a request for information retrieval by inputting the classification of the information he or she wants or one or more than one keywords for the information. Alternatively, the user can input a request for information retrieval by inputting a requesting sentence written in a natural language as shown in FIG. 31 for the second embodiment. Then, the information referencing section 3 retrieves the requested piece of information from the disclosed information accumulated in the disclosed information accumulation section 6 (Step S9901).

If the retrieved number of pieces of disclosed information is "0", the information sharing support system notifies the user that no such information is available to the user (Step S9908).

If there are a plurality of pieces of information retrieved in response to the user's request, the system displays a list of the pieces to prompt the user to specify what he or she wants to get. At this stage, the information referencing section 3 can support the information specifying operation on the part of the user by displaying the evaluations for the listed pieces of information that are accumulated in the reference history accumulation section 7 (Steps S9903 and S9904).

Now, the operation of supporting the information specifying operation of the user by displaying the evaluations as auxiliary information will be described by referring to FIGS. 101 through 103.

FIG. 101 shows an exemplary interface, showing what the system displays in response to a retrieving sentence of "What is the procedure for attending the society meeting?" input by the user when a plurality of pieces of disclosed information are retrieved by the system. The information referencing section typically displays an interface as shown in FIG. 101, which shows the retrieving sentence input by the user, the keywords extracted by the information referencing section 3 in response to the retrieving sentence and the result of the retrieval operation conducted according to the keywords. Additionally, the keywords relating to each of the extracted keywords are displayed in a hierarchical manner in a lower half of the display screen. Then, the user selects one or more than one keywords that seem to be relating to the information he or she wants from the hierarchically displayed keywords to retrieve a piece of information that may be very close to what he or she wants. For example, when the user uses the keyword "national convention" in FIG. 101, the number of candidate keywords relating to it may be reduced significantly due to the limited number of pieces of information stored in the disclosed information accumulation section.

FIG. 102 shows an interface displaying a hierarchical group of keywords in response to the selection of keyword "national convention" to prompt the user to specify a single keyword. In this interface, it will be seen that the screen shows a group of keywords, each of which is accompanied by a number indicating that the shown number of pieces of information can be retrieved if the keyword is selected. For example, the user will understand that a total of ten pieces of information that relate to keywords "national convention" and "speech" are stored in the system.

When the "display of candidates" button is operated in FIG. 102, a list of titles of the retrieved pieces of information will appear as shown in FIG. 103. Then, the information referencing section 3 can display icons saying, for example, "useful" and "useful to some extent" to show the approximate evaluations given to the respective pieces of information by referencing the evaluations accumulated in the reference history accumulation section 7. Then, the user can retrieve pieces of information to which other users have given high marks out of a plurality of candidates by relying on the icons.

Figure 104:
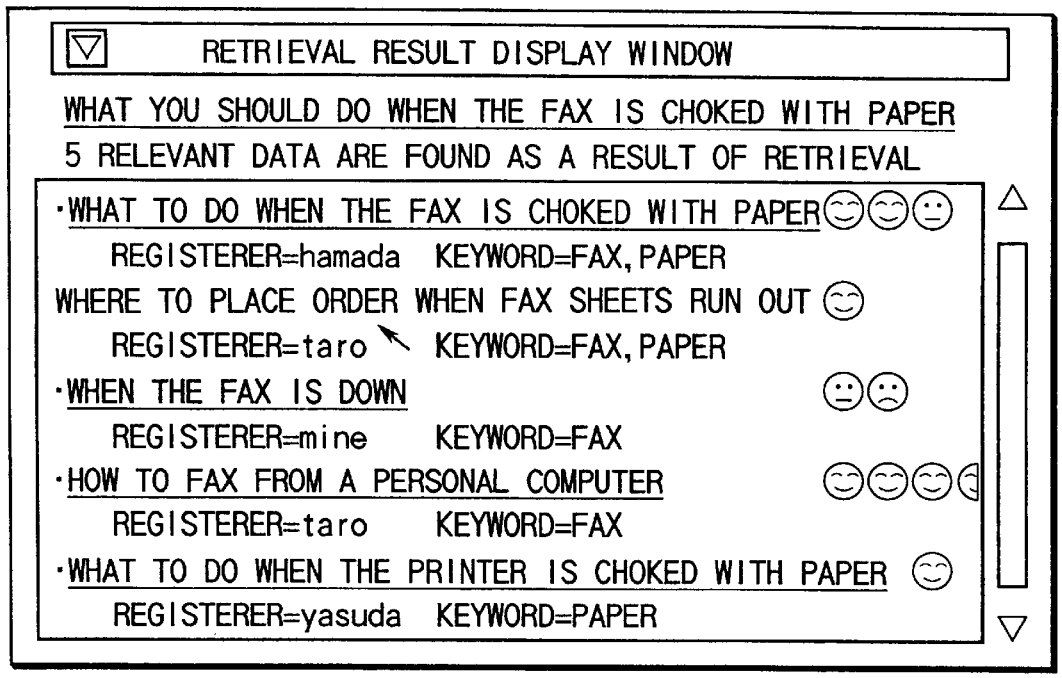
FIG. 104 is a further exemplary interface for an information retrieving operation, prompting the operator to specify a specific piece of information from the displayed candidates when a number of pieces of information can be retrieved.

FIG. 104 shows another exemplary interface, where the information referencing section 3 displays a list of pieces of information that have been preliminarily retrieved in order prompt the user to specify one of them. If the number of pieces of information retrieved by the section of the keyword(s) extracted from the retrieving sentence is not large, the information referencing section 3 may not use other related keywords any further to reduce the number of pieces of candidate information. Each of the titles listed on the screen is accompanied by one or more than one icons to show the rating given to it on the basis of the evaluations stored in the reference history accumulation section 7. While smiling and scowling icons are used to represent the respective evaluations and the number of icons given to each title represents the number of evaluations given to it in FIG. 103, any other techniques may be used to show evaluations as auxiliary information. For example, icons with different colors may be used depending on the rating and the number of evaluations or the displayed titles may be shown in different colors and/or fonts also depending on the rating and the number of evaluations given to each title.

As the user specifies one of the pieces of information displayed in FIG. 103 or 104 by selecting the corresponding title on the screen, the evaluations notifying section 11 checks if the user who is requesting the specified piece of information is the person who disclosed the information or a privileged user with regard to the disclosed information accumulation section 6 (Step S9905).

If the user is the person who disclosed the information or a privileged user, the evaluations notifying section 11 prepares a detailed evaluation report for the displayed information on the basis of the evaluation data accumulated in the reference history accumulation section 7 and displays the report to the user (Step S9909). If the user is neither the person who disclosed the information nor a privileged user, it prepares only a summarized evaluation report for the displayed information and displays it to the user (Step S9906).

Figure 105:
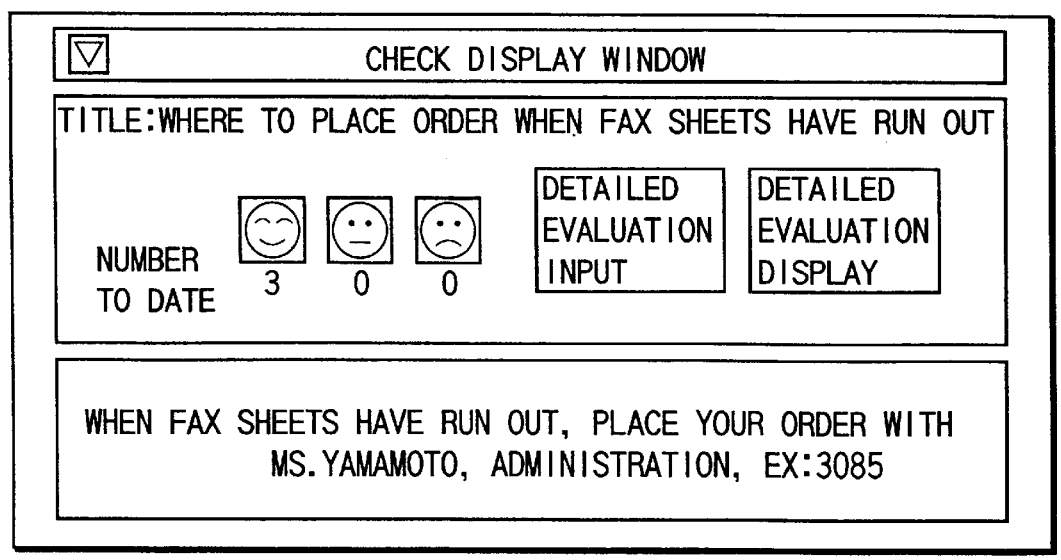
FIG. 105 is an exemplary interface for presenting the user information provided with summarized evaluations.

FIG. 105 shows an exemplary interface, where the evaluations notifying section 11 displays the specified piece of information with a summarized evaluation report. It will be seen that icons and the number of evaluations are shown under the title of the information. The user can enter his or her own evaluation on the information by selecting one of the icons there. Additionally, the user can call the interface as shown in FIG. 6 and described earlier by referring to the first embodiment to enter a more detailed evaluation on the information by operating the "detailed evaluation input" button. The user can see a detailed evaluation r eport by operating the "detailed evaluation display" button.

The evaluation notifying section 12 can modify the detailed evaluation report if the user requesting it is other than the person who disclosed the information or a privileged user.

FIG. 106 shows an exemplary summarized evaluation report that can be displayed on the interface. The number of evaluations and the average point are shown along with the maximum and minimum points given to the information, although it does not say which users gave which points nor if any comments have been entered or not.

FIG. 107 shows an exemplary detailed evaluation report that can be displayed on the interface. Then, the user can call an interface as shown in FIG. 10 or 11 and described earlier by referring to the first embodiment by operating the "list of evaluators" or "list of comments" button, whichever is appropriate.

Then, the user can enter his or her own evaluation on the disclosed information displayed to him or her (Step S9907).

Figure 100:
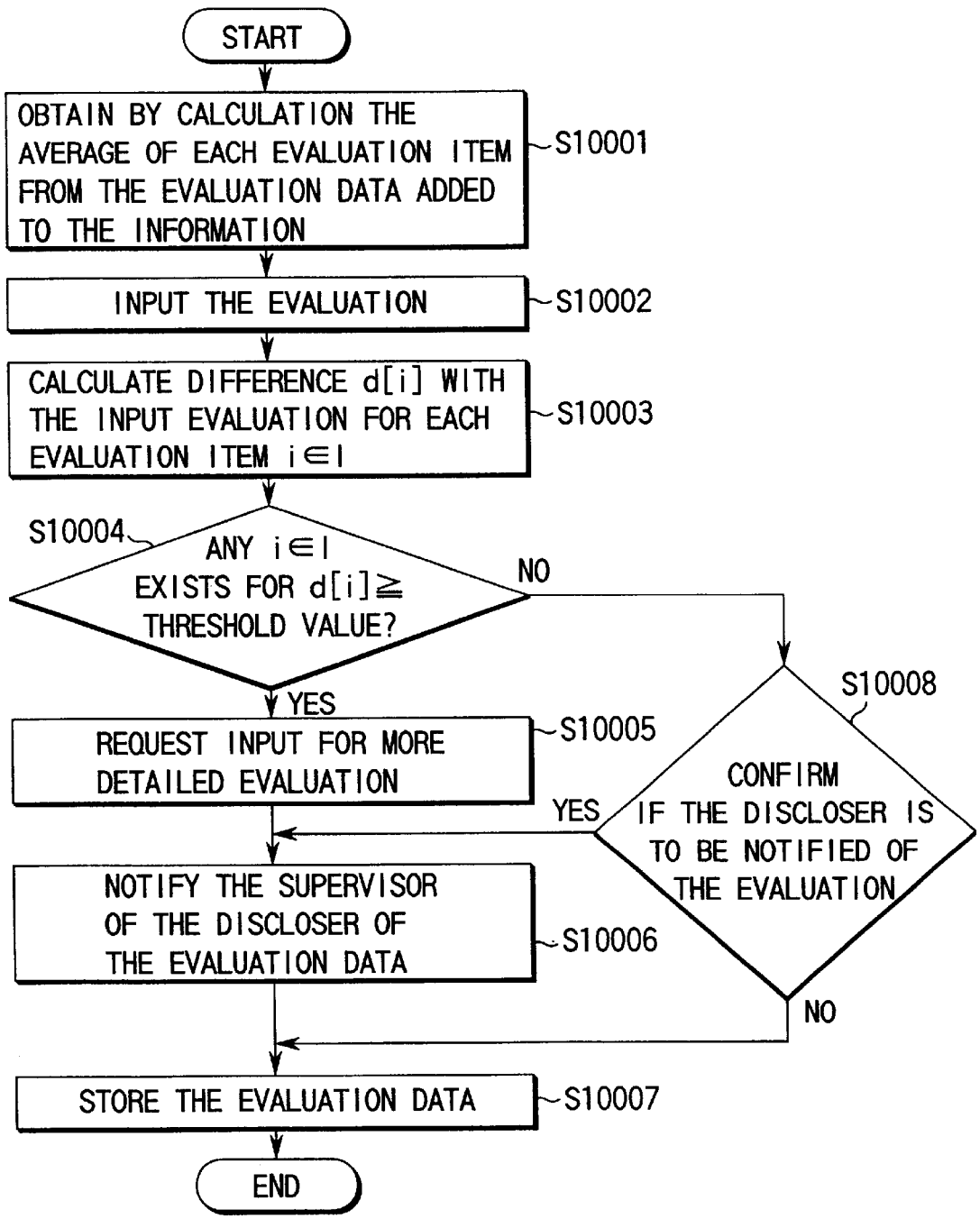
FIG. 100 is a flow chart for an evaluation input processing procedure.

FIG. 100 is a flow chart for the processing operation of entering an evaluation in Step S9907. As the user enters his or her evaluations to a piece of disclosed information, the evaluation section 9 determines by calculation the average for each evaluation item with the data stored in the reference history accumulation section 7 for the item (Step S100010.)

Evaluation data may be stored in the reference history accumulation section 7 typically in the format as shown in FIG. 37. While evaluation data may include "comments" and other non-numerical data, such non-numerical data are not used for determining the average.

As the user prepare evaluation data for the piece of disclosed information (Step S10002), the evaluation section 9 determines the difference between the average of the evaluation data stored in the reference history accumulation section 7 and the data newly entered by the user (Step S1003) for each evaluation item and sees if the difference exceeds a predetermined threshold value (Step S10004).

If the difference exceeds a predetermined value, the user has to drive the interface for entering the reasons for the rating he or she gave to that item (Step S10005).

FIG. 108 shows an exemplary image that can be displayed by the information sharing support system for a retrieval request of the user. It shows a group of buttons for entering simplified evaluations and the number of entered evaluations as auxiliary data. If the user operates the button "obsolete" having the smallest number of evaluation inputs (and therefore representing an evaluation that has not been selected before and hence is different from those of the other evaluators), an image as shown in FIG. 109 appears to prompt the user to enter more detailed data.

More specifically, if the user evaluated the displayed piece of information as "obsolete", the system prompt the user to specify what part of the information is obsolete. If the user gave it an evaluation different from other evaluators or that has not been given before, the system will prompt the user to enter more detailed data so that the system can realize and accumulate data on the flaws and/or the advantages of the information.

FIG. 110 shows another exemplary image that can be displayed by the information sharing support system to prompt the user to enter detailed data for his or her evaluations. As the user operates the "OK" button on the interface of FIG. 109 or 110, the data input by the user are accumulated in the evaluations accumulation section 9.

If the user who has entered the evaluations wants, the information sharing support system can notify the registered users and the privileged users of the evaluation data input by that user. Alternatively, it may be so arranged that, if the evaluations given by the user differ significantly from those stored in the system, the evaluations notifying section 11 automatically sends a message as shown in FIG. 111 to the registered users for the disclosed information and the privileged users (Step S10008).

As shown in FIG. 111, the message may include the contents of the piece of information evaluated by the user, the user's name and the detailed data of the evaluations.

When the information provider receives the notifying message as shown in FIG. 111, he or she can edit the information disclosed by him or her by operating the "edit the information" button. Additionally, the information provider can talk with the user who has just entered the evaluations by way of the network as the line is connected by operating the "mail to the evaluator" button in order to find out detailed data supporting the user's evaluations.

The information provider and the user-evaluator can talk with each other not by way of the network but by electronic mail or by some other non-simultaneous section.

While the information provider talks with a user each time when the user gives evaluations to the information disclosed by the information provider in the above arrangement, such a dialogue may take place in occasions other than the time when the user gives evaluations. For example, it may be so arranged that the user references the most recent evaluation data given to the information he or she has disclosed in a manner as described earlier for the first embodiment by referring to FIGS. 8 through 11 and thereafter talks with the user-evaluator who gave the evaluations to find out detailed data supporting the evaluations.

Figure 112:
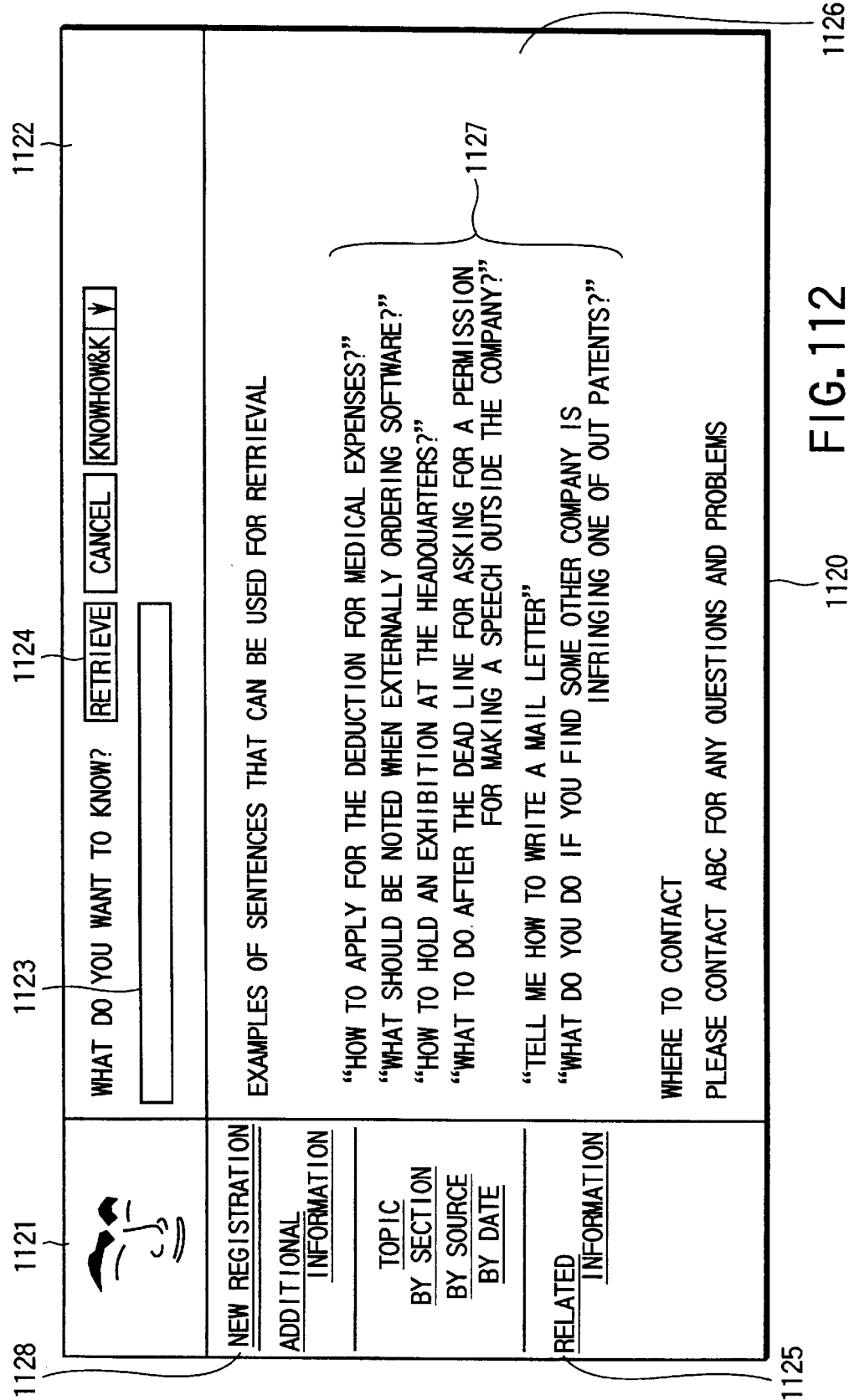
FIG. 112 shows an exemplary image on the interface screen for an information referencing operation of the seventh embodiment of information sharing support system.

FIG. 112 shows another exemplary image that can be displayed on the interface screen of the seventh embodiment of information sharing support system according to the invention.

Referring to FIG. 112, the information reference window 1120 comprises a face window 1121 for displaying the status of the system, a question input window 1122 where the user can specify the information he or she wants in a natural language, a menu window 1125 where the user can specify the type of information he or she wants from the system and a result display window 1126 for displaying the response of the system.

Figure 113:
FIG. 113 shows an exemplary image on the interface screen, displaying the result of a retrieving operation performed on the basis of a question in the natural language.

The user can make the system retrieve and display the information he or she wants by entering a question into the question input field 1123 in a natural language and operating the "execute retrieval" button 1124. Initially, the system shows in the result display window 1126 examples of questions 1127 that can be used to efficiently retrieve information FIG. 113 show an image that displays the result of an information retrieving operation performed by the system in response to the question entered in a natural language. The user inputs a question in a natural language into the question input field 1132 of the question input window 1131 and specifies the scope of retrieval by selecting an item in the scope specifying menu 1133. The result display window 1134 displays the result of the retrieving operation. The system also displays a message telling about the keyword(s) it used for the retrieving operation in response to the question and the number of pieces of information retrieved by the operation. The titles 1136 of the retrieved pieces of information are shown thereunder with summarized evaluation data added thereto in the form of icons 1137. It may be appreciated that in FIG. 113, not only the titles of the retrieved pieces of information but also a summary 1138 of the contents of each retrieved piece of information.

FIG. 114 shows an exemplary image that can be displayed on the display screen when the title 1136 is selected in the result display window of FIG. 113. The image of FIG. 114 comprises a window 1141 for displaying the evaluations given to the piece of information having the selected title and an information display window 1144 where the information specified by the user is displayed. It will be appreciated that icons 1142 representing the evaluations are shown with the title. A menu 1143 for entering simplified evaluations is also displayed under the title. The user can input his or her evaluation to the piece of information with that title by operating one of the buttons "useful", "useful to some extent", etc shown there.

Figure 115:
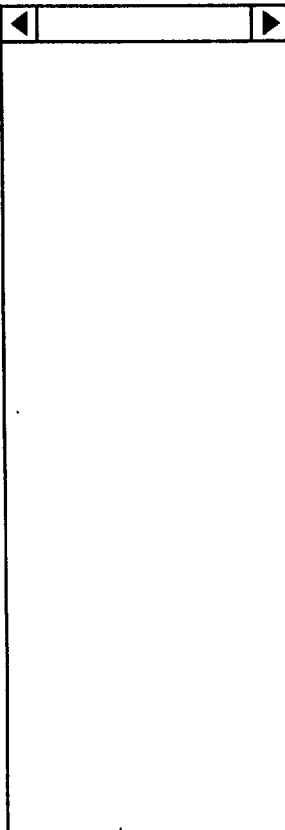
FIG. 115 shows an exemplary image on the evaluation display window that can be displayed when evaluation "obsolete" is specified in the evaluation input menu of FIG. 101.

FIG. 115 shows an exemplary image of evaluation input window that can be displayed on the screen when the "obsolete" button is selected in the evaluation input menu 1143 of FIG. 114.

A message telling the type of information to be added 1551 and a field 1152 for entering detailed data for the evaluation are displayed on the evaluation input window 1150.

Figure 116:
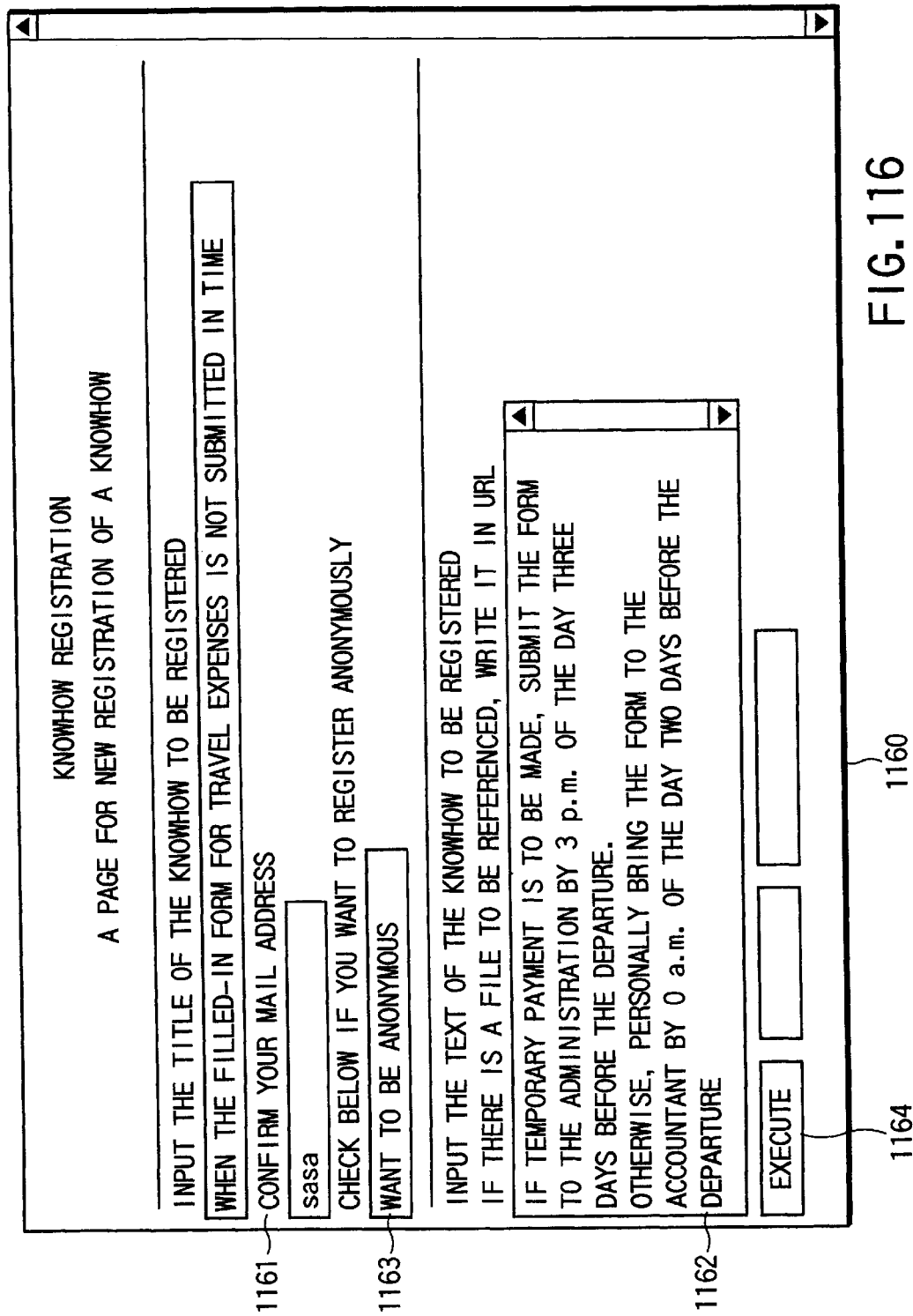
FIG. 116 shows an exemplary image on the interface screen that can be displayed when registering a piece of disclosed information.

FIG. 116 shows an exemplary image that can be displayed on the interface screen when a piece of disclosed information is registered by way of the information registration section 2. An information registration window 1160 as shown in FIG. 116 may be displayed when the "new registration" button 1126 is operated in the menu window 1125 of FIG. 112.

Then, the user can input the title of the disclosed information and the name of the discloser in the input field 1161. Additionally, the contents of the disclosed information to be registered can be input on the window 1162. If the user wants to register the disclosed information anonymously, he or she operates the "want to be anonymous" button 1163. Then, the disclosed information will be shown to the general users as anonymous information. When the "execute" button is operated, the information registration section 2 operates to adds keywords to the registered disclosed information.

FIG. 117 shows an exemplary image that can be used for the information registration section 2 to display the registered disclosed information to which keywords added by the section 2 to the user-registerer. The user can select the keyword(s) he or she thinks necessary for the disclosed information by operating the related check button(s) 1171. The user can also directly edit the contents of the keyword display field 1172.

FIG. 118 shows an exemplary image that can be displayed on the interface screen to show the additional information added to the disclosed information. A list of the titles of the added pieces of information 1181 is shown under the contents of the disclosed information 1180. The user can see the description for an selected one the titles each time he or she selects it from the list.

Figure 119:
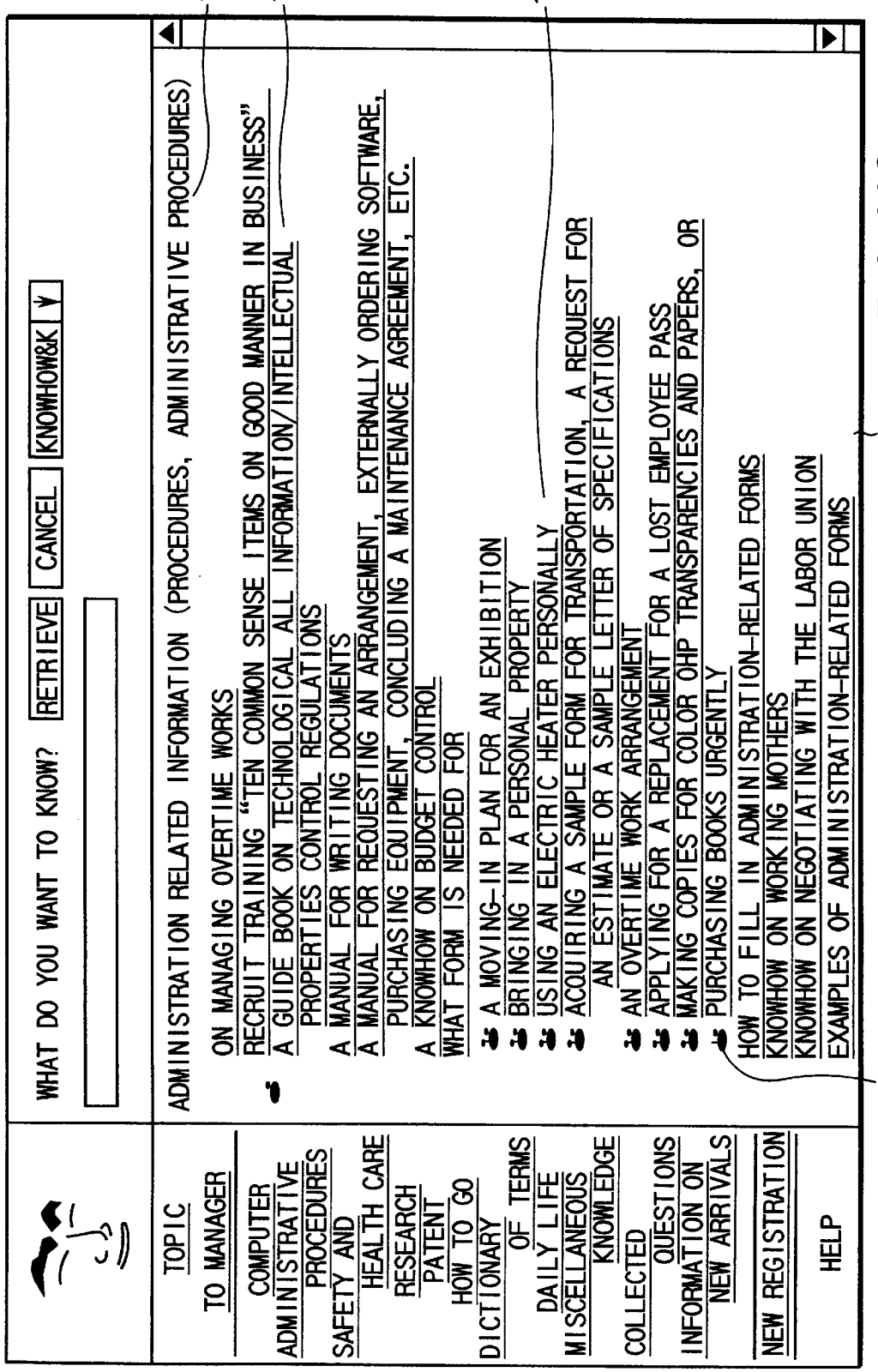

FIG. 119 shows an exemplary retrieval window that can be used when the user hierarchically references the registered pieces of disclosed information according to the classifications of the system without using a question written in a natural language. The result display window 1190 displays the hierarchical classification of the disclosed information. The hierarchy of the disclosed pieces of information can be made visible by section of indentations. The window shows an upper class 1191 and a lower class 1192 and then titles of a number of pieces of information 1193. An icon 1194 is shown for each string of characters that represents a piece of disclosed information.

As described above, the seventh embodiment provides the following advantages. First, the evaluations given to a piece of disclosed information can be presented efficiently to the information discloser in a manner that fits the intention of each user-evaluator.

Second, each user can see the evaluations given to the piece of information as auxiliary information along with the information per se so that the user may conveniently find the reliability of the disclosed information by referencing the evaluations.

Third, when the evaluations given to the disclosed information is presented to a user as auxiliary information, it may be shown in different level of detailedness according to the position or the authority of the user to protect the privacy of the evaluator who gave some of the evaluations.

Fourth, if the evaluation data entered by an information referencer differ significantly from the evaluation data that have been stored in the system, they can be quickly and effectively notified to the information discloser.

Fifth, if the evaluation data entered by an information referencer differ significantly from the evaluation data that have been stored in the system, the referencer-evaluator can be prompted to enter detailed data supporting the evaluations to make it possible to effectively utilize the evaluations.

Finally, attributes can be automatically extracted from each piece of disclosed information with this embodiment to the convenience of users. Additionally, the extracted attributes can be refined for accuracy by asking the information discloser and privileged users to confirm and, if necessary, correct them.

8th Embodiment

Now, the eighth embodiment of the invention will be described.

Figure 120:
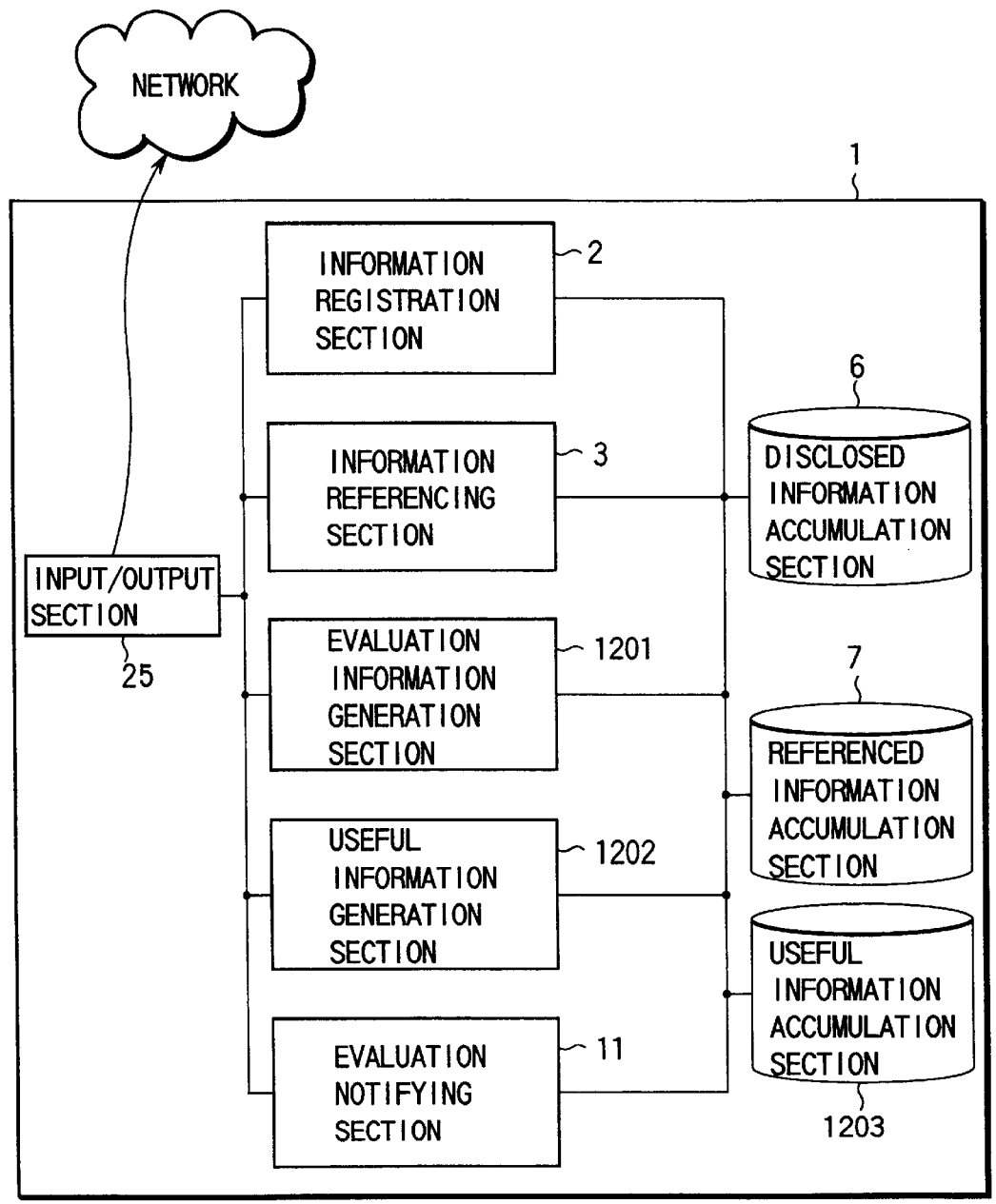

Referring to FIG. 120, this eighth embodiment of information sharing support system 1 comprises an input/output section 25, an information registration section 2, an information referencing section 3, a disclosed information accumulation section 6, an evaluation information generation section 1201, a reference history accumulation section 7, a useful information generation section 1202, a useful information accumulation section 1203 and an evaluation notifying section.

The input/output section 25 operates to receive one or more than one inputs in the form of text, still picture, movie and/or speech from the network to which it is connected. Alternatively, it may receive inputs directly from a keyboard, a mouse, a microphone or a camera without using a network.

The information registration section 2 operates to register the information disclosed by a user (information discloser-provider) to others in the disclosed information accumulation section 6.

The information referencing section 3 operates to retrieve, reference and utilize the information registered in the disclosed information accumulation section 6.

The reference history accumulation section 7 operates to accumulate the identifiers of the pieces of information that have been retrieved and referenced and, if necessary, accumulates the identifiers of the users and the records of information referencing operations including the dates of such operations.

The evaluation information generation section 1201 operates to obtain personal evaluations to a piece of disclosed information and statistically process the accumulated evaluations by using the reference records stored in the reference history accumulation section 7. The obtained data are then accumulated in said reference history accumulation section 7.

The useful information generation section 1202 determines the merits of each user to the system (to what worth the user has to the operation of the information sharing support system) from the information reference records accumulated in the reference history accumulation section 7 and accumulates the determined merits in the useful information accumulation section 1203.

The evaluation notifying section 11 notifies the determined merits to the person(s) empowered to evaluate personal merits.

Figure 121:
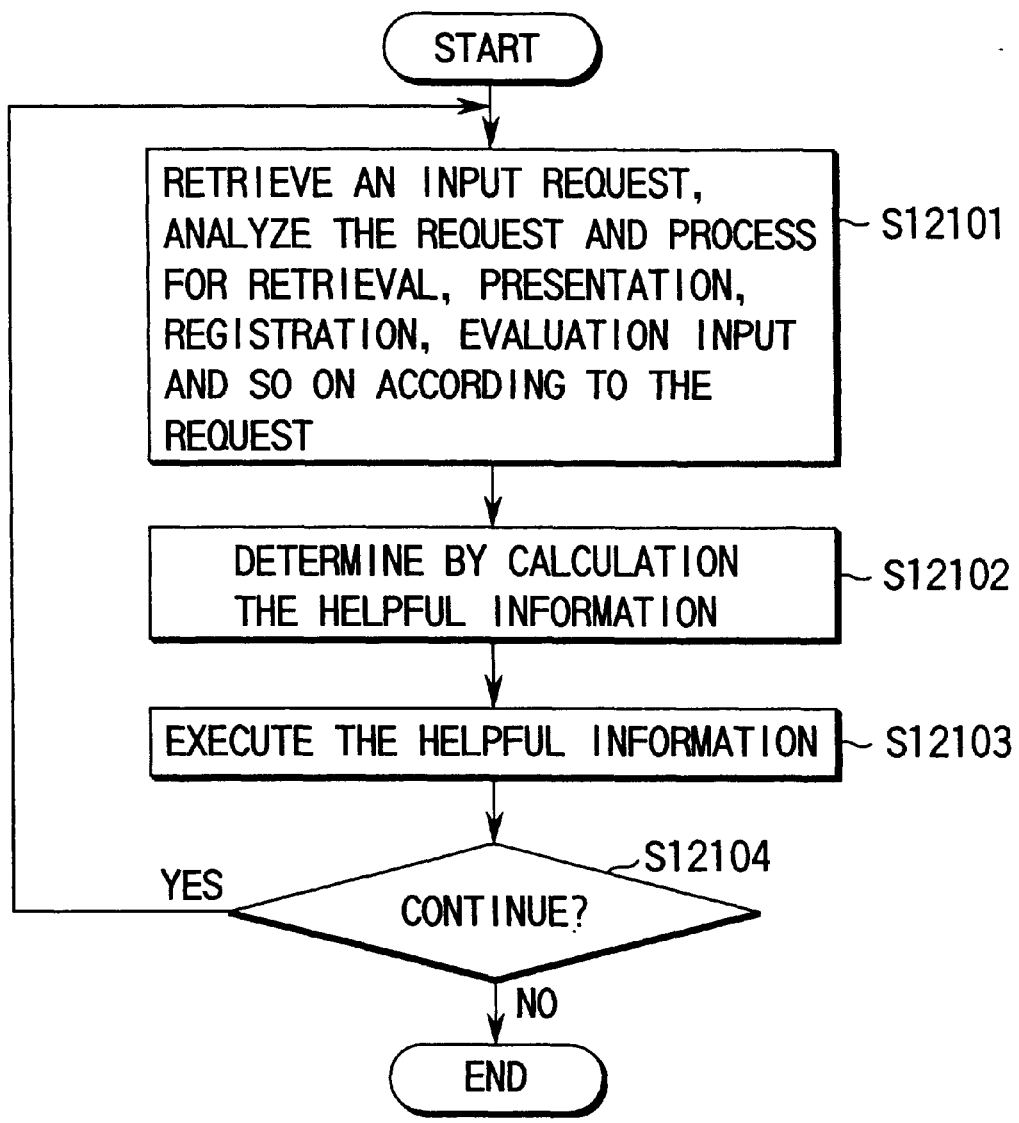

FIG. 121 shows a flow chart of the processing operation of the information sharing support system 1 of FIG. 120. The operation of the information sharing support system 1 will be described below by referring to FIG. 121.

Upon receiving a request from a user, the information sharing support system operates to display the requested information, accumulate relevant data and input the evaluations given by the user (Step S12101). This operation does not differ from that of any of the preceding embodiments.

Then, the information sharing support system causes the useful information generation section 1202 to determine by calculation the merits of the user in retrieving the information (Step S12102) and the determined merits are accumulated in the useful information accumulation section 1203 (Step S12103). Thereafter, the system receives another request of the user. If there is no other request, the system closes the operation (Step S12104).

Figures 122, 123:
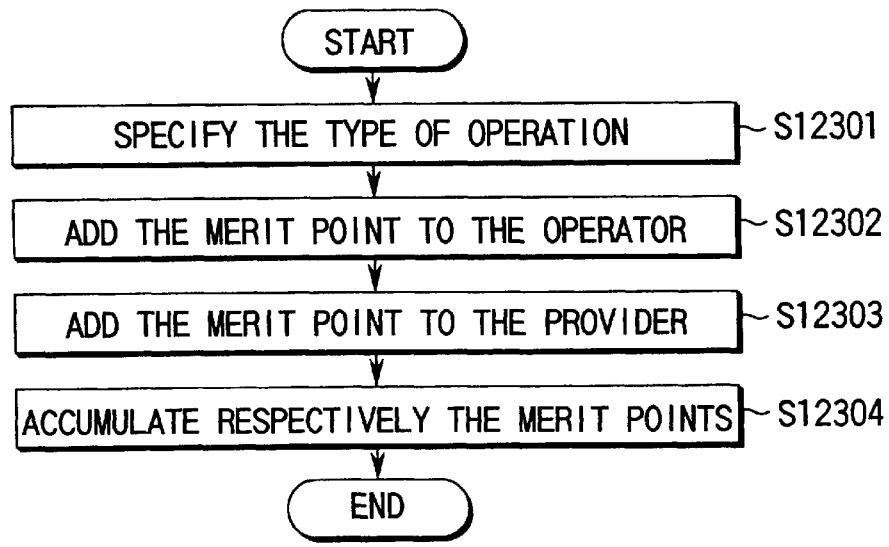

FIG. 122 shows an exemplary table of merit points that can be stored and used by the useful information generation section 1202 to determine the merits of the current operation of the user.

Referring to FIG. 122, it shows a number of points 1222, each of which will be added to the user for the current operation. It also shows a number of points 1223, which of which will be added to the information provider for the current operation.

FIG. 123 shows a flow chart for the useful information generation section 1202 to determining the merits of a user for the operation performed by him or her.

The useful information generation section 1202 finds out the type of operation performed by the user by referring to the operation records of the user (Step S12301) and increments the merit point of the operator-user and that of the provider of the referenced information by using the data on the table of FIG. 122 (Steps S12302 and S12303). The incremented merit points will then be stored in the useful information accumulation section 1203 (Step S12304).

FIG. 124 shows an exemplary table of merit points stored in the useful information accumulation section 1203. Merit points 1242 are given to the names of the users 1241 who utilize the information sharing support system 1. In this example, merit points are allocated to the number of accesses, information rerferencing, information registration, information evaluation and questions.

FIG. 125 shows an exemplary image that can be displayed on the useful information display window 1241 of the system to show the merit points accumulated in the useful information accumulation section 1203.

As shown in FIG. 125, the useful information display window 1241 shows the names of the users of the system in the descending order of their merit points. The merit points of the users can also be displayed in the descending order for each type of operation by using the attribute specifying menu 1252 arranged along the bottom of the window.

As described above, with the eighth embodiment of the invention, the merits of each of the users of an information sharing support system according to the invention can be expressed in numerical values from the point of view of the operation of the system by determining the merit of each user for each operation of driving the system and accumulating the determined merit points for all the operations of the user on the system. In other words, not only a fact of providing information for sharing but also a fact of referencing the information, that of evaluating it and that of providing information that is highly evaluated by others are evaluated to encourage the users to utilize the system and enhance the activity of the system.

9th Embodiment

The ninth through twelfth embodiments as described hereinafter represent so many different modifications to the additional information processing section 5 of FIG. 1.

Figure 126:
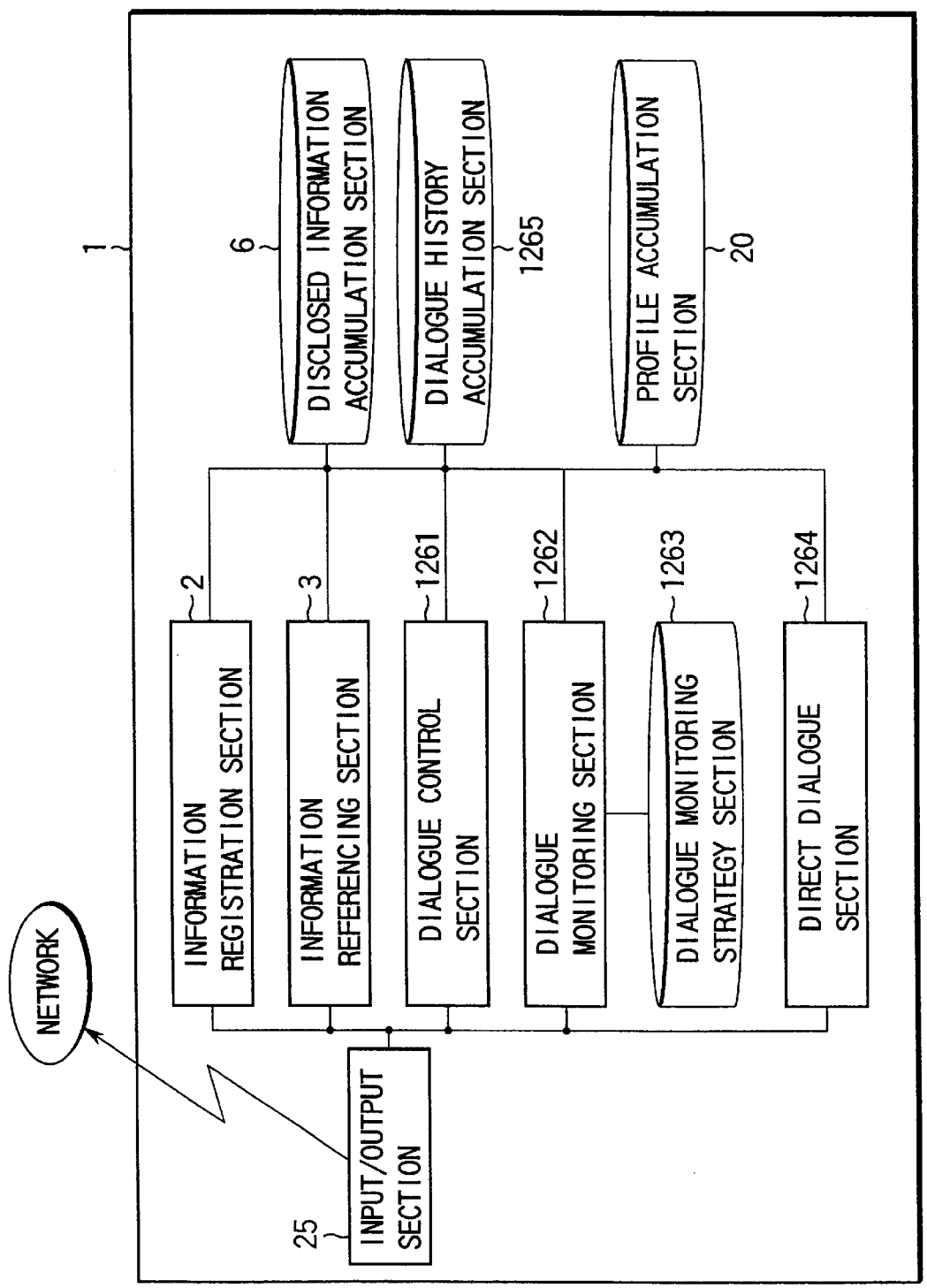

FIG. 126 is a schematic block diagram of the ninth embodiment of information sharing support system according to the invention.

Referring to FIG. 126, the information sharing support system 1 comprises an information registration section 2, an information referencing section 3, a dialogue control section 1261, a dialogue monitoring section 1262, a dialogue monitoring strategy section 1263, a direct dialogue section 1264 and a profile accumulation section 20.

The information registration section 2 operates to register the information disclosed by a user or a group of users to others in the disclosed information accumulation section 6. The information may be in the form of documents describing knowledge and/or knowhows, computer software and pictures.

The information referencing section 3 operates to retrieve, reference and utilize the information registered in the disclosed information accumulation section 6.

The dialogue control section 1261 controls the dialogue between the information referencing section 3 and the user when the user references the information accumulated in the disclosed information accumulation section 6 by way of the information referencing section 3.

The dialogue history accumulation section 1265 accumulate the records dialogues between the information referencing section 3 and each of the users of the system. Since the system 1 is accessible to a plurality of users, dialogue records will be accumulated for each of the users.

The users can talk with the system in a natural language or in GUI. However, user instructions can often be ambiguous. If such is the case, the information referencing section 3 issues additional information to more rigorously select candidate pieces of information to be retrieved on the basis of the history of dialogues accumulated in the dialogue history accumulation section 1265.

The dialogue monitoring section 1662 monitors the dialogue between an information discloser and a user by way of the information referencing section 3. The dialogue may be monitored by outputting dialogue history that may be voiced or expressed in the form of a text. When a plurality of users are handled, the dialogue monitoring strategy section 1263 will be consulted to determine how to monitor a plurality of dialogues concurrently.

The direct dialogue section 1264 asks detailed questions to the user on the disclosed information and connects the communication line between the user and the information discloser for a direct dialogue when the information referencing section 3 can no longer accommodate the situation.

The profile accumulation section 20 accumulates profile data on each of the users and groups of the users. The accumulated profile data may include data on the professional knowledge of each of the members and topics that may interest him or her. The accumulated data will be referenced when the dialogue monitoring strategy section 1263 is consulted to determine the mode of monitoring any specific dialogue.

The above described sections are connected to an input/output section 25 so that the user may input necessary data or the system may present information to the user. The input/output section 25 operates for input/output operations in the form of voice, keyboard operation, synthetic voice and text.

As the information demander requests the system to display information with voice or by section of the keyboard, the information referencing section displays the requested information in text or in synthetic voice. At the same time, the output of the system is presented to the provider of the information as a record of dialogue also in text or in synthetic voice.

In the information sharing support system 1, the input/output section 25 controls the transmission/reception of data by way of the network to which the system is connected. In other words, the users of a plurality of information sharing support systems 1 can access the disclosed information accumulated in the any of the systems by way of the input/output section 25 of his or her own system.

While FIG. 126 shows an arrangement where the users of a plurality of information sharing support systems 1 access the disclosed information accumulated in the system by way of the network connecting them, the user and the information provider can hold a dialogue by way of a stand-alone information sharing support system without using a network.

Now, the operation of the embodiment will be described by showing exemplary images that can be displayed on the user (information referencer) terminal (information sharing support system 1) trying to retrieve and reference disclosed information and the information provider's terminal (information sharing support system 1).

Figure 130:
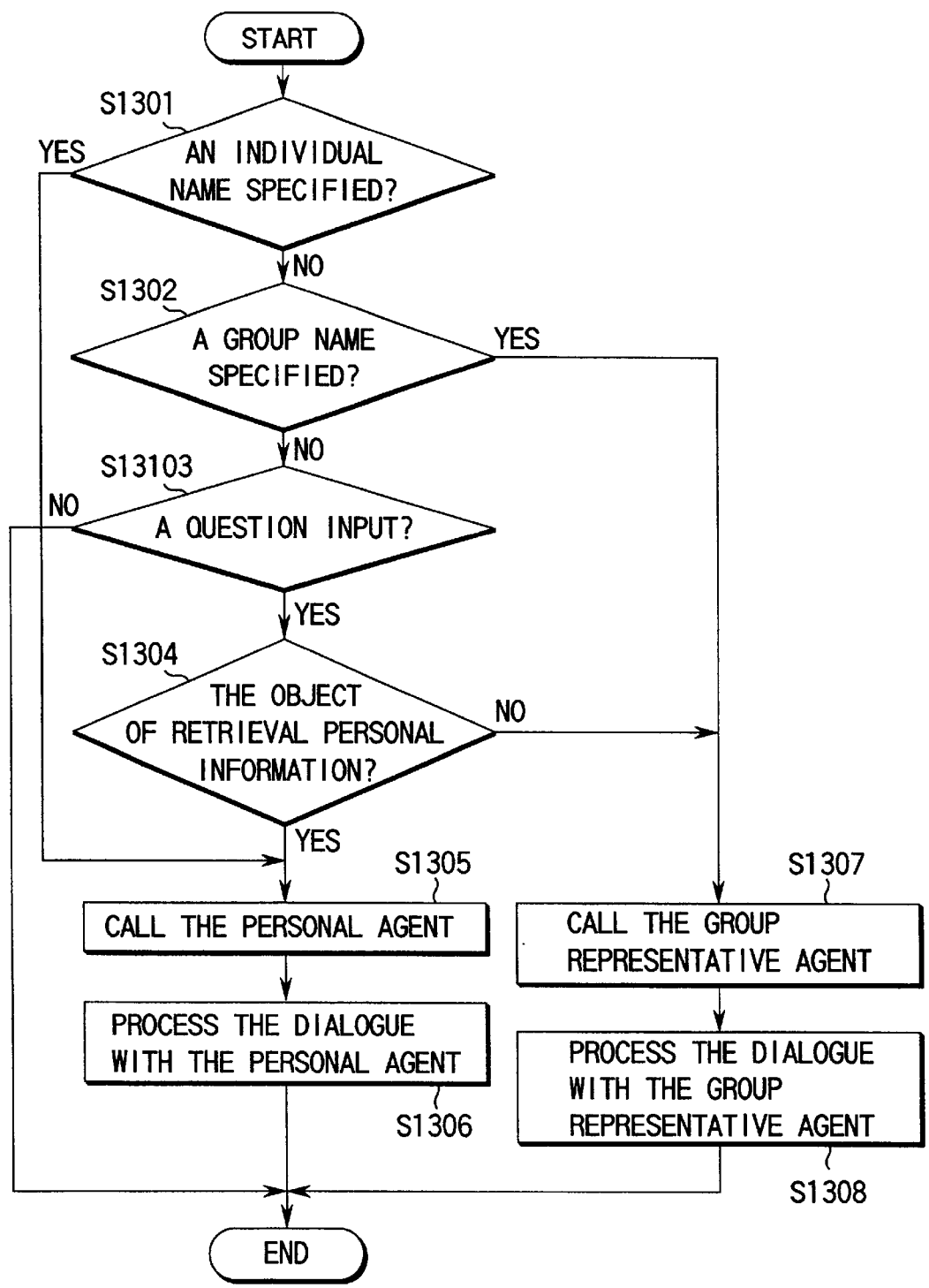

In this embodiment, the information referencer may call the agent of the information provider to retrieve the information disclosed by him or her. FIG. 130 shows a flow chart for the operation of calling the agent to retrieve information.

Referring to FIG. 130, if the user wants to specify the name of an information provider (for example "Kanako Suzuki") (Step S1301), he or she firstly calls the agent of the information provider (Step S1301). If, on the other hand, the user wants to specify the name of a group such as "in charge of working conditions" (Step S1302), he or she firstly calls the agent of the representative of the group, who may be the manager in charge of the group or the information manager of the group (Step S1307).

If a question such as "What do I do for making an overseas official trip?" is input (Step S1303), the system find out if the disclosed information to be retrieved belongs to a person or not (Step S1304) and, if it is found that it belongs to a person (Step S1305), the agent of that person is called. If, on the other hand, it is found that the disclosed information belongs to a group, the agent of the representative of the group is called (Step S1307).

The possessor of the disclosed information being retrieved can be identified by referring to the list of the providers of the pieces of information registered and accumulated in the disclosed information accumulation section 6. Alternatively, the possessor may be identified by referring to the profiles of the persons and the groups accumulated in the profile accumulation section 20 and to the level of professional knowledge that meets the information to be retrieved.

FIGS. 127A, 127B, 128A and 128B show exemplary information retrieving images that can be displayed on the terminal of the information referencer.

Figure 127A:
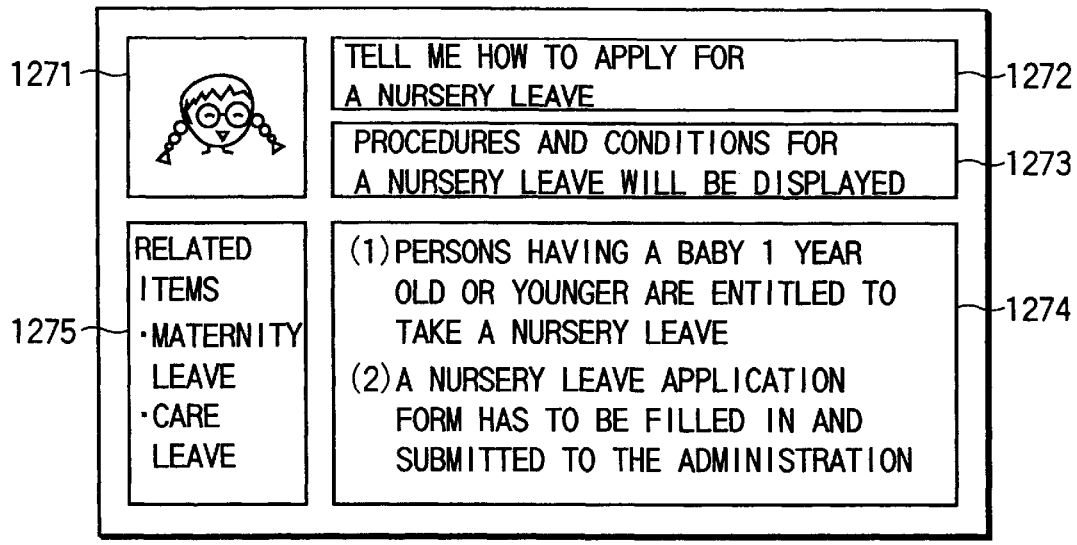

The image of FIG. 127A has a symbol display region 1271 for the agent of the information discloser, a question input window 1272, a response display window 1273 for display the response of the agent, a disclosed information display window 1274 and a related items display window 1275.

In FIG. 127A, the agent answers to a question "Tell me how to apply for a nursery leave." entered into the question input window 1272. It will be noted that the agent on the symbol display window 1271 is smiling.

Figure 127B:
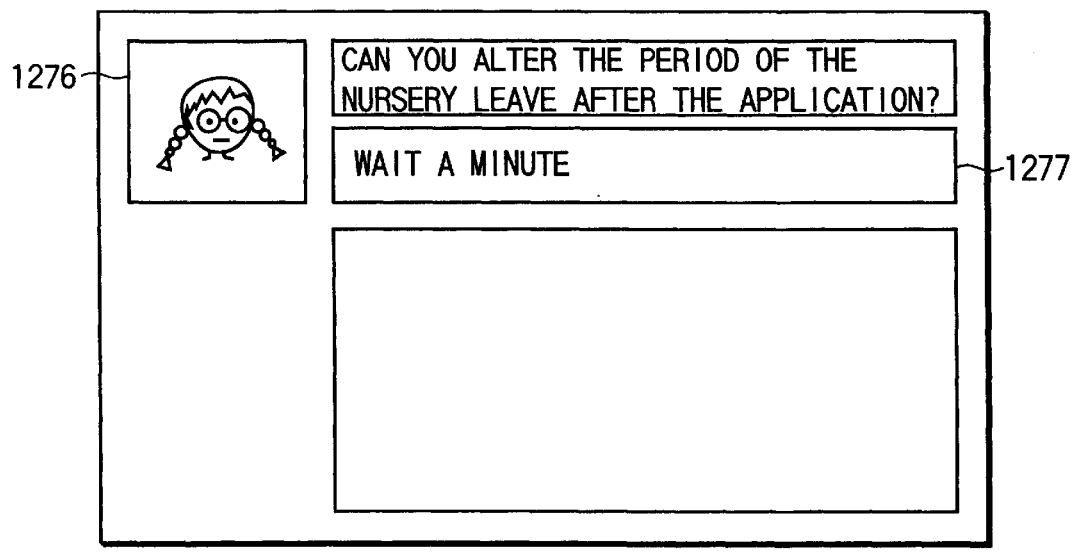

In FIG. 127B, the user inputs a question "Can you alter the period of the nursery leave after the application?" into the question input window 1272 of FIG. 127A. Then, the agent in the symbol display window 1271 shows an annoyed face and "Wait a minute" is displayed on the response display window 1273 because no information that can answer the question has been registered in the system.

Meanwhile, the direct dialogue section 1264 connects the communication line between the information discloser and the person retrieving and referencing the disclosed information. As the line is connected for a direct dialogue, the screen switches the image of FIG. 127B to the image of FIG. 128A.

Figure 128A:

In the image of FIG. 128A for a direct dialogue, the symbol display window 1271 of FIG. 127B is replaced by a window 1278 for showing the information discloser's face. Additionally, there are shown a dialogue display window 1279 for the dialogue between the information demander and the information provider and an information display window 190 for displaying the disclosed information.

Figure 128B:

FIG. 128B shows an image that can be displayed when the user and the information provider are talking to each other in voice so that the dialogue display window is not necessary.

Figure 129:
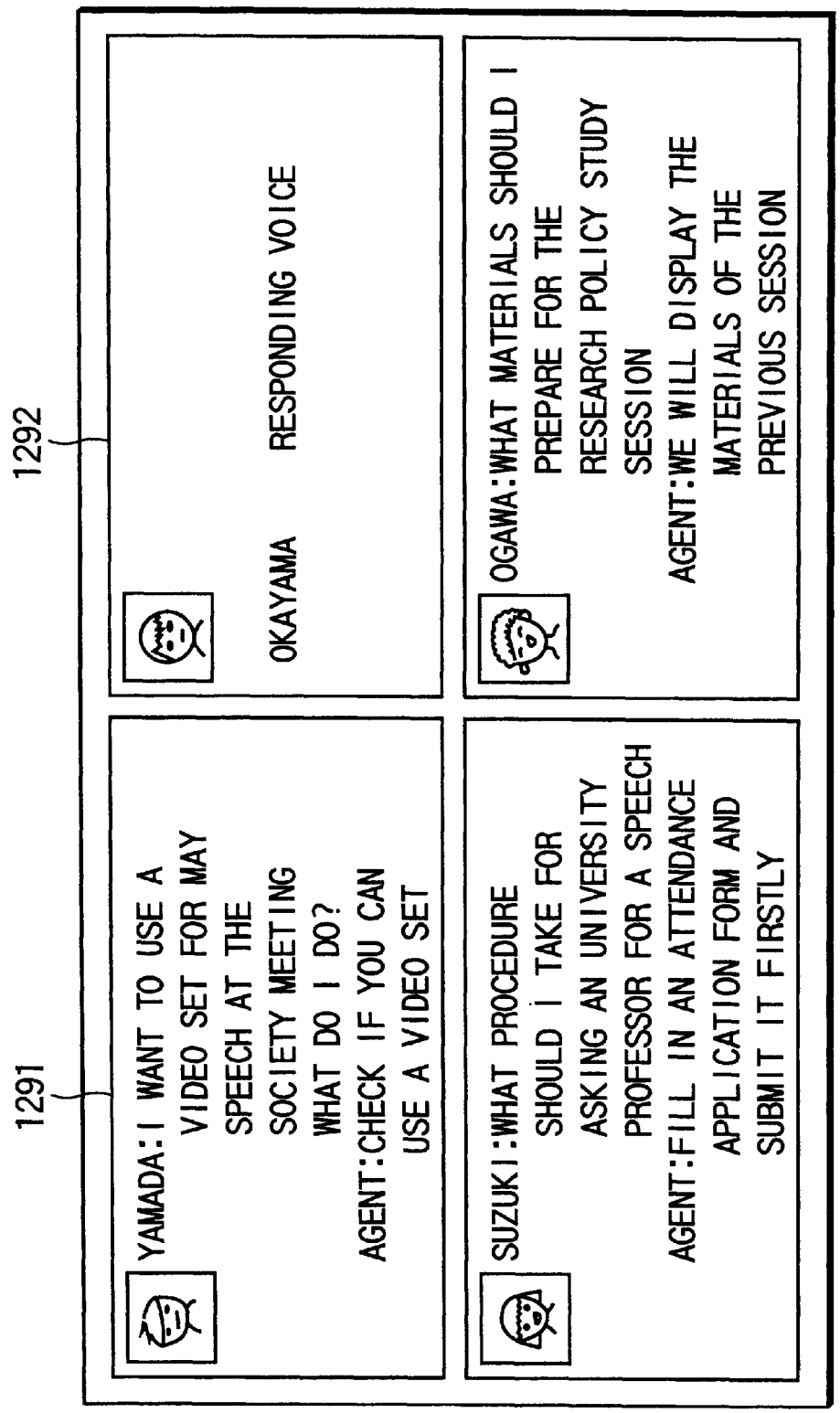

FIG. 129 shows an exemplary image that can be displayed on the information discloser's terminal when his or her agent is displaying the information. The dialogue between the agent and the user can be retrieved from the dialogue history accumulation section 1265 and displayed on the dialogue display window 1291 if the information discloser wants. The user's face and the dialogue between the agent and the user are displayed on the dialogue window 1291.

If the agent is displaying the disclosed information to a plurality of users simultaneously, a plurality of dialogue windows 1291 will be shown on the screen. The information discloser can hear the dialogue between the user and the agent. If such is the case, the dialogue display window 1292 may simply show a message that the information provider can hear the dialogue.

Now, the processing operation of the information sharing support system will be described in detail by referring to the flow chart of FIG. 131.

In the embodiment of information sharing support system, the agent of the information discloser operates to retrieve and display pieces of information out of the disclosed information accumulated in the disclosed information accumulation section 6 in response to a request of the information demander.

The information discloser can select a personal confirmation mode so that the agent should send any answer to the user after getting a personal consent/confirmation from the information discloser. The information discloser can also monitor the dialogue between the agent and the user only when he or she selected a dialogue display mode because watching constantly such a dialogue is time consuming and can even be annoying as the information discloser is at work.

In the personal confirmation mode, the agent answers to the question of the user (Steps S13101 and S13102). If a personal confirmation mode is not selected, on the other hand, the agent shows the name of the user and the question to the information discloser to ask if the agent should answer for the information discloser or not (Steps S13101, S13102).

If the information discloser gives his or her consent, the agent can answer the question (Steps S13103, S13104). If not, the system connects the communication line between the user and the information discloser and switches to a direct dialogue mode (Steps S13103, S13105).

When the agent answers for the information discloser, the information referencing section 3 retrieves the information that may satisfy the user from the disclosed information accumulation section 6 and displays it to the user (Step S13104). At this time, the system also check if a dialogue display mode is selected or not and, if it is found that a dialogue mode is not selected, it stores a record of the dialogue in the dialogue history accumulation section 1265 so that the information discloser may see it some time later (Steps S13106, S13108).

If a dialogue display mode is selected, on the other hand, the system also checks if a voice output mode is selected or not (Step S13107). If selected, it outputs the dialogue between the agent and the user to the information discloser's terminal in voice (Step S13109).

If, on the other hand, a voice output mode is not selected, the system displays the text of the dialogue (Step S13110).

Now, the processing operation of displaying the dialogue between the agent and one or more than one users on the information discloser's terminal will be described by referring to the flow chart of FIG. 132.

When the agent responds to a plurality of users, the system gives priorities to the dialogues between the agent and the respective users according to the questions posed by the users and displays the dialogues according to priority.

When a user poses a question to the system, it checks to see if the agent of the disclosed information in question is already responding to some other user or not (Step S13201). If the agent is not talking with any other user, the system gives the user a highest priority for dialogue (Step S13203).

If the user is already talking with some other user, the dialogue monitoring strategy section 1263 determines by calculation the priorities of the questioning users (Step S13202).

Additionally, the system checks if a voice output mode is selected for displaying a dialogue (Step S13202). If yes, it outputs the dialogue in voice between the agent and the user having the highest priority (Step S13205) and displays any other dialogues in text (Step S13207).

If there is a dialogue being output in voice and a newly started dialogue has a priority higher than that dialogue, the system sends a message to the information discloser, telling him or her that the dialogue being presented to him or her in voice will be switched, and then outputs the dialogue between the agent and the new user in voice.

If a voice output mode is not selected, all the concurrent dialogues will be displayed on the information discloser's display screen in text (Step S13206). Alternatively, they may be displayed by section of icons to minimize the work load on the part of the information discloser.

FIGS. 113A through 113C show exemplary profile data that can be stored in the profile accumulation section 20 and referenced by the dialogue monitoring strategy section 1263 for determining priorities.

As shown in FIGS. 113A through 113C, profile data may contain topics of dialogue 1331 and their respective points 1332, keywords 1333 appearing in dialogues and their respective points 1334 and users-dialogue holders 1335 and their respective points.

The dialogue monitoring strategy section 1263 obtains the user's name, the topic of the dialogue with the user and the keyword of the dialogue from the dialogue control section 1261 by way of the information referencing section 3 and determines the point to be given to the dialogue by referencing the profile accumulation section 20. The point represents the sum of the point of the topic, that of the keyword and that of the user. If there are more than one topics and keywords, the points of the topics and those of the keywords are averaged respectively so that always a sum of three points may be obtained. Alternatively, the topic, the keyword and the user may be weighted in a manner as specified by the user.

As described above, with the ninth embodiment, when the information referencing section 3 can no longer respond to all the users asking questions concurrently, it selects the direct dialogue mode to make each of the users to directly talk with the information discloser. Then, the image of the information discloser and the symbol of the information referencing section 3 are displayed on a same region of the display window of the user to tell the user that the direct dialogue mode has been selected. At the same time, the information referencing section 3 is smoothly switched to the information discloser to efficiently carry on the dialogue with the user. Additionally, the information discloser can monitor the dialogue between the information referencing section 3 and the user in voice to minimize the work load on the part of the information discloser. With this arrangement, the information discloser can monitor the dialogue in voice if the dialogue seems to him or her very important or if the information referencer expects the mode of dialogue to be switched to a direct dialogue mode. Thus, the switching operation from the indirect dialogue mode to the direct dialogue proceeds very smoothly.

10th Embodiment

Now, the tenth embodiment of the invention will be described.

FIG. 134 is a schematic block diagram of the tenth embodiment of information sharing support system according to the invention. Note that the components that are similar to those of the first embodiment are denoted respectively by the same reference symbols and will not be described any further. Only the difference of the two embodiment will be described below.

Referring to FIG. 134, the information sharing support system 1 comprises an information registration section 2, an information referencing section 3, an additional information registration section 22, an additional information disclosure control section 1341, an additional information disclosure conditions input section 1342, an input/output section 25, a disclosed information accumulation section 6, an additional information accumulation section 16, an additional information disclosure conditions accumulation section 13643, a profile accumulation section 1344, an information contents comprehension section 17 and a dictionary/terms accumulation section 18.

The information registration section 2 operates to register the disclosed information of knowledge and knowhows, which will be accumulated in the disclosed information accumulation section 6. The information registration section 2 is interlocked with the additional information disclosure conditions input section 1342 so that the conditions to be met when any additional information is added to it after the disclosure are input simultaneously.

The information referencing section 3 operates to retrieve, reference and utilize the information registered by users in the disclosed information accumulation section 6.

The additional information registration section 22 is used to register additional information to the information being referenced by the information referencing section 3 for addition and/or correction and the additional information registered by the additional information registration section 22 is stored in the additional information accumulation section 16. The additional information registration section 22 is also interlocked with the additional information disclosure conditions input section 1342 so that the conditions to be met when any additional information is added to it after the disclosure are input by the registerer of the additional information simultaneously.

The additional information disclosure control section 1341 controls the disclosure of additional information on the basis of the data on the registerer, the information manager empowered to manage the accumulated information, the disclosure conditions registered by the registerer of the additional information, the technical field of the disclosed information and the professional field of the registerer of the additional information.

The additional information disclosure conditions input section 1342 is also interlocked with the information registration section 2 and the additional information registration section 22, although the manager of information who manages publicly valuable information can also input disclosure condition. The entered disclosure conditions are accumulated in the additional information disclosure conditions accumulation section 1343.

In the disclosed information accumulation section 6, all the pieces of information accumulated there may be managed in a unitary manner or may be divided into a group of pieces of personal information registered and disclosed by individuals for personal applications and a group of pieces of public information including rules and regulations and business data registered for organizational applications. Then, the pieces of information of each group may be hierarchically organized and controlled.

The additional information accumulation section 16 accumulates pieces of additional information that are correlated to the corresponding respective pieces of disclosed information. The pieces of additional information accumulated there will be disclosed under the control of the additional information disclosure control section 1341 so that they may be shared by the members of the system along with the other disclosed information.

The additional information disclosure conditions accumulation section 1343 accumulates the conditions input by way of the additional information disclosure conditions input section 6 and correlated to the corresponding respective pieces of additional information so that the condition data stored in it for additional information may be referenced by the additional information disclosure control section 1341.

The profile accumulation section 1344 accumulates profile data on each of the users and groups of the users. The accumulated profile data may include data on the professional knowledge of the each of the members and the topics that may interest him or her. The accumulated data will be referenced by the information contents comprehension section 17 for determining the contents of information and by the additional information disclosure control section 1341 for determining the reliability of each piece of additional information to be registered.

FIGS. 135A and 135B show exemplary pieces of disclosed information accumulated in the disclosed information accumulation section 6.

Referring to FIG. 135A, each of the pieces of disclosed information comprises an information ID#, a number of attributes and the values of the respective attributes as described earlier by referring to FIG. 2. The information on FIG. 135A differs from that of FIG. 2 in that the "discloser" of FIG. 2 is replaced by the three items of "author", "registerer" and "manager".

FIG. 136 shows an exemplary image that can be displayed on the user interface screen. In FIG. 136, the "specify conditions" button 1361 is used by the user to enter the conditions for the disclosure of the additional information when the additional information is registered for a piece of information registered by way of the user interface.

FIG. 137 shows an exemplary image that can be displayed on the input window when the "specify conditions" button 1361 is operated by the user in the screen of FIG. 136.

It may be so arranged that default values are used for the user that may have been predetermined or selected by the user if the user does not explicitly specify an conditions on disclosing the additional information he or she has registered by way of the input window of FIG. 137. Then, the user may not have to input a set of conditions each time he or she registers a new piece of additional information.

If a set of conditions are specified for the professionals of a specific technical field, the "specify classification" button of FIG. 137 may be operated to find out the most qualified professional by using, for example, the ramified chart of FIG. 3 as data provided for the operation of the information contents comprehension section 17 of FIG. 134.

Now, the processing operation of the additional information registration section 22 for registering additional information to a piece of disclosed information retrieved by way of the information referencing section 3 will be described by referring to FIGS. 138A and 138B showing exemplary images that can be displayed on the user interface screen.

Referring firstly to FIG. 138A, a specific region 1381 of the retrieved piece of disclosed information is specified so that a piece of additional information may be added thereto. Then, a menu 1382 is displayed by operating the "input additional information" button. If "correction" is selected in the menu 1382, an additional information registration window 1383 as shown in FIG. 138B is displayed so that the name of the registerer of the additional information and the information per se can be input. Additionally, the registerer can specify the conditions under which the registered additional information can be disclosed.

The additional information disclosure control section 1341 determines if the additional information attached to a piece of disclosed information by way of the additional information registration section 22 should be disclosed or not and, if disclosed, to what extent so control the presentation of the additional information when the original piece of disclosed information is referenced.

The conditions under which the additional information registered by way of the additional information registration section 22 can be disclosed may then be accumulated in the additional information accumulation section 16 as they are correlated to the original piece of disclosed information and also to the additional information in a format as shown in FIG. 139. The disclosure conditions may comprise the disclosed information ID# 1392, the additional information ID# 1393, the disclosure conditions 1394 specified by the registerer of the original piece of disclosed information, the category of the additional information (the semantic relationship between the additional information and the original piece of disclosed information to which the additional information is added) 1395 and the disclosure conditions 1396 specified by the registerer of the additional information as shown in FIG. 139.

As will be described hereinafter, the judgment if a piece of disclosed information can be actually presented to an information demander or not may be made on additional information that is registered and correlated to the original piece of disclosed information each time such additional information is registered. Although in the example of FIG. 139, the judgment made on the conditions specified by the registerer of the original piece of disclosed information are recorded as the final judgment 1391 because such a judgment may often be satisfactory for exposing the piece of disclosed information to the information demander.

Now the operation of judging if a piece of additional information can be disclosed or not on the basis of the conditions posed by the discloser or the original information and/or those posed by the registerer of the additional information will be described by way of an example shown in the flow chart of FIG. 140.

When there are conditions posed by the registerer of the additional information (Step S14001), then, the scope of disclosure of the piece of information added to the original piece of disclosed information by the registerer of the additional information for the purpose of personal reference will be limited to the registerer him- or herself (Step S14002). In this case, if the additional information will be judged for allowableness of disclosure solely on the basis of the conditions posed by the registerer of the additional information because of the disclosure of the additional information does not affect the rest of the users regardless of the conditions posed by the discloser of the original information (Step S14003).

When there are not any conditions posed by the registerer of the additional information (Step S14001) or, if there are, they relate to disclosing the additional information to the users other than the registerer him- or herself (Step S14002), then, the system examines the conditions posed by the registerer of the original information (Step S14004).

If it is found that the conditions posed by the registerer of the original information contains those relating to the category of additional information, the system determines if the additional information belongs to any of the categories authorized for disclosure (Step S14004). If it belongs to a category that is not authorized for disclosure, the system judges that it cannot disclose the additional information (Step S14006).

If it is found that the conditions posed by the registerer of the original information do not contain those relating to the category of additional information (Step S14004) or the additional information belongs to any of the categories authorized for disclosure under specific conditions (Step S14005), the system examines the conditions for authorization for disclosure. Thus, if the conditions posed by the registerer of the original information do not require the agreement of the author or the registerer of the original information, the system determines that the additional information can be disclosed (Steps S14007, S14010). If they do, the persons authorized by the conditions are notified of the additional information and asked if the information can be disclosed or not (Step S14008). If all the authorized persons agree to disclose the information, the system determines that it can be disclosed (Step S14010). If, to the contrary, the disclosure of the information is not agreed by all the authorized persons, the system determines that it cannot be disclosed (Step S14009).

Note that the operation of examining the professional field of the additional information and its registerer as described earlier by referring to the first embodiment is also used in this embodiment.

The result of the above judging operation is recorded in the judgment column 1391 of FIG. 139 for future reference.

Now, the operation of the additional information disclosure control section 1341 for determining if the additional information is to be disclosed or not when the original piece of disclosed information is referenced will be described by referring to the flow chart of FIG. 141.

Firstly, as described earlier for the first embodiment by referring to FIG. 5, the selected piece of information will be displayed (Step S14101). Then, the system checks the additional information accumulation section 16 to see if there is any information added to the disclosed information. When there is not any, the operation will be terminated (Step S14102).

If there is but it is found that the additional information cannot be disclosed, it will not be disclosed to the user (Steps S14103, S14104). If it is determined that the additional information can be disclosed, the system examines the conditions for the disclosure of the information posed by the registerer of the additional information (Step S14105). Then, the system checks if the user referencing the disclosed information meets the conditions (Step S14107) and it presents the additional information to the user (Step S14109) if the user does but does not if the user does not (Step S14108).

When the user want to provide additional information to the disclosed information in the form of correction or addition, the additional information will be disclosed to the user unconditionally if the additional information is registered by the user (Steps S14105, S14106) and only when the conditions provided by the registerer are met by the user if the additional information is not registered by the user.

If the disclosed information accumulation section 6 separates pieces of information that are controlled individually by authors and registerers and those that are of highly public character and should not be controlled personally, it may be so arranged that the latter are managed by a specifically assigned manager, who is authorized to provide access conditions to any piece of disclosed information of public character in addition to the conditions posed by the registerer. If such is the case, the system may have a hierarchical structure and the disclosed information may be managed in a distributed manner.

The reliability of the system can be improved when the system is so arranged that each piece of the information accumulated in the system is made accessible not with the consent of the author or the registerer but that of a person who is selected to highly professional in the technical field to which that piece of information belongs according to the profile data accumulated in the system.

The profile data stored in the system may not necessarily relate to individuals and professional data relating to the positions within the organization may also be stored as part of the profile data. If such is the case, again, the system may have a hierarchical structure and the disclosed information may be managed in a distributed manner.

As described above, with the tenth embodiment of the invention, not only the discloser of a piece of information stored in the system but also users can add, correct, erased part of or give comments to that piece of information. The conditions under which the additional information is disclosed with the original piece of disclosed information are defined by both the provider of the original information (author, registerer and/or an authorized person) and that of the additional information. Additionally, since the additional information is managed for disclosure by taking those conditions into consideration, the shared information of the system can be managed not by a single manager and a distributed management system may be realized to allow the users to manage respective parts of the information accumulated in the system.

11th Embodiment

The eleventh embodiment of information sharing support system according to the invention may have the configuration as illustrated in FIG. 1.

FIG. 142 shows an exemplary piece of information that can be accumulated in the disclosed information accumulation section 6 of the eleventh embodiment of information sharing support system.

For the purpose of this embodiment, each piece of information comprises an information ID# 1421, its attributes 1422 and their descriptions 1423. The attributes include the title, the discloser, the date of disclosure, the category that may be a knowhow, software or a picture, the classification, the keyword, the contents and the referenced records.

FIG. 142 shows an example where a question is accumulated in the disclosed information accumulation section. The title is "Tell me how to fill in the form for placement of an order for equipment." The discloser is "Yuichi Tanaka" and the disclosure date is "Dec. 8, 1996". The category is "question" and the classification is "request for an arrangement". The related information is "how to get a manual on request for an arrangement" (information ID#300) and the keywords are "budget", "equipment" and "order placement". The contents include a questioning sentence.

The user interface as shown FIG. 3 or 4 can be used for the operation of inputting information in this embodiment by way of the information registration section 2 and that of retrieving/referencing information by way of the information referencing section 3. Additionally, the user interface as shown in FIG. 143 may also be used for the operation of retrieving/referencing information by way of the information referencing section 3.

Referring to FIG. 143, the user inputs a question in a natural language into the retrieving sentence input region 1432 of the information retrieval window 1431. Then, the information referencing section 3 extracts one or more than one keywords from the sentence in a natural language by section of a natural language processing technique such as morpheme analysis and then retrieves pieces of disclosed information that matches the extracted keywords from the disclosed information accumulation section 6. A method for retrieving data by section a natural language and generating a response sentence as described in Japanese Patent Application Laid-Open No. 7-86266 or No. 7-235805 may be used for the purpose of this embodiment.

FIG. 144 shows an exemplary image that can be displayed on the retrieval result display interface for displaying the result of an information retrieving operation conducted by mean of the user interface of FIG. 143. Referring to FIG. 144, the keywords 1442 extracted from the questioning sentence and a list 1443 of the titles of the pieces of disclosed information that match the keywords are displayed in the result display region 1441.

Then, the user can see the contents of one of the retrieved pieces of disclosed information by pointing the title thereof by section of an input device such as a mouse.

FIG. 145 shows an exemplary image that can be displayed on the user interface for presenting the contents of the selected piece of disclosed information. The title of the piece of disclosed information selected by the user, the name of the discloser and the contents are shown in the result display region 1452 of the screen.

The procedure described for the first embodiment for inputting additional information to be added by way of the additional information registration section 22 to the referenced information by way of the information referencing section 3 may also be used for this embodiment.

FIG. 146 shows a flow chart for a processing operation of this embodiment for displaying a piece of disclosed information when that piece is in the form of a questioning sentence.

Referring to FIG. 146, the system displays the piece of information requested for display (Step S14601). Then, the information contents comprehension section 17 determines if that piece represents a question or not (Step S14602). The information contents comprehension section 17 determines if the piece of disclosed information represents a subjective view or an objective fact in a manner as described earlier by referring to the first embodiment. Additionally, it determines if the piece of disclosed information represents a question or not in a similar manner. More specifically, if it contains a questioning expression accumulated in the dictionary/terms accumulation section 18 (e.g., "tell me" or "what"), the information contents comprehension section 17 determines that the piece of disclosed information represents a questioning sentence.

If the piece of disclosed information is not a questioning sentence, the information referencing section 3 presents that piece of information to the user in a manner as described earlier by referring to the first embodiment (Step S14603).

If that piece of information does not represent a question, the system checks if any additional question is registered in the additional information accumulation section 16 and displays the result (Step S14604). If there is no additional question, the system displays a menu for entering an answer and receives the request of the user (Step S14605).

FIG. 147 shows an exemplary answer input menu that can be displayed on the user interface. The answer input menu 1471 prompts the user to select one of the keys of "input answer", "additional question", "request for notification when the answer is registered" and "erase the menu".

If the user requests to "end the answer input", the system terminates the display (Step S14606). If the user requests to "input an additional question" (Step S14607), then the system displays an interface for entering an additional question and obtains the additional question from the user as an additional piece of information to be added to the piece of disclosed information in question and accumulate it in the additional information accumulation section 16 (Step S14608).

FIG. 150 shows an exemplary image that can be displayed on the user interface for entering an additional question. The user can input his or her question in the additional information input window 1500.

FIG. 148 shows an exemplary image that can be displayed on the user interface when the user selects "request for notification when the answer is registered" in the answer input menu of FIG. 147 (Step S14609). Then, the user inputs his or her name into the input field 1482 on the additional information input window 1481. Then, the name of the user wanting to be notified of the fact that the answer to the question is added to the accumulated information of the system as additional information for the question (Step S14613).

FIG. 149 shows an exemplary image that can be displayed on the user interface when the user selects "input answer"

from the answer input menu of FIG. 147 (Step S14610). Then, the user inputs his or her answer in the additional information input window and registers it. The registered answer will then be accumulated in the additional information accumulation section 16 (Step S14611). Once the answer to the question is registered, the user who disclosed the question and the user(s) wanting to be notified of the additional information will be notified of the fact that the answer has been registered (Step S14612).

FIG. 151 shows an exemplary image that can be displayed on the user interface when the user selects "request for notification when the answer is registered". In this example, an answer notifying window 1510 appears on the user's terminal screen wanting to be notified of the additional information to notify the user of the fact that the answer has been registered.

Now, the processing operation of adding a piece of disclosed information to another piece of disclosed information will be described. FIGS. 152 through 154 show exemplary pieces of disclosed information that can be accumulated in the disclosed information accumulation section 6, the additional information accumulation section 16 and the semantic relationships accumulation section 19.

FIG. 152 shows a piece of information that can be accumulated in the disclosed information accumulation section 6, to which any authorized users can add a piece of authorized information.

FIG. 154 shows an exemplary piece of disclosed information added to the information of FIG. 152. While each piece of authorized information is used in the format for additional information as described earlier by referring to the first embodiment, a piece of information in such a format will be handled as authorized information if it contains only a string of letters "authorized".

FIG. 153 shows exemplary data that can be accumulated in the semantic relationships accumulation section 19, which accumulates data having an "authorized" "semantic relationship". An authorized data may be deprived of the authorization in the course of time particularly when the related rules have been changed. If such is the case, a description "delete "authorized"" will be added.

FIG. 155 is a flow chart of the processing operation for adding a piece of authorized information to a piece of disclosed information. Now, this operation will be described by referring to the flow chart.

Firstly, the system identifies the user currently accessing the system (Step S15501). Then, the system process the request of the user. If the user wants to reference a piece of disclosed information, it retrieves the requested piece of disclosed information and presents it to the user (Step S15502). Then, it determines if the user has any privilege to the presented piece of disclosed information on the basis of the profiles accumulated in the profile accumulation section 20 and the classification of the presented piece of information (Step S15503). A privileged user relative to a specific piece of disclosed information as used herein section that the professional field of the user agrees with the technical field of that piece of disclosed information. In other words, the user has professional knowledge above a predetermined level. Then, the profiles accumulated in the profile accumulation section 20 are referenced to determine the professional field of the user.

FIG. 156 shows exemplary profile data that can be stored in the profile accumulation section 20. The profile says that the user is authorized to register authorized information of the item "authorized field" (1561).

If the user referencing a piece of disclosed information is not authorized in a specific field, the information referencing section 3 determines if a piece of authorized information is added to the piece of disclosed information referenced by the user or not. If yes, the added information will be displayed by the additional information notifying section 15 (Step S15504).

FIG. 157 shows an exemplary image of the user interface window that can be displayed when a piece of authorized information is added to the disclosed information. If the displayed piece of disclosed information 1570 is authorized, user will be notified of it typically by section of an icon 1572 that appears on the window. As the icon 1572 is operated by section of the input device, which may typically be a mouse, the authorized information will be displayed on the window 1571. Alternatively, the authorized information may be displayed simultaneously with the disclosed information 1570 on the window 1571. After the completion of the processing operation for displaying the authorized information, the system proceeds to the normal operation for displaying the disclosed information (Step S15505).

If the user referencing a piece of disclosed information is an authorized user, the system checks if that piece of information is an authorized piece of information or not (Step S15506).

If yes, the system displays the authorized information as in Step S15504 and then adds an operation of "cancellation of authorization" to the menu for selecting a piece of additional information to be registered for the disclosed information (Step S15508).

If the piece of disclosed information is not authorized, the system adds an operation of "authorization of information" in the menu (Step S15509).

FIGS. 158A and 158B show an exemplary image that can be displayed on the user interface when the user adds a piece of information to the disclosed information. Referring to FIG. 158A, the user specifies a disclosed information display region 1580 so that a menu 1581 for selecting the operation to be conducted for additional information. In this example, the disclosed information that is being displayed has been authorized as indicated by an icon 1582 so that the menu 1581 shows item "cancel authorization". When the item "cancel authorization" is selected on the menu 1581, an image as shown in FIG. 158B is displayed on window so that the user can select "OK" or "cancel".

When authorized information is added to a piece of disclosed information or the authorized information that has been added to a piece of disclosed information is deleted, the additional information accumulated in the additional information accumulation section 16 is corrected (Step S15512) and, at the same time, all the users who have referenced the disclosed information are identified on the basis of the operation records of the users stored in the additional information accumulation section 16 and notified of the fact that the authorized information has been modified (Step S15513).

FIG. 159 shows an exemplary image that can be displayed on the user interface of the user who is notified of the fact that the authorized information has been modified.

The operation of adding a piece of authorized information to a piece of disclosed information when a user referenced the disclosed information by way of the information referencing section is described above. However, with this embodiment of information sharing support system according to the invention, if the user is authorized to add authorized information to the piece of disclosed information he or she accesses if the disclosed information belongs to a specific technical field, the system can prompt the authorized user to add authorized information by showing him or her that no authorized information has been added to the piece of disclosed information that belongs to the specific technical field.

For example, if a piece of disclosed information is provided with unauthorized pieces of additional information, the embodiment can display the pieces of additional information as in FIG. 160. As shown in FIG. 160, the system displays a message 1602 telling the user the number of pieces of additional information that the user can authorize but has not authorized yet and a list 1603 of the titles of those pieces of additional information in the information display window 1601. Then, the user can select one of the titles on the list 1603 and displays the disclosed information under that title on the information display window 1601.

With the above described eleventh embodiment, any piece of information that a user has can be registered as disclosed information and, additionally, a piece of information the user does not possess can be registered in the form of a questioning sentence.

Thus, a user can find out what sorts of information the remaining users of the system wants and hence will be motivated to register any useful information he or she has to make that information to be shared by all the users.

Additionally, a user who has professional knowledge in the field of a piece of disclosed information can add authorized information to that disclosed information and the added authorized information can be displayed in a convenient manner to all the users of the system. There are pieces of information that represent personal subjective views or those that can become obsolete with time. While users of known information sharing support systems cannot know for sure if the information they are referencing are obsolete and hence unreliable or not, the above described embodiment is provided with a scheme to make the system reliable in terms of obsoleteness of information so that the users are encouraged to use the system positively.

12th Embodiment

Now, the twelfth embodiment of the invention will be described.

FIG. 161 shows a schematic block diagram of the twelfth embodiment of information sharing support system according to the invention.

Input data in the form of text, still picture, movie and/or speech will be entered into the system typically from a network through the input section 1611 and stored in the data storage section 1617. User instructions in the form of text or speech will also be entered by way of the input section 1611.

The input analysis section 1612 analyzes the input data and comprehends the request of the user.

The question storage section 1618 stores the user request obtained by analyzing the user input by the input analysis section 1612.

The data retrieval section 1614 retrieves data necessary to respond to the user request coming from the input analysis section 1612 out of the data stored in the data storage section 1617.

The related question retrieval section 1614 retrieves a question from the user request stored in the question storage section 1618 on the basis of the input data required by the input analysis section 1612.

The answer generation section 1615 generates an answer in the form of text, speech, still picture or movie or any combination thereof to the question from the output of the input analysis section 1612, that of the data retrieval section 1613 and that of the related question retrieval section 1614.

The output section 1616 presents the output of the answer generation section 1615 to the user.

FIG. 162 shows a block diagram of an information sharing support system obtained by modifying the twelfth embodiment. It will be appreciated that this embodiment differs from the twelfth embodiment in that it additionally comprises a question presentation section 1621.

Referring to FIG. 162, the answer generation section 1615 generates an appropriate answer to the user request by taking the outcome of the retrieval operation of the system. On the other hand, the question presentation section 1621 operates to presents the user the question retrieved by the related question retrieval section 1614 when the user registers data.

FIG. 163 shows a block diagram of another information sharing support system obtained by modifying the twelfth embodiment. This embodiment differs from the twelfth embodiment in that the input analysis section 1612 of FIG. 162 is divided into a question analysis section 1631 and a data analysis section 1632.

Now, the operation of the twelfth embodiment of information sharing support system will be described below firstly by referring to the flow chart of FIG. 164 and the exemplary images shown in the drawing that can be displayed on the user interface screen.

Assume that a user accesses the information sharing support system to reference a desired piece of information and inputs a request of "Tell me how to draw a patent map." in the interface window of FIG. 166 (Step S16401). Note that the input section not necessarily has to be provided with a keyboard as input section. Alternatively, it may be provided with the capability of voice recognition and voice synthesis or a combination of a keyboard and a voice recognition capability.

The input analysis section 1612 may be so adapted as to morphemically and syntactically analyze the input in a natural language to extract the request of the user therefrom (Step S16402). Methods of comprehending the meaning of an input in a natural language, solving a problem and generating a response by section of an agent are described in detail in Japanese Patent Applications Laid-Open Nos. 6-095997 and 7-86266. Now, a method that can be used for the purpose of the invention will be briefly described below.

FIG. 167 shows an exemplary result of a morphemic analysis that can be obtained by analyzing the input. Alternatively, the system may syntactically analyze the input by section of the grammatical rules stored in the input analysis section 1612 as shown in FIG. 168. If the input matches a predetermined set of rules, the nouns contained in the sentence will be coupled by "&" to form a retrieving sentence as shown below.

SQL {Select*from DB where patent & map}

The prepared retrieving sentence will then be sent to the data retrieval section 1613 as user request.

FIG. 169 shows a method of analyzing the input by referring to a dictionary of keywords. The dictionary format of FIG. 169 will be described below.

The first item says "keyword" and the second item says attribute names and their values to be used for a retrieval operation. In this example, the attribute names include "object" (object, person, place, etc.), "act" and "mode". More than one attribute names of the second item may be separated by",". More than one synonyms of the first item may also be separated by",", or arranged in different lines. The third item says "basic concept" and a basic concept will be specified by referring to a predetermined table of conceptual system as shown in FIG. 170.

The fourth item says "indispensable attribute" realized by specifying a specific combination as an indispensable requirement to be included in the retrieval conditions of the system. For example, for preparing something, an attribute value having an "object" as a basic concept that is succeeded by "&" can be accepted as a retrieval condition. If the input sentence does not contain any "object" in it, the agent asks "What is to be prepared" to the user to obtain an indispensable data for the requested retrieving operation. Likewise, "how" only indicates that the user wants a procedure for something but it can make out a retrieval condition when combined with an act "to draw".

As a result of the above analysis, the retrieval conditions for the sentence "Tell me how to draw a patent map" will be as follows.

SQL {Select*from DB where object=patent map & act=draw & mode procedure}

Thus, the sentence input by the user is determined as a request. Then, the data retrieval section 1613 retrieves a piece of information that meets the user's request by section of the retrieval conditions prepared from the request (Step S16403). The accumulated information may be so arranged that each piece of stored information can be retrieved by using a dictionary of synonyms or a dictionary of keywords as shown in FIG. 169. In the latter case, each piece of information stored in the system is registered with a set of keywords including an attribute name and an attribute value automatically assigned to it.

Another retrieving method that can be used for the purpose of the invention uses similarity. While the above retrieving formula uses SQL (structured query language), any other appropriate retrieving methods may also be used for the purpose of the invention. Since such methods are described in many documents, they will not be described here any further.

The data retrieval section 1613 provides an answer from the outcome of the retrieving operation. If a single data is obtained as a result of the retrieving operation, the entire sentence of the data may be displayed. If more than one data are obtained, only a list of the titles of the data may be displayed. Alternatively, a combination of a list and a summary or the entire sentences may be displayed depending on the circumstances (Steps S16404 and S16405).

FIGS. 171A and 171B show exemplary images that can be displayed to the user, where only the titles of the retrieved data items are shown so that the user may select any one of them at a time.

If a number of different data items are obtained as a result of the retrieving operation, one or more than one more rigorous retrieval conditions may be posed on the operation. For example, if 2,020 data items are obtained by using a condition of "object=patent" as shown in FIG. 171A, it will be time consuming to show only a list of their titles and more time consuming for the user to find out the right one from them. In FIG. 172A, the retrieved titles are partly shown in the descending order of the scores they have and the list can be pulled down by operating the right arrow on the screen. With such an arrangement, it will still be a toilsome operation for the user to find out the right answer to his or her request because the right answer may have a relatively low score.

Then, the agent may ask the user "I found 2,020 pieces of information on patent. Do you want to add a condition for retrieval?" as shown in FIG. 172B. If the user inputs "How to write claims", then conditions are made to include "object=patent and object=claim and act=write and mode=procedure" to make it easy to find out the right answer.

When displaying the outcome of the retrieving operation, the retrieving formula may be also displayed to the user on the screen. In the example of FIG. 173, a retrieving formula of "patent and claims and write and procedure 10 pieces" is displayed.

If the retrieving operations ends fruitless, the user may be notified of the fact or the retrieving operation may be continued by modifying the "and" conditions to "or" conditions until a piece of information that can meet the request is retrieved or until no retrieving operation can continue. For example, the retrieving conditions can be modified by automatically providing candidates such as "(object=patent or object=claim) and act=preparation and mode=procedure)", "(object=patent or object=claim) and act=preparation", "object=patent and object=patent" and conducting the retrieval operation until a piece of information that can meet the request is retrieved.

If the retrieving operation ends fruitless. The user may be notified of the fact and prompted to change his or her retrieval condition (Steps S16404, S16406). For example, after telling the user the outcome of the retrieving operation, the agent may ask the user "Do you change the retrieval condition?" or "Do you want to loosen the retrieval condition?" as shown in FIG. 174A. The system may show the formula of retrieval conditions as in FIG. 173.

When the user's input specifies one or more than one new retrieving conditions as shown in FIG. 174B, a set of new retrieving conditions is prepared from the input in a manner as described above and used for the succeeding retrieval operation. On the other hand, if the user answers only "yes" as shown in FIG. 175, a retrieving formula that automatically loosens the retrieving conditions may be prepared.

The request posed by the user is then stored in the question storage section 1618 (Step S16407) only when the retrieving operation ended fruitless as shown in FIG. 176 with the formula (of retrieval conditions).

If the user gets the right answer after posing a number of requests, the final request that succeeded in getting the right answer may also be recorded with the number of retrieved data items as shown in FIG. 177.

FIG. 165 is a flow chart of an alternative operation of the twelfth embodiment of information sharing support system according to the invention. In this operation, the request of the user that succeeded in getting the right answer is also recorded (Step S16501).

Still alternatively, the system may be so arranged as to ask the user if he or she want his or her request to be recorded and stores it only when the user's answer is positive as typically shown in FIG. 182. In the case of FIG. 183, if the retrieving operation conducted in response to a user's request ended fruitless, the agent asks the user, if a data that can meet the request is registered in the future, he or she wants to be notified of it. If the answer is positive, the system may record the user's name, the request and the requested date as shown in FIG. 178. Alternatively, the system may record all the requests, the users's names who posed the requests and the dates of the requests as shown in FIG. 179.

If the input is not a single sentence but provided with additional retrieval conditions, all the request sentences will be correlated and stored in the system. For example, if the user inputs two requests of knowing about "patent" and "how to write claims" as shown in FIG. 172B, ID(s) of the input sentence. that relating to the retrieving sentence will be recorded as related ID as shown in FIG. 180.

If no right answer is found as a result of a retrieving operation, the system may ask the user to specify the scope of search and records the user's request as shown in FIG. 184. In the illustrated example, the agent shows four messages of "Ask the persons who have registered related information.", "White a letter to the related news group.", "Ask knowledgeable persons by mail." and "Let the controller to search." to the user to allow the user to make a choice. Then, if the user wants to select messages "1" and "2", he or she can do so by section of a pointing device or by voicing the numbers. Then, the selected messages will be registered in the system.

Alternatively, it may be so arranged that the user can register the question he or she poses if the retrieving operation does not end fruitlessly but he or she is not satisfied with the answer. For example, if the user expresses a feeling of dissatisfaction as "Let me know more detailed information if you can," as shown in FIG. 185, the user's request will also be registered. Then, the request of "Let me know more detailed information if you can." will be correlated to the original request and registered.

Then, another user may access the information sharing support system to register a piece of information. This operation will be described by referring to the flow chart of FIG. 164. If there is a user input of "I want to register the information of a text." as shown in FIG. 186 (Step S16401), the input analysis section 1612 determines that the user's intention is to register a piece of information by referring to the table of grammatical rules stored in the system and typically expressed in the form of FIG. 168 (Step S16402).

Then, the user registers the title of the information by way of an information registration window as shown in FIG. 187. The system will operate efficiently if it is so arranged that the date of registration and the name of the author are automatically input into the system with the information.

The system may be so arranged that, if there is an input as shown in FIG. 187 by way of the user interface that is used for information retrieval, the input analysis section 1612 determines that the user's intention is to register a piece of information. Then, the user may feel it easy to register information because he or she does not have to discriminate information retrieval and information registration.

Once it is determined that the user's intention is to register a piece of information, the system generates a sentence for prompting the user to proceed as shown in FIG. 186 and presents it to the user. Alternatively, the system may change the image on the user interface so that the user may input the title and other data of the information he or she wants to register. The system will operate efficiently if it is so arranged that the date and the user ID# or user's name are automatically registered as the date of registration and as the name of the author respectively. Still alternatively, a registration command or a button may be arranged on the user interface so that the screen will show an image good for information registration when it is operated by the user. Then, the system will not have to determine the user's intention.

The title input by the user is then forwarded to the input analysis section 1612, which then may prepare a retrieving sentence as shown below by referring to the dictionary and the grammatical rules described above by referring to FIGS. 167 and 178.

SQL {Select*from DB where claims & prepare}

Or, it may prepare a retrieving sentence as shown below by referring to the dictionary of FIG. 169.

SQL {Select*from DB where object name=claims & act=prepare}

It should be noted that "claims" is a synonym of "claim 1, 2 or so on" and "express" is a synonym of "prepare". The prepared retrieving sentence is then forwarded to the related question retrieval section 1614, which retrieves related questions from the questions stored in the question storage section 1618 (Step S16408). Related questions may be so defined as sentences containing words that agree with the words contained in the retrieving sentence.

The relationship between a retrieving sentence and a retrieved questioning sentence may be determined by using a weight that varies as a function of the syntactical feature of the questioning sentence and the types and the attributes of the words used there.

A related questioning sentence may be obtained by a method as will be described below. The ratio of the number of the searched words in the related questioning sentence to that of the words contained in the formula of retrieval conditions (hereinafter referred to as the reappearing ratio) is (the number of the agreeing words contained in the formula of retrieval conditions)/(the number of the searched words)=2/2× 100=100%.

On the other hand, the ratio of the number of the searched words to the number of the words contained in the formula of retrieval conditions (hereinafter referred to as the fitting ratio is (the number of the agreeing words contained in the formula of retrieval conditions)/(the number of the contained words)=2/4× 100=50%.

For example, 70% will be given as the threshold value for the reappearing ratio and 40% will be given as the threshold value for the fitting ratio and the retrieved questioning sentences with a reappearing ration exceeding the threshold value may be arranged in the descending order of their reappearing ratios. If two or more than two sentences have a same reappearing ratio, they may be arranged in the descending order of their fitting ratios. Then, a list as shown in FIG. 188 may be obtained.

The sentences may be provided with a variable weight that varies as a function of the attributes they have. For example, of the words contained in the title, the objects expressed by a proper noun or a common noun may have a higher priority and may be followed by the acts expressed by a verb or some other noun and the lowest priority may be given to the modes. For example, while "claims for patent" and "preparation of patent specification" have a same reappearing ratio and a same fitting ratio and hence a same priority will be given to them, the reappearing ratio of "claims for patent" will be 1.2/2 and that of "preparation of patent specification" will be 0.8/2 when they are weighted by 1.2:0.8 in favor of the former so that the former may be regarded to be more related to the request sentence.

Questioning sentences that are regarded to be highly related to the requesting sentence will be presented to the user typically on a screen as shown in FIG. 189 or 190 (Steps S16409 and S16410). Then, the user may check and input one or more than one of the questioning sentences to which the data he or she is going to register may provide an answer. Alternatively, the user may give a new title to the information that answers the questioning sentences and register it as another piece of registered information. For example, the user may use the screen of FIG. 189 and operate the "different registration" button. Then, the information to be registered by the user will appear on the screen to prompt the user to proceeds with the predetermined operation for registration. Alternatively, the date and the name of the registerer of the questioning sentence may be displayed on the screen as shown in FIG. 190. Note that, if the questioning sentence and the title do not agree with each other on the synonym level, they may be regarded to be strongly correlated if they contains words that are close to each other in the conceptual system of FIG. 170.

After displaying related questioning sentences or, if no related questioning sentence is found, an image as shown in FIG. 191 or 192, the system prompt to enter the text. If the information to be registered is expected to be not in the form of text, the system may be so arranged that the user can register the file name of an image or a picture or transmit a compressed file to the system. Alternatively, the system may be so arranged that it can record information in the form of speech. If such is the case, the system may display an image as shown in FIG. 193 to prompt the user to register the information in voice. As a choice, the user may input the title and the author in the form of text.

Then, the input data will be registered in the data storage section 1617 (Step S16411). If an answer to a related question is input, it will be correlated to the question before it is registered. When an answer to a question that has been registered is obtained, it will be presented to the user who registered the question by electronic mail or at the time when the latter user accesses the system.

While the system analyzes the input title, prepares a retrieving sentence and retrieves related questions by section of the prepared retrieving sentence before the text with that title is input in the above description, it may alternatively be so arranged that the text to be registered is input with the title at first so that related questions may be retrieved by section of both the title and the text. Still alternatively, it may be so arranged that only the text is input and registered at first.

Various known method can be used for the computation of the similarity between a related question and a registered data for the purpose of the invention. Such methods include "WISE: A World Wide Web Resource Data Base System" (IEEE TRANSACTIONS ON KNOWLEDGE AND DATA ENGINEERING, Col. 8, No. 4, August 1996, pp. 548–554).

While only related questions are presented to the user who registers information in the above description, it can be so arranged that related pieces of information are presented to the user who registers information. More specifically, if such related pieces of information are presented when the title of the information is input, the user can reference them to avoid registration of similar pieces of information. Additionally, any registered data may be updated by providing a user interface adapted to evaluation, addition and correction.

While related questions are presented to a user who registers data in the above description, they may also be presented to a user who retrieves data. If the retrieved data is evaluated as "useful, useful to some extent or not very useful", related data may be presented to the person who gave such an evaluation.

If an information sharing support system according to the invention is haunted by a troublesome situation where irrelevant questions are registered or there are too may registered questions so that the number of related questions cannot be controlled appropriately, the person authorized to control the registered questions may be provided with an interface through which he or she can check and edit the questions that have been registered. The number of questions to be presented to a user can be reduced by registering the names who posed the questions and the dates when the questions are posed without registering questions detected by a same formula of retrieving conditions as similar questions.

Only a summary of related questions may be presented to a user registering a data. Such a summary may contain only the number of similar questions or the names of the persons who posed the questions. Alternatively, related questions may be weighted appropriately for priority so that only questions with high priority may be presented to the user. Such a weighting system may be so arranged that questions relating to the professional field of the user are heavily weighted and the correlation between each of the questions and the data to be registered by the user is determined on the basis of the data registered by the person who posed the question.

As described above, with the twelfth embodiment of the invention, each user request for data retrieval is recorded and, when another user registers information relating to the request, the information is presented to the first user so that the question of the second user may be answered. With this arrangement, a required piece of information may be collected from an appropriate person effectively and efficiently.

Additionally, repeated registrations of similar data can be avoided by presenting the similar data that have been registered to the user trying to register a similar data.

Thus, with this embodiment, data can be shared efficiently and repeated registrations of similar data can be effectively avoided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An information sharing system using a computer so as to allow a plurality of users to share disclosed information, said system comprising:
    an input section for receiving responses to the disclosed information from referencers of the disclosed information;
    an evaluation information generation section for totalizing and processing said responses to generate evaluation information and storing the evaluation information after correlating it with said disclosed information; and
    an evaluation information notifying section for presenting the evaluation information generated by the evaluation information generation section,
    said evaluation information notifying section including a section for notifying a provider of said disclosed information of said evaluation information.

2. An information sharing system according to claim 1, wherein:
    said evaluation information generation section includes a section for generating evaluation information on the disclosed information; and
    said section for generating evaluation information on the disclosed information being adapted to obtaining information on a utility value of said disclosed information from said responses and generating said evaluation information for said disclosed information on the basis of the obtained information by totalizing and processing said information on the utility value.

3. An information sharing support system according to claim 2, wherein said evaluation information generation section includes a section for weighting said utility value according to the attributes of the information referencer inputting an answer.

4. An information sharing support system according to claim 2, wherein said evaluation information generation section includes an emotion recognizing section;

said emotion recognizing section comprising:

a dictionary of emotional expressions storage section having a dictionary of emotional expressions for correlating sentences and acts that may be contained in responses with specific emotions and storing them;

an emotion determining section for picking up sentences and acts representing emotions from the responses input by said referencers, determining the emotions of said referencers on the basis of said dictionary of emotional expressions stored in said emotional data storage section and generating evaluation information for the disclosed information on the basis of the determined emotions.

5. An information sharing support system according to claim 4, wherein said emotion recognizing section includes a dialogue section;

said dialogue section being adapted to having a dialogue of questions and answers with said referencers;

said emotion determining section being adapted to for picking up sentences and acts representing emotions from the responses input by said referencers, determining the emotions of said referencers on the basis of said dictionary of emotional expressions stored in said emotional data storage section and generating evaluation information for the disclosed information on the basis of the determined emotions.

6. An information sharing support system according to claim 2, wherein said evaluation information notifying section includes a section for notifying said evaluation data to the provider of said disclosed information according to the request of each referencer.

7. An information sharing support system according to claim 2, wherein said evaluation information notifying section includes a section for notifying said evaluation data to the provider of said disclosed information according to the request of the provider of said disclosed information and that of a person with a predefined authority.

8. An information sharing support system according to claim 2, wherein said evaluation information notifying section includes a section for presenting said evaluation information as information indicating the effectiveness of said disclosed information to each referencer referencing said disclosed information.

9. An information sharing support system according to claim 8, wherein said evaluation information notifying section presents said evaluation information to each referencer referencing said disclosed information to a degree of detailedness that varies as a function of the attributes of the referencer.

10. An information sharing support system according to claim 2, wherein said evaluation information notifying section includes a section for notifying the provider of said disclosed information only when the evaluation information generated on the basis of the utility value input for said disclosed information differs from the evaluation information accumulated before that time by a predetermined amount.

11. An information sharing support system according to claim 2 further comprising:

a detailed information input requesting section for requesting an input of detailed information on said utility value to the referencers who entered said responses when the evaluation information generated on the basis of the utility value contained in said responses differs from the evaluation information accumulated before that time by a predetermined amount.

12. An information sharing support system according to claim 2 further comprising:

a section for obtaining attribute information from the disclosed information and storing said disclosed information with said attribute information added thereto.

13. An information sharing support system according to claim 1, wherein said evaluation information generation section has a section for generating evaluation information on the record of utilization of the information sharing system for each referencer;

said section for generating evaluation information on the record of utilization of the information sharing system for each referencer being so adapted to detect the utilization of the information sharing system on the basis of said responses and generate evaluation information on the record of utilization by totalizing the detections; and said evaluation information notifying section has a section for notifying the referencer of said disclosed information of said evaluation information.

14. An information sharing support system according to claim 13, wherein said section for generating evaluation information on the record of utilization of the information sharing system for each referencer includes a section for prompting said referencer to input incidents of utilization of said disclosed information.

15. An information sharing support system according to claim 13, wherein said section for generating evaluation information on the record of utilization of the information sharing system for each referencer includes a section for weighting said record of utilization according to the attributes of said referencer.

16. An information sharing support system according to claim 1, further comprising:

a utilization conditions storage section for storing notifying conditions for notifying said responses to the information provider of the disclosed information;

said notifying conditions being modifiable only by said information provider; and a response notifying section for notifying said information provider of any response meeting said notifying conditions.

17. An information sharing system using a computer so as to allow a plurality of users to share disclosed information said system comprising:
- an input section for receiving additional information to be added to the disclosed information from a referencer of said disclosed information;
- a semantic relationship specifying section for specifying a semantic relationship of said additional information relative to the disclosed information;
- an additional information accumulation section for storing said additional information with the semantic relationship; and
- an additional information presentation section for extracting said semantic relationship from said additional information accumulation section and presenting said additional information on the basis of the semantic relationship when presenting the disclosed information to an information referencer.

18. An information sharing support system according to claim 17, wherein
said semantic relationship specifying section includes:
- a semantic relationship accumulation section for storing in advance predetermined semantic relationships; and
- a semantic relationship determining section for analyzing said additional information and determining the semantic relationship of said additional information relative to said disclosed information by section of said semantic relationship accumulation section.

19. An information sharing support system according to claim 17, further comprising:
- a section for interpreting the disclosed information for determining if said disclosed information represents an objective fact or a subjective view;
- said additional information presentation section being adapted to display additional information having a semantic relationship of correction relative to said disclosed information if said disclosed information represents an objective fact at the time of displaying said disclosed information.

20. An information sharing support system according to claim 17, further comprising:
- a section for determining the technical field of said disclosed information;
- a section for determining the professional field of the referencer who has entered additional information relating to said disclosed information;
- a section for determining by computation the reliability of said additional information on the basis of the technical field of said disclosed information and the professional field of the user who has entered the additional information; and
- an additional information presentation control section for controlling the presentation of the additional information according to the semantic relationship between said additional information and said disclosed information and the reliability of said additional information.

21. An information sharing support system according to claim 17, wherein
said additional information presentation control section includes a section for individually controlling the presentation of the additional information to the information discloser and the information referencer according to the semantic relationship between said additional information and said disclosed information.

22. An information sharing support system according to claim 17, further comprising:
- a determining section for determining if the disclosed information represents a question or not; and
- a section for notifying the additional information to the provider of the disclosed information according to the semantic relationship between the disclosed information and the additional information if it is determined that the disclosed information represents a question.

23. An information sharing support system according to claim 20, wherein
said information presentation control section includes:
- a section for presenting the additional information as authorized information if the referencer who has input said additional information has a predetermined authority depending on the technical field of said disclosed information.

24. An information sharing support system according to claim 23, wherein
said information presentation control section includes:
- a section for notifying all the information referencers who have referenced the disclosed information provided with the authorized information of the fact that said authorized information is added or removed whenever such addition or removal occurs.

25. An information sharing support system according to claim 17, further comprising a section for requesting privileged users to input additional information to the disclosed information depending on the technical field of the disclosed information presented by said information presentation section.

26. An information sharing support system according to claim 17, further comprising:
- a storage section for storing presentation conditions for said additional information; and
- an additional information presentation control section for controlling the presentation of said additional information on the basis of the semantic relationship between said additional information and the disclosed information and the presentation conditions stored in said section when presenting the additional information.

27. An information sharing support system according to claim 26, further comprising
- a section for receiving presentation conditions from persons having a predetermined authority for the information sharing support system and the information referencer who has input said additional information.

28. An information sharing support system according to claim 26, wherein
said presentation conditions include conditions for presenting the additional information depending on the attributes of the information referencer; and
said additional information presentation control section controls the presentation of said additional information according to the presentation conditions and the attributes of the information referencer.

29. An information sharing system using a computer so as to allow a plurality of users to share disclosed information, said system comprising:
- a request input section for receiving and storing the requests of information requesters; and
- a request particulars presentation section for analyzing the contents of the disclosed information when said information is registered by an information discloser and extracting requests related to the disclosed information from said request input section to present the requests to the information disclosure wherein said request input section analyzes the particulars of said request, extracts keywords therefrom and stores said request as correlated with said keywords;

said request particulars presentation section retrieves request information by using said keywords as clues and presents it to the information discloser.

30. A computer program product for an information sharing system using a computer so as to allow a plurality of users to share disclosed information, said computer program product comprising:

a storage medium including a section for issuing commands to said information sharing support system including:

an input command for receiving responses from referencers of disclosed information;

an evaluation information generation command for generating evaluation information by summing up said responses correlating the evaluation information to said disclosed information and storing it; and an evaluation information notifying command for presenting the evaluation information generated by the evaluation information generation section, said evaluation information notifying command including a command for notifying a provider of said disclosed information of said evaluation information.

31. A computer program product according to claim 30, wherein said evaluation information generation command includes a command for obtaining information on a utility value of said disclosed information from said responses and generating said evaluation information for the disclosed information on the basis of the obtained information by summing up and processing said information on said utility value.

32. A computer program product according to claim 31, wherein said evaluation information generation command includes a command for weighting said utility value according to the attributes of the information referencer inputting an answer.

33. A computer program product according to claim 31, wherein said evaluation information generation command includes an emotion recognizing command;

said emotion recognizing command comprising:

a dictionary of emotional expressions storage command having a dictionary of emotional expressions for correlating sentences and acts that may be contained in responses with specific emotions and storing them;

an emotion determining command for picking up sentences and acts representing emotions from the responses input by said referencers, determining the emotions of said referencers on the basis of said dictionary of emotional expressions stored in said emotional data storage command and generating evaluation information for the disclosed information on the basis of the determined emotions.

34. A computer program product according to claim 33, wherein said emotion recognizing command includes a dialogue command;

said dialogue command being adapted to having a dialogue of questions and answers with said referencers;

said emotion determining command being adapted to for picking up sentences and acts representing emotions from the responses input by said referencers, determining the emotions of said referencers on the basis of said dictionary of emotional expressions stored in said emotional data storage command and generating evaluation information for the disclosed information on the basis of the determined emotions.

35. A computer program product according to claim 31, wherein said evaluation information notifying command includes a command for notifying said evaluation data to the provider of said disclosed information according to the request of each referencer.

36. A computer program product according to claim 31, wherein said evaluation information notifying command includes a command for notifying said evaluation data to the provider of said disclosed information according to the request of the provider of said disclosed information and that of a person with a predefined authority.

37. A computer program product according to claim 31, wherein said evaluation information notifying command includes a command for presenting said evaluation information as information indicating the effectiveness of said disclosed information to each referencer referencing said disclosed information.

38. A computer program product according to claim 37, wherein said evaluation information notifying command presents said evaluation information to each referencer referencing said disclosed information to a degree of detailedness that varies as a function of the attributes of the referencer.

39. A computer program product according to claim 31, wherein said evaluation information notifying command includes a command for notifying the provider of said disclosed information only when the evaluation information generated on the basis of the utility value input for said disclosed information differs from the evaluation information accumulated before that time by a predetermined amount.

40. A computer program product according to claim 31, further comprising:

a detailed information input requesting command for requesting an input of detailed information on said utility value to the referencers who entered said responses when the evaluation information generated on the basis of the utility value contained in said responses differs from the evaluation information accumulated before that time by a predetermined amount.

41. A computer program product according to claim 31, further comprising:

a command for obtaining attribute information from the disclosed information and storing said disclosed information with said attribute information added thereto.

42. A computer program product according to claim 30, wherein said evaluation information generation command has a command for generating evaluation information on the record of utilization of the information sharing system for each referencer;

said command for generating evaluation information on the record of utilization of the information sharing system for each referencer being so adapted to detect the utilization of the information sharing system on the basis of said responses and generate evaluation information on the record of utilization by totalizing the detections; and said evaluation information notifying command has a command for notifying the referencer of said disclosed information of said evaluation information.

43. A computer program product according to claim 42, wherein said command for generating evaluation information on the record of utilization of the information sharing system for each referencer includes a command for prompting said referencer to input incidents of utilization of said disclosed information.

44. A computer program product according to claim 42, wherein said command for generating evaluation information on the record of utilization of the information sharing system for each referencer includes a command for weighting said record of utilization according to the attributes of said referencer.

45. A computer program product according to claim 30 further comprising:

a utilization conditions storage command for storing notifying conditions for notifying said responses to the information provider of the disclosed information;

said notifying conditions being modifiable only by said information provider; and a response notifying command for notifying said information provider of any response meeting said notifying conditions.

46. A computer program product for an information sharing system using a computer so as to allow a plurality of users to share disclosed information, said computer program product comprising:

a storage medium including a section for issuing commands to said information sharing support system including:

an input command for receiving additional information to be added to the disclosed information from a reference of said disclosed information;

a semantic relationship specifying command for specifying a semantic relationship of said additional information relative to the disclosed information;

an additional information accumulation command for storing said additional information with the semantic relationship; and an additional information presentation command for extracting said semantic relationship from said additional information accumulation command and presenting said additional information on the basis of the semantic relationship when presenting the disclosed information to an information referencer.

47. A computer program product according to claim 46, wherein said semantic relationship specifying command includes:

a semantic relationship accumulation command for storing in advance predetermined semantic relationships; and a semantic relationship determining command for analyzing said additional information and determining the semantic relationship of said additional information relative to said disclosed information by section of said semantic relationship accumulation command.

48. A computer program product according to claim 46, further comprising:

a command for interpreting the disclosed information for determining if said disclosed information represents an objective fact or a subjective view;

said additional information presentation command being adapted to display additional information having a semantic relationship of correction relative to said disclosed information if said disclosed information represents an objective fact at the time of displaying said disclosed information.

49. A computer program product according to claim 46, further comprising:

a command for determining the technical field of said disclosed information;

a command for determining the professional field of the referencer who has entered additional information relating to said disclosed information;

a command for determining by computation the reliability of said additional information on the basis of the technical field of said disclosed information and the professional field of the user who has entered the additional information; and an additional information presentation control command for controlling the presentation of the additional information according to the semantic relationship between said additional information and said disclosed information and the reliability of said additional information.

50. A computer program product according to claim 46, wherein said additional information presentation control command includes a command for individually controlling the presentation of the additional information to the information discloser and the information referencer according to the semantic relationship between said additional information and said disclosed information.

51. A computer program product according to claim 46, further comprising:

a determining command for determining if the disclosed information represents a question or not; and a command for notifying the additional information to the provider of the disclosed information according to the semantic relationship between the disclosed information and the additional information if it is determined that the disclosed information represents a question.

52. A computer program product according to claim 49, wherein said information presentation control command includes:

a command for presenting the additional information as authorized information if the referencer who has input said additional information has a predetermined authority depending on the technical field of said disclosed information.

53. A computer program product according to claim 52, wherein said information presentation control command includes:

a command for notifying all the information referencers who have referenced the disclosed information provided with the authorized information of the fact that said authorized information is added or removed whenever such addition or removal occurs.

54. A computer program product according to claim 46, further comprising a command for requesting privileged users to input additional information to the disclosed information depending on the technical field of the disclosed information presented by said information presentation command.

55. A computer program product according to claim 46, further comprising:

a storage command for storing presentation conditions for said additional information; and an additional information presentation control command for controlling the presentation of said additional information on the basis of the semantic relationship between said additional information and the disclosed information and the presentation conditions stored in said command when presenting the additional information.

56. A computer program product according to claim 55, further comprising a command for receiving presentation conditions from persons having a predetermined authority for the information sharing support system and the information referencer who has input said additional information.

57. A computer program product according to claim 55, wherein said presentation conditions include conditions for presenting the additional information depending on the attributes of the information referencer; and said additional information presentation control command controls the presentation of said additional information according to the presentation conditions and the attributes of the information referencer.

58. A computer program product for an information sharing system using a computer so as to allow a plurality of users to share disclosed information, said computer program product comprising:

a request input command for receiving and storing the requests of information requesters; and a request particulars presentation command for analyzing the contents of the disclosed information when said information is registered by an information discloser and extracting requests related to the disclosed information from said request input command to present the requests to the information discloser.

59. A computer program product according to claim 58, wherein said request input command analyzes the particulars of said request, extracts keywords therefrom and stores said request as correlated with said keywords;

said request particulars presentation command retrieves request information by using said keywords as clues and presents it to the information discloser.

* * * * *

UNITED STATES PATENT AND TRADEMARK OFFICE
CERTIFICATE OF CORRECTION

PATENT NO.   : 6,339,774 B1
DATED        : January 15, 2002
INVENTOR(S)  : Nakayama et al.

It is certified that error appears in the above-identified patent and that said Letters Patent is hereby corrected as shown below:

<u>Title page,</u>
Item [45], and the Notice information should read:

-- [45] Date of Patent:          *Jan. 15, 2002

[*]   Notice:   This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Tenth Day of September, 2002

Attest:

JAMES E. ROGAN
Attesting Officer                 Director of the United States Patent and Trademark Office